US007818691B2

(12) United States Patent
Irvine

(10) Patent No.: US 7,818,691 B2
(45) Date of Patent: Oct. 19, 2010

(54) ZEROCLICK

(76) Inventor: Nes Stewart Irvine, 16 Sollershott West, Letchworth, Hertfordshire (GB) SG6 3PX ( * ) Notice: Subject to any disclaimer, the term of this patent is extended or adjusted under 35 U.S.C. 154(b) by 983 days.

(21) Appl. No.: 10/275,863

(22) PCT Filed: May 3, 2001

(86) PCT No.: PCT/GB01/01978

§ 371 (c)(1),
(2), (4) Date: Apr. 11, 2003

(87) PCT Pub. No.: WO02/05081

PCT Pub. Date: Jan. 17, 2002

(65) Prior Publication Data

US 2003/0197744 A1 Oct. 23, 2003

(30) Foreign Application Priority Data

| | | |
|---|---|---|
| May 11, 2000 | (GB) | 0011321.7 |
| May 12, 2000 | (GB) | 0011370.4 |
| May 12, 2000 | (GB) | 0011441.3 |
| May 24, 2000 | (GB) | 0012582.3 |
| Nov. 1, 2000 | (GB) | 0026891.2 |
| Nov. 20, 2000 | (GB) | 0028097.4 |
| Nov. 27, 2000 | (GB) | 0028693.0 |
| Nov. 30, 2000 | (GB) | 0029148.4 |
| Dec. 21, 2000 | (GB) | 0031164.7 |
| Dec. 27, 2000 | (GB) | 0031680.2 |

(51) Int. Cl.
*G06F 3/00* (2006.01)
*G06F 3/033* (2006.01)

(52) U.S. Cl. ....................... 715/856; 715/863; 715/802; 715/805; 715/711; 345/157; 345/163; 345/179

(58) Field of Classification Search ......... 715/856–863, 715/802–803, 701–702, 764, 805, 711; 709/218, 709/224; 345/157, 163, 179
See application file for complete search history.

(56) References Cited

U.S. PATENT DOCUMENTS

| | | | | |
|---|---|---|---|---|
| 5,600,778 A * | 2/1997 | Swanson et al. | | 715/762 |
| 5,689,667 A * | 11/1997 | Kurtenbach | | 715/810 |
| 5,721,853 A | 2/1998 | Smith | | |
| 5,745,116 A * | 4/1998 | Pisutha-Arnond | | 715/863 |
| 5,790,115 A * | 8/1998 | Pleyer et al. | | 715/716 |
| 5,805,167 A * | 9/1998 | van Cruyningen | | 715/808 |
| 6,028,271 A | 2/2000 | Gillespie et al. | | |

(Continued)

FOREIGN PATENT DOCUMENTS

EP 0 660 218 6/1995

*Primary Examiner*—Tadeese Hailu

(57) ABSTRACT

A GUI interface, a method of programming a GUI interface, and an apparatus which enables functions of controls in the GUI to be activated by a movement to a control and then another subsequent movement related to that control. It may be defined more precisely below. A GUI in which, when a pointer 0 is immediately adjacent or passes over a control area 1, a procedure is initiated whereby subsequent movement of the pointer over a predetermined path area 3 generates a 'click' event which simulates direct clicking of the control 1 and moving outside the predetermined path area 3 prior to completion of the path 3 resets the control to as if the pointer has never started along the predetermined path area 3.

105 Claims, 42 Drawing Sheets

U.S. PATENT DOCUMENTS

| | | | | |
|---|---|---|---|---|
| 6,057,844 | A * | 5/2000 | Strauss | 715/863 |
| 6,094,197 | A * | 7/2000 | Buxton et al. | 715/863 |
| 6,101,498 | A * | 8/2000 | Scaer et al. | 707/10 |
| 6,104,400 | A * | 8/2000 | Halachmi et al. | 715/854 |
| 6,239,803 | B1 * | 5/2001 | Driskell | 715/810 |
| 6,337,698 | B1 * | 1/2002 | Keely et al. | 715/823 |
| 6,429,846 | B2 * | 8/2002 | Rosenberg et al. | 345/156 |
| 6,445,383 | B1 * | 9/2002 | Chambers et al. | 345/173 |
| 6,496,206 | B1 * | 12/2002 | Mernyk et al. | 715/835 |
| 6,618,063 | B1 * | 9/2003 | Kurtenbach | 715/834 |
| 6,707,443 | B2 * | 3/2004 | Bruneau et al. | 345/156 |
| 6,819,345 | B1 * | 11/2004 | Jones et al. | 715/856 |
| 6,915,489 | B2 * | 7/2005 | Gargi | 715/790 |
| 7,003,734 | B1 * | 2/2006 | Gardner et al. | 715/808 |
| 2002/0087661 | A1 * | 7/2002 | Matichuk et al. | 709/218 |
| 2003/0200505 | A1 * | 10/2003 | Evans | 715/507 |

* cited by examiner

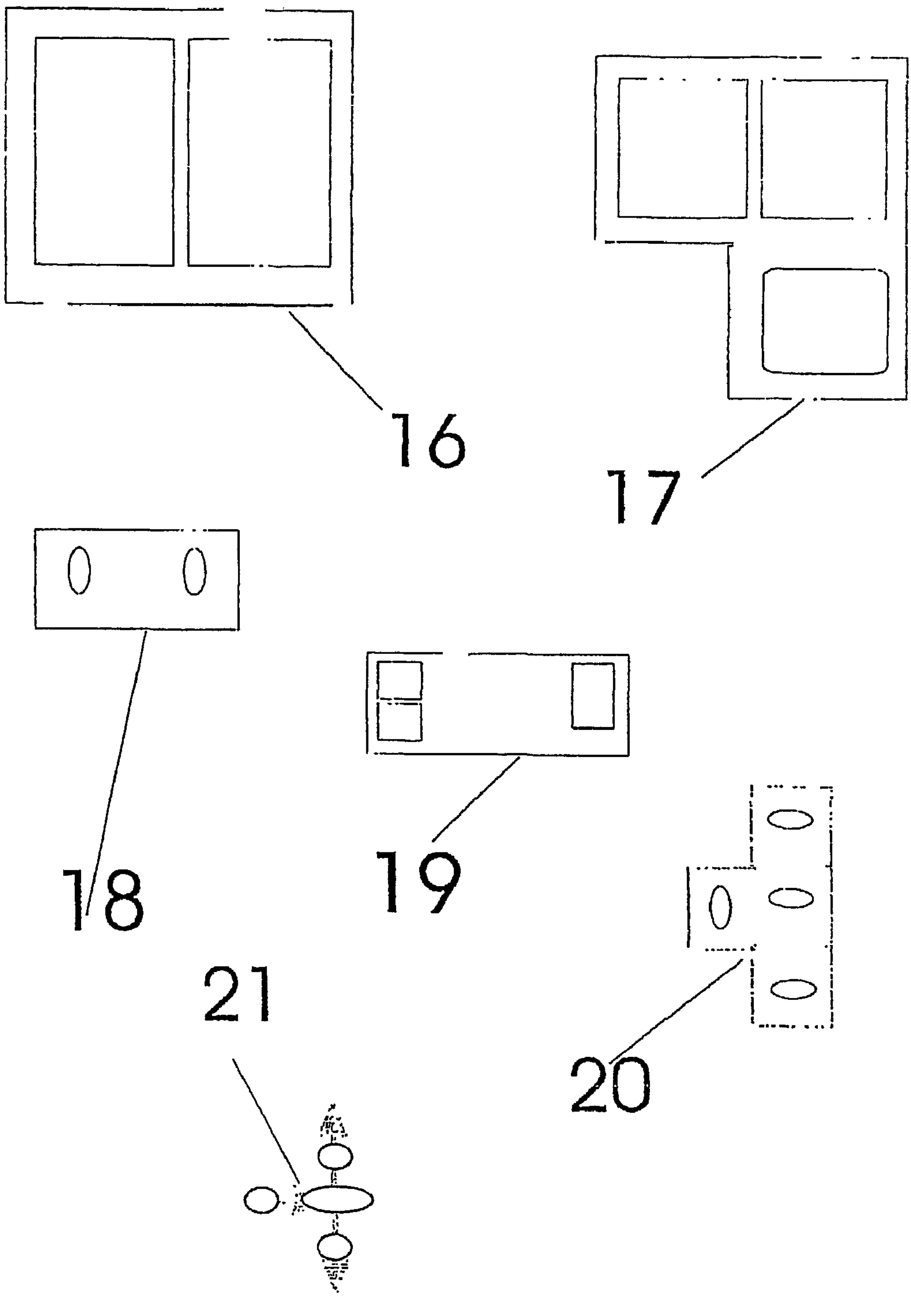
Fig. 11 (16 - 21)

Fig. 18
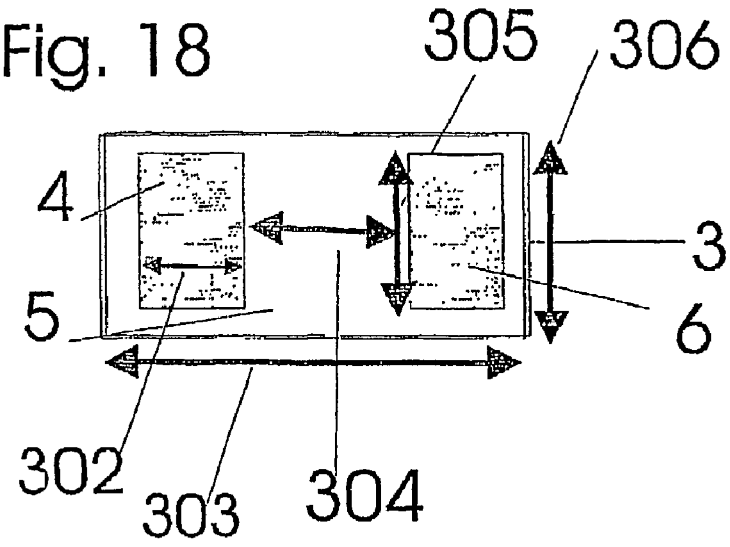
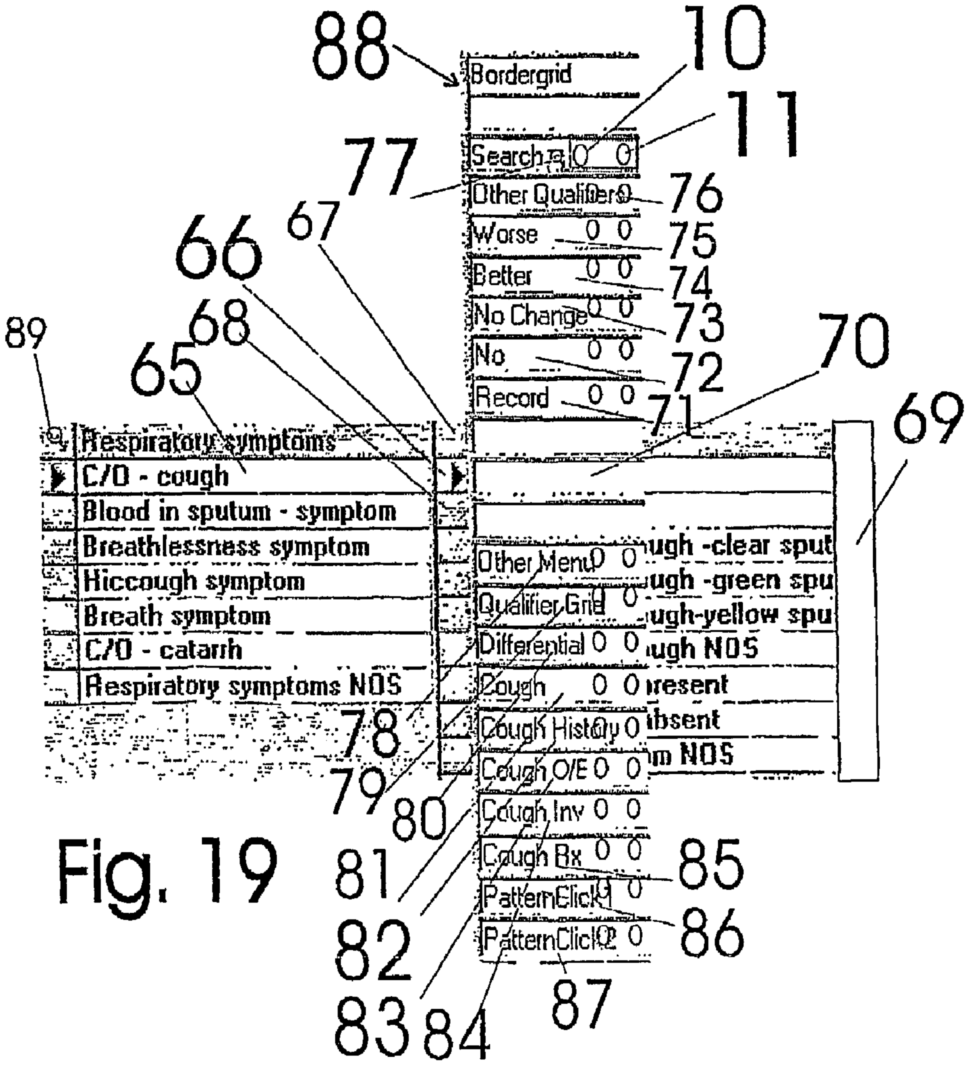
Fig. 19

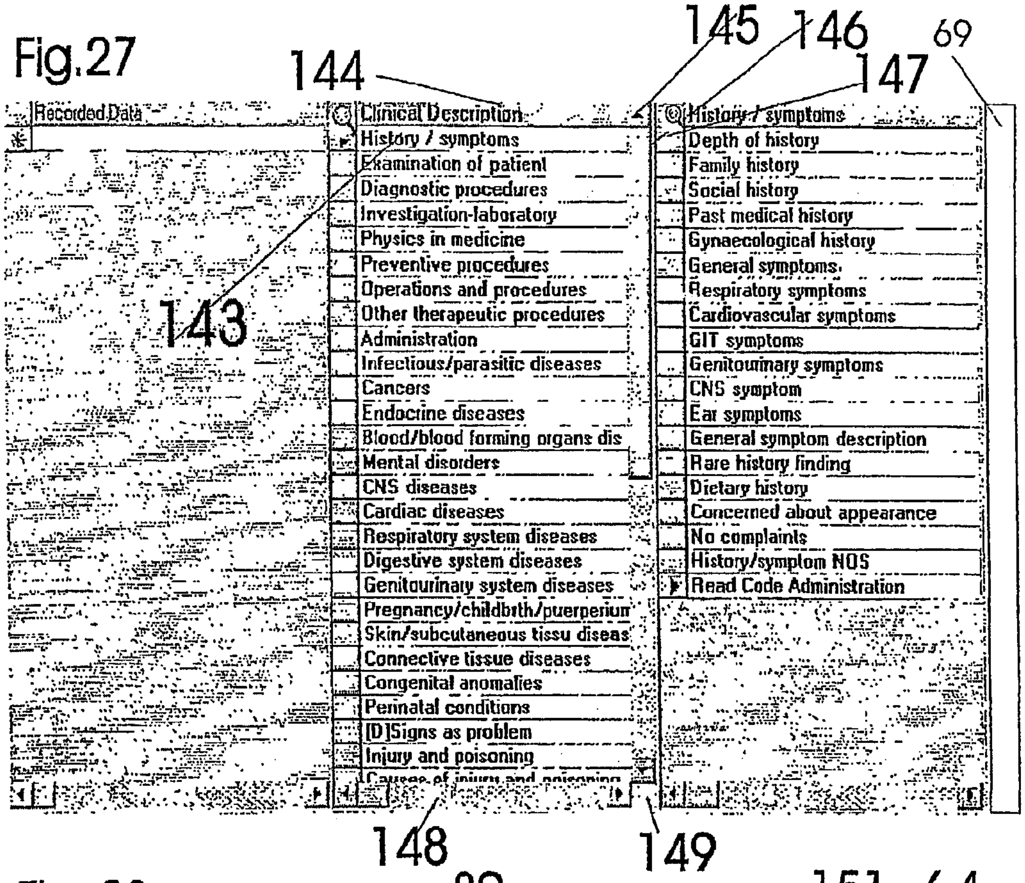

Fig. 27

Clinical Description 144 — 145 146 History/symptoms 147 — 69

| Recorded Data | Clinical Description | History / symptoms |
|---|---|---|
| | History / symptoms | Depth of history |
| | Examination of patient | Family history |
| | Diagnostic procedures | Social history |
| | Investigation-laboratory | Past medical history |
| | Physics in medicine | Gynaecological history |
| | Preventive procedures | General symptoms |
| | Operations and procedures | Respiratory symptoms |
| | Other therapeutic procedures | Cardiovascular symptoms |
| | Administration | GIT symptoms |
| | Infectious/parasitic diseases | Genitourinary symptoms |
| | Cancers | CNS symptom |
| | Endocrine diseases | Ear symptoms |
| | Blood/blood forming organs dis | General symptom description |
| | Mental disorders | Rare history finding |
| | CNS diseases | Dietary history |
| | Cardiac diseases | Concerned about appearance |
| | Respiratory system diseases | No complaints |
| | Digestive system diseases | History/symptom NOS |
| | Genitourinary system diseases | Read Code Administration |
| | Pregnancy/childbirth/puerperium | |
| | Skin/subcutaneous tissu diseas | |
| | Connective tissue diseases | |
| | Congenital anomalies | |
| | Perinatal conditions | |
| | [D]Signs as problem | |
| | Injury and poisoning | |
| | Causes of injury and poisoning | |

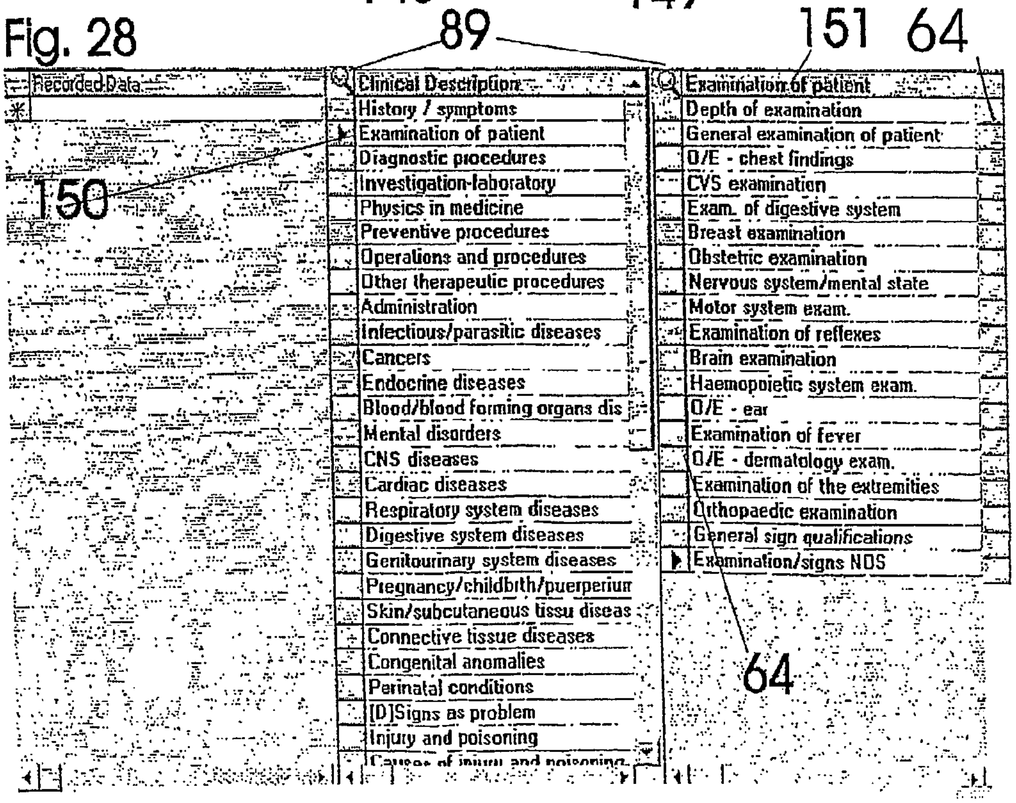

Fig. 28

89 — Examination of patient 151 64

| Recorded Data | Clinical Description | Examination of patient |
|---|---|---|
| | History / symptoms | Depth of examination |
| | Examination of patient | General examination of patient |
| | Diagnostic procedures | O/E - chest findings |
| | Investigation-laboratory | CVS examination |
| | Physics in medicine | Exam. of digestive system |
| | Preventive procedures | Breast examination |
| | Operations and procedures | Obstetric examination |
| | Other therapeutic procedures | Nervous system/mental state |
| | Administration | Motor system exam. |
| | Infectious/parasitic diseases | Examination of reflexes |
| | Cancers | Brain examination |
| | Endocrine diseases | Haemopoietic system exam. |
| | Blood/blood forming organs dis | O/E - ear |
| | Mental disorders | Examination of fever |
| | CNS diseases | O/E - dermatology exam. |
| | Cardiac diseases | Examination of the extremities |
| | Respiratory system diseases | Orthopaedic examination |
| | Digestive system diseases | General sign qualifications |
| | Genitourinary system diseases | Examination/signs NOS |
| | Pregnancy/childbirth/puerperium | |
| | Skin/subcutaneous tissu diseas | |
| | Connective tissue diseases | |
| | Congenital anomalies | 64 |
| | Perinatal conditions | |
| | [D]Signs as problem | |
| | Injury and poisoning | |
| | Causes of injury and poisoning | |

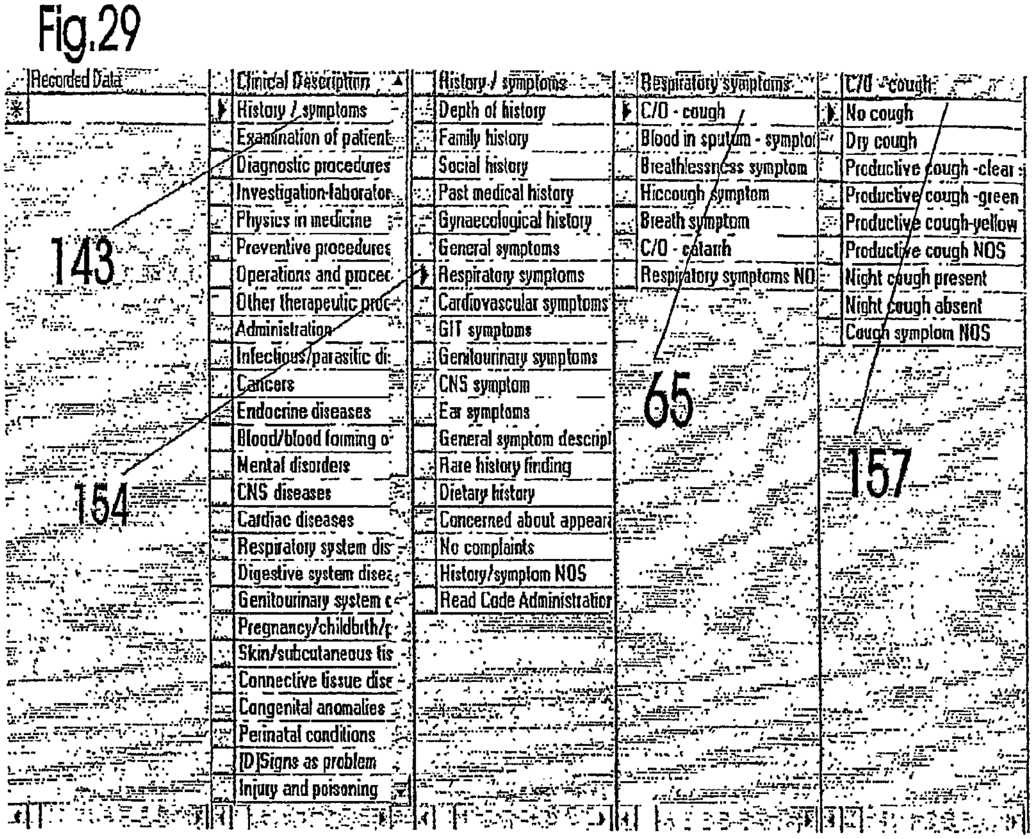

Fig.30

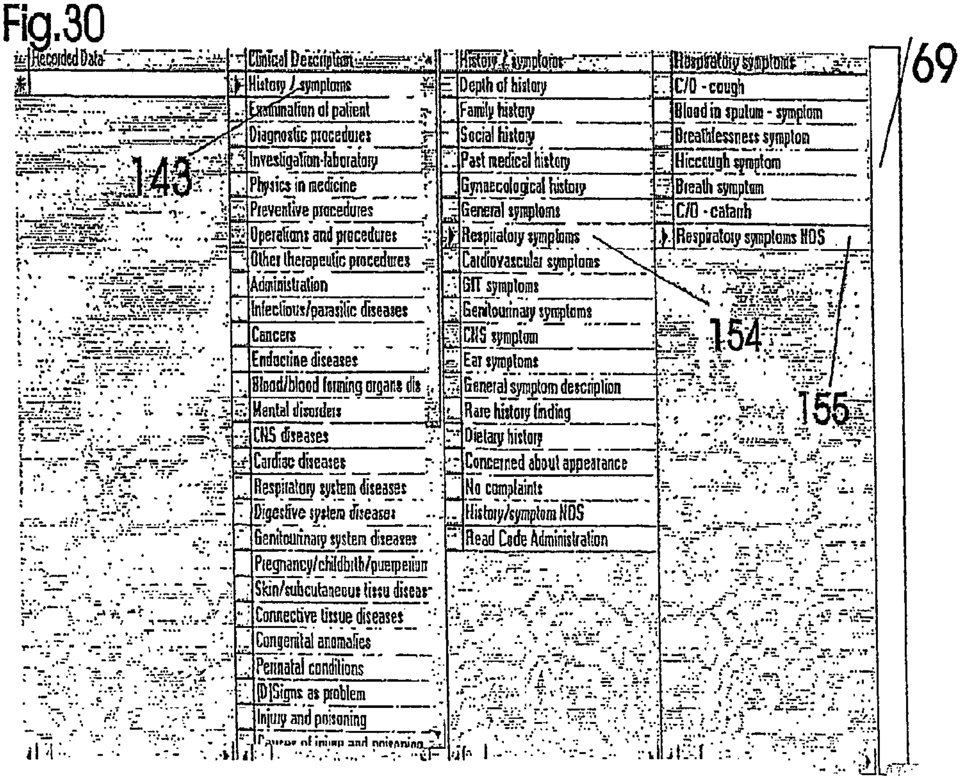

| Recorded Data | Clinical Description | History / symptoms | Respiratory symptoms | C/O - cough |
|---|---|---|---|---|
| | History / symptoms | Depth of history | C/O - cough | No cough |
| | Examination of patient | Family history | Blood in sputum - symptom | Dry cough |
| | Diagnostic procedures | Social history | Breathlessness symptom | Productive cough -clear |
| | Investigation-laborator | Past medical history | Hiccough symptom | Productive cough -green |
| | Physics in medicine | Gynaecological history | Breath symptom | Productive cough-yellow |
| | Preventive procedures | General symptoms | C/O - catarrh | Productive cough NOS |
| | Operations and proced | Respiratory symptoms | Respiratory symptoms NO | Night cough present |
| | Other therapeutic proc | Cardiovascular symptoms | | Night cough absent |
| | Administration | GIT symptoms | | Cough symptom NOS |
| | Infectious/parasitic di | Genitourinary symptoms | | |
| | Cancers | CNS symptom | | |
| | Endocrine diseases | Ear symptoms | | |
| | Blood/blood forming o | General symptom descripl | | |
| | Mental disorders | Rare history finding | | |
| | CNS diseases | Dietary history | | |
| | Cardiac diseases | Concerned about appear | | |
| | Respiratory system dis | No complaints | | |
| | Digestive system disea | History/symptom NOS | | |
| | Genitourinary system d | Read Code Administration | | |
| | Pregnancy/childbirth/p | | | |
| | Skin/subcutaneous tis | | | |
| | Connective tissue dise | | | |
| | Congenital anomalies | | | |
| | Perinatal conditions | | | |
| | [D]Signs as problem | | | |
| | Injury and poisoning | | | |

| Recorded Data | Clinical Description | History / symptoms | Respiratory symptoms |
|---|---|---|---|
| | History / symptoms | Depth of history | C/O - cough |
| | Examination of patient | Family history | Blood in sputum - symptom |
| | Diagnostic procedures | Social history | Breathlessness symptom |
| | Investigation-laboratory | Past medical history | Hiccough symptom |
| | Physics in medicine | Gynaecological history | Breath symptom |
| | Preventive procedures | General symptoms | C/O - catarrh |
| | Operations and procedures | Respiratory symptoms | Respiratory symptoms NOS |
| | Other therapeutic procedures | Cardiovascular symptoms | |
| | Administration | GIT symptoms | |
| | Infectious/parasitic diseases | Genitourinary symptoms | |
| | Cancers | CNS symptom | |
| | Endocrine diseases | Ear symptoms | |
| | Blood/blood forming organs dis | General symptom description | |
| | Mental disorders | Rare history finding | |
| | CNS diseases | Dietary history | |
| | Cardiac diseases | Concerned about appearance | |
| | Respiratory system diseases | No complaints | |
| | Digestive system diseases | History/symptom NOS | |
| | Genitourinary system diseases | Read Code Administration | |
| | Pregnancy/childbirth/puerperium | | |
| | Skin/subcutaneous tissu disea | | |
| | Connective tissue diseases | | |
| | Congenital anomalies | | |
| | Perinatal conditions | | |
| | [D]Signs as problem | | |
| | Injury and poisoning | | |

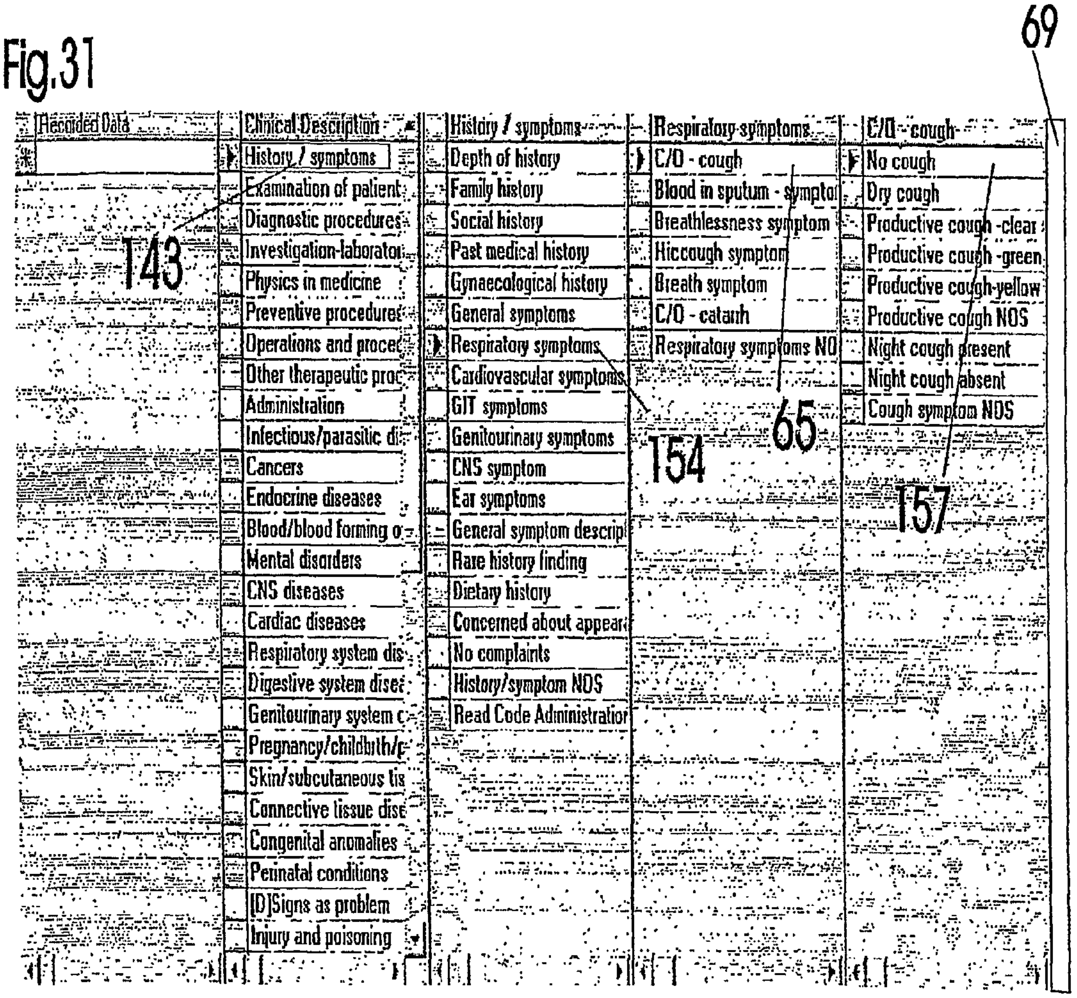

Fig.31

| Recorded Data | Clinical Description | History / symptoms | Respiratory symptoms | C/O - cough |
|---|---|---|---|---|
|  | History / symptoms | Depth of history | C/O - cough | No cough |
|  | Examination of patient | Family history | Blood in sputum - symptom | Dry cough |
|  | Diagnostic procedures | Social history | Breathlessness symptom | Productive cough -clear |
|  | Investigation-laboratory | Past medical history | Hiccough symptom | Productive cough -green |
|  | Physics in medicine | Gynaecological history | Breath symptom | Productive cough-yellow |
|  | Preventive procedures | General symptoms | C/O - catarrh | Productive cough NOS |
|  | Operations and proced | Respiratory symptoms | Respiratory symptoms NOS | Night cough present |
|  | Other therapeutic proc | Cardiovascular symptoms |  | Night cough absent |
|  | Administration | GIT symptoms |  | Cough symptom NOS |
|  | Infectious/parasitic di | Genitourinary symptoms |  |  |
|  | Cancers | CNS symptom |  |  |
|  | Endocrine diseases | Ear symptoms |  |  |
|  | Blood/blood forming o | General symptom descrip |  |  |
|  | Mental disorders | Rare history finding |  |  |
|  | CNS diseases | Dietary history |  |  |
|  | Cardiac diseases | Concerned about appear |  |  |
|  | Respiratory system dis | No complaints |  |  |
|  | Digestive system disea | History/symptom NOS |  |  |
|  | Genitourinary system c | Read Code Administration |  |  |
|  | Pregnancy/childbirth/p |  |  |  |
|  | Skin/subcutaneous tis |  |  |  |
|  | Connective tissue dise |  |  |  |
|  | Congenital anomalies |  |  |  |
|  | Perinatal conditions |  |  |  |
|  | [D]Signs as problem |  |  |  |
|  | Injury and poisoning |  |  |  |

Fig. 32
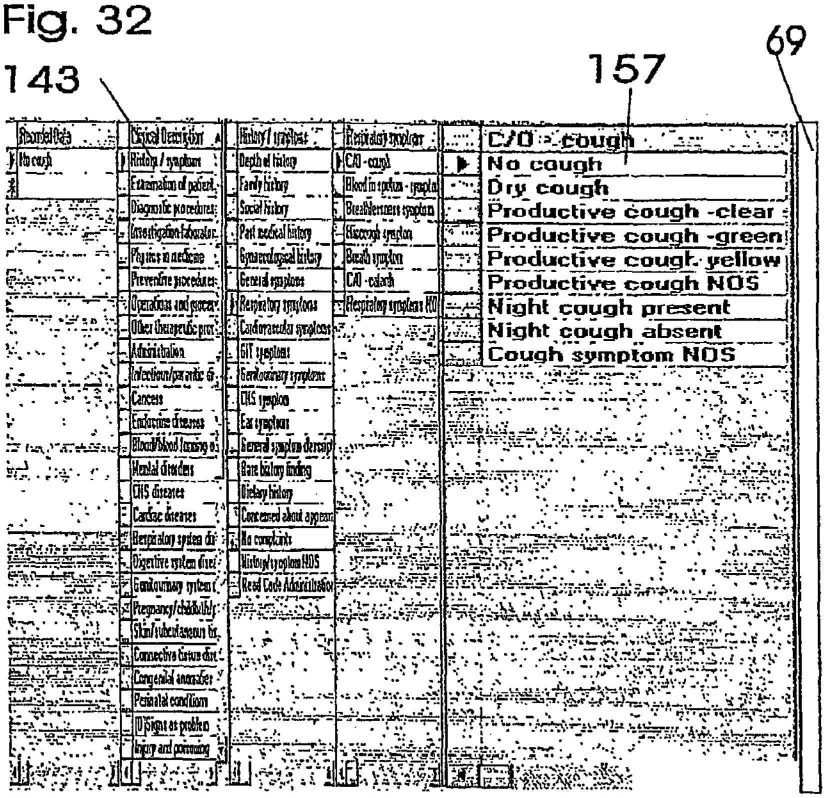
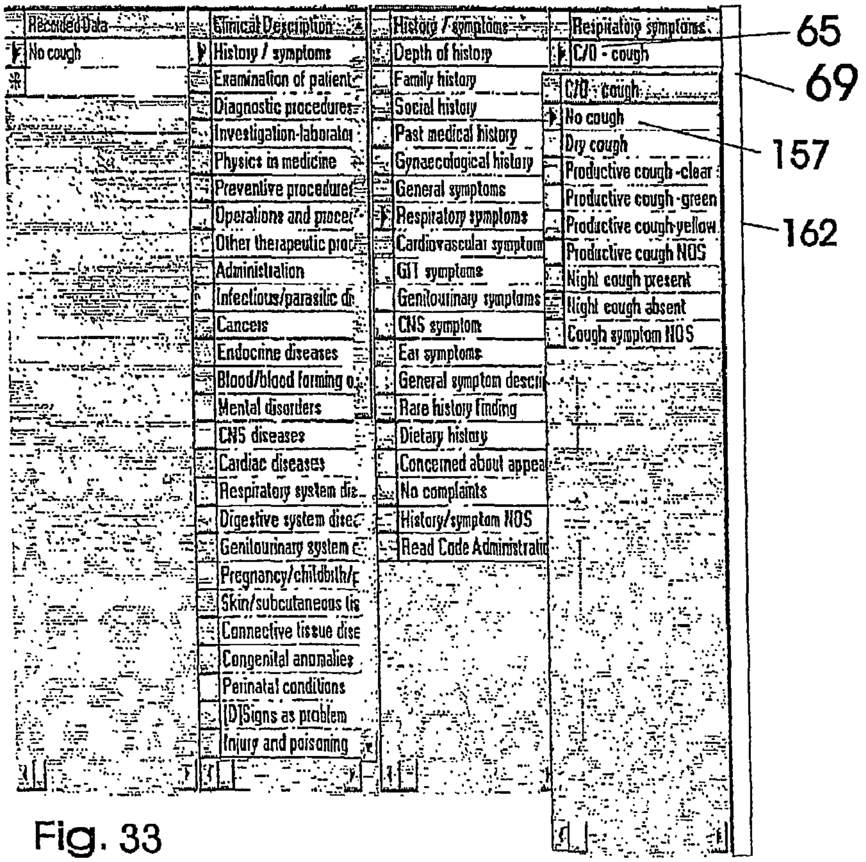
Fig. 33

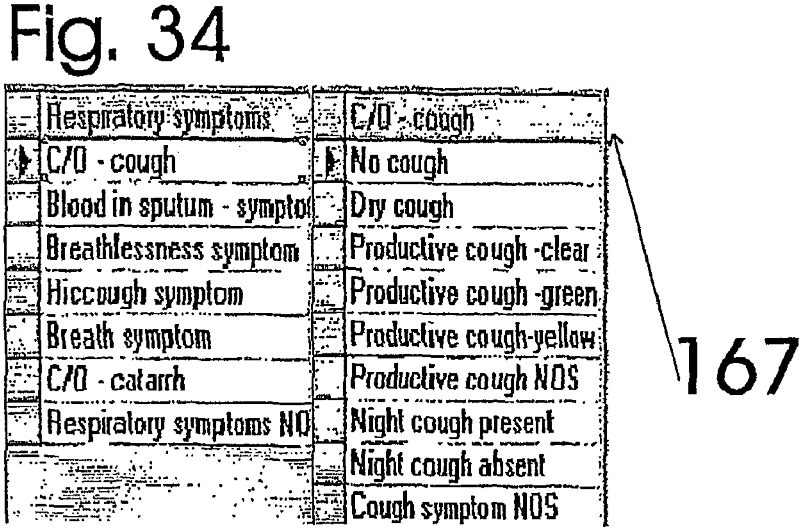

Fig. 34

| Respiratory symptoms | C/O - cough |
|---|---|
| C/O - cough | No cough |
| Blood in sputum - sympto| | Dry cough |
| Breathlessness symptom | Productive cough -clear |
| Hiccough symptom | Productive cough -green |
| Breath symptom | Productive cough-yellow |
| C/O - catarrh | Productive cough NOS |
| Respiratory symptoms NO| | Night cough present |
| | Night cough absent |
| | Cough symptom NOS |

→ 167

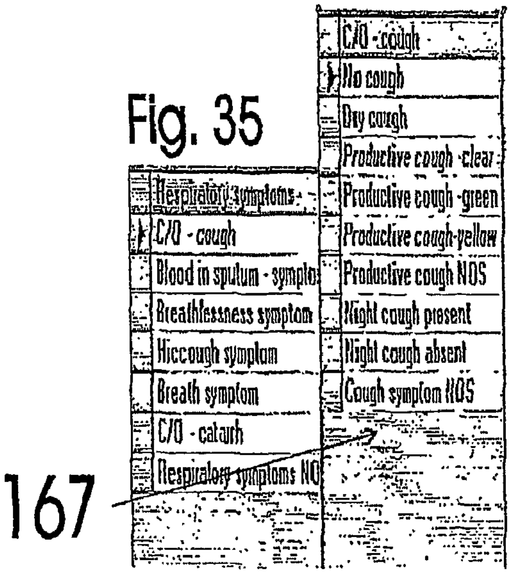

Fig. 35

| | C/O - cough |
|---|---|
| | No cough |
| | Dry cough |
| | Productive cough -clear |
| Respiratory symptoms | Productive cough -green |
| C/O - cough | Productive cough-yellow |
| Blood in sputum - sympto| | Productive cough NOS |
| Breathlessness symptom | Night cough present |
| Hiccough symptom | Night cough absent |
| Breath symptom | Cough symptom NOS |
| C/O - catarrh | |
| Respiratory symptoms NO| | |

167

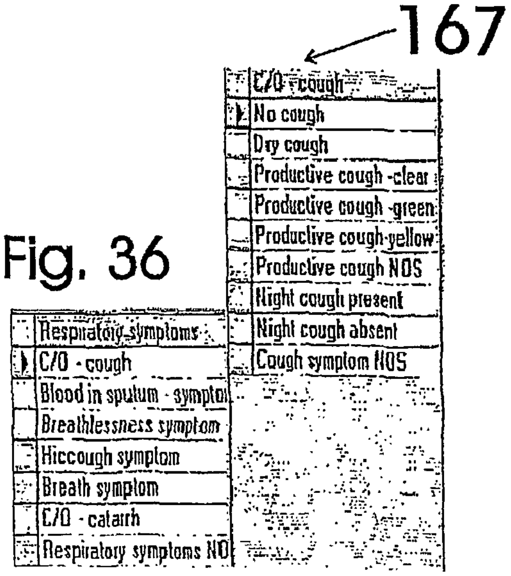

| | C/O - cough |
|---|---|
| | No cough |
| | Dry cough |
| | Productive cough -clear |
| | Productive cough -green |
| | Productive cough-yellow |
| | Productive cough NOS |
| | Night cough present |
| Respiratory symptoms | Night cough absent |
| C/O - cough | Cough symptom NOS |
| Blood in sputum - sympto| | |
| Breathlessness symptom | |
| Hiccough symptom | |
| Breath symptom | |
| C/O - catarrh | |
| Respiratory symptoms NO| | |

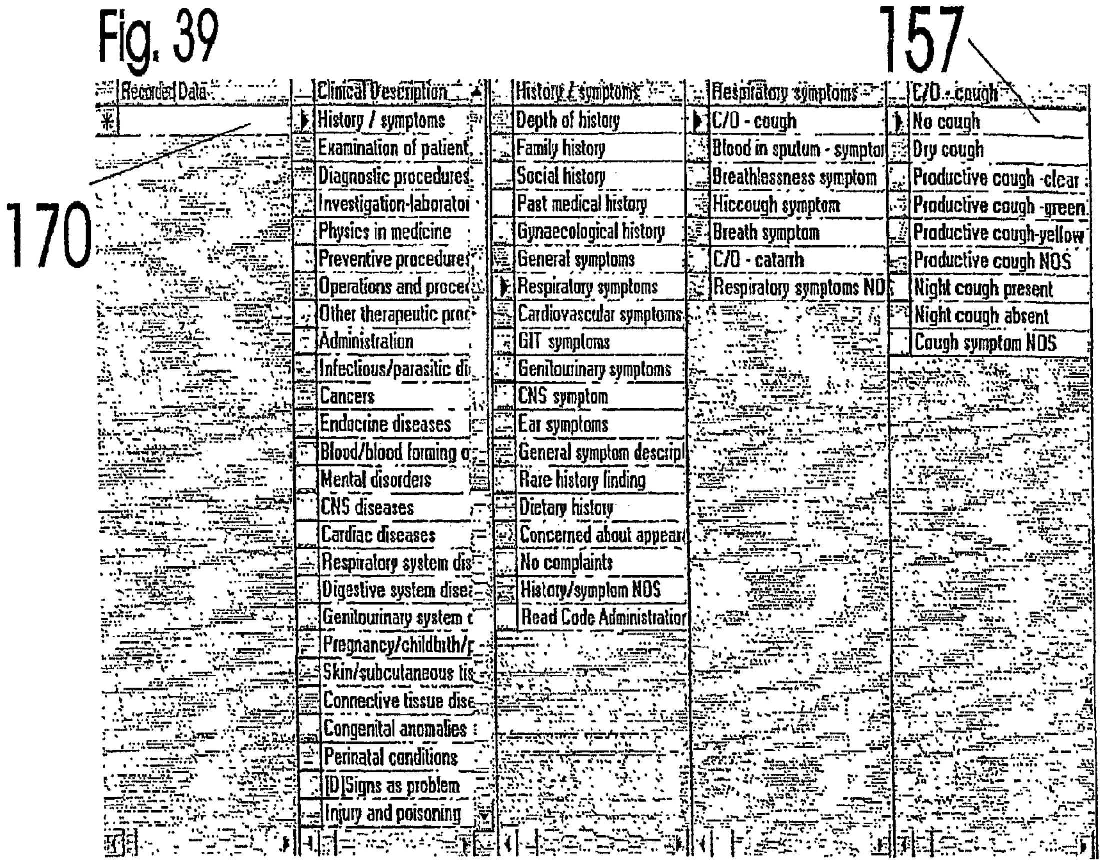

| Recorded Data | Clinical Description | History / symptoms | Respiratory symptoms | C/O - cough |
|---|---|---|---|---|
| * | History / symptoms | Depth of history | C/O - cough | No cough |
|  | Examination of patient | Family history | Blood in sputum - symptom | Dry cough |
|  | Diagnostic procedures | Social history | Breathlessness symptom | Productive cough -clear |
|  | Investigation-laboratol | Past medical history | Hiccough symptom | Productive cough -green |
|  | Physics in medicine | Gynaecological history | Breath symptom | Productive cough-yellow |
|  | Preventive procedures | General symptoms | C/O - catarrh | Productive cough NOS |
|  | Operations and proced | Respiratory symptoms | Respiratory symptoms NOS | Night cough present |
|  | Other therapeutic proc | Cardiovascular symptoms |  | Night cough absent |
|  | Administration | GIT symptoms |  | Cough symptom NOS |
|  | Infectious/parasitic di | Genitourinary symptoms |  |  |
|  | Cancers | CNS symptom |  |  |
|  | Endocrine diseases | Ear symptoms |  |  |
|  | Blood/blood forming o | General symptom descrip |  |  |
|  | Mental disorders | Rare history finding |  |  |
|  | CNS diseases | Dietary history |  |  |
|  | Cardiac diseases | Concerned about appear |  |  |
|  | Respiratory system dis | No complaints |  |  |
|  | Digestive system disea | History/symptom NOS |  |  |
|  | Genitourinary system c | Read Code Administration |  |  |
|  | Pregnancy/childbirth/p |  |  |  |
|  | Skin/subcutaneous tis |  |  |  |
|  | Connective tissue dise |  |  |  |
|  | Congenital anomalies |  |  |  |
|  | Perinatal conditions |  |  |  |
|  | [D]Signs as problem |  |  |  |
|  | Injury and poisoning |  |  |  |

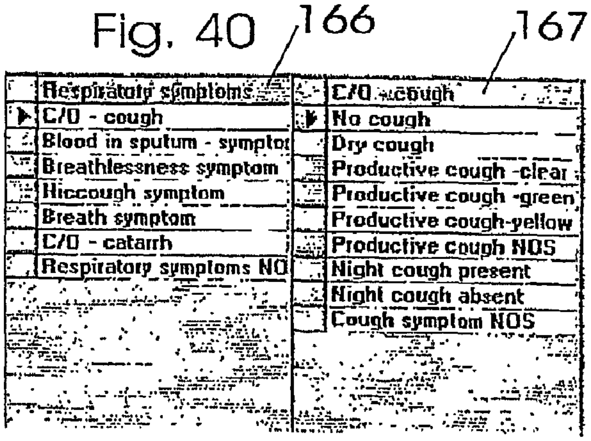

Fig. 40

166 — Respiratory symptoms
- C/O - cough
- Blood in sputum - symptom
- Breathlessness symptom
- Hiccough symptom
- Breath symptom
- C/O - catarrh
- Respiratory symptoms NO 167 — C/O - cough
- No cough
- Dry cough
- Productive cough -clear
- Productive cough -green
- Productive cough-yellow
- Productive cough NOS
- Night cough present
- Night cough absent
- Cough symptom NOS

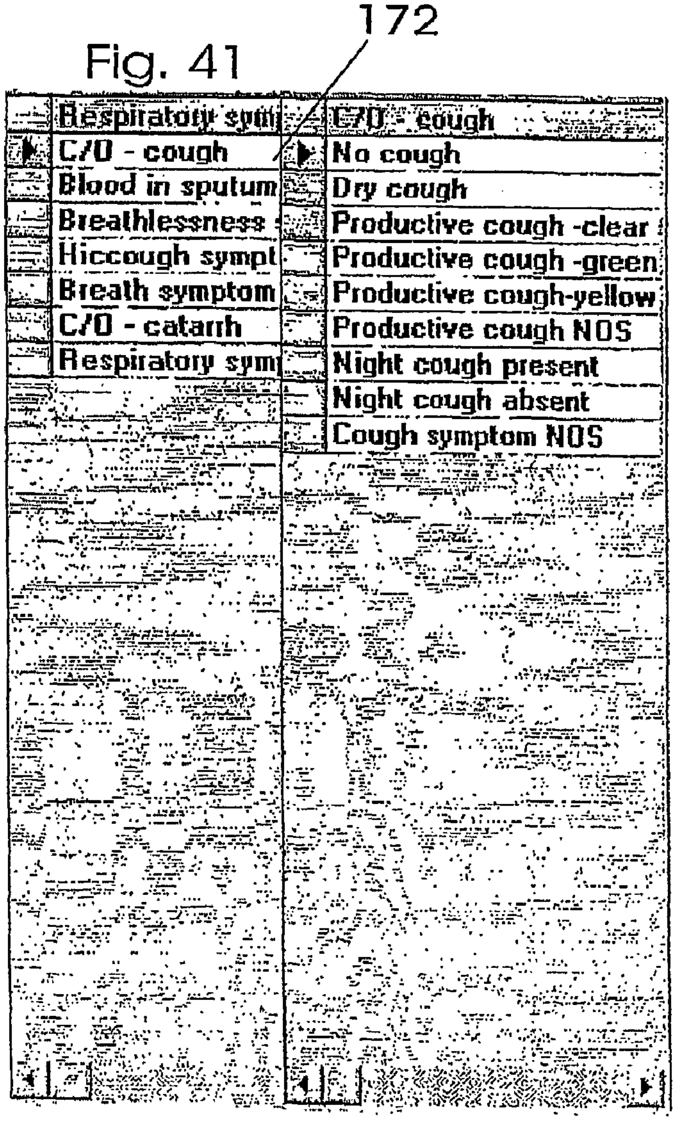

Fig. 41

172 — Respiratory sym
- C/O - cough
- Blood in sputum
- Breathlessness
- Hiccough sympt
- Breath symptom
- C/O - catarrh
- Respiratory sym C/O - cough
- No cough
- Dry cough
- Productive cough -clear
- Productive cough -green
- Productive cough-yellow
- Productive cough NOS
- Night cough present
- Night cough absent
- Cough symptom NOS

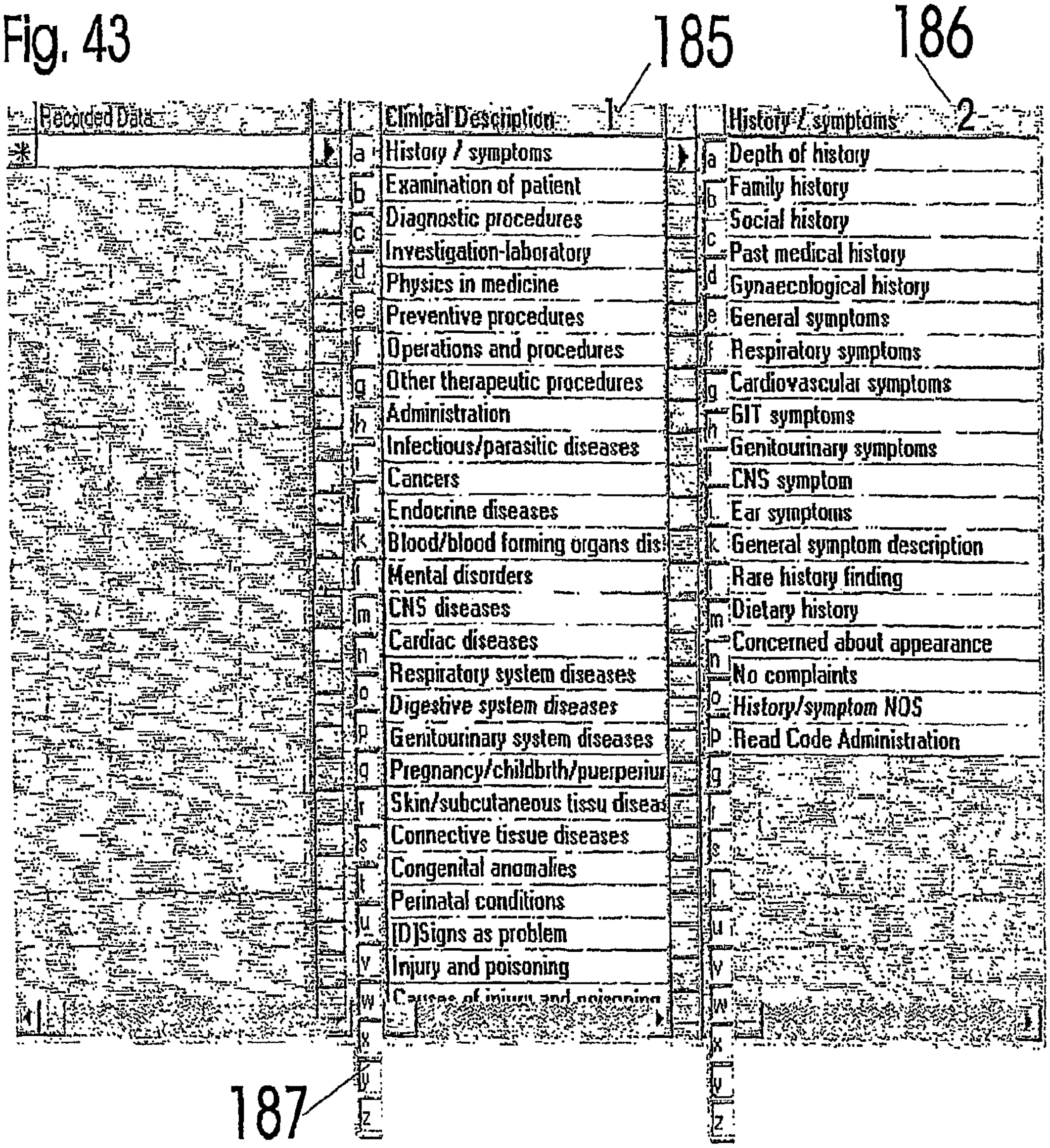

Fig. 43

| Recorded Data | | Clinical Description 1 / 185 | | History / symptoms 2 / 186 |
|---|---|---|---|---|
| * | | a History / symptoms | | a Depth of history |
| | | b Examination of patient | | b Family history |
| | | c Diagnostic procedures | | c Social history |
| | | d Investigation-laboratory | | d Past medical history |
| | | e Physics in medicine | | e Gynaecological history |
| | | f Preventive procedures | | f General symptoms |
| | | g Operations and procedures | | g Respiratory symptoms |
| | | h Other therapeutic procedures | | h Cardiovascular symptoms |
| | | i Administration | | i GIT symptoms |
| | | j Infectious/parasitic diseases | | j Genitourinary symptoms |
| | | k Cancers | | k CNS symptom |
| | | l Endocrine diseases | | l Ear symptoms |
| | | m Blood/blood forming organs dis | | m General symptom description |
| | | n Mental disorders | | n Rare history finding |
| | | o CNS diseases | | o Dietary history |
| | | p Cardiac diseases | | p Concerned about appearance |
| | | q Respiratory system diseases | | q No complaints |
| | | r Digestive system diseases | | r History/symptom NOS |
| | | s Genitourinary system diseases | | s Read Code Administration |
| | | t Pregnancy/childbirth/puerperium | | |
| | | u Skin/subcutaneous tissu disea | | |
| | | v Connective tissue diseases | | |
| | | w Congenital anomalies | | |
| | | x Perinatal conditions | | |
| | | y [D]Signs as problem | | |
| | | z Injury and poisoning | | |
| | | Causes of injury and poisoning | | |

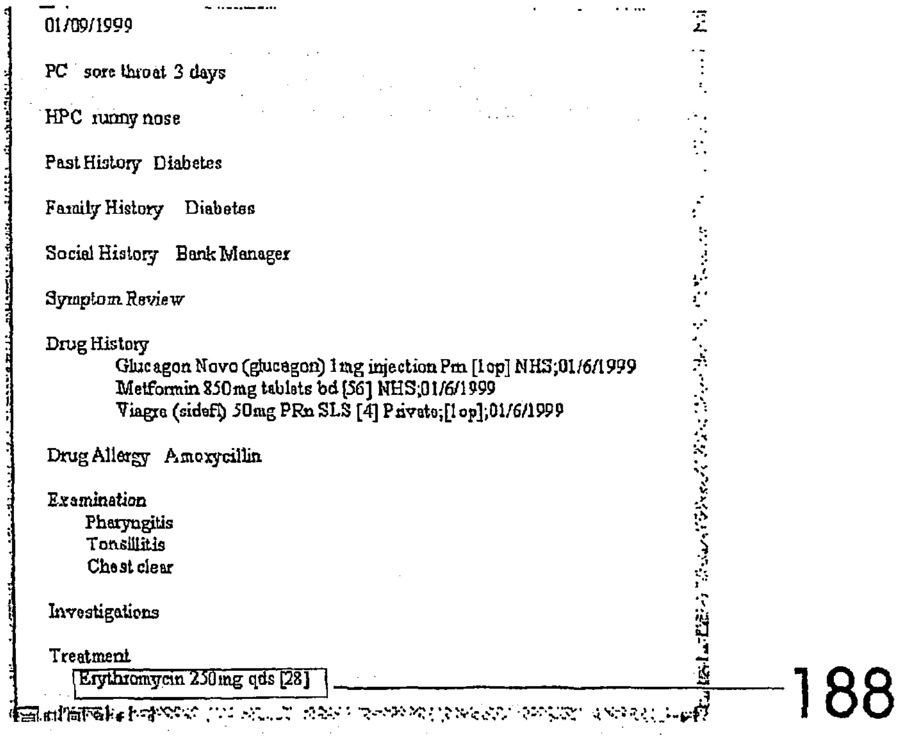

Fig. 45

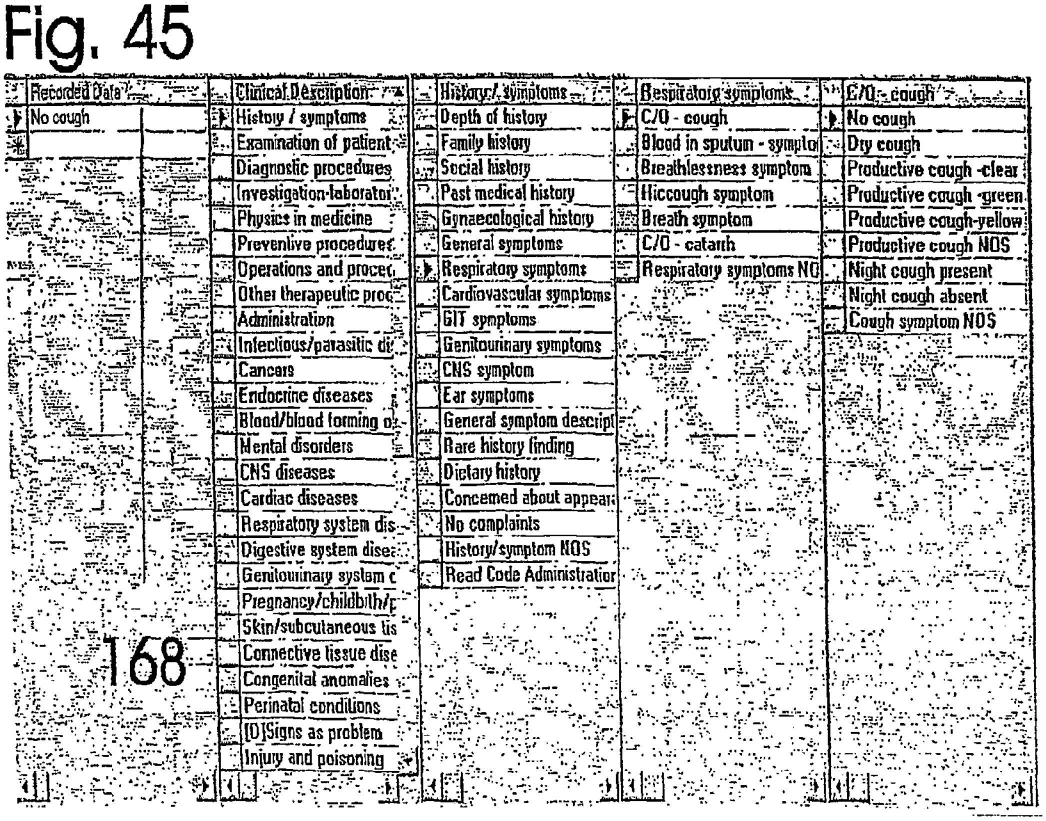

PC   sore throat 3 days

HPC   runny nose

Past History   Diabetes

Family History   Diabetes

Social History   Bank Manager

Symptom Review

Drug History
    Glucagon Novo (glucagon) 1mg injection Prn [1op] NHS;01/6/1999
    Metformin 850mg tablets bd [56] NHS;01/6/1999
    Viagra (sidef) 50mg PRn SLS [4] Private;[1op];01/6/1999

Drug Allergy   Amoxycillin

Examination
    Pharyngitis
    Tonsillitis
    Chest clear

Investigations

Treatment
    Erythromycin 250mg qds [28]

| Recorded Data | Clinical Description | History / Symptoms | Respiratory symptoms | C/O - cough |
|---|---|---|---|---|
| No cough | History / symptoms | Depth of history | C/O - cough | No cough |
| | Examination of patient | Family history | Blood in sputum - symptom | Dry cough |
| | Diagnostic procedures | Social history | Breathlessness symptom | Productive cough -clear |
| | Investigation-laboratory | Past medical history | Hiccough symptom | Productive cough -green |
| | Physics in medicine | Gynaecological history | Breath symptom | Productive cough-yellow |
| | Preventive procedures | General symptoms | C/O - catarrh | Productive cough NOS |
| | Operations and proce... | Respiratory symptoms | Respiratory symptoms NO | Night cough present |
| | Other therapeutic proc... | Cardiovascular symptoms | | Night cough absent |
| | Administration | GIT symptoms | | Cough symptom NOS |
| | Infectious/parasitic di... | Genitourinary symptoms | | |
| | Cancers | CNS symptom | | |
| | Endocrine diseases | Ear symptoms | | |
| | Blood/blood forming o... | General symptom descript... | | |
| | Mental disorders | Rare history finding | | |
| | CNS diseases | Dietary history | | |
| | Cardiac diseases | Concerned about appear... | | |
| | Respiratory system dis... | No complaints | | |
| | Digestive system dise... | History/symptom NOS | | |
| | Genitourinary system c | Read Code Administration | | |
| | Pregnancy/childbirth/p... | | | |
| | Skin/subcutaneous tis... | | | |
| | Connective tissue dise | | | |
| | Congenital anomalies | | | |
| | Perinatal conditions | | | |
| | [D]Signs as problem | | | |
| | Injury and poisoning | | | |

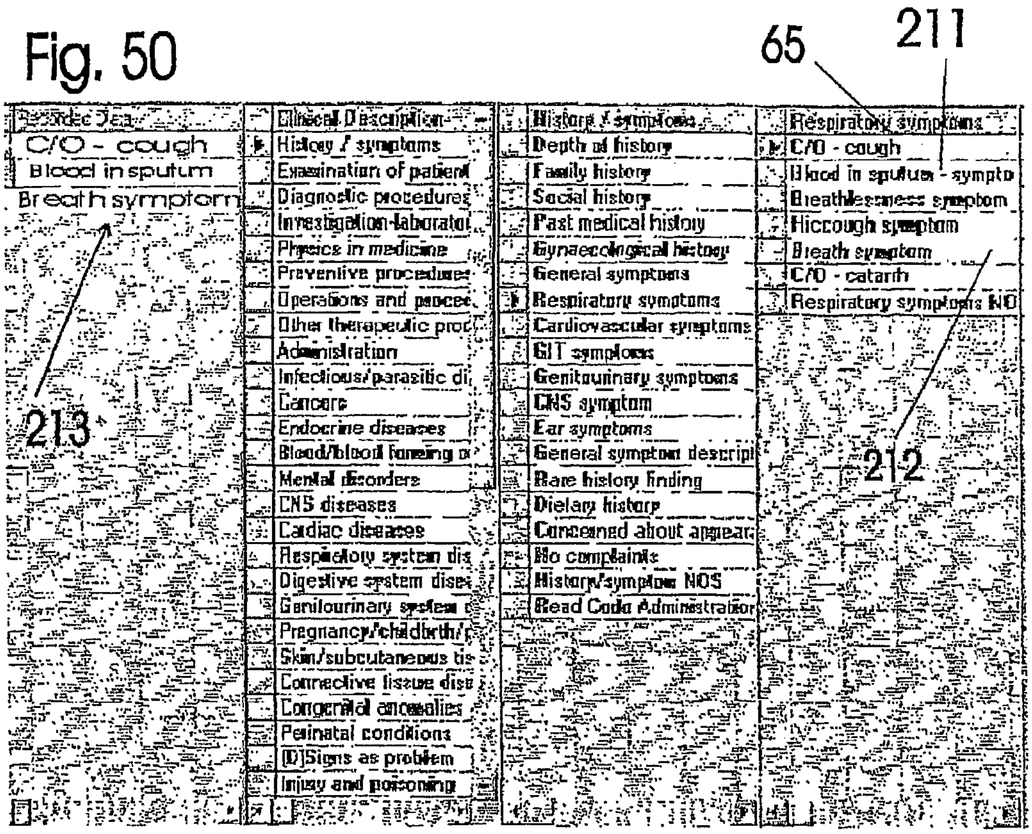

Fig. 51

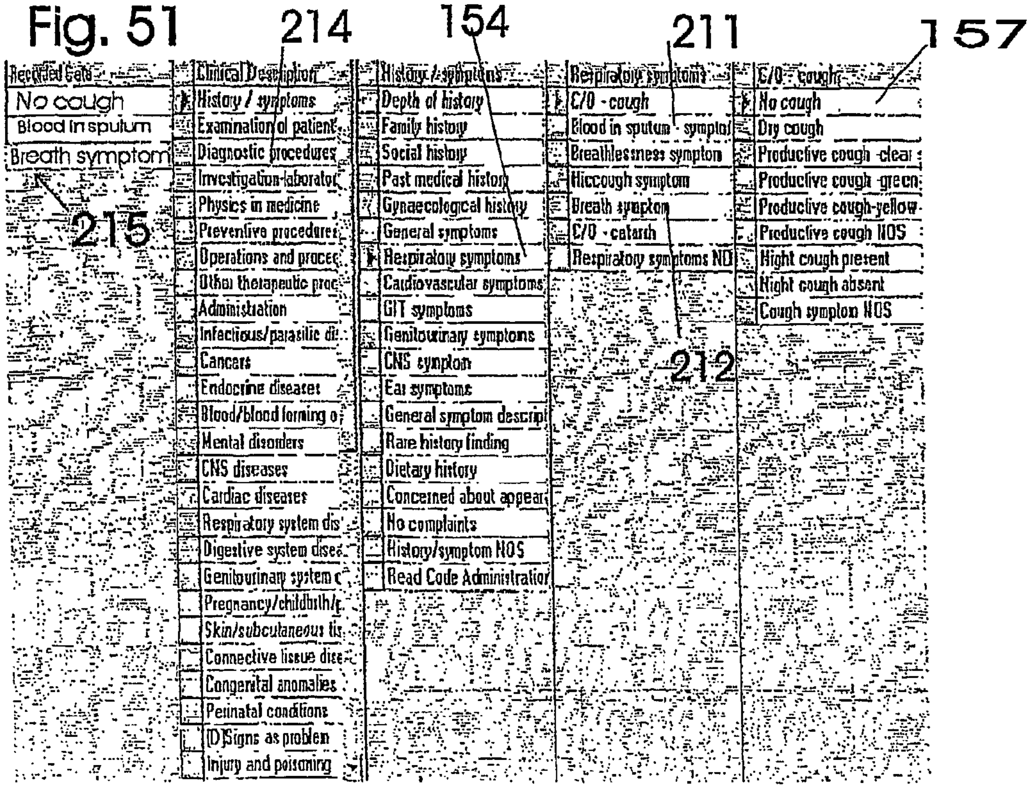

| Recorded Data | Clinical Description | History / symptoms | Respiratory symptoms |
|---|---|---|---|
| C/O - cough | History / symptoms | Depth of history | C/O - cough |
| Blood in sputum | Examination of patient | Family history | Blood in sputum - sympto |
| Breath symptom | Diagnostic procedures | Social history | Breathlessness symptom |
| | Investigation-laboratory | Past medical history | Hiccough symptom |
| | Physics in medicine | Gynaecological history | Breath symptom |
| | Preventive procedures | General symptoms | C/O - catarrh |
| | Operations and proced. | Respiratory symptoms | Respiratory symptoms NOS |
| | Other therapeutic proc | Cardiovascular symptoms | |
| | Administration | GIT symptoms | |
| | Infectious/parasitic di | Genitourinary symptoms | |
| | Cancers | CNS symptom | |
| | Endocrine diseases | Ear symptoms | |
| | Blood/blood forming o | General symptom descript | |
| | Mental disorders | Rare history finding | |
| | CNS diseases | Dietary history | |
| | Cardiac diseases | Concerned about appear. | |
| | Respiratory system dis | No complaints | |
| | Digestive system dise | History/symptom NOS | |
| | Genitourinary system c | Read Code Administrator | |
| | Pregnancy/childbirth/p | | |
| | Skin/subcutaneous tis | | |
| | Connective tissue dise | | |
| | Congenital anomalies | | |
| | Perinatal conditions | | |
| | [D]Signs as problem | | |
| | Injury and poisoning | | |

| Recorded Data | Clinical Description | History / symptoms | Respiratory symptoms | C/O - cough |
|---|---|---|---|---|
| No cough | History / symptoms | Depth of history | C/O - cough | No cough |
| Blood in sputum | Examination of patient | Family history | Blood in sputum - symptom | Dry cough |
| Breath symptom | Diagnostic procedures | Social history | Breathlessness symptom | Productive cough -clear |
| | Investigation-laboratory | Past medical history | Hiccough symptom | Productive cough -green |
| | Physics in medicine | Gynaecological history | Breath symptom | Productive cough-yellow |
| | Preventive procedures | General symptoms | C/O - catarrh | Productive cough NOS |
| | Operations and proced | Respiratory symptoms | Respiratory symptoms NOS | Night cough present |
| | Other therapeutic proc | Cardiovascular symptoms | | Night cough absent |
| | Administration | GIT symptoms | | Cough symptom NOS |
| | Infectious/parasitic di | Genitourinary symptoms | | |
| | Cancers | CNS symptom | | |
| | Endocrine diseases | Ear symptoms | | |
| | Blood/blood forming o | General symptom descript | | |
| | Mental disorders | Rare history finding | | |
| | CNS diseases | Dietary history | | |
| | Cardiac diseases | Concerned about appear | | |
| | Respiratory system dis | No complaints | | |
| | Digestive system dise | History/symptom NOS | | |
| | Genitourinary system c | Read Code Administrator | | |
| | Pregnancy/childbirth/p | | | |
| | Skin/subcutaneous tis | | | |
| | Connective tissue dise | | | |
| | Congenital anomalies | | | |
| | Perinatal conditions | | | |
| | [D]Signs as problem | | | |
| | Injury and poisoning | | | |

| Menu Items | Function | Group |
|---|---|---|
| Overview | Shows last management, reason for the management, current drugs for condition, awaiting for any investigation or referral | this is the default |
| Progress of condition | Recording Change in Clinical Features since Last Seen | |
| Management Protocol | This shows the current government protocol | |
| Complete Clinical Notes | This displays the complete clinical notes as in a normal clerking - this can be modified by the user's preference | |
| Change in Management | recommended for this consultation | The following from explanation to prognosis show the Drs Management |
| Dr Explanation | Explanation of condition by doctor and/or leaflet suggested by computer | |
| Investigations | This allows for investigations to be ordered and/or forms printed | |
| Printing drugs | Allows user to select and print drugs for selected condition or all drugs | |
| Adding a drug | Allows user to add drugs and give a reason for their addition and/or print added drugs for selected condition or all conditions | |
| Changing a drug | Allows user to change drugs and give a reason for their change and/or print changed drugs for selected condition or all conditions | |
| Deleting a drug | Allows user to delete drugs and give reason for their for selected condition or all conditions | |
| Drug Allergy | Allows user to Record a Drug Allergy and/or automatic notification to Prescribing Authority | |
| Drug Side Effect | Allows user to Record a Drug Side Effect and/or automatic notification to Prescribing Authority | |
| Show All Drugs | Shows all the drugs for the patient, listing the drugs, last prescription date, reason for condition, and compliance | |
| Referral Letter | Shows a Rich Text Box with a referral letter constructed from the available data (this could be varied) | |
| Electronic Letter | Enables that letter to be sent electronically to hospital | |
| Advice by doctor | Lifestyle changes beneficial to condition given by doctor and/or patient leaflets/appropriate advice for condition suggested by Computer | |
| Prognosis of Condition | suggested by Computer database for condition | |
| Complete Clinical Notes | This displays the complete clinical notes as in a normal clerking - this can be modified by the user's preference | Below are the subsections of the complete medical notes |
| History of Presenting Complaint | The presenting complaint and history | |
| Past Medical | Past Medical, Past Surgical, Family History, Social History | |

Fig. 60 a

| | | |
|---|---|---|
| Systems Review | The review of all the medical systems | |
| Screening Details | Shows all the current Medical/Government recommended screening details, also indicating those that need to be done. | |
| Existing Examination | Shows all the recorded examination details regarding the patients with the date when they were done | |
| Existing Investigations | Shows the existing investigations results and those requested | |
| Previous Advice Given | Records what previous advice the doctor has given regarding the advice | |
| Compliance | Compares the regularity of drugs repeat requests with the calculated | |
| Automated Process | | These are the computer suggesting differential diagnosis, management |
| Differential Diagnosis | List of possible diagnosis generated by computer from incidence of conditions that fit the patient's clinical picture for the specific condition and/or all clinical data | |
| Further Investigations | suggested by computer to exclude serious conditions suggested by the patient's clinical feature. | |
| Management Protocol | The computer gives the latest management advice suggested by computer for condition, and particular patient's features | |
| Description of Condition | suggested by computer - Patient education leaflet | |
| Effectiveness of Condition Rx | Basis of a new standard of care. An accurate documentation of symptom reduction/cure in a given time for a given cost | below describe the components of the new standard |
| Time to diagnosis | Length of time to come to a provisional, probable clinical diagnosis, consultant clinical diagnosis or a confirmed diagnosis | |
| Time to symptom reduction | Time taken treating the condition to get to the current reduction of symptoms | |
| Time to cure of condition | Time taken to cure condition | |
| Quality of explanation of the condition | Effectiveness of educating the patient regarding the condition | |
| Quality of advice beneficial to condition | Quality of health promotion advice to patient/ and ability to show this in compliance | |
| Patient's subjective reaction to doctor | How effective was the doctors bedside manner as recorded by patient | |
| Cost of treating the patient | records cost of doctors/other medical staff, investigations, referrals, and drug treatment | |
| Problems with NHS treatment | Ability to record all Problems with NHS Rx so government can plan to avoid them - not allowing patients appropriate treatment at appropriate times | |

Fig. 60 b

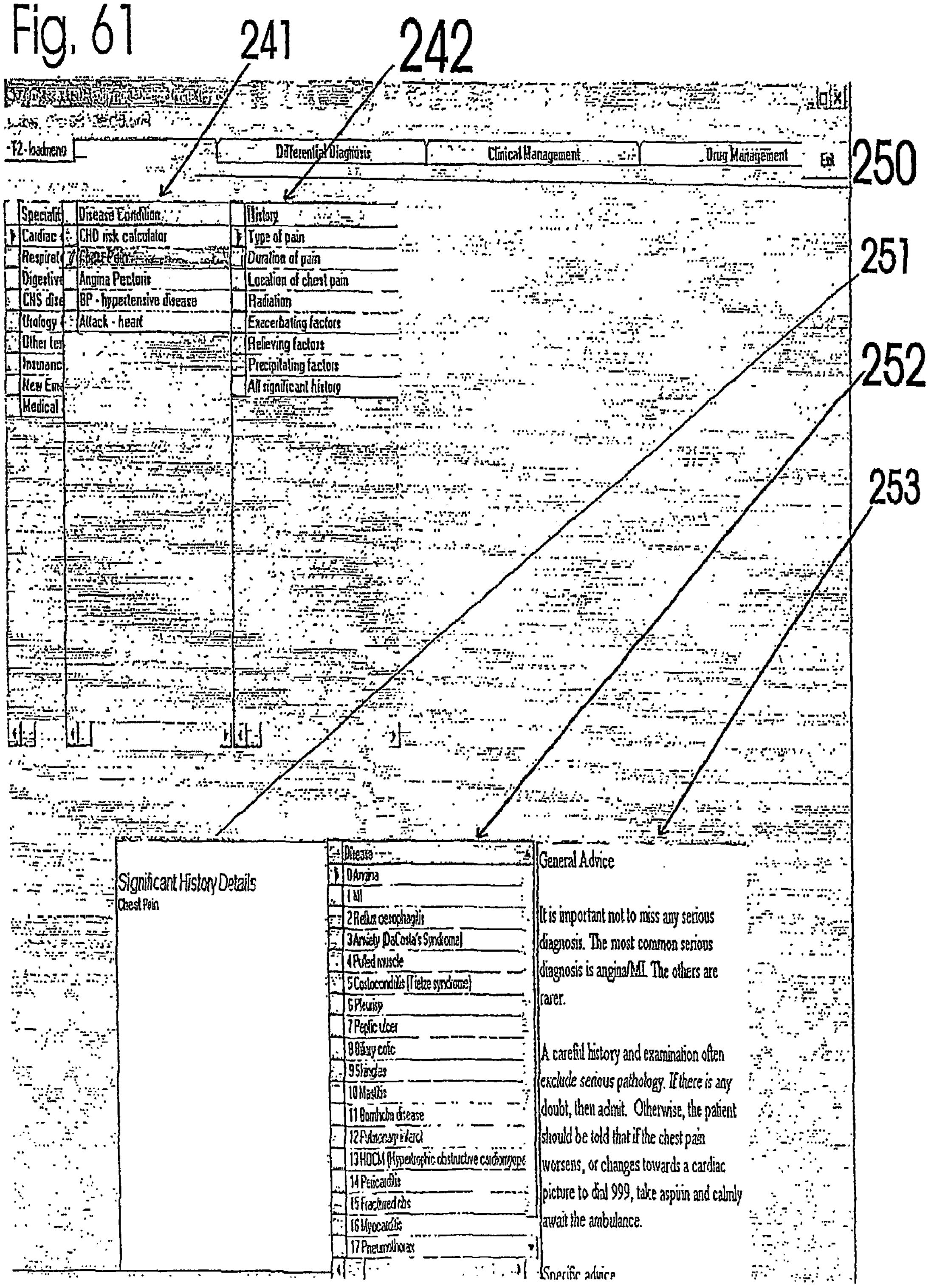

Fig. 61

| Specialty | Disease Condition | History |
|---|---|---|
| Cardiac | CHD risk calculator | Type of pain |
| Respiratory | Chest Pain | Duration of pain |
| Digestive | Angina Pectoris | Location of chest pain |
| CNS dis | BP - hypertensive disease | Radiation |
| Urology | Attack - heart | Exacerbating factors |
| Other tes | | Relieving factors |
| Insurance | | Precipitating factors |
| New Eur | | All significant history |
| Medical | | |

241 — Disease Condition column
242 — History column
250 — window frame (Differential Diagnosis / Clinical Management / Drug Management tabs)
251, 252, 253 — bottom panels Significant History Details
- Chest Pain

| Disease |
|---|
| 0 Angina |
| 1 MI |
| 2 Reflux oesophagitis |
| 3 Anxiety (DaCosta's Syndrome) |
| 4 Pulled muscle |
| 5 Costochondritis (Tietze syndrome) |
| 6 Pleurisy |
| 7 Peptic ulcer |
| 8 Biliary colic |
| 9 Shingles |
| 10 Mastitis |
| 11 Bornholm disease |
| 12 Pulmonary infarct |
| 13 HOCM (Hypertrophic obstructive cardiomyopathy) |
| 14 Pericarditis |
| 15 Fractured ribs |
| 16 Myocarditis |
| 17 Pneumothorax |

General Advice

It is important not to miss any serious diagnosis. The most common serious diagnosis is angina/MI. The others are rarer.

A careful history and examination often exclude serious pathology. If there is any doubt, then admit. Otherwise, the patient should be told that if the chest pain worsens, or changes towards a cardiac picture to dial 999, take aspirin and calmly await the ambulance.

Specific advice

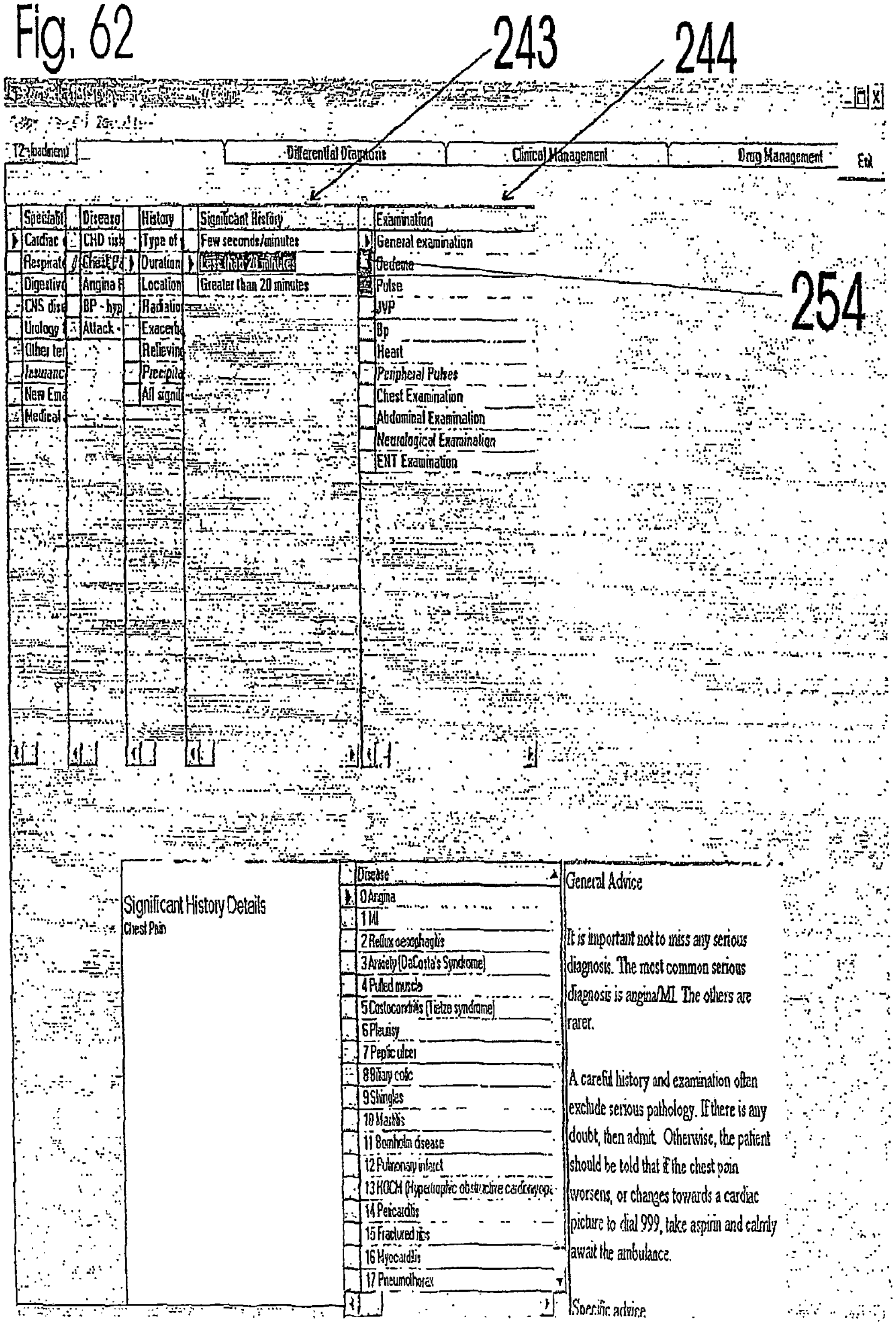

Fig. 62

| Speciality | Disease | History | Significant History | Examination |
|---|---|---|---|---|
| Cardiac | CHD risk | Type of | Few seconds/minutes | General examination |
| Respiratory | Chest Pain | Duration | Few mins to 20 minutes | Oedema |
| Digestive | Angina R | Location | Greater than 20 minutes | Pulse |
| CNS dise | BP - hyp | Radiation | | JVP |
| Urology | Attack | Exacerb | | Bp |
| Other ter | | Relieving | | Heart |
| Insurance | | Precipit | | Peripheral Pulses |
| New Ema | | All signif | | Chest Examination |
| Medical | | | | Abdominal Examination |
| | | | | Neurological Examination |
| | | | | ENT Examination |

243, 244, 254

Significant History Details
Chest Pain

| Disease |
|---|
| 0 Angina |
| 1 MI |
| 2 Reflux oesophagitis |
| 3 Anxiety (DaCosta's Syndrome) |
| 4 Pulled muscle |
| 5 Costochondritis (Tietze syndrome) |
| 6 Pleurisy |
| 7 Peptic ulcer |
| 8 Biliary colic |
| 9 Shingles |
| 10 Mastitis |
| 11 Bornholm disease |
| 12 Pulmonary infarct |
| 13 HOCM (Hypertrophic obstructive cardiomyopathy) |
| 14 Pericarditis |
| 15 Fractured ribs |
| 16 Myocarditis |
| 17 Pneumothorax |

General Advice

It is important not to miss any serious diagnosis. The most common serious diagnosis is angina/MI. The others are rarer.

A careful history and examination often exclude serious pathology. If there is any doubt, then admit. Otherwise, the patient should be told that if the chest pain worsens, or changes towards a cardiac picture to dial 999, take aspirin and calmly await the ambulance.

Specific advice

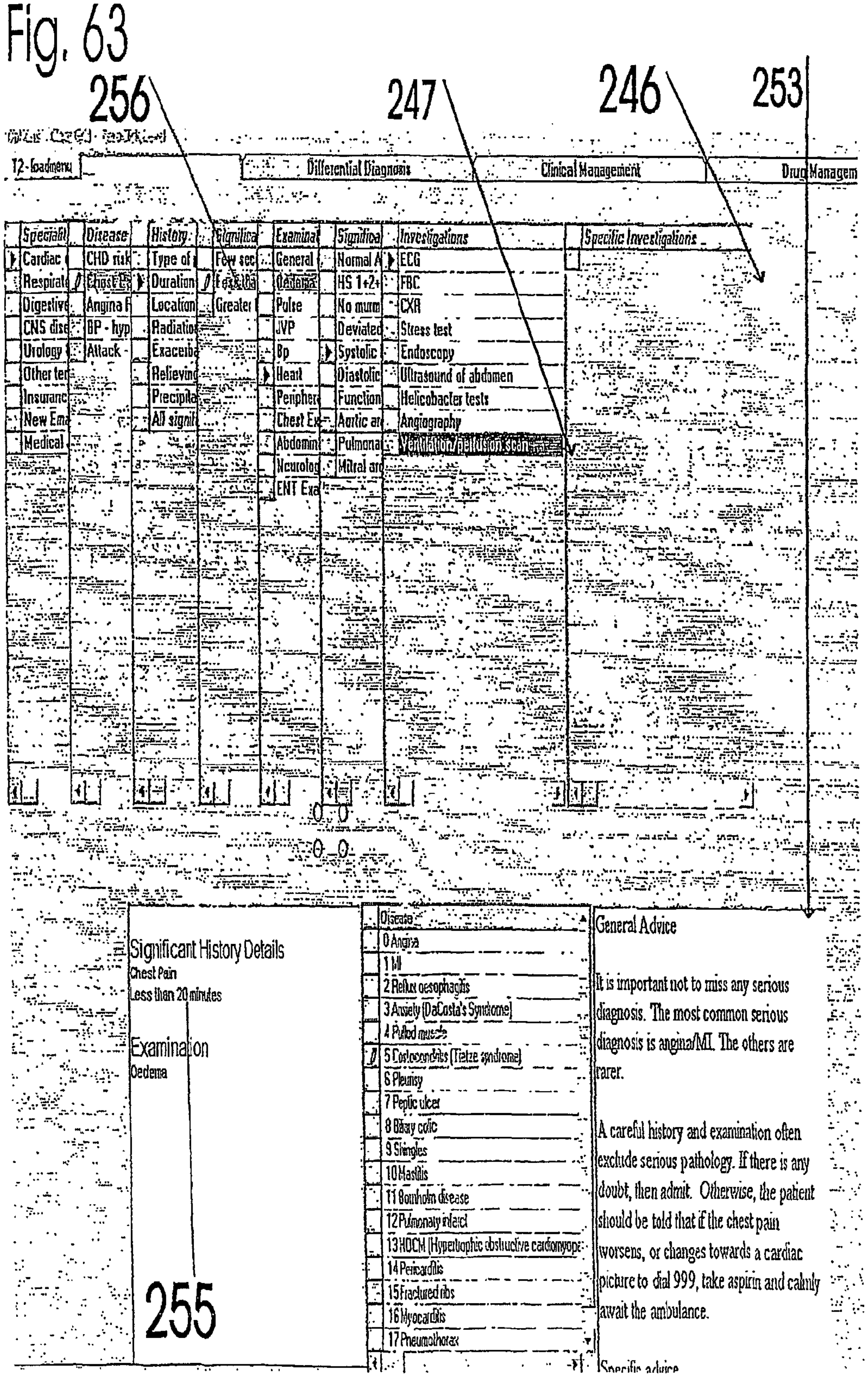

Fig. 63

| Specialit | Disease | History | Significa | Examina | Significa | Investigations | Specific Investigations |
|---|---|---|---|---|---|---|---|
| Cardiac | CHD risk | Type of | Few sec | General | Normal A | ECG | |
| Respirat | Chest E | Duration | Less tha | Oedema | HS 1+2+ | FBC | |
| Digestive | Angina | Location | Greater | Pulse | No murm | CXR | |
| CNS dis | BP - hyp | Radiatio | | JVP | Deviated | Stress test | |
| Urology | Attack | Exacerb | | Bp | Systolic | Endoscopy | |
| Other ter | | Relieving | | Heart | Diastolic | Ultrasound of abdomen | |
| Insuranc | | Precipta | | Peripher | Function | Helicobacter tests | |
| New Em | | All signif | | Chest Ex | Aortic ar | Angiography | |
| Medical | | | | Abdomin | Pulmona | Ventilation/perfusion scan | |
| | | | | Neurolog | Mitral ar | | |
| | | | | ENT Exa | | | |

256 — 247 — 246 — 253

Significant History Details
Chest Pain
Less than 20 minutes

Examination
Oedema

255

| Disease |
|---|
| 0 Angina |
| 1 MI |
| 2 Reflux oesophagitis |
| 3 Anxiety (DaCosta's Syndrome) |
| 4 Pulled muscle |
| 5 Costocondritis (Tietze syndrome) |
| 6 Pleurisy |
| 7 Peptic ulcer |
| 8 Biliary colic |
| 9 Shingles |
| 10 Mastitis |
| 11 Bornholm disease |
| 12 Pulmonary infarct |
| 13 HOCM (Hypertrophic obstructive cardiomyopa |
| 14 Pericarditis |
| 15 Fractured ribs |
| 16 Myocarditis |
| 17 Pneumothorax |

General Advice

It is important not to miss any serious diagnosis. The most common serious diagnosis is angina/MI. The others are rarer.

A careful history and examination often exclude serious pathology. If there is any doubt, then admit. Otherwise, the patient should be told that if the chest pain worsens, or changes towards a cardiac picture to dial 999, take aspirin and calmly await the ambulance.

Specific advice

Fig 67
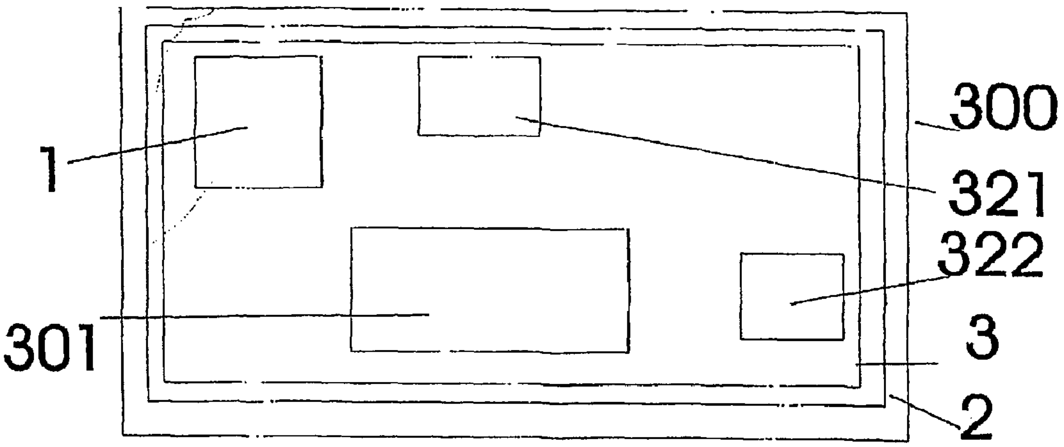
Fig. 68
306
Activating a bordergrid for a ↓~~word~~↑ or phrase in a text box by an invisible zeroclick in the spaces either side of the word or phrase.
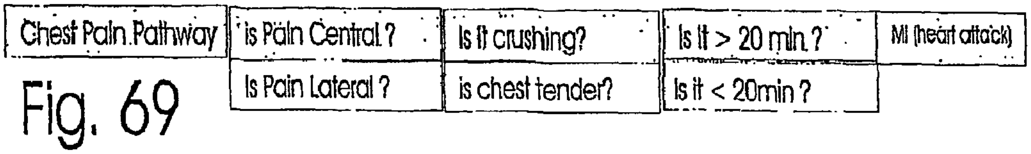
Fig. 69

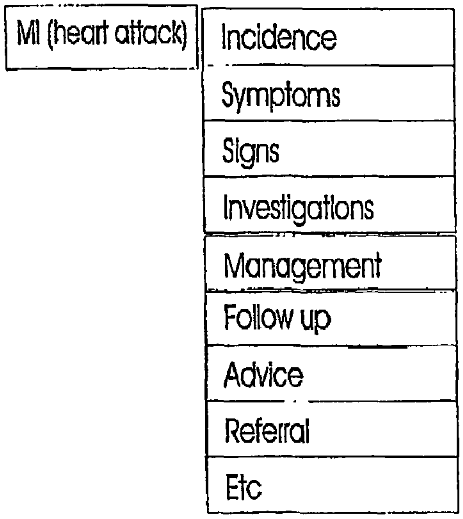

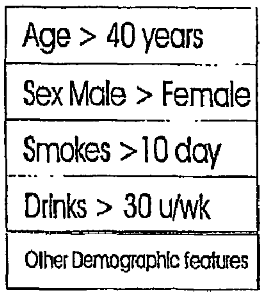

Fig. 72

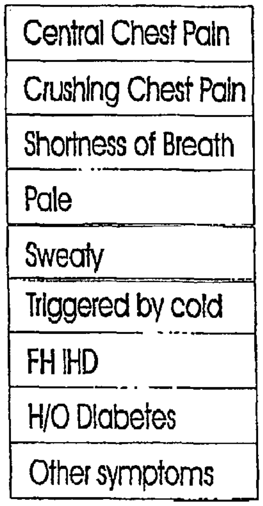

Fig. 73

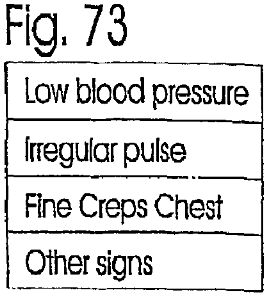

Fig. 74

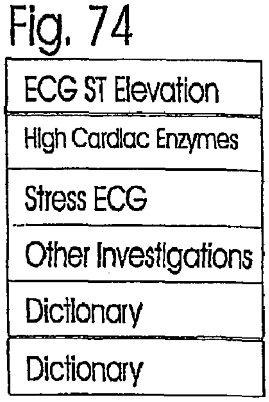

Fig. 75

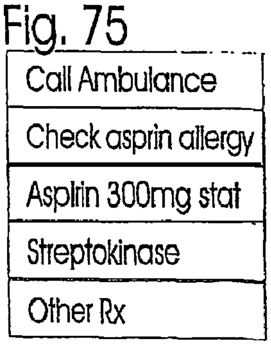

| MI (heart attack) | Incidence |
| --- | --- |
| | Symptoms |
| | Signs |
| | Investigations |
| | Management |
| | Follow up |
| | Advice |
| | Referral |
| | Etc |

| Age > 40 years |
| --- |
| Sex Male > Female |
| Smokes >10 day |
| Drinks > 30 u/wk |
| Other Demographic features |

| Central Chest Pain |
| --- |
| Crushing Chest Pain |
| Shortness of Breath |
| Pale |
| Sweaty |
| Triggered by cold |
| FH IHD |
| H/O Diabetes |
| Other symptoms |

| Low blood pressure |
| --- |
| Irregular pulse |
| Fine Creps Chest |
| Other signs |

| ECG ST Elevation |
| --- |
| High Cardiac Enzymes |
| Stress ECG |
| Other Investigations |
| Dictionary |
| Dictionary |

| Call Ambulance |
| --- |
| Check aspirin allergy |
| Aspirin 300mg stat |
| Streptokinase |
| Other Rx |

ZEROCLICK

In addition to the other disclosed priority documents in the Foreign Application Priority Data, this specification cites document 0010535.3 (GB) filed on Feb. 5, 2000.

CROSS-REFERENCE TO RELATED APPLICATIONS

The Subject of the Search

A GUI in which, when a pointer is immediately adjacent or passes over a control, a procedure is initiated whereby subsequent movement of the pointer over a predetermined path generates a 'click' event which simulates direct clicking of the control.

U.S. Pat. No. 5,959,628 Cecchini et all

U.S. Pat. No. 5,805,165 Microsoft

U.S. Pat. No. 5,721,853 AST Research Inc

U.S. Pat. No. 5,852,439 JBA Holding PLC

U.S. Pat. No. 5,914,716 Microsoft

U.S. Pat. No. 5,995,979 Avid Technology

JP2000181779 Hitachi

Online printout from Gale Group computer database, Accession No 1460825, "Connectix launches HAND-OFF II), MacWeek, vol 5, n40, p12(1), 19.11.91

From the above documents the concept of activating some element of a GUI without clicking is known. However, I was unable to find any disclosure of the concept described in this application of moving the pointer to a first zone and then to a second related zone to activate the function of a GUI.

Smith (U.S. Pat. No. 5,721,853) is the nearest prior art to this invention. In FIG. 1 of Smith, Smith described the typical embodiment of the conventional graphical user interface GUI and how it could be generated by a computer. There is a computer screen 16 in FIG. 1 of Smith, showing the Smiths spot interface GDE 10 overlaid on a window 12 of the conventional GUI. Within the window 12, Smith showed several visible icons of the GUI, including the invention of Smith, which was also a visible icon, always on top of any other graphical object unless disabled. Smith invention was similar to the other icons of the conventional GUI, in that they were all visible, so that the user need only 'remember the icon' and the user could directly move the pointer over the icon, then select and execute that function by clicking the picture representation of that function.

Smith described that the clicking was done by a mouse input 22 of FIG. 1 of Smith, and this mouse input had two features. The first was an input to move the pointer; 'a mouse is an input device which, when moved over a surface, moves a mouse pointer across the computer display in a corresponding manner'. The second was the mouse buttons; 'which when pressed, generate to the computer an input relating the user and the location of the mouse pointer on the computer display.'

Smith's GDE icon was similar to the conventional GUI in that it was visible and had a distinct sphere appearance to remind the user of its function. However, it differed from the conventional icon which required a button press and release over the icon (e.g. My Computer) to select the GDE. Smith's inventive step was that the user could by the 'movement of the pointer over said GDE, thereby to select said GDE'. Once selected, this could trigger either the immediate display of a collar in claims 13, and 17 of Smith or start a timer function described in claim 18 of Smith as 'subsequent to said detecting selection of said GDE waiting a first period of time prior to performing said displaying said collar associated with said GDE'. Thus neither the collar being displayed nor the timer could be initiated unless a click event of 'selecting said GDE' (step 704 of FIG. 7) occurred, and this occurred by the pointer moving over said GDE.

This choice of Smith to execute a click event 'to select said GDE' by moving the pointer over said GDE, had a high chance of the user accidentally moving over the icon and executing the click event of selection of said GDE unintentionally. Smith had tried to reduce this accidental triggering by limiting the size of the control area (GDE) to the GDE 10 'being of minimal size', and/or causing a delay timer to be trigger after the click event of 'to select said GDE'. In addition, to prevent any of the secondary menu being accidentally triggered, Smith emphasised 'It should be recognized that the buttons **302*d*** operate in a conventional manner in that they enable the user to open additional windows or initiate execution of applications programs simply by clicking on the appropriate button(s).' This emphasis of the conventional manner of executing functions was 'clicking', would clarify to a person skilled in the art to use clicks for all functions that Smith did not describe executing a click event by moving the pointer over a control area.

All these above methods have limitations. The icon has to be displayed and visible of 'sphere appearance' means that Smiths GDE could not have any other appearance. This was so that the icon conformed to the conventional GUI method that the user would see this visible appearance of this icon and know it would behave in its specific manner. Thus Smith shows a visible icon. Likewise the icon in Jones (U.S. Pat. No. 6,819,345) in the independent claims 1 and 4 of Jones is 'visually embedded' and therefore a visible icon, with further visible display of a first border in c) and text in d) of the independent claim meaning that in Jones the control area (visible embedded subdocument) and further changes in c) and d) are essential visible changes displayed on the screen of the method of operating this GUI. Likewise the visible displayed icon in Smith was a minimal size, to minimize accidental triggering and obstruction of the underlying window. Therefore in Smith the icon could not be any size but only minimal size restricting the GDE to a maximum size of an icon. Furthermore if a timer was not used, then there was a greater risk of accidentally triggering the 'click' event of selection of the GDE; and if a timer was used the user was inconvenienced to having to wait for the timer to elapse before the user could access the collar or secondary menu. In addition once the user was over the secondary menu, the user could not access any of the functions of the secondary menu without a mouse button press or release. All the above were limitations which affected the user.

Instead of having any of the above limitations, Irvine used pointer movement in a different manner to Smith. In Irvine the movement of the pointer over the first zone (GDE or control area) did not generate a 'click' event as in Smith. Therefore, there was no accidental triggering of the selection of said GDE if the pointer moved over said GDE. Therefore, the control area could be a control of any size up to the full screen, not just the minimal size of the icon as in Smith. Likewise the control area could be invisible and indeed not displayed on a touch sensitive surface with no visual feedback, and furthermore the control area could trigger any function of the GUI because the user could design the second specified movement to be a sequence of pointer movement almost impossible to occur by a random movement.

BACKGROUND OF THE INVENTION

Since the invention of the mouse, the mouse has had two major functions. The first was the movement of a pointer over a screen and the second was a button press/click. Consequently the programming design for all graphical interfaces has been based with the mindset of using the movement of the mouse (or other pointer device) to locate a graphical user interface (GUI) control in conjunction with the double click, the click, the up and down button press to activate the function of the GUI control.

BRIEF SUMMARY OF THE INVENTION

This invention provides the design of the computer interface to the movement of the pointer alone for both the location and "click" events and offers the programmer and user an additional "visual" click system to program increased functionality and ergonomic design. This specification then develops the idea, showing how all existing mouse functionality (or any other user input device and keyboard functionality) may occur by mouse movement alone. It then shows how this methodology may be applied giving examples of character entry, number entry, date entry, data entry using hierarchical structures (HCG), a collection of data elements from a hierarchical structure (patternclick), a bordergrid (defined later in program), a qualifier grid (defined later in program), and a comprehensive example within a medical program demonstrating all the previous features. In this specification, the whole control of the computer can be a series of pointer movements.

The methodology of the invention provides programmers and users with a new GUI method to update their existing program design based on the conventional programming model (of pointer movement to locate a GUI control area and click) or create new programs to the new methodology (of pointer movement to come into contact with the GUI control area and second pointer movement to activate a click of the GUI control area or to confirm it was the users intention to activate that GUI control area) which enables more ergonomic, more user friendly and more intuitive programs.

With the prior art, it is known that if a pointer is moved over a GUI, the movement may trigger a function. These functions, however, are functions where accidental triggering by unintentional mouse movement is not serious and usually provide information like hover text, animation, bitmaps, i.e. to provide further information regarding the GUI that the mouse has moved over. In other words the worst that may happen if a pointer is unintentionally moved over a GUI control is more information is shown regarding the GUI interface. In programs, where accidental activation of functions are not wanted the movement to locate the GUI is used and then the "click" functionality is used as a best compromise between speed of activating a function and prevention of unintentional triggering of function. In the prior art, there has been no extensive research into a 'click' by movement alone due to the existing effectiveness and error prevention for all functions that require this dual combination of functionality. This new Zeroclick method may allow all functions that would have required a pointing device click or key press in existing program to be activated by a pointer movement instead of a click or a key press when they were never previously associated with a click by movement alone in the existing relevant operating system and program context.

This describes how a 'click' event can be generated by a specified pointer movement by moving the pointer in a certain order between the subareas. It illustrates a reverse movement (e.g. a left reverse Zeroclick means that the pointer completes a specified movement from subarea 4 to subarea 6 back to subarea 4 to generate a 'click' event while remaining within the predetermined path area 3) or a specified pointer movement which is the pointer moving in a certain direction within the predetermined path area (3) to generate a 'click' event (e.g. A left to right direction Zeroclick generates a 'click' event by the specified movement of moving a pointer from within subarea 4 to subarea 6 while remaining within the predetermined path area 3). It then describes that the reverse or direction specified movement can be in any direction.

Figure 4:
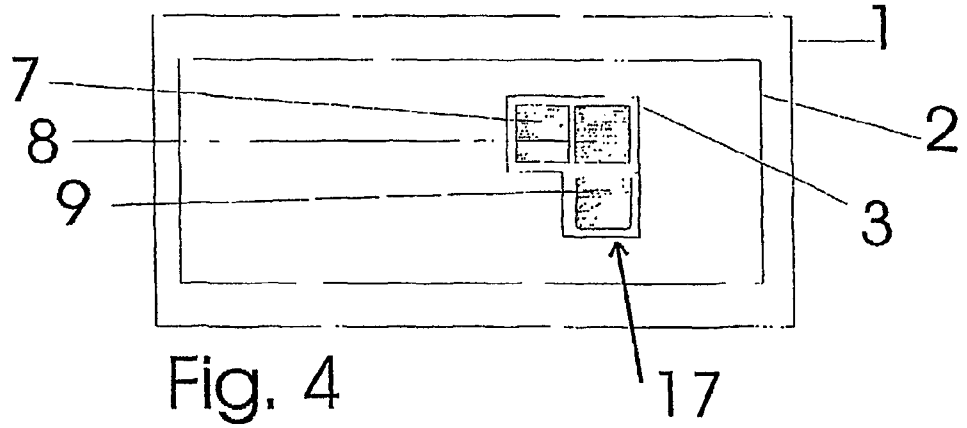

FIG. 4 This shows a predetermined path area 3 containing three subareas 7,8,9 at right angles. It describes how moving a pointer within a predetermined path area 3 according to a specified movement from contact with subarea 7, to subarea 8 to subarea 9 can generate a 'click' event called a right angled zeroclick. It then describes how if the predetermined path area 3 is rotated to generate right angled specified movement at any angle.

Figure 3:
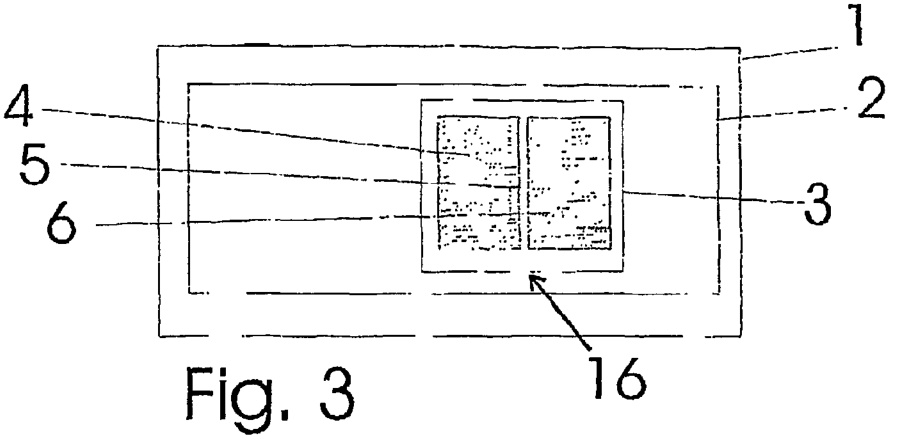
FIG. 3 This show a screen area of a control area 1 which contains a further screen area of the predetermined path area (3) which has a left subarea 4 and a right subarea 6.
Figure 5:
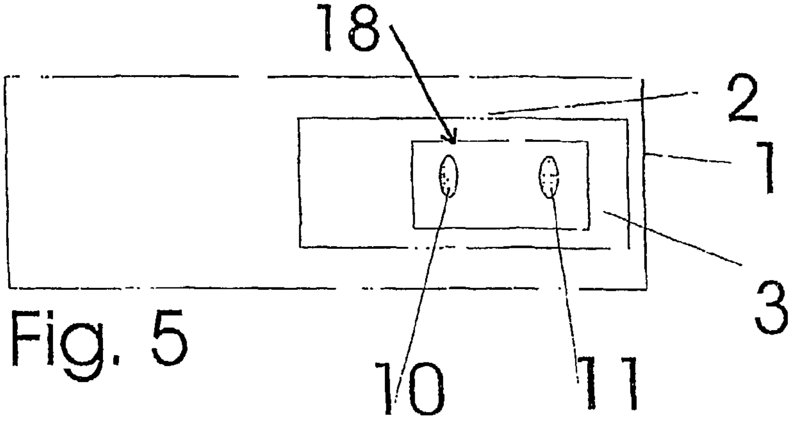

FIG. 5 this is a variation of FIG. 3. The subareas 4 and 6 are smaller and further apart in FIG. 5 to illustrate how FIG. 5 can generate a direction "click" event in a safer manner than FIG. 3.

FIGS. 6,7,8,9,10 all show variations of the same four T shaped Zeroclick. This described how the left single, tight single, left double and right double button 'click' events may be generated by different specified pointer movements between the subareas 12, 13, 14 or 15 within the predetermined path area 3. Then describes how using other direction, reverse or angled specified movement may simulate additional 'click' events.

FIG. 11 shows different styles of subareas within the predetermined path area 3 and by a subsequent movement of the pointer according to a specified movement of a correct sequence of the pointer moving over two or more subarea generates a 'click' event. These are only a few examples. The range in styles is vast.

FIG. 11 shows some different styles of zeroclick. These can be interchangeably swapped as different styles for the predetermined path area (3). FIG. 3 shows 16, FIG. 4 shows 17, and FIG. 5 shows 18.

Figure 13:
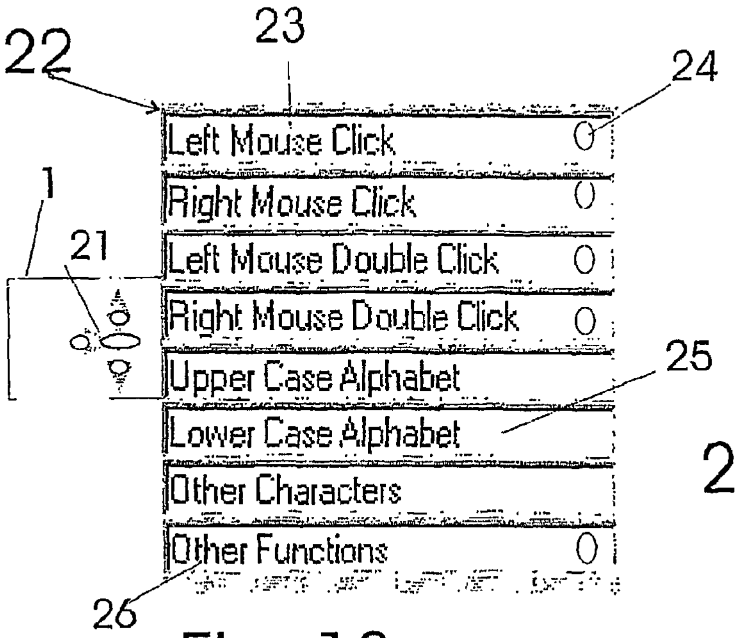
Figure 12:
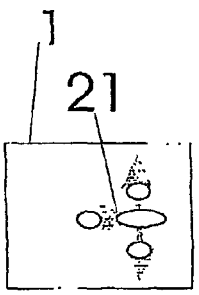

FIG. 12 and FIG. 13 show a bordergrid 22 being generated by moving over a control area 1.

Figure 14:
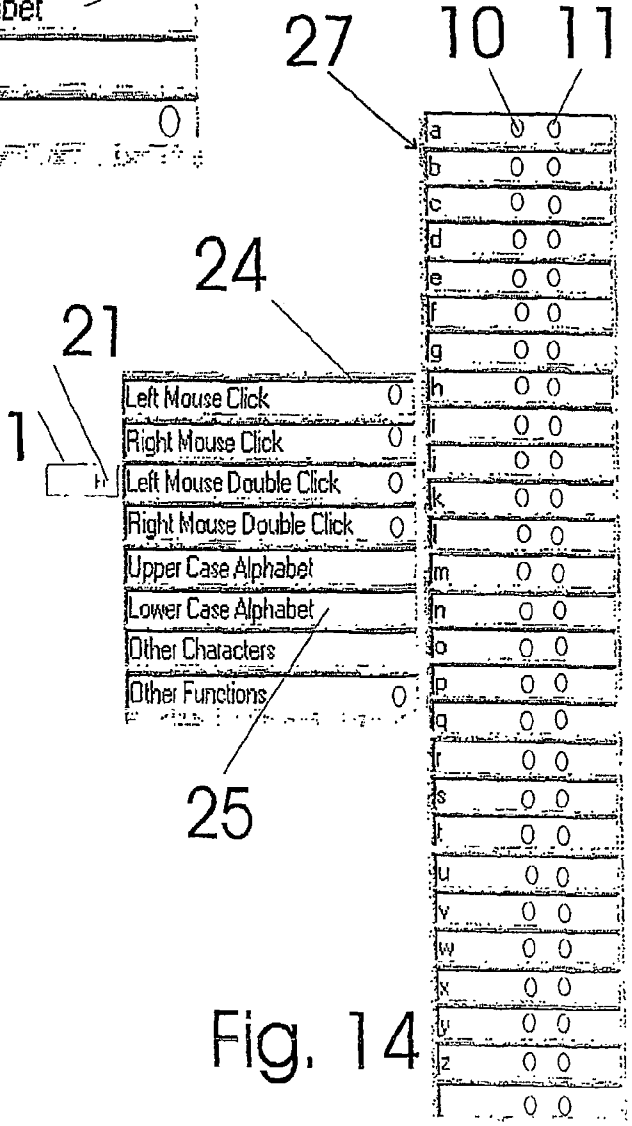
Figure 15:
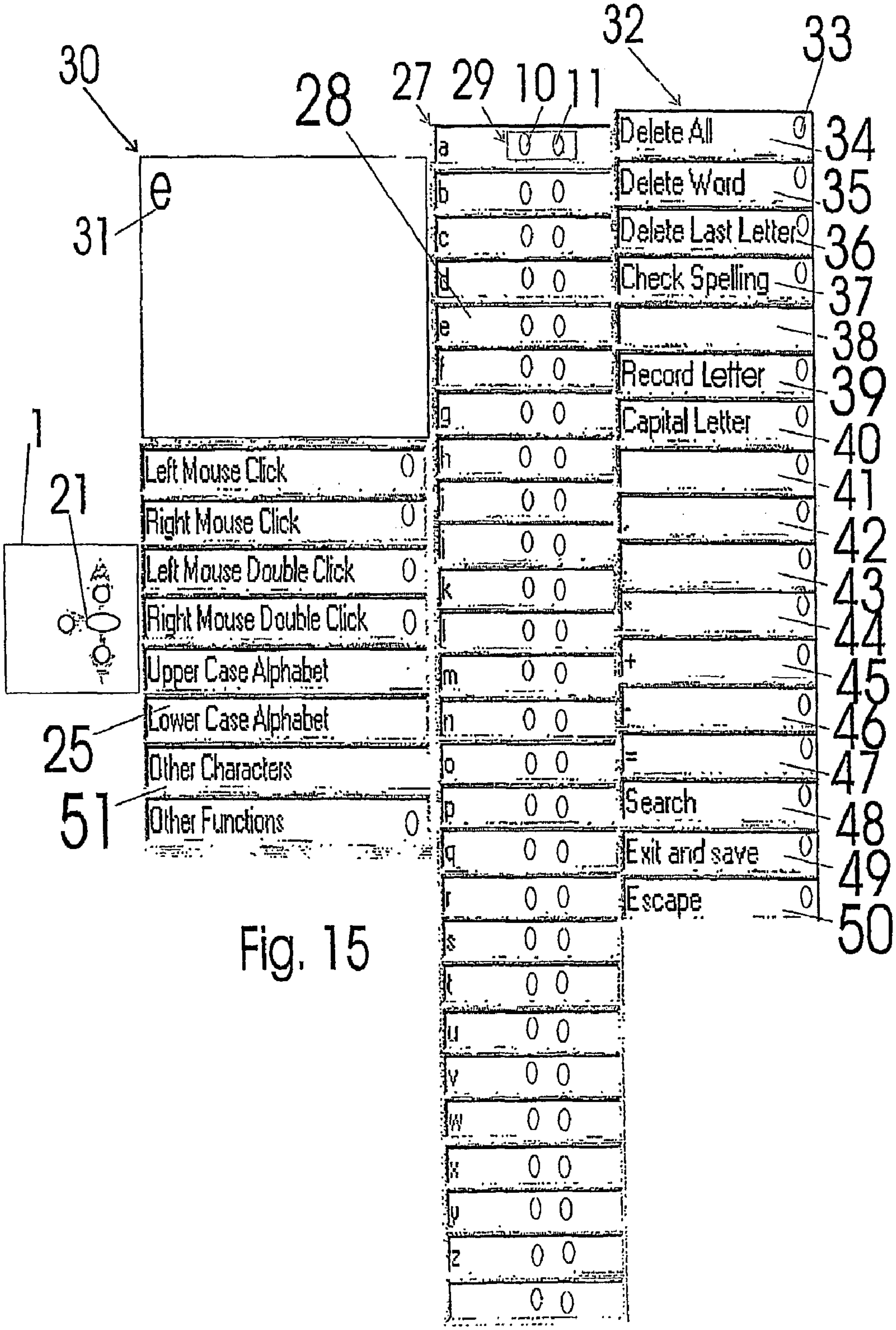
Figure 16:
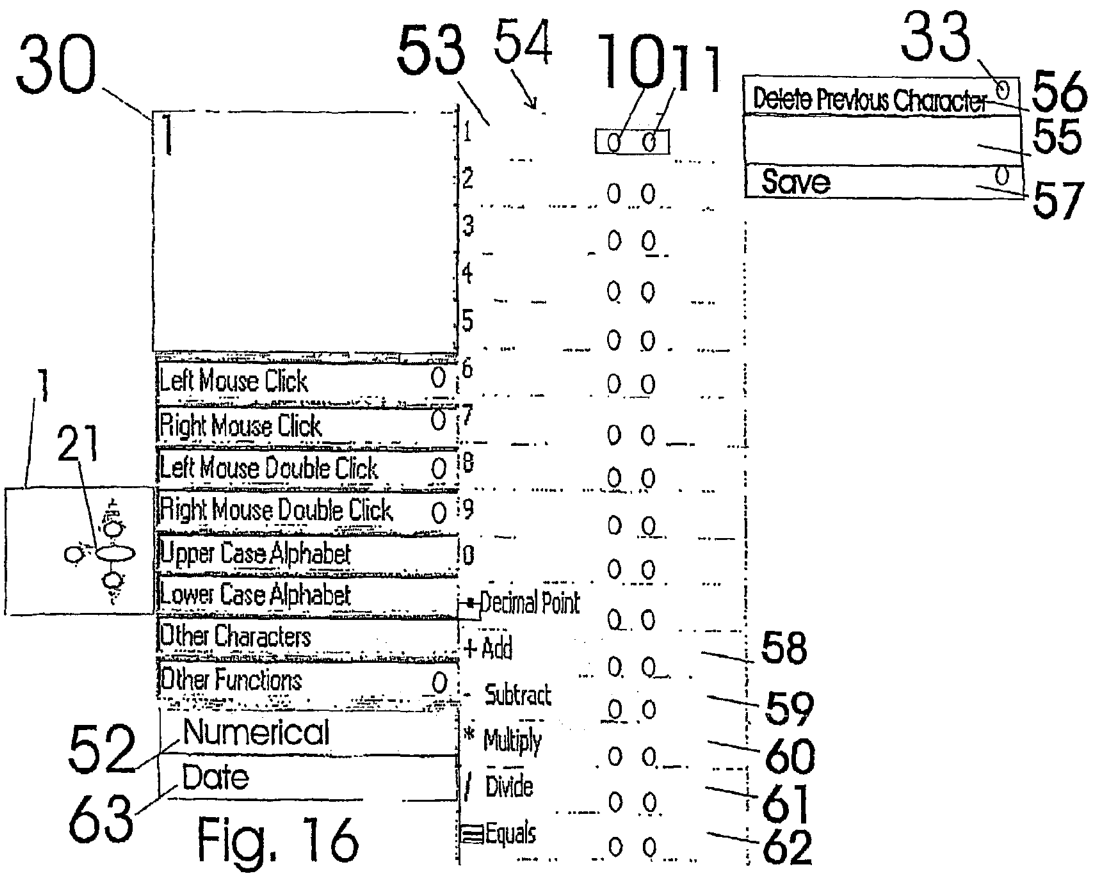

FIG. 14, FIG. 15 and FIG. 16 show a method that the bordergrid may be used for character and number data entry.

Figure 17:
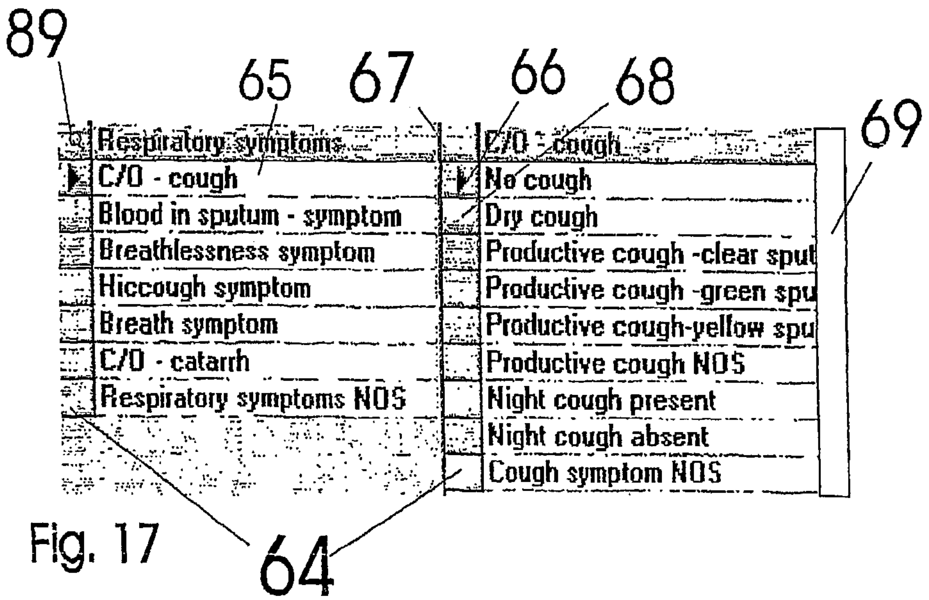

FIG. 17 and FIG. 19 shows an alternative style of bordergrid.

FIG. 18 describes some features of the predetermined path area (3) and/or the specified pointer movement that can be varied for the purposes of improving the speed of completion of the 'click' event and/or improving the error prevention of the 'click' event. It describes the components of the path 3, the path length 303, the path width 306, the distance between subareas 304, the height of the subarea 305 and the width of the subarea 302 and the specified pointer movement within the predetermined path area (3) that can be adjustable for these purposes.

Figure 20:
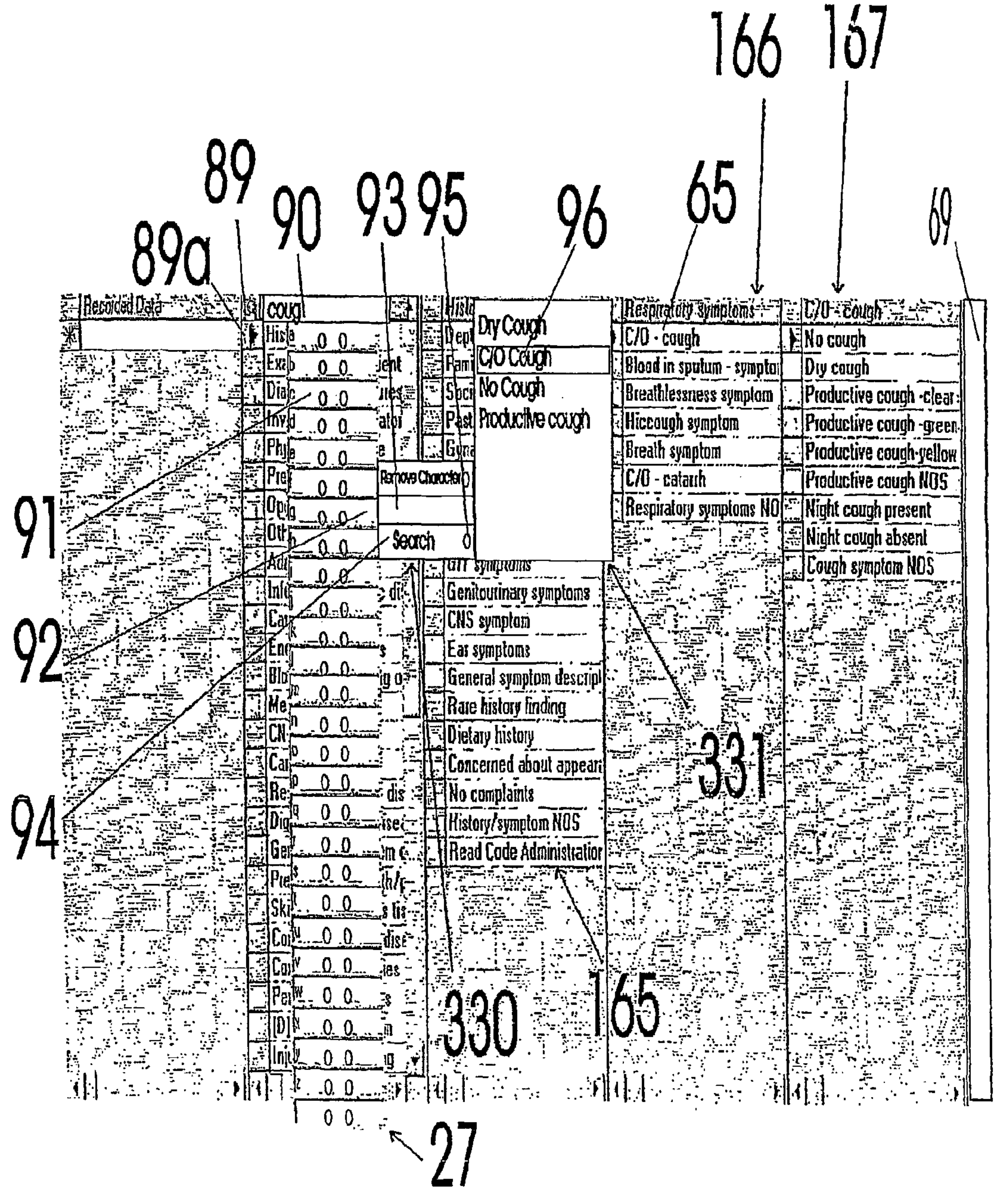
Figure 21:
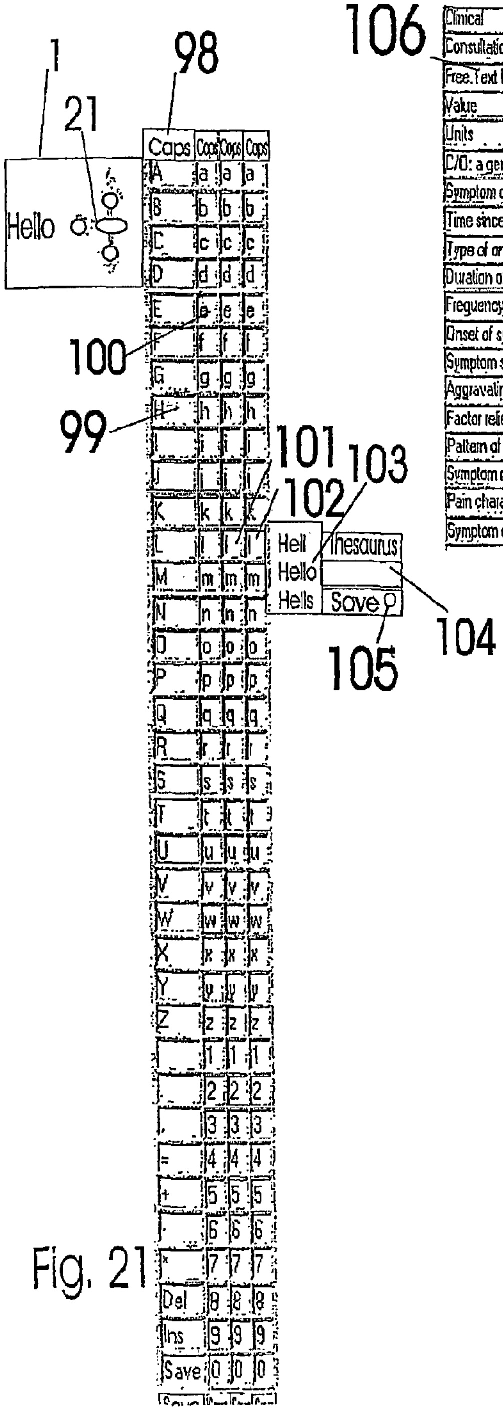
Figure 22:
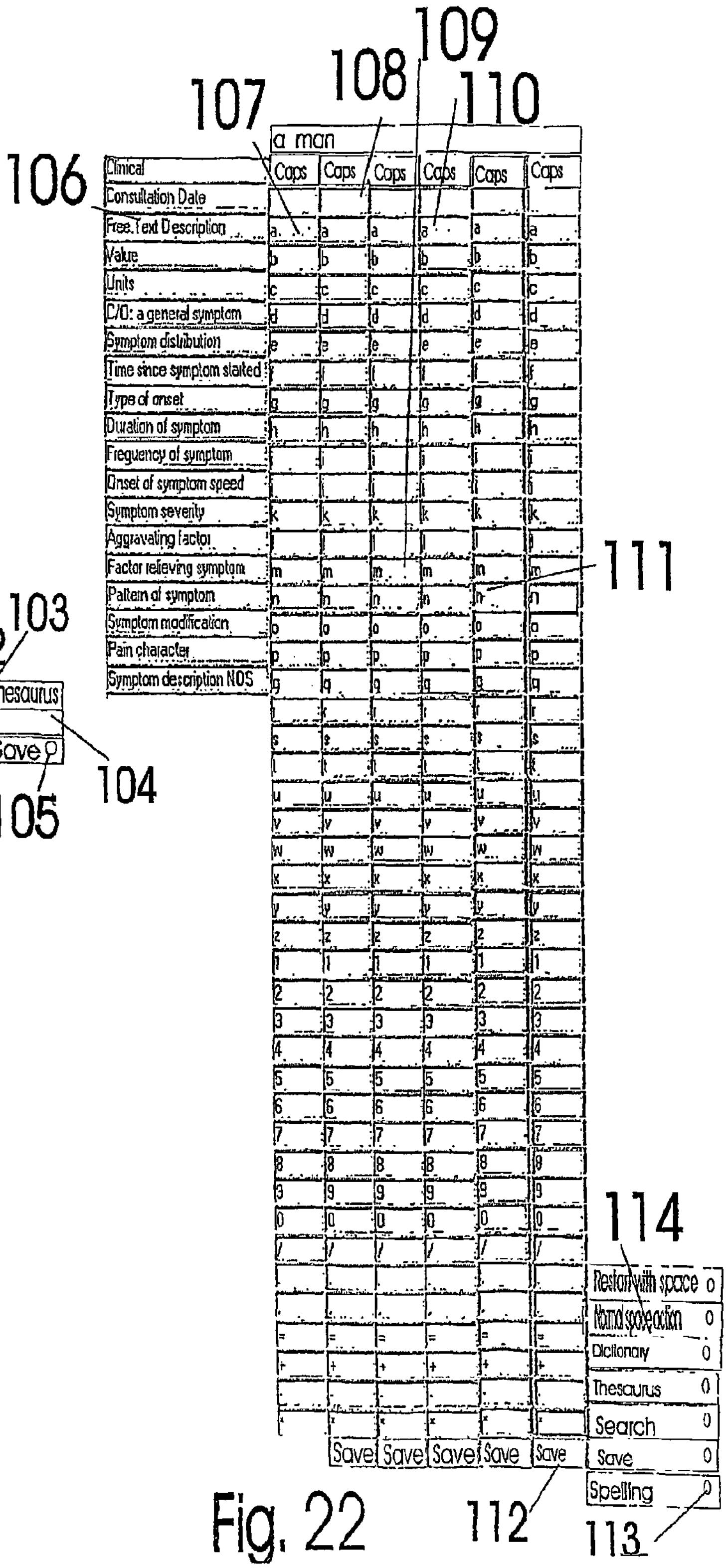
Figure 23:
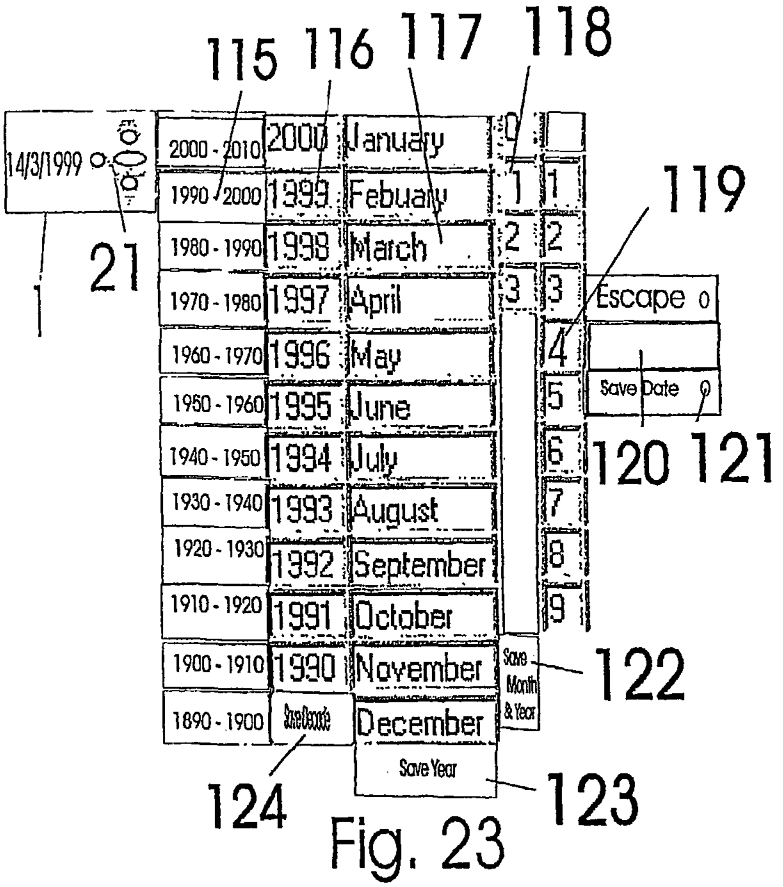
Figure 24:
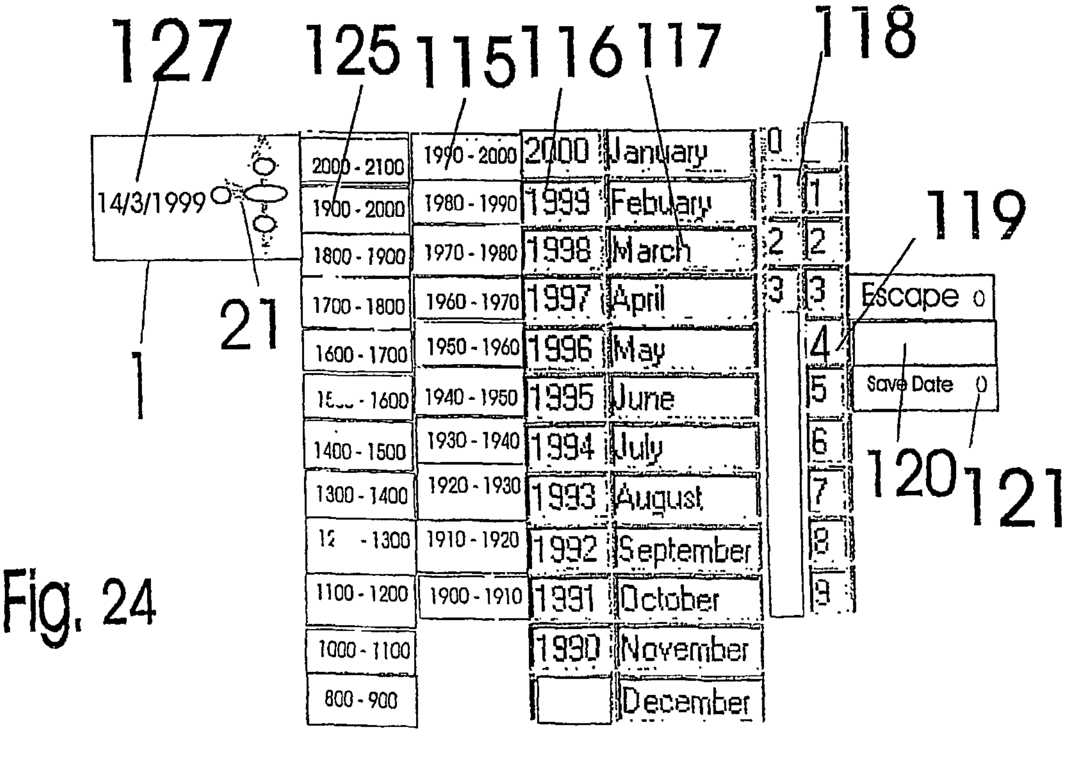
Figure 25:
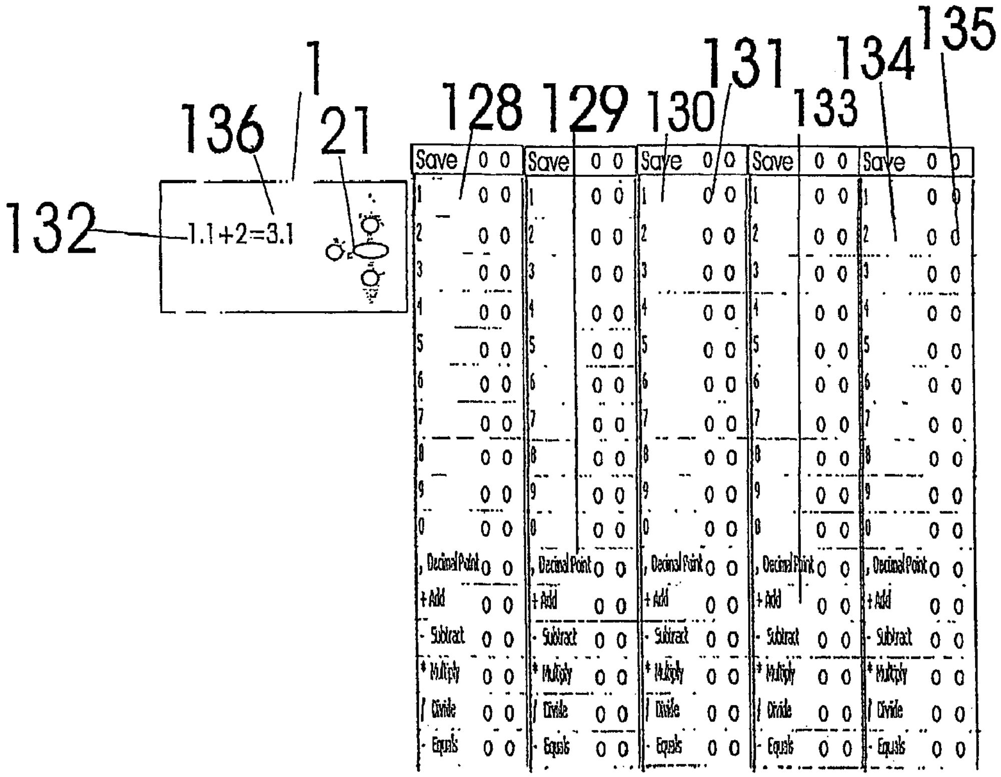
Figure 26:
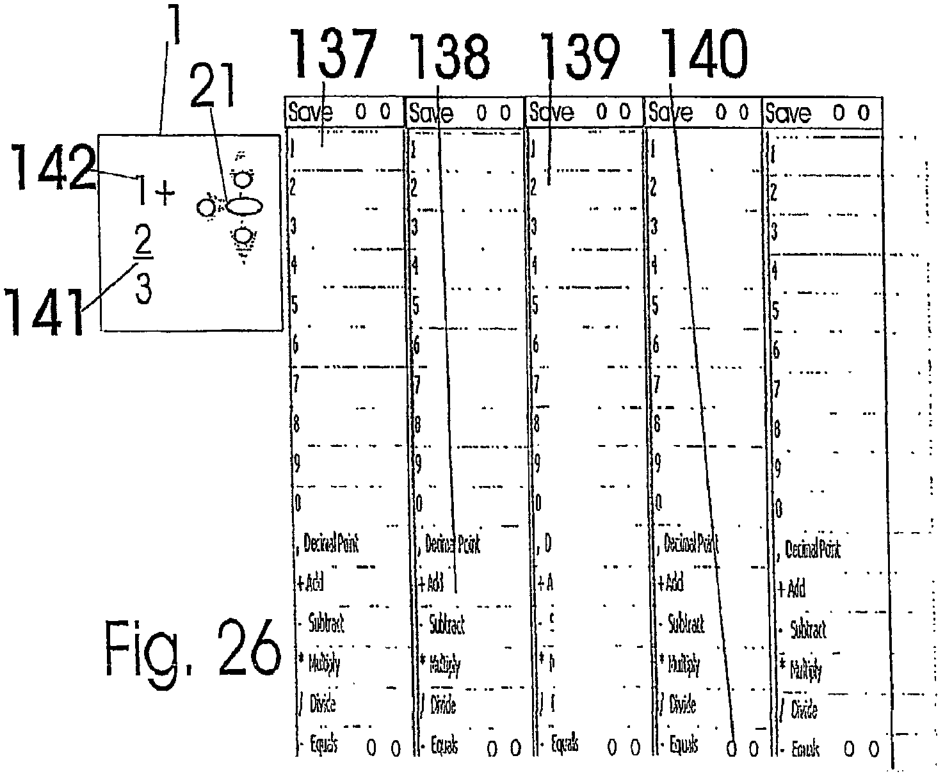
Figure 37:
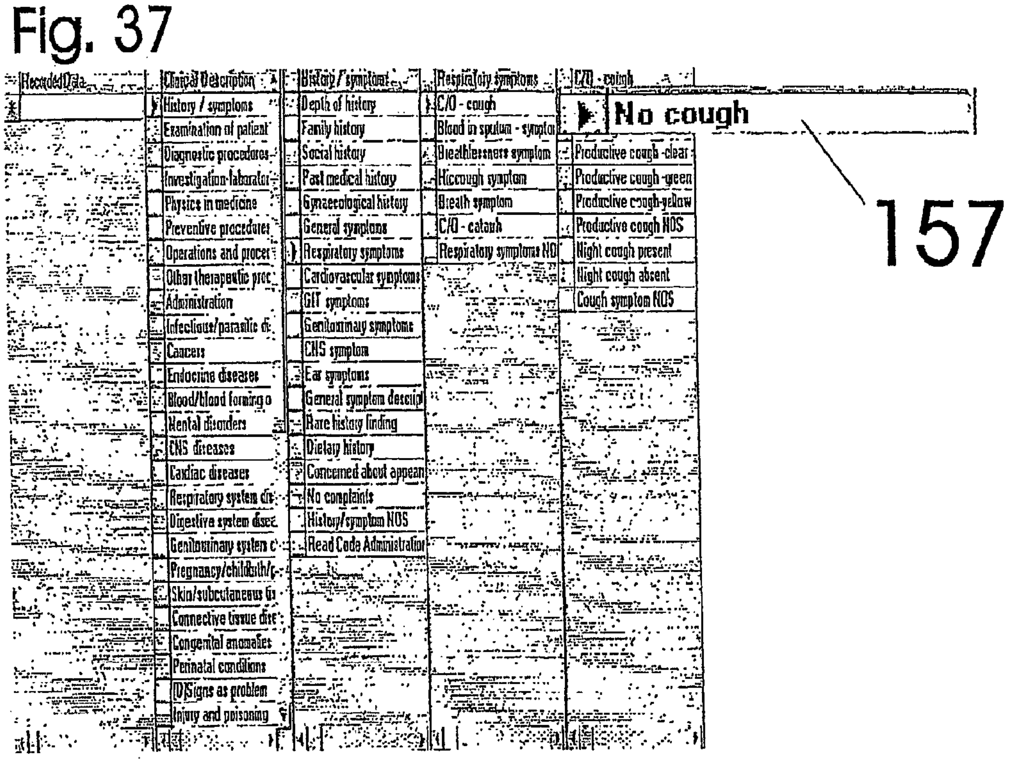
Figure 38:
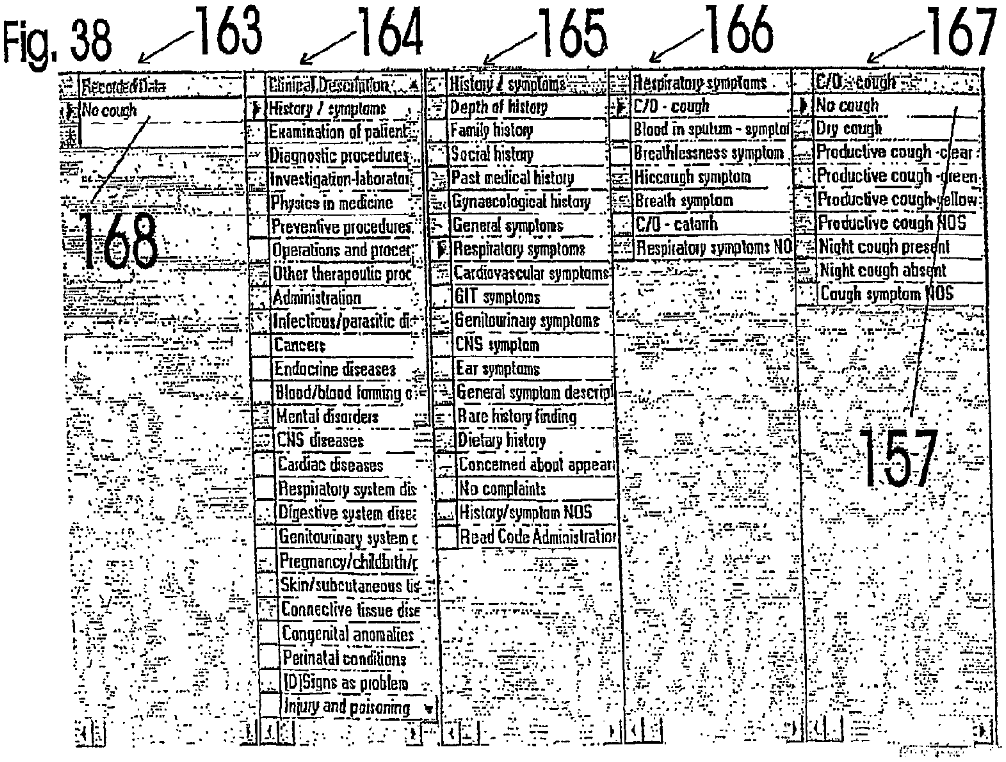
Figure 42A:
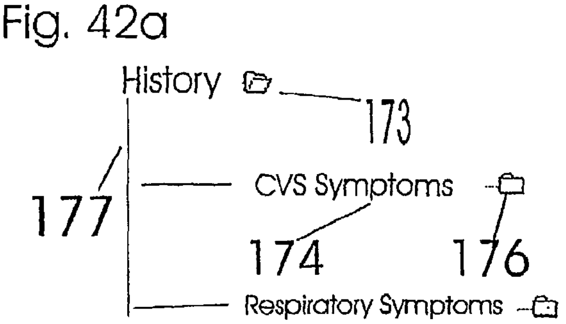
Figure 42B:
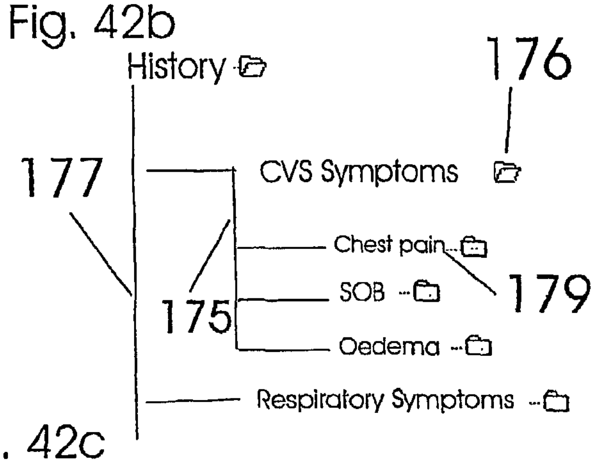
Figure 42C:
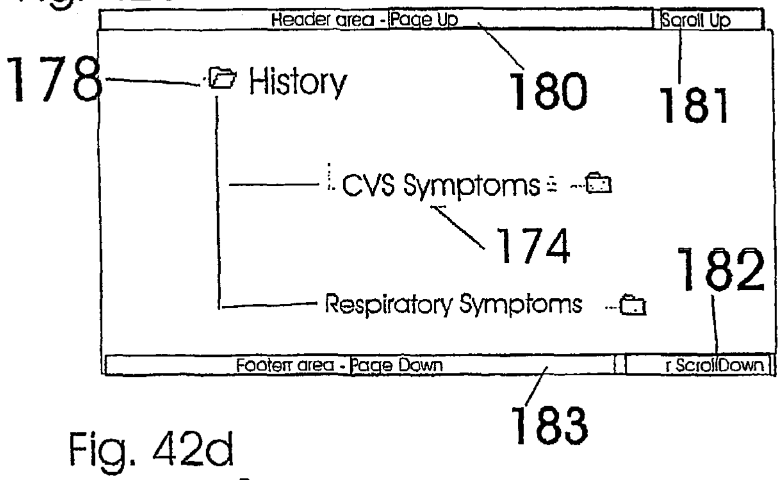
Figure 42D:
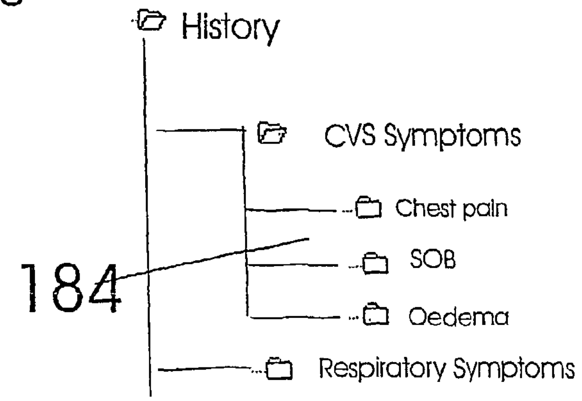

FIG. 20 shows the search on the Hierarchical Cascading Grid (HCG). FIG. 21 show a HCG keyboard replacement, FIG. 22 shows a HCG keyboard replacement to write phrases, FIG. 23 shows HCG date entry, FIG. 24 show a variation of date entry in the HCG. FIG. 25 and FIG. 26 shows numerical data entry in the HCG.

FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40 and FIG. 41 illustrate the features of the HCG with an example a medical application.

FIG. 42*a-d* show a variation of the HCG in the form of a hierarchical tree view.

FIG. 43 shows how the HCG could be operated by the keyboard in addition to pointer movement.

FIG. 44 shows traditional computerised medical notes which can operate by specified pointer movement.

FIGS. 45, 46, 47, 49, 50 and FIG. 51 show data entry in the HCG medical example.

FIGS. 52, 53, 54, 55, 56, 57, 58, 59, 60*a*, 60*b*, 61, 62, 63, 64, 65 illustrate a medical application which could operate by pointer movement.

FIG. 67 show how a "click" event may be simulated by specified movement over a touch screen or a touch pad being completed by jumping from one location of the screen to another. This is in addition to "click" events generated by specified movements over a touch screen or touch pad with finger movements or pointer movements.

Figure 76:
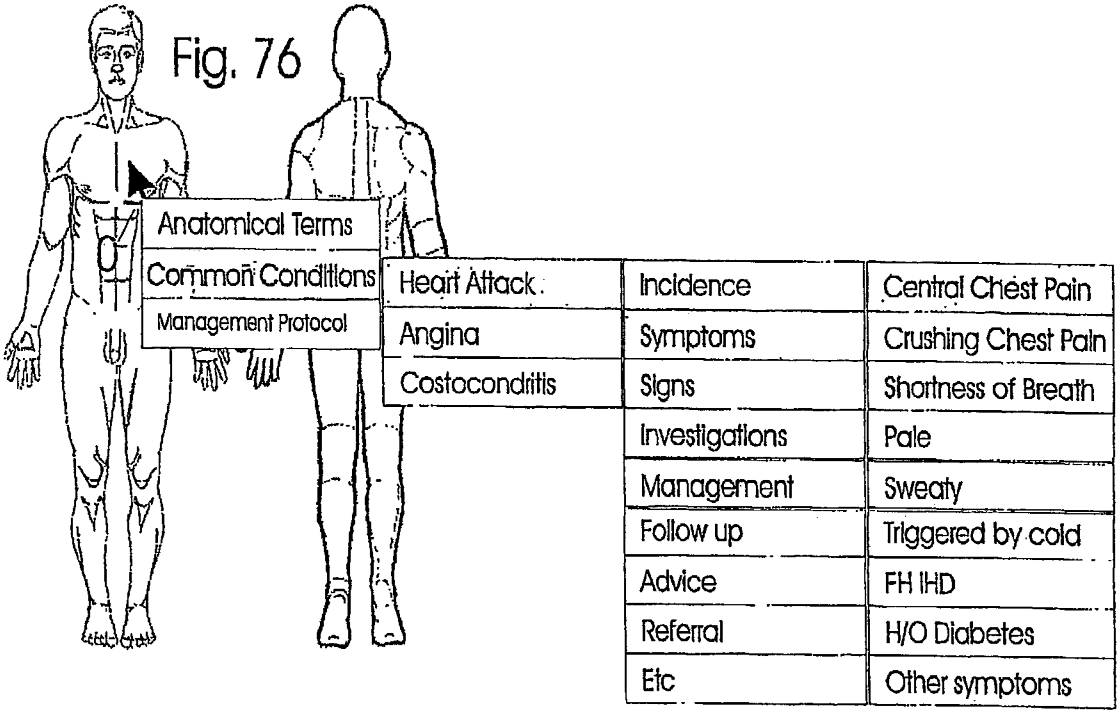

FIGS. 69, 70, 71, 72, 73, 74, 75, showing examples of hierarchical medical menus accessible from an anatomical structure and condition locator shown in FIG. 76

FIG. 68 shows a "click" event generated by pointer movement over an invisible control area (1) and an invisible predetermined path area (3).

Figure 77:
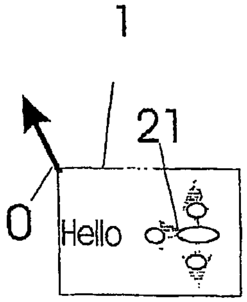

FIG. 77 describes two ways that a pixel may be selected and trigger a function by a specified movement of a certain direction of pointer-movement, for example a south west direction, or a reverse pointer movement—the reverse zeroclick.

Figure 78:
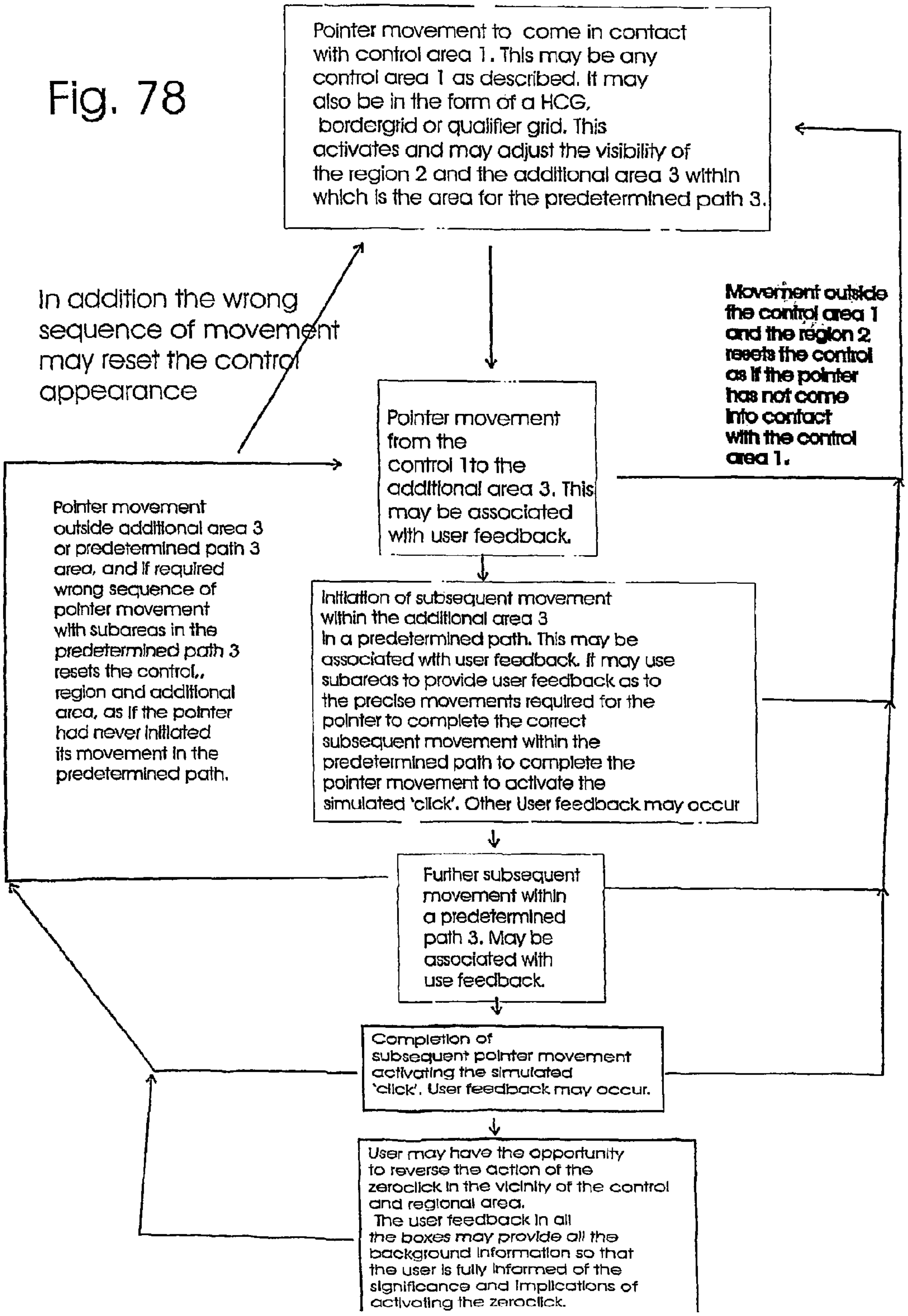

FIG. 78 describes the flow chart method that may be used of simulating a "click" event by pointer movement.

DETAILED DESCRIPTION OF THE INVENTION

The concept of a replacement methodology for the traditional mouse movement and clicking has little development in the prior art, and only in situations where it has been a necessity, like small computers, or force feedback devices, or vcr/tv controls. However, the intention of these were for a specialized market and never for the broader market and there has been a failure to address the major problem of considering a click replacement system by movement alone, which is that the speed of a mouse click is faster than a click in inexperienced users by movement and it has lower unintentional error, better speed of activation and better use of the graphical interface. Thus for any click system by movement to offer a viable alternative to the conventional mouse movement and click, the following problems need to be identified and obvious solutions and benefits need to be made public so that developer and user may be aware and understand the significant evolutionary benefits of using the Zeroclick methods, to motivate them to learn and adopt this GUI method seriously as an additional method of a user controlling a GUI. For it to be a serious competing method of operating a GUI, the user will need to perceive the definite benefits and need for change before changing from such a well accepted conventional methodology.

1) Solutions need to be provided because the speed of a mouse click is very fast, and it is difficult to design movements of the mouse that would be specific enough as a click, but also fast enough to equal the click. This is the major aspect that all the prior art has failed to address. If a child or inexperienced user is asked to click a button or to move a mouse to activate a click then clicking a button will be a much faster activity. Thus no programmer has seriously considered designing a GUI click emulation by movement alone because the speed of a movement to click would be slower than clicking a mouse to achieve the click with the same degree of error prevention. Thus all the known and commercial programs today have based their technology on using the click buttons on the mouse and do not have additional or replacement click emulation by movement for all their GUI controls (except those functions which do not cause unacceptable consequences if accidentally triggered by movement). Solution. 1. The movement click should be a simple but distinct movement. Usually this will mean horizontal, vertical movements requiring one change of direction if 180 degrees over a certain line, or 90 degrees within a given path. 2. The path of the pointer movement from coming in contact with the control should be as efficient as possible and easy to navigate for the user. Thus the pathways from the specific control should be accessed with the most appropriate hierarchical structure. Thus the information may be organised automatically according to user usage, common classification or grouped according to useful groups of information specific to achieving a certain useful task. An ideal combination of using hierarchical structure dependent on appropriate classification, common usage, useful combinations of subdata, and all the supporting information will allow the user to appropriately use the right function and know the implications of selection of that function or data via user feedback. The possibility of having one or more branching hierarchical data structures from every cell of a grid, line of a list, item of a menu, icon of a toolbar or any other subdata element of a grouped collection of data elements as described the bordergrid HCG enhances the efficiency of the controls by a single control having numerous pathways. It may be achieved by one or more bordergrids. 3. The path of the movement click should be as educational as possible. Thus the pathway to trigger a function may display information (e.g. speech, animation, video, audio, photography) in any appropriate form on the screen prior to the completion of the movement click, and provide information afterwards of the implications of the click via information. 4. The path of the movement should activate as many functions as appropriate with the appropriate user feedback to achieve 3. above. E.g. in a medical data recording program when a user moves over a condition, all the necessary information may be seen, and tailored to be displayed according to the doctors preference, so that the doctor may as rapidly as possible get a full picture of the clinical features that support the diagnosis, and the steps of management and the cost of each management step, all from a single movement over an individual cell. By moving over any additional grid providing more information the screen will then show the additional information so that the doctor may be fully informed of the specific implications of the existing data of the subject. The doctor never needs to type in or use any click mechanism to select any data already inputted regarding the condition. He then by a further movement may record any changes or further details to any existing recorded data, thus saving the user the need to input any data that is on the original system. One of the options will be to record any new changes to existing recorded data, and it will be hierarchically structured. After the doctor has imputed the data, then the user will be presented with all appropriate deductions from the data entered. Thus if the information was a clinical feature, it will analyse whether that clinical features has further confirmed the diagnosis, or has increased the differential diagnosis, or the order of the differential diagnosis regarding the clinical features entered. If a management step (consultation, advice, drugs, operative procedure, change in diet, lifestyle or any other remedy) has been performed then any change in clinical feature or additional clinical features (e.g. history, examination investigations) has been recorded. Then the effectiveness of the management step may automatically be deduced by recording the change in clinical features that had occurred from the onset of the condition. The change in clinical features may then also automatically suggest different management steps according to the best evidence based medicine using all the clinical data available of the patient. Thus the advice given by the computer will consider the complete patient picture and thus may give the entire range of managements available and then arrange the most relevant management steps according to best evidence for the condition in an order appropriate for the whole patient's position. 5. The whole screen may be used to give user feedback as shown in the medical program. 6. Speed—indicate the exact pathway that needs to be followed to complete the movement for a click. 7. The program may have an option to allow the program to respond to standard clicks, both standard clicks and Zeroclick, or Zeroclick alone to allow users to train and practise with Zeroclick 8. User adjustment of the Zeroclick path and type of movement and number of interactions and feedback enable faster clicking and having the default type of Zeroclick to suit the individual. Visibility may be switched on and off. 8) Filename structure enables emails to drop files in background to local workstations or personal computers and the filename structure and file then seamlessly may add the web updated data, or the user updated data locally to existing subdata or branching data. 9) All keyboard functionality may be replaced by the mouse movement alone. 10) All data entered may be classified to a known hierarchical code. Thus free text entered under a term with a known code may be classified to the nearest appropriate code. 11) Provide one uniform interface for all programming needs. It is based on the simplest requirement of mouse movement. Thus for developers using programs with controls with these events, then it would be known that the information may be portable to all operating systems with mouse input.

2) Solutions need to be provided because the conventional GUI allows the user to assume than no unacceptable functions will be triggered by mouse movement alone, but will require a click or key press. Zeroclick goes against the prior art. The conventional design of all existing programs assumes if you randomly move your mouse over a computer screen with a GUI then unless you have clicked a button, or made a key press to activate a program or a function, then there will be no triggering of any function which would have unacceptable consequences if accidentally triggered. Thus introducing a click system by movement alone will require a learning curve, and require practice even by experienced mouse users as they learn a new method of 'clicking', and learn to avoid accidentally triggering functions, that would have previously required a click, by pointer movements over the screen. Solutions 1) reducing the width of path makes unintentional triggering of the movement click less likely 2) making the movement within the path more complicated 3) having a further movement to undo the consequences of activating a movement by accident, e.g. recording data in the HCG 4) use feedback to warn the user what function is about to be activated if the movement is completed. 5) Switch turning Zeroclick on and off. 6) User adjustment for finding optimum error prevention 7) Education and training of the user of this new GUI which may have functions which were previously only activated by the standard click or keyboard now being activated by pointer movement alone. 3) Solutions need to be provided because the controls activated by movement will require greater space than standard clicks. A click with a mouse may occur over a very small area, e.g. the X close icon or the toolbars in Window™ applications. This occupies a small amount of space and requires no adjustment for a click by movement. It can be located anywhere on the screen without any problems of triggering the control by a click. Thus the controls with the standard click have an efficient use of the screen space. Solutions 1) Show the Zeroclick path only when the pointer is in contact with the related control. 2) If it would go off the screen, adjustment will be made that the Zeroclick will be on the screen 3) Moving outside the original control and or additional areas made visible will cause all the additional screen changes to disappear. 4) The Zeroclick control would be appropriately adjusted for all screen sizes. 5) The Zeroclick Control will be adjusted to provide the optimum adjustment for visibility. 6) Choose suitable transparency of the Zeroclick Control for function e.g. if using the HCG for recording data from a cell then make the path as transparent as possible. 4) The controls should have a backward compatibility path. Solution. 1) The existing programs should have a pathway for these programs to be adapted so that the standard click may be adapted to the Zeroclick (preferably without even needing to alter existing programs but just their environment) 2) Able to offer both the standard click functionality and click by movement functionality. 3) To retain the original style of the GUI interface as much as possible by still having to move in contact with the control to activate the ZCC. 5) Making known other indirect benefits or unexpected benefits of a click system by movement alone so that programmers and users become aware of the advantages of this technology. In addition to those mentioned above additional benefits are 1) The cost and increased effectiveness of touch screens which do not need to be pressure sensitive but triggered by movement alone. 2) The ability to fully operate programs without reference to keyboard or input device buttons, or to truly surf the web without the slow jerky movement of the user using mouse buttons, making the surfing experience more enjoyable and effortless. 3) The user may access and interact with data as fast as their thought, without the coordination problem of slowing over a particular area. 4) The noticeable difference in ease and speed in using programs with Zeroclick methods compared to the standard click system which seems slow and having an endless series of additional clicks to achieve the same functionality. 5) The lack of tension in holding the mouse due to no need to press the mouse buttons means users may adopt much more relaxed posture. 6) Make public the idea that clicking by movement alone is the next evolutionary step to computing using any communication method e.g. analogies like:—The skier going down the mountain needs to evolve from the inefficient snow plough and leaning backwards from fear, to overcoming their fear and leaning forwards and practising until they achieve a new level of control and efficiency as they glide through the snow with increasing more efficient parallel turns. The same analogy occurs with as swimmer struggling through waves evolving to surfer gliding over the waves, or rowing boat evolving to a sail boat. The same analogy applies to the traditional slow process of jerky mouse movements with clicks, appears slow and amateur compared to the evolution to effortless gliding of the Zeroclick methods. Or asking question to make users or developer recognise the evolutionary potential of clicking by movement alone:—Do you clunk and click your way though the web or has your web browser evolved to control the web by pointer movement alone? Or have you experienced the next level of efficiency and control with programs that have evolved to have added the clicking by pointer movement alone, or are you still pointing and clicking with the mouse?

7) Show the evidence that the Zeroclick is evolutionary. It is a fluid movement. The design leads to more ergonomic programming and single movements as part of the predetermined path triggering multiple functions. The software companies are given a method by which this functionality may be rapidly achieved in existing programs that do not have this functionality. The keyboard is not needed for data entry, as the HCG with pattern click may rapidly record data faster than conventional touch typing. The number of functions that may radiate and be activated from a single control may be thousands using a bordergrid. This system educates, and mistakes by accidental triggering may be rectified. It is as safe and it is as fast. There is a backward compatibility route, and a mechanism by which the user may by trained in using the Zeroclick method, and adjust it to their own preference Thus this specification provides a public exploration of the unobvious evolutionary benefits for clicking by movement by finding multiple solutions and additional benefits by applying these solutions to overcome the obvious disadvantages of the method compared to the conventional GUI interface. By definition evolution means a beneficial adaptation. Thus one very important method is convincing the user to persevere with a new GUI interface skill (i.e. movement to produce a click) that apparently seems more difficult and slower than the traditional GUI activation of a function by a button press (click) on an input device until they master the skill of Zeroclicking. The lack of its implementation in existing programs is proof that it is not obvious, natural or easy as clicking a button to all users of the mouse. This is obvious as novices using the mouse find pressing a button easier, and competent users of the mouse are so accustomed to clicking the mouse buttons for activation of the GUI function they also would need motivation to perceive that the Zeroclicking was a necessary evolutionary computer skill. Thus the motivation to change to a Zeroclick method requires the following. The idea Zeroclick is a better way to control computer inputs than the conventional clicking method needs to be presented. E.g. slogans like Don't Clunk and Click but Zeroclick or Do you really surf the web or are you one of those people who just clunk around the web page with jerky mouse movements and having to click to find or activate functions on the web pages, or do you Zeroclick with the effortless continuous gliding of the mouse to control every aspect of the web page in one harmonious movement. Or comparing the traditional method of click as someone snow ploughing down a mountain compared to the evolution of a skier to performing narrow parallel turns. Thus it would appear to be a backward step not a forward step. However, like many evolutionary steps, where further research into apparent dead ends may produce unexpected results, the Zeroclick methodology if persisted proves to be evolutionary because the user becomes more efficient because everything becomes a fluid movement. The whole control of the computer is a series of movements. Thus for the Zeroclick to become successful the user needs to believe it is the next evolutionary GUI interface skill. Thus part of the Zeroclick methodology must require the user or programmer having a motivational aspect to use the Zeroclick being a more effective GUI method than the conventional programming method. The user will need convincing and persuading that Zeroclicking is worth pursuing and that it is an essential interface skill that needs to be developed. They need to improve their dexterity with mouse movement, until the Zeroclick becomes more natural than the movement and click. The movement clicks seem awkward. However, if persisted, not just information or activation of functions without serious consequences but the full control of programs may be achieved without a single click. The users today have accepted that for most commercial programs they have to activate the function by a standard click. Thus with Zeroclick functionality it becomes very important to maximize the ergonomics, educative and intuitive component of the Zeroclick.

a) Ergonomics. The minimum movement that is easy for Mouser is needed. Conventional programming relies on having a menu system located in a certain area. The Zeroclick functionality will try to have all the information flow hierarchically from the location of the GUI. Thus from one GUI all the information necessary for understanding and functioning that GUI will stem from that GUI. Thus the user follows a movement path which represents one or more choices to locate a certain specific function or to perform a certain task. The user then does one further movement and that activates the Zeroclick. Thus the user becomes so used to using the mouse movement that one further movement to activate the click becomes much more accurate and intuitive than the traditional move to an area then click.

b) Educative. Conventionally the help section is part of the menu. However, with Zeroclick the help section may be one of the options of the bordergrid menu items, that the user may have a context sensitive help activated by a Zeroclick or bordergrid menu item. They also may have a hierarchical help menu selection. This may be written, audio, multimedia or animation. This help function may also educate the implications of using these functions so that the user understands the choices and purpose of the function. They could then activate the function by another Zeroclick.

c) It needs to be intuitive.

I) It needs to be backward compatible. The user is used to the GUI remaining stationary and the pointer coming into contact with it and then being able to be activated by a click.

II) The fourth point is that the Zeroclick must allow for the user's familiarity and mouse dexterity in performing Zeroclicks. The click on a mouse is easier to perform for a beginner, than the movement of the mouse. Thus a Zeroclick method preferably has some method that the user may switch on or vary the Zeroclick to their liking.

This may be achieved by having an option on the program that allows the user to customise the GUI controls to suit the user ability to move a pointer with a pointer device. This could be altering the style, shape and interactions within the path of the Zeroclick. It may also allow the user to have just traditional clicking methodology, combined methodology, or Zeroclick alone. Thus the programmer may control all the variables in deigning the Zeroclick and the most appropriate aspects of the control for the user may vary for the Zeroclick.

Another aspect of the Zeroclick is to make sure that it becomes available for existing technology. By adding the functionality to click by movement alone at an operating level, or any computer environment (e.g. web browsers with the Zeroclick methodology or any terminal emulation environment or network environment or operating system i.e. in any computer environment connecting computers, or any operating system environment running the program, or at a program level, or within a GUI development environment a global event added to all controls and/or individual controls and or functions or a set of functions in any programming language) like the internet, or network software, will automatically enable existing programs designed to run on that operating system or in that computer environment to have the additional functionality without needing to reprogram the application. Thus at every development level there may be a group of functions or events that may enable any program, operating system or any computer network connecting more than one computer to have Zeroclick functionality added, and it could be controlled by any input device with which the user may control the movement of the pointer. (touchscreen, mouse, joystick, etc). All the above enables all existing GUI's, which would only have their traditional click methodology, to automatically be changed to add or replace it with the Zeroclick methodology. It also may be applied as events in visual development languages, or functions or procedures or code that enables the programmers to program the Zeroclick functionality into existing programs.

Currently the operation of computer operating systems and programs require a compromise between users using the mouse (pointer device) and the keyboard. The user often has to switch between the two, which is inefficient. Also the current program control operation, design and data input methods often require too many key presses or clicks to record data at speed. The purpose of applying some or all of these methods partially or completely to existing (or future) operating systems or programs is to allow a reduction in key or mouse button presses (or other locator device) in some or all of the operating system and/or program's operation, functionality and data recording.

This has the advantage of having a single programming interface for touch screens and mouse based computer systems. It will enable users to only need to use the locator device and also it will change the mindset of compromise of users and developers still accepting the inefficiencies of the conventional GUI needing to move between moving the pointer of a mouse, slowing the mouse down to click, and switching to the keyboard to input data.

Using techniques of having a program react only to the mouse position, and directional movement, without having the need of a mechanical clicking device will streamline the design of all current programs.

The potential and flexibility of using these methods may develop a new style, called the Zeroclick Style.

Application of Zeroclick May be Comprehensive to all Previous Software and all Future Software Development.

These Zeroclick Methods may transform any operating system, application or control into a GUI, which does not need to use any mouse button or keyboard presses where they were used before. Thus the Zeroclick Methods may be applied comprehensively to all existing software and all future software development. One of the most obvious application example demonstrating how the Zeroclick Methods may be applied to applications is on an internet browser (Zeroclick Internet Browser). Using the Zeroclick Methods, the user would not need to use any mouse button press or keyboard presses to completely surf the net. Instead of the user moving the pointer then clicking, the user could truly completely control the interaction with and data entry for the internet by mouse movement alone. The browser could recognise the html or any internet language and generate addition Zeroclick functionality for all the control areas associated with any internet web page language. This Zeroclick functionality may augment or replace the normal mouse clicks and/or keyboard functionality to an appropriate Zeroclick or bordergrid. The example of the bordergrid shows a generic way that keyboard presses and mouse clicks may be emulated in addition to or instead of the original web page editing. FIG. 15 or 16 (or any additional necessary bordergrid menu items available to add additional mouse button presses and/or any other group of characters with the character grid.) show how any control area may by transformed to have an associated bordergrid to replace conventional editing.

Thus the internet browser could provide all the conventional functionality of current internet browsers but in addition offer the ability of the Zeroclick Methods to control the access to the net through mouse movement alone (or any degree of increased control above that previously by mouse movement). The browser could initially transform any web page to be surfed using the Zeroclick methods by adapting the response of the browser to the Web page source code. However, future internet language could be extended to contain language or functions to make it more compatible with the Zeroclick internet browser. E.g. the HTML source code could have a method that generic bordergrid menu item of Right Mouse Click could be adapted so that it described the function. In this way the users could use existing web pages immediately with the Zeroclick web browser but later web pages could become completely customised to the Zeroclick Methods as the web site programmers wish to add Zeroclick functionality on their websites. This method could also apply to any other terminal emulator program which communicates between two or more computers. The Zeroclick functionality may be added to the language, but as previously described, the emulator itself may have existing generic Zeroclick functionality. Thus both internet browser or any terminal emulator may add Zeroclick functionality to the existing communications with current internet or terminal emulator language. The user may have the option of retaining all the original functionality of the internet browser or terminal emulator. Thus the user may use the Zeroclick internet browser or a Zeroclick terminal emulator as a conventional internet browser and terminal emulator. The Zeroclick browser or Zeroclick emulator may have an additional Zeroclick Setting which could allowed the Zeroclick Methods to be generated automatically in an appropriate manner from web pages or the original terminal emulator communication language. The user would also be able to customise the Zeroclick methods.

Eventually there may be a situation where the developer or user only wishes to use the Zeroclick functionality on the Zeroclick internet browser or Zeroclick terminal emulator.

The web servers accessed by the Zeroclick internet browsers, or local programs accessed by the Zeroclick internet browser, or servers to the terminal emulators, may also wish to add the additional Zeroclick functionality by developing new communication and programming language functions to fully exploit the power of Zeroclick methods available in the browser. Operating systems then may add Zeroclick functionality, thus lessening the need for this code at an individual program level.

U.S. Pat. No. 5,500,935 discloses a GUI including menu functions illustrated at FIGS. 3(a) and 4. A user touches a touch panel or presses on a stylus, which calls a menu. If the menu fits, it is displayed at the location of the stylus, and the system determines whether the stylus is over a menu item when the user removes the stylus, and executes a corresponding function. If the menu does not fit at the stylus location, the user is presented a guide display 66 i.e. a visible adjustment path on the display from the current location, and if the system detects that the stylus reaches the new location, the menu is redisplayed in full at the new location 74. The GUI of U.S. Pat. No. 5,500,935 differs from the invention discussed further below in that following the path does not select the "control area" (i.e. the "colors"), in that the path reflects the movement to be applied to a menu for fitting it on the screen, rather than corresponds to a predefined, standard movement corresponding to a given function to be selected, and in that the (popping up of the) path is dependent on the position of the unfittable menu on the display, not of the user's intention to have it appear by moving the pointer on a control area.

EP-A-0660218 describes (FIG. 8 and corresponding description) following an invisible path upwards to change a characteristic (capital e.g. "A" instead of small "a") of the selection (character e.g. "a" of a virtual keyboard) obtained by placing the pen or stylus on the key corresponding to the character, and finally completing the stroke by lifting the pen. FIG. 11 shows a menu mode, wherein a menu appears responsive to pressing the pen and waiting a short interval. The navigation through the menu is obtained by going over a selected item, and the selection is confirmed when the pen is lifted.

U.S. Pat. No. 5,721,853, which is considered the closest prior art, discloses a GUI used by means of a mouse, the GUI displaying (see FIGS. 2 and 3) a spot interface comprising a collar 200 when the mouse pointer 23 is moved over a spot graphical display element GDE 10, without a click being needed. Further movement of the mouse pointer 23 into one of the quadrants of the collar results in the display of a secondary interface 302, wherein the user can finally initiate execution of functions by clicking the appropriate buttons.

The invention is a GUI interface, a method of programming a GUI interface, and an apparatus which enables one or more functions of controls in the GUI to be activated by a movement of the pointer to a control and then another subsequent movement of the pointer related to that control; that is the completion of that subsequent specified pointer movement related to a control area (1) activates one or more functions of the GUI.

According to a first aspect of the present invention, there is provided a graphical user interface GUI. A graphical user interface (GUI), which may comprise an update of an existing program, that may fully operate a GUI by a two step method of movement of a pointer (0) to trigger one or more functions within the GUI, wherein, said existing program is any existing program that can operate the movement of the pointer (0) over a screen (300) and has one or more functions operated by one or more other methods apart from said two step method, and/or one or more functions operated by one or more said other methods in said existing program can be updated to operate by said two step method, wherein said GUI triggers one or more functions within the GUI by the completion of the following said two step method: first said pointer (0) is immediately adjacent or passes within a control area (1), which is an area of the screen (300) that may be any size including from a pixel on the screen (300) to occupying the whole screen (300), and second by the completion of a subsequent movement of said pointer (0) according to a specified movement generates a 'click' event, thereby triggering one or more functions within the GUI.

According to a second aspect of the present invention, there is provided a method of operating a graphical user interface GUI. A method of operating a graphical user interface GUI, which may comprise an update of an existing program, that may fully operate a GUI by a two step method of movement of the pointer (0) to trigger one or more functions within the GUI, wherein said existing program is any existing program that can operate the movement of a pointer (0) over a screen (300) and has one or more functions operated by one or more other methods apart from said two step method, and/or one or more functions operated by one or more said other methods in said existing program can be updated to operate by said two step method, wherein said method of operating the GUI triggers one or more functions within the GUI by the completion of the following said two step method: first said pointer (0) is immediately adjacent or passes within a control area (1), which is an area of the screen (300) that may be any size including from a pixel on the screen (300) to occupying the whole screen (300), and second by the completion of a subsequent movement of said pointer (0) according to a specified movement generates a 'click' event, thereby triggering one or more functions within the GUI.

The present invention provides a group of methods that can be applied partially or completely to any apparatus, or any program (e.g. a computer operating system, and/or any program (e.g. a computer operating system, and/or any computer application and/or control), which enables the user to operate all or some of the operating system or program functions by interaction with the movement of a pointer alone in a GUI to facilitate efficiency of the program through the pointer movement and/or produce a reduction in clicks and/or keyboard presses.

These methods are called the Zeroclick methods and the specific replacement of the mouse or the pointer device click visual equivalent are referred to as a Zeroclick.

The Zeroclick Methods

This comprises of a method or methods or if appropriate devices using a method or methods classified for convenience to three main areas described below, all of which assist in improving the speed and relevance of data input and the user's more efficient control of the devices or programs (this could any program—e.g. operating system program, or any applications or any controls) by pointer movement alone.

1) The Zeroclick Control, which enables a click/command/function to be triggered by pointer movement alone related visually to any control area of certain height or width. The bordergrid is also a variation of the Zeroclick which enable a pop up grid menu system associated with a control area to be triggered and the grid menu items activated by pointer movement alone. The bordergrid may provide a complete keyboard replacement, a "click" replacement, further more efficient and powerful data entry and display methods, and any other functions being accessed for any control area by the interaction of the pointer movement with the control area.

2) Data input and display methods. Flexible user friendly, educational, self classifying, rapid data entry recording methods demonstrated by a hierarchical cascading grid (HCG), and modified tree view both with increased functional efficiency by the interaction of these grids with the movement of the pointer alone. Any of these features may be transposed and/or applied to any hierarchical data display method to increase its functionality.

3) Other general design principles (See below relevant section in patent description) to increase data input illustrated by specific application to a medical recording program (but not limited in use to it). All these principles can be applied to any application in any other knowledge field if requiring similar functionality as illustrated by the medical program.

Since these are methods that can be applied to all existing operating systems and programs, these methods could be added in addition to having the conventional complete keyboard control, and/or mouse button presses (locator device commands). As users need to evolve from existing systems to ones using new methodology, the application of the methodology could be as full or partial depending on user and/or developer preference or needs.

Definition of Terms Used. Brief Introduction to the Combination of Words Control Area 1 Used in this Patent This is a combination of the two words control and area, It is referring to a pointer-sensitive area in a GUI that an object (e.g. a command button or any control, component or any pointer-sensitive area in a control, program or operating system which may be associated with a function that may be activated by a click when the pointer is over the area) may trigger a function associated with the area when a pointer is clicked over that area In other words a control area may be any control or object any existing program, which has the standard click to trigger any function currently triggered by a click over a certain control area or trigger any function that the developer/user wished to associate with that control area.

Control Area 1

A control area will refer to the existing or future pointer sensitive areas of an operating system areas and/or program areas and/or control areas which have unique "click" action associated with them and/or new pointer-sensitive areas to which the developer wishes to add a Zeroclick control. A control area may be any controls or components e.g. command buttons, labels, edit boxes, list boxes, check boxes, option boxes, combo boxes, scrolls, picture boxes, vertical and horizontal scroll boxes, shapes and any other available controls or components, i.e. all these components are pointer-sensitive areas and have an event, which can monitor a "click" so the user can develop or use a function associated with that "click." within that component area. A control area may also be subareas of controls which have unique "click" action for each subarea, e.g. a menu item of a menu, a row of a list box etc. A control area also could be an area of a program that is arouse sensitive (can detect a pointer movement, while over that specific area, so that a function could be associated with that pointer-sensitive area). In summary a control area may be all known areas of operating systems and/or applications and controls associated with a unique "click" action or any defined pointer-sensitive area that the developer wishes to associate with the unique triggering of an event when a pointer moves in contact or over that specific pointer-sensitive area.

"Click" or "Clicking"

"click" or "clicking" will refer to any mouse click actions and/or button press actions and/or pointer device clicks and/or locator device button press actions (e.g. these could be mouse down, mouse up actions, or any other mouse related buttons).

Unique "Click" Action

This is any mouse sensitive area of a program, which the developer can assign a unique function related to any form of pressing of a mouse button (or any equivalent pointer device with buttons) while the pointer is within the boundary of that mouse sensitive area. It may apply to all existing or future designs of programs (e.g. operating system, applications or controls) which have areas which have a unique "click" action.

The Pointer 0

The pointer means the arrow, cursor or other bitmap indicating the pointer on the computer screen representing the location of the mouse position or pointer device position in relation to the computer screen 300. Cursor may also mean any pointer. It may have any shape, size, appearance or colour.

The pointer device (or mouse refers to the generic pointing device) (e.g. a mouse, touch pad, touch screen, joystick, pointing device, graphic tablet, pen, direction arrows, voice activated, etc) may move a pointer to a specific x,y coordinate on a computer screen 300. They also usually have a minimum equivalent method of 2 buttons for all the functionality of clicking. The action that the click has will be specific to the pointer location. For example, clicking could be pressing a mouse button, voice activated command at a specific pointer location, key strokes at a pointer location, joystick button, etc. And/or This is a term that is used with a list of two or more features joined by the and/or conjunction. It means that the user has the option of combining any one with any other or more of the features (to the maximum of all the features) described in the list.

Triggering of the Zeroclick

It stands for the triggering of a function related to a control area by the interaction of a pointer movement with a PSA (pointer sensitive-area) related to that control area.

ZC is Zeroclick. Zeroclick is defined as the triggering of a function related to a control area 1, or the simulation of a click for a control area 1, by the interaction of a pointer movement with an additional area 3 or predetermined path area 3 as described in the claims.

ZCC 2 is Zeroclick Control 2. This contains an additional area 3 or a predetermined path area 3 which is a PSA which by the interaction of the pointer movement on or within its boundaries triggers a Zeroclick for the control area with which the ZCC 2 is in contact, related and indeed has first been activated by the pointer coming in contact with the control 1. In the drawings the border of the Zeroclick Control (or the border of the area occupied by the ZCC) may be assumed identical to the region 2 described in the claims. This region 2 or the boundary of the ZCC 2 may also be referred as the Zeroclick Shape 2. The Zeroclick Control 2 achieves the Zeroclick for a given control 1 by having a predetermined path area 3 or path 3 or additional area 3 within the Zeroclick Control 2, in which the pointer must perform a subsequent movement, after the pointer has already come in contact with the control area 1 and moved within or on the control area 1 boundary to come in contact and to activate the related Zeroclick Control 2 to the control 1. Sometimes the Zeroclick Control 2 has a predetermined path area 3 or additional area 3 mentioned in the claims and description which is the same size as the ZCC 2 area or region 2. However, the definition of the additional area 3 or predetermined path area 3 or sometimes path 3 is that it is an area with a boundary shape contained within the region 2 up to the maximum size of the boundary of the region 2 area or the boundary of the Zeroclick control area 2. ZCEC is the Zeroclick emulated Click, i.e. it is a description of the pointer movement interaction with the ZCC or its subareas that causes the activation of the function associated with the or control area. Sometimes the term Zeroclick equivalent of the Right mouse Click refers to a Zeroclick which emulates (triggers) the Right mouse click action. PSA is any pointer-sensitive area. In other words the program can detect if the pointer is over or is moving over this area. This sometimes is referred to in the documentation as a mouse sensitive area.

Definition of a Zeroclick

Figure 1:
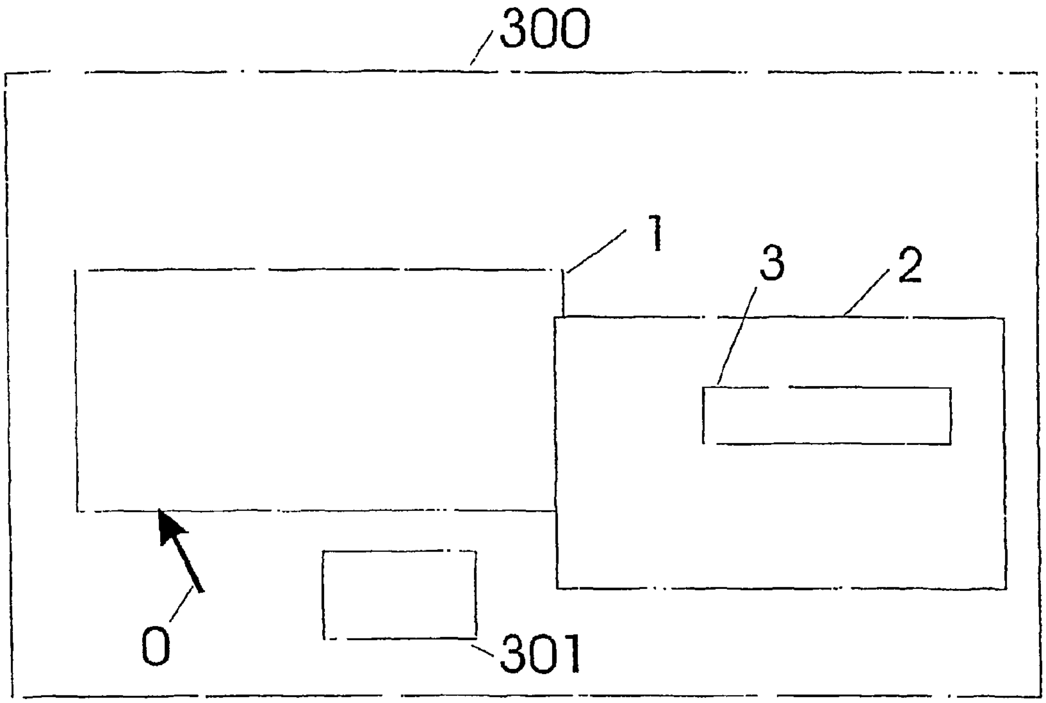
FIG. 1 shows a computer screen 300 containing an area of the screen 300 called a control area 1 with a pointer 0 adjacent to the control area 1 and a predetermined path area 3. The 'click' event is generated by moving the pointer 0 from the control area 1 by a subsequent movement to within the predetermined path area 3 according to a specified movement to generate a 'click' event by triggering a function related to the control.

As illustrated in FIG. 1, and further expanded in the description of the Zeroclick below, a Zeroclick is an event by which the user can trigger a procedure or function with a control area 1 by pointer 0 movement alone coming in contact with that control area 1 and then performing a subsequent pointer movement, where the conventional methodology of obtaining that action would have involved a "click" over that control area 1. Therefore a Zeroclick may be defined as the movement click associated with a control area 1 within a graphical user interface (GUI) as defined or a method of movement clicking within a GUI or an apparatus as defined in the claims, which uses this pointer movement click. Thus instead of activating functions related to a control 1 by the pointer coming into contact and clicking to confirm the selection and triggering of a function related to the control 1, with the Zeroclick, the user confirms the selection and triggers a function related to the control 1 by a subsequent pointer movement within a predetermined path related to the original control area 1. The claims in the next five paragraphs as originally filed give a more precise definition of the Zeroclick:—

1. A GUI in which, when a pointer is immediately adjacent or passes over a control area, a procedure is initiated whereby subsequent movement of the pointer over a predetermined path generates a 'click' event which simulates direct clicking of the control and moving outside the predetermined path prior to completion of the path resets the control to as if the pointer has never started along the predetermined path. 2. A GUI as defined in claim 1 wherein the control area may be any size, shape, or appearance, and relates to one or more functions to be accessed via the GUI. 3. A GUI as defined in claim 1 wherein the control in claim 1 may be associated with one or more predetermined paths generating one or more different 'click' events. 4. A GUI as defined in claim 1 wherein the predetermined path may extend outside the original control area and the appearance of said area outside the control area and/or the control area may be adjustable to provide feedback to the user. 5. The user feedback in claim 4 may be information how to complete the correct movement to simulate the direct 'clicking' of the control and may be aided by visible subareas within the predetermined path. 6. The user feedback in claim 4 may provide the user within all the movement stages from the contact with the control area to final movement that leads to the direct clicking of the control with the appropriate user feedback that the user is provided with additional information that he may understand the significance and implications of activating the function by the simulated direct clicking of the control. 7. A GUI as defined in claim 1 wherein the predetermined path may be adjusted so that it fits on the computer even if the original position of the control area, would have meant that the predetermined path would have gone off the screen and not be accessible to the pointer. 8. A GUI as defined in claim 1 wherein the predetermined path may be adjusted to suit a certain screen size. 9. A GUI as defined in claim 1 wherein the predetermined path and subsequent movement within the predetermined path may be adjusted for the purposes of error prevention. 10. A GUI as defined in claim 1 wherein the predetermined path and subsequent movement within the predetermined path may be adjusted for the purposes of user preference. 11. A GUI as defined in claim 1 wherein the predetermined path and subsequent movement within the predetermined path may be adjusted for the purposes of speed of completing this Simulated click. 12. A GUI as defined in claim 1 wherein all the possible clicks and multiple different clicks related to each control in a program accessed via the GUI would have an equivalent 'click' as defined in claim 1.

13. A GUI as defined in claim 12 wherein the various clicks for controlling the control may be listed. 14. A GUI as defined in claim 12 wherein list of clicks for controlling the control includes a description of the function to be selected. 15. A GUI as defined in claim 1 wherein the function to be activated by the simulated click previously only been accessed by other methods in the existing program context. 16. A GUI as defined in claim 15 wherein the previous other methods would have been by a standard click method. 17. A GUI as defined in claim 15 wherein the previous other Methods would have been by the keyboard. 18. A GUI as defined in claim 1 is in the form of a HCG. 19. A GUI as defined in claim 1 is in the form of a bordergrid. 20. A GUI as defined in claim 1 is in the form of a qualifier grid. 21. A GUI as defined in claim 1 is in the form of a sequential grid. 22. A GUI as defined in claim 1 whereby the action of the simulated click or activated function may be reversed by a subsequent movement in an additional area of the control area. 23. A GUI as defined in claim 1 wherein existing programs without the functionality of claim 1 may have the functionality by means of a transforming program in the operating system. 24. A GUI as defined in claim 1 wherein the predetermined path of the simulated click activates a pattern click. 25. A GUI as defined in claim 1 which may be programmed easier by a set of procedures, functions or controls. 26. A GUI as defined in claim 1 which by programming may transform existing programs without the functionality of claim 1 to have the functionality. 27. A GUI as defined in claim 1 which by reinterpretation of the web source pages may transform existing programs without the functionality of claim 1 to have the functionality. 28. A GUI as defined in any preceding claim wherein the 'click' as defined in claim 1 may be used in conjunction with standard clicks for controlling program functions through the GUI. 29. A GUI as defined in any preceding claim wherein the GUI is displayed on a touch screen.

30. A method of operating a GUI in which a function related to a control area may be triggered by a pointer movement over the control area, then by further movement over an additional area comprising the steps of: a. moving the pointer into contact with the control area b. initiating activating the function associated with the control area by moving the pointer to an additional area related to the control area c. moving the pointer within a certain region containing the additional area defined in b. and completing a specified movement within the additional area to complete activation of the function associated with the control area. 31. A method of operating a GUI as defined in claim 30 wherein the function to be activated may comprise generation of one or more further regions for further function activation. 32. A method of operating a GUI as defined in claim 30 wherein the control area may be a screen control of any appearance, size, shape or colour. 33. A method of operating a GUI as defined in claim 30 wherein the movement of a pointer over the control area makes another area or areas visible within the control or in an area adjacent the control area. 34. A method of operating a GUI as defined in claim 30 wherein the appearance of the control area and the certain region may be varied to provide user feedback at different parts of the movement described in b. & c. 35 A GUI as defined in any claims 30-33 wherein the 'click' as defined in claim 1 may be used in conjunction with standard clicks for controlling program functions through the GUI. 36. A method of operating a GUI as defined in claim 30 wherein the areas made visible may be in the form of a bordergrid. 37. A method of operating a GUI as defined in claim 30 wherein the areas made visible may be in the form of a qualifier grid. 38. A method of operating a GUI as defined in claim 30 wherein the areas made visible may be in the form of a HCG. 39 A method of operating a GUI as defined in claim 30 wherein the areas made visible may be in the form of a sequential grid. 40. A method of operating a GUI as defined in claim 30 wherein the areas made visible may be in the form of a pattern click.

41. A method of operating a GUI in which by pointer movement alone may activate functions, which were previously activated in existing programs by other methods. 42. A method of operating a GUI as defined in claim 41 where the other methods may be a standard click method. 43. A method of operating a GUI as defined in claim 41 where the other methods may by the keyboard.

44. A method of operating a GUI as defined in claim 30 wherein the additional area and subsequent movement within it may be adjusted for the purposes of error prevention. 45. A method of operating a GUI as defined in claim 30 wherein the additional area and subsequent movement within it may be adjusted for the purposes of speed of clicking. 46. A GUI as defined in any preceding claim wherein the GUI is displayed on a touch screen.

47. An apparatus incorporating an user-interface according to any preceding claim. 48. An apparatus as hereinbefore described with reference to the accompanying drawings. 49. A method as hereinbefore described with reference to the accompanying drawings. 50. A GUI as hereinbefore described with reference to the accompanying drawings.

A Description of the Zeroclick

To be industrially sound it will need to address the disadvantages or problems inherent in activating a click by movement alone compared to the traditional click, and design and apply solutions that would enable programmers and users to adapt it as an alternative or replacement method to the standard method of clicking in a GUI. Below is one method.

Figure 2:
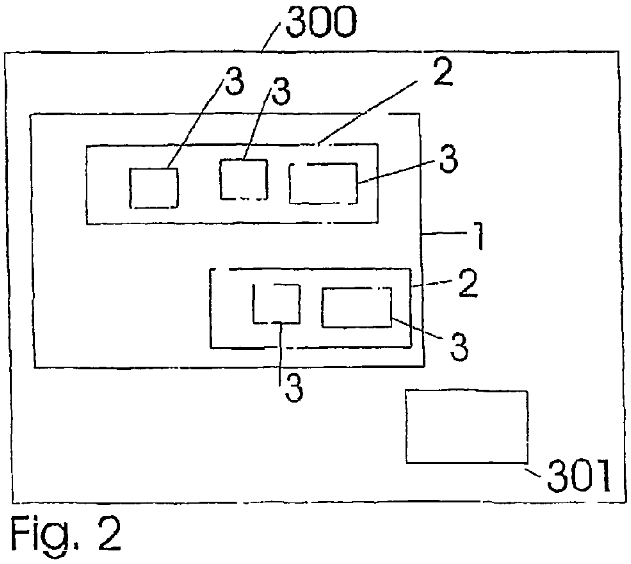
FIG. 2 This shows a computer screen 300 containing an area of the screen 300 called a control area 1 which contains two predetermined path area 3 within the control area 1. It illustrates the control area 1 can generate more than one 'click' event; each predetermined path area 3 can generate one or more different 'click' events by completing a pointer movement according to a specified pointer movement for each predetermined path area 3.

FIG. 1 shows the boundary of a control area 1, which will activate a function if a click is performed while the pointer is on or within the boundary of the control area. This control area may be any existing control, component or known pointer-sensitive area which when clicked with the pointer over it triggers a function (or functions if there are more than one different types of clicks associated with the PSA) specific for the control area. The control area 1 may be any future pointer-sensitive area, which may have an associated function (or functions) of any appearance, shape, size or colour. FIG. 1 shows the effect of the pointer 0 coming in contact with the control area 1 activating another region 2 or Zeroclick Control 2 which has a border or aspect in contact with the control area 1. This region 2 or Zeroclick Control 2 may be the same area as the control area, or within the control area 1, as shown in FIG. 2, or the region 2 or Zeroclick Control 2 may only partially overlap the control area 1, as shown in FIG. 1, or the region 2 or Zeroclick Control 2 may just have one aspect of the region's boundary in contact with the control area's boundary. The region 2 or Zeroclick Control 2 may be visible, partly visible or invisible. This region 2 or Zeroclick Control 2 may be visible as part of the control area 1, see FIG. 2, or may appear when the pointer comes in contact with the control area 1, see FIG. 1, This region 2 or Zeroclick Control 2 retains focus of the control area 1 (i.e. the region 2 or Zeroclick Control 2 thus extends the pointer-sensitive area of the control area 1 to the increased area covered by the region 2 or Zeroclick Control 2), as shown in FIG. 1. If the pointer moves outside the region 2 or Zeroclick Control 2 and outside the control area then the control area resets to its original state and appearance as if the pointer had never come in contact with the control area 1. This region 2 or Zeroclick Control 2 contains an additional area 3. The boundary of the additional area 3 may be within the region 2 or Zeroclick Control 2 or it may be the same area as region 2 or Zeroclick Control 2. The boundary of the additional area 3 represent a boundary of a path that the pointer must complete a predetermined movement within the path to trigger a function related to the control area. The control area 1, the region 2 or Zeroclick Control 2, the additional area 3 and any other area of the computer screen may change to provide user feedback in response to movement of the pointer coming in contact with the control area 1, and within the region 2 or Zeroclick Control 2 and all further movements within the path 3. The region 2 or Zeroclick Control 2 or additional area 3 (or alternatively named path 3) may have any appearance, shape, size or colour. The appearance of the path 3 or additional area 3 may be designed so that the user may be guided as to the exact movement needed to complete the pathway. To help this process there may be visible subareas of any appearance, shape, size or colour (for example, 4,6 in FIG. 3; 7,8,9 in FIG. 4 and FIG. 8: 10,11 in FIGS. 5; and 12,13,14,15, in FIGS. 6,7,9,10) and visible changes related to these subareas and further user feedback 301 related to these movements. This feedback may provide the information required to complete the movement required for the function activation. It mainly will consist of the control and the components of the Zeroclick Control 2 changing appropriately to assist the user to complete the movement required for the function activation. Sometimes other areas of the screen may be used to give further text, animation, movies to improve the user's Zeroclick technique. Alternatively it may give sound in relation to the movements, or both audio and visual components so the user's movements are constantly being monitored by the computer and the computer responds with the appropriate verbal or visual signals from the computer to maximize the efficiency of the Zeroclick.

In addition to the user feedback to make the Zeroclick movements intuitive to the user, the movements comprising the Zeroclick (e.g. the pointer movement with the control, the ZCC 2 or its components) may provide user feedback (audio and/or visual) that is educational regarding the background information, and implications of selecting a given function for a control 1, so that the user may always make an appropriately informed decision regarding the selection of a function. The information for this informed decision may be supplied in the most appropriate form for the user (e.g. text, animation, bitmap, sound bite, or movie) to assist the user while making the Zeroclick movements. This additional information may be located anywhere on the computer screen, and may occupy one or more areas of the computer screen. The additional information may be any information available to provide the user with all the relevant information to know that the selection of the function by completing the movement within the additional area is the correct function to select. After the selection of the function there may be all the information available regarding the implication of having selected that function. Thus by movement alone the computer may provide the user with all relevant information to accurately have all the relevant background information to select a function, to know the implications of having selected that function or recording that particular data into the program.

There then may be an opportunity for the user to perform another movement or click to reverse the effects of having selected this function (FIGS. 21,22,23,24,25—all these grids, movement on the forward direction-records data (i.e. in the left to right hierarchical grid, movement to the right border of the grid to the next grid records-data. E.g FIG. 23 moving the pointer from 116 to next right grid (the month grid) records 1999 in the control text box), movement back to the original grid removes that recorded data and allows selection of a different year). In the HCG one Zeroclick records data, and repeating the Zeroclick removes the recorded data, see FIG. 38 157 the Zeroclick being performed to record 168. FIG. 39 shows the repeat of the Zeroclick function causes the recorded data to be removed 170.

Movement outside the additional area 3 or path 3 prior to the completion of the movement to trigger a function with the pointer resets the control area as if the pointer had never come in contact with the additional area 3.

The programmer may also reset the function if the wrong movement or wrong sequences of movement has been performed within the additional area, and/or in relationship to the subareas within the additional area 3. This may be described with reference to FIG. 7. The programmer may design four basic Zeroclicks to emulate the standard single double left and right mouse clicks which have a common pathway of staffing at subarea 12 and moving to subarea 13. Thus the control area 1 and the Zeroclick will reset if the mouse moves from subarea 12 to 15 or subarea 12 to 14.

As shown by FIG. 2, the programmer may have one or more regions 2 per control area 1 and/or one or more different additional areas 3 or paths per region and/or one or more different The FIG. 3 shows the subarea 4, subarea boundary line 5, and subarea 6 within the additional area 3. A simple Zeroclick defined as a left reverse Zeroclick, which the user moves the pointer from subarea 4 (the left subarea) across the subarea boundary line 5 to subarea 6 then reverses direction back across the subarea boundary line 5 to the left subarea 4 while remaining within the predetermined path area 3 or additional area 3 it completes the Zeroclick, and hence the name left reverse Zeroclick. Thus the right reverse Zeroclick occurs if the user moves the pointer from the right subarea 6 across 5 to 4 then reverses direction from 4 across the subarea boundary line 5 back to the right subarea 6 while remaining within the path 3. Thus if the control area 1 or region 2 or Zeroclick Control 2 was rotated through 90° clockwise, the left reverse Zeroclick as described above becomes the top reverse Zeroclick, and the right reverse Zeroclick as described above becomes the bottom reverse Zeroclick. A left to right direction Zeroclick is achieved by moving from the left subarea 4, across the subarea boundary line 5 to the right subarea 6 while the pointer remains within the predetermined path. A right to left direction Zeroclick is achieved by moving the pointer from the right subarea 6 across the subarea boundary line 5 to the left subarea 5. By rotating the Zeroclick Control 2 through 90 degrees clockwise, the left to right Zeroclick as described above becomes the top to bottom direction Zeroclick and the right to left Zeroclick becomes the bottom to top direction Zeroclick. The region 2 area may be rotated by any degree if user preferred to present a Zeroclick Control 2 with a Zeroclick in any direction or any reverse direction at any degree angle if the user prefers.

The FIG. 4 shows subarea 7, subarea 8, subarea 9 within the additional area 3 or predetermined path 3. The pointer movement required to activate a left to bottom right angled Zeroclick is to move the pointer within subarea 7 through subarea 8 and then through subarea 9 and remain within the additional area 3. Thus the movement is a change of movement through 90 degrees through three subareas. The pointer movement required to activate a bottom to left right angled Zeroclick is to move the pointer within subarea 9 through subarea 8 and then through subarea 7 and remain within the additional area 3. If the Zeroclick Control 2 or region 2 is rotated 90 degrees clockwise from the original in FIG. 4 then the left to bottom right angled Zeroclick as described above becomes the top to left right angled Zeroclick, and the bottom to left right angled Zeroclick becomes a left to top right angled Zeroclick. If the Zeroclick Control 2 or region 2 is rotated 180 degrees clockwise from the original in FIG. 4 then the left to bottom right angled Zeroclick as described above becomes the right to top right angled Zeroclick, and the bottom to left right angled Zeroclick becomes a top to right right angled Zeroclick. If the Zeroclick Control 2 or region 2 is rotated 270 degrees clockwise from the original in FIG. 4 then the left to bottom right angled Zeroclick as described above becomes the bottom to right right angled Zeroclick, and the bottom to left right angled. Zeroclick becomes a right to bottom right angled Zeroclick. These describe the range of right angled clicks. Obviously clicks may be designed where the path or subareas make other angled clicks than 90 degrees, and the angled clicks may be rotated to any degree, not just 90 degrees. The user may have a variation of the angled tick to be rotated with a path and subarea user feedback that may look like a V or a tick. Keeping the pointer movement within the V shaped additional area 3 or tick shaped outline predetermined path area 3 from the beginning of the v or tick to the end would trigger a tick Zeroclick or v Zeroclick.

FIG. 5 shows a variation of the FIG. 3 Zeroclick Control 2 in the following way. The left subarea 4 is transposed to the left subarea ellipse 10 in FIG. 5, and the space between subarea ellipse 10 and subarea ellipse 11 in FIG. 5 being varied from the subarea boundary, line 5 in FIG. 3 and the right subarea 6 being varied to the right subarea ellipse 11. Consequently FIG. 5 may show the complete variations of reverse Zeroclick and direction Zeroclicks described by FIG. 3. This variation will be used later to discuss the variation required for user, speed of click and error prevention considerations.

Classification of Different Types of Zeroclicks

Thus the Zeroclick path may have any form of direction Zeroclick, reverse Zeroclick, or angled Zeroclick or any combination of these Zeroclicks using variation in shape of the predetermined path or interaction with subareas. The T shaped Zeroclick shows a combination of the reverse and right angled Zeroclicks to make the equivalent of the left or right single or double mouse clicks. The only additional classification of zeroclick is a contact zeroclick. This is where the point comes in contact with the zeroclick control additional area, e,g, FIG. 13 ZeroClick 24. This is rarely used and only in combination with other zeroclicks, just because of the high risks of accidental triggering, which usually is more of a disadvantage than its slightly faster speed.

Figure 6:
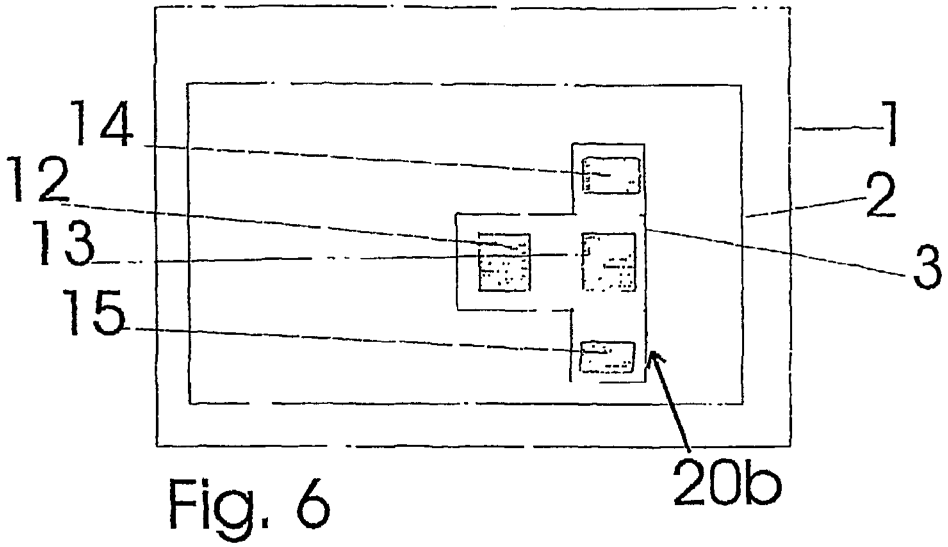
Figure 7:
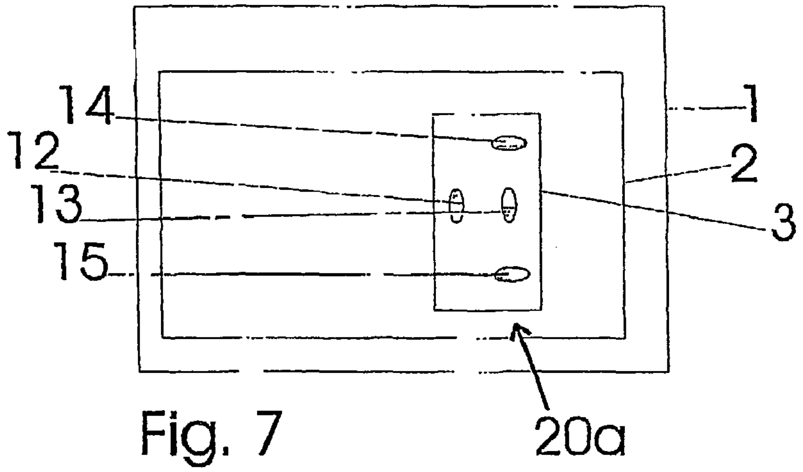
Figure 8:
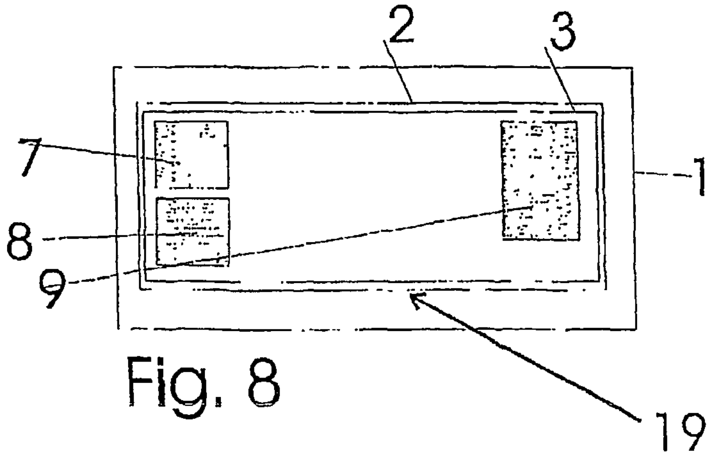

FIGS. 6, 7,9,10 all show variations of the same four T shaped Zeroclick. The FIG. 6 show the additional area 3 with a subarea 12 and subarea 13 and subarea 14 and subarea 15. This shows how a single additional area 3 or predetermined path area 3 may have, several different subsequent movements to trigger different Zeroclicks using a different interaction of the pointer with the subareas while remaining in the additional area 3 E.g. If the pointer movement remains within the additional area 3 then moving the pointer in contact with subarea 12, subarea 13, subarea 14 may trigger one function, e.g. the left mouse click equivalent for control area 1. Moving the pointer to subarea 12, subarea 13 and subarea 15 may trigger another function, e.g. right mouse click equivalent for the control area 1. Moving the pointer to subarea 12, subarea 13, subarea 12, subarea 13 and subarea 14 may trigger one function e.g. double left mouse click equivalent for control area 1. Moving the pointer to subarea 12, subarea 13, subarea 12, subarea 13 and subarea 15 may trigger another function, e.g. double right mouse click equivalent for the control area 1. Obviously other direction, reverse, or angle clicks may be used for additional clicks.

As common to all Zeroclicks, movement outside the additional area 3 or path prior to the completion of the movement to trigger a function with the pointer resets the control area as if the pointer had never come in contact with the additional area 3. The programmer may also reset the function if the wrong movement or wrong sequences of movement has been performed within the additional area, and/or in relationship to the subareas within the additional area 3. Also the user feedback may use any combination of style to indicate the next movement or complete movement required to perform a Zeroclick. All the components of the control, region, additional area or subareas may change colour or appearance to provide this user feedback. E.g. the appearance of the T shaped Zeroclick may vary from 20 to 21.

Some Different Names for Different Types of Zeroclick.

FIG. 11 shows some different styles of zeroclick. For ease of description these have been given the following names; the double rectangle zeroclick 16 or the double rectangular zeroclick 16, the L shaped zeroclick 17, the 0 0 zeroclick 18, another L shaped zeroclick 19, the T shaped zeroclick 20, and the arrow T shaped zeroclick 21. However, in the drawing the zeroclicks shown are only for illustration and may be swapped for other types, and the appropriate zeroclicks required to activate these different types of zeroclick controls may also be varied if developer or user required. The developer may design a huge variation of zeroclicks built on these and other variations in the description.

The above figures show just a few styles of the Zeroclick, the variation in the appearance, shape, size and colour of the control area, region and additional area and any subareas and the possibility of user feedback at any stage of the pointer movement in contact with the control area, region, additional area, and subareas, and the position and visibility of the region area, and the numerous variations of movement within one or more additional areas triggering a function or functions by different Zeroclicks.

The important aspect is that the programmer understands the variations of the Zeroclick Control which may improve the error prevention, improve the speed, and improve the user feedback of the Zeroclick as illustrated by the drawings.

Aspects which improve the error prevention of the Zeroclick from the drawings. FIG. 18 shows the various components of the path 3, the path length 303, the path width 306, the distance between subareas 304, the height of the subarea 305 and the width of the subarea 302.

The factors that improve the error prevention and make intentional movement more likely are a decrease in the path area 3 (a reduction of size of the path area 3), a change of direction within a path area 3 (a reverse Zeroclick or a angle Zeroclick—the more specific the angle and the smaller area to change direction the better), a reduction in width of the path area 306, an increase of the distance between subareas 304, the smaller the subareas, the more changes of directions within the path area 3, and the correct sequence of change of direction. The changes of direction may be between subareas or having a path that is bent at various angles. Also resetting if wrong sequence of mouse movement occurs, and making it easy for a user to reverse the change of a Zeroclick to give confidence in using this GUI.

The factors that improve speed are simple, easy to learn movement like right angled clicks or reverse clicks, that have a short distance between subareas, but still give the user a reassurance that the error prevention is as good as a mouse click, otherwise the user speed slows due to fear of accidentally triggering unwanted functions. The double rectangle Zeroclick 18 if it is small enough is a good compromise of these features.

The tailoring of the Zeroclick to the user. Some users are left to right (western), some are right to left Arabic etc. Some users find some movements easier to manage. The user may have a control option in the control panel or as a selectable function in the program. This may enable to turn on and off the Zeroclick features, and/or to change the various components of the path as described above to suit the user's style.

In the case of the simplest Zeroclick the direction Zeroclick, where the pointer moves from A to B e.g. subarea 10 to subarea 11—the left to right direction Zeroclick, then there are two main factors that influence the error of the accidental triggering of the Zeroclick. The first is the width of the path that the pointer may move between point A and point B. The narrower the width of the path (ie the vertical distance of the path or the vertical distance of the subarea boundary line 5 in FIG. 3 or the vertical distance of the space between the lower horizontal border of the area 3 and the upper horizontal border of the area 3 in FIG. 5), the less likely is accidental triggering. The more the distance between the two subareas, the less likely is accidental triggering of the Zeroclick.

E.g the boundary line 5 horizontal distance in FIG. 3 and the horizontal distance between subarea 10 and subarea 11 in FIG. 5 of the vertical, the less likely is accidental error. Thus the left to right direction Zeroclick for the FIG. 5 Zeroclick control 18 than the FIG. 3 Zeroclick control 16 (because the narrower the additional area 3 width between the minimum distance the pointer has to move to activate) is less likely to activate the movement click accidentally. Thus the 0 0 Zeroclick in 18 is less likely to accidentally activate a Zeroclick than the double rectangular Zeroclick in 16.

The control area 1, region 2 or Zeroclick Control 2, additional area 3, or subareas may also respond to clicks. This could be for any reason but it could allow for additional functionality to be obtained with the clicking system. It also could help a user get familiar with the Zeroclick by providing both functionality.

The Design Considerations of the Zeroclick

This will require design considerations for an appropriate minimum risk of accidental triggering the Zeroclick by user performing the pointer movement unintentionally and/or the user being able to perform the task as easily as a click and/or methods for making Zeroclick as acceptable to the user and programming community a method that can be used in conjunction with the click or as an alternative method.

Commercial Design of the Zeroclick.

One way to achieve the description of the Zeroclick commercially is to make the region 2 into a Zeroclick Control (ZCC). The Zeroclick Control would be added in a default position, with a default style to a control area (or there may be several different default styles for different objects or controls) by activating a single property e.g. ZeroclickOn=True. The click function associated with the control area may be turned off by another property e.g. TraditionalClickOff=True. The developer would be able to fully control the style of the ZCC, and the user may be able to adjust all the ZCC properties (e.g. to change appearance of the ZCC, the shape of the path, the movement required to activate the Zeroclick, the user feedback) to tailor the ZCC to their particular use. The Zeroclick Control may be adjusted automatically with reference to the computer screen (i.e. positioned and/or resized to fit on the computer screen regardless of position of the control or screen size.) These features may be built into all programming languages. Thus developers may have additional procedures, functions, properties and events for all their existing and future controls that would easily allow the addition of the Zeroclick functionality. Operating systems, all network environments and even library patches for existing program environments may enable the ZCC to be added to existing programs without even changing the program, as event-driven operating systems may detect the pointer coordinates and know which object that the pointer is over, and thus a default ZCC may be added. Likewise web pages written in source code may be reinterpreted to add Zeroclick functionality by associating a ZCC with the original control area.

Zeroclick Control Components

This section transtates the description of the Zeroclick to the ZCC. With reference to FIG. 2 the components of the Zeroclick control are the Zeroclick shape (region 2) which represents the mouse sensitive area of the Zeroclick control. The Zeroclick boundary (additional area 3 or path), which represents the area the pointer must remain within when perform a certain mouse and/or locator device movement to emulate the click. The Zeroclick boundary may be the Zeroclick shape (the preferred description below) or an area within the Zeroclick shape. There are then various subareas or shapes with the Zeroclick boundary as described above.

How the Pointer Movement May Interact with the Zeroclick Control Components to Trigger a Zeroclick.

This is one of numerous possible examples of a Zeroclick Control associated with a control area. A more comprehensive discussion of the variation will be discussed in the next section. This example will highlight some useful features that the Zeroclick may have.

Figure 9:
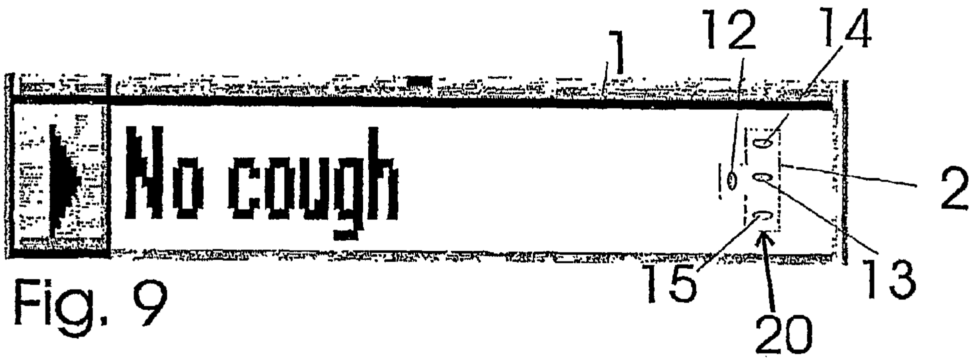
Figure 10:
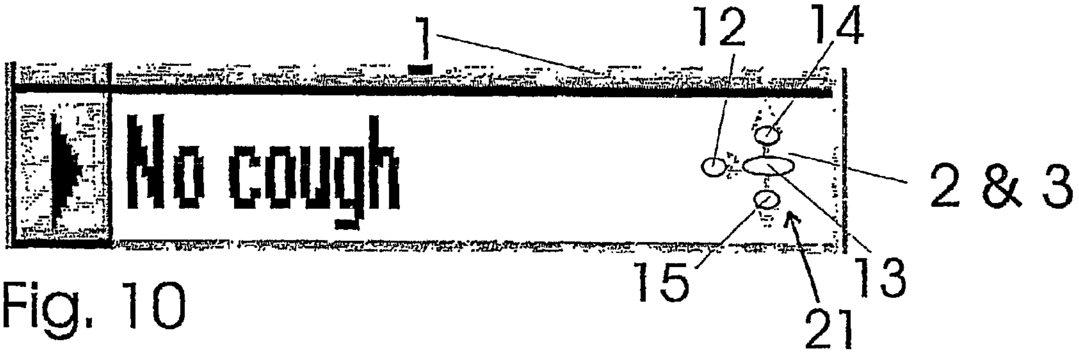

FIGS. 9 and 10 Show the control area and the Zeroclick Control

The ZCC may be permanently visible related to the control area or may appear when the pointer moves over the control area. The ZCC may be visible, partially visible, or invisible and may be activated by the movement of the pointer with the control area and the ZCC and its components. The variation may be controlled by developer and/or user preference. For use in a cell with text within a grid it may be beneficial to have the ZCC invisible until the cell row is in focus so that user can read the underlying text of the cells clearly. For control areas that are permanent features it may be better that the ZCC is visible so that users can aim for the ZCC before the pointer comes in contact with the control area.

The ZCC may have an appearance, that is intuitive. The design of the one horizontal arrow leading to two arrows in opposite directions suggest that two possible activation of the Zeroclick may occur, i.e. a moving the pointer through the horizontal arrow 12 and either following the up arrow 14 (triggering one Zeroclick) or following the down blue arrow 15 (triggering another Zeroclick)

FIG. 5 shows the Zeroclick boundary line 5 being altered from that in FIG. 3. This demonstrates by increasing the distance between the subareas 10 and 11, it decreases the likelihood of accidental triggering than the Zeroclick path boundary 3 in FIG. 3.

FIGS. 9,10 show how the Zeroclick may be applied to a grid cell or a menu item. The border of the grid cell 1 or menu item 1 represents the border of the PSA of the control. The ZCC shape and path boundary 2 is invisible in FIG. 9 but reflects the outside borders of the arrows in the arrow T shaped ZCC 21 in FIG. 10. Thus using this T shaped ZeroClick, the grid cell may have four Zeroclicks attached to it. There may be two or more different Zeroclick Controls within the PSA of the grid cell, and they may have been of different types, if the user preferred.

FIG. 8

This shows the Zeroclick control 2 for this control. It also shows three subareas (7,8,9) within the ZC control 2. To emulate the standard mouse buttons (left and Right single and double click actions) for the control 1, the movement of the pointer would be as follows: Single left mouse click would be by moving the pointer so that it came in contact with the subareas 7, 8, 9 in that order while keeping within the path 3. Single right mouse click would be by moving the pointer so it came in contact with the subareas 8, 7, 9 in that order while keeping within the path 3.

Double left mouse click would be by moving the pointer so that it came in contact with the red circle areas 7, 8, 7,8,9 in that order while keeping within the path 3. Double right mouse click would be by moving the pointer so it came in contact with the red circle areas 8, 7,8.7, 9 in that order while keeping within the path 3.

However, if the subareas were accessed in the wrong order or the pointer moved outside the ZCC, the ZCC would reset and the user would have to move the pointer to have contact with the subareas as described above within the ZC boundary to trigger any of the ZCECs described above.

The Zeroclick May be Triggered Differently if User/Developer Prefers

If the user wished to tailor the zeroclick or the ZCC this may be achieved by a control in the program or the operating system. In the control panel the user may be given a control to setup the Zeroclick to their desired specification so that it obtains the best compromise of ease of performing the Zeroclick while minimising the risk of accidental triggering of a Zeroclick. The next section, however, describes in more details the variables of the components of the Zeroclick that may be adjusted to get the most effective Zeroclick for a user developer's preference.

The Appearance of the Zeroclick Control

The ZCC may be permanently visible related to the control area or may appear when the pointer moves over the control area. This depends on user preference. The appearance of the Zeroclick Control may be different when inactivated, different when the pointer moves over its control area, different when it moves over the ZC shape, and different when the pointer interacts in different ways with any of its components. All these differences may allow the developer the exact control of the style and feedback of the ZCC.

How the Zeroclick Control Performs a Zeroclick for the Relevant Control Area.

To understand how the Zeroclick Control performs a Zeroclick, the user will need first to understand the components of the Zeroclick Control, then how the movement of pointer may interact with these components to perform a Zeroclick in a preferred Zeroclick shape, then the possible variation of appearance of the Zeroclick control, possible variation of directional pointer movement interaction with the various components of the Zeroclick Control, and a discussion of The Possible Variation of Zeroclick Appearance and Pointer Movement Interaction with the ZCC Required for Activation of a Function Related to a Control Area The developer can have complete control of the pointer movement interaction with the Z CC and its subareas.

The path of the pointer over a Zeroclick control can be detected by X and Y pixel co-ordinates. The interaction of the Zeroclick Control with the path of the pointer enables the programmer an almost infinite range of possibilities of how to display and program the pointer's interaction with any one of the features of the pointer movement with the ZCC or any number of subareas (this could be one or more areas which could be up to the size of area of the ZCC) within the Zeroclick Control (ZCC)

Some of the possible interactions of the pointer with the ZCC could be:—start location of pointer, finish location of pointer, direction of pointer, distance pointer, moves in a certain direction related to a certain location speed of pointer, path of pointer, pattern of pointer movement, pointer movement related to the ZCC or its subareas The Developer could have Complete Control of the Appearance of the ZCC.

The ZCC may be permanently visible, permanently invisible, or appearing when the pointer moved over the control area or subareas of the control area that activate it. The appearance of the Zeroclick control if visible may vary from one component to all components being visible depending on user/developer/design preference.

The optimum design is a balance between consistency, aesthetics, intuitive, educational, functionality, prevention of errors, speed and programming considerations (response of the program)

Consistency This is probably the most important feature. Having a Zeroclick which is uniform in design and used a standard by many software developers would make the Zeroclick more familiar and useful for the user. This could be adjusted once per user in the control panel and used for all programs. For example the user may choose the FIG. 3, the reverse direction Zeroclick as the standard single click.

Aesthetics, The ZCC should be attractive to look at.

Intuitive. The appearance of the Zeroclick Shape should be intuitive. I.e. the user should be able to guess the common movements of for example the ZCC in FIG. 21, which is a picture of three blue arrows heads show the direction of the pointer. A user may almost guess that two of the Zeroclick movements are following the horizontal arrow across and then turning up and a second movement would probably be following the horizontal arrow and then turning through a right angle and following the downward arrow.

Educational. If a standard design of Zeroclick is universally adapted by software developers.

E.g. an intuitive and recognisable icon, this could have predictable feedback with the arrows changing colour as the Zeroclick is being activated by the pointer movement. It could be then linked to a bordergrid (See next section). This would then show a list of grid menu items, educating the user as to the possible functions of the control area. These menu items could be triggered with another Zeroclick to perform the relevant function. It will also enable the user to enter any relevant keystrokes or data by using the bordergrid character data entry style.

Functionality may also be suggested by bitmaps indicating the function trigger at the end of the pathway. The appearance of the control and the appearance of the ZCC and pathways for each function may be suggested by the graphical appearance.

Prevention of errors. In the preferred ZCC, the variation of pointer movement required to prevent accidental triggering of the ZCC could be almost infinite. Both the Zeroclick path and the sequence of movement required to simulate the click for the control may be varied. It ends up being a compromise of the user performing actions that are fast (e.g. easy to do, like horizontal and vertical movements) yet are very unlikely to be triggered accidentally. In the preferred Zeroclick this may normally be accomplished by the pointer starting in a certain location and the pointer changing direction once between two points (reverse direction 180 degrees) or once per three points (e.g. 90 degree change). However, there are certain circumstances where simpler Zeroclick or more complicated Zeroclicks are needed.

Speed. The simpler, easier (e.g. vertical, reverse or horizontal lines), more familiar and less far apart the movement and the wider the path, the easier and faster it is to trigger the Zeroclick. This needs to be balanced by making the movements sufficiently complicated as not to cause accidental triggering of the Zeroclick. Size of the ZCC. If the ZCC shape is too small it can become difficult for the user to accurately trigger the ZCEC with the pointer movement. In these conditions the ZC shape could be increased in size to sometimes greater that the related control area in order for the ZC to be easily triggered by the user Programming considerations. The programmer has a large variation of manipulating the various aspects of the pointer movement with the control area, and the ZCC. The simpler the movements, the easier to program and the faster the program responds to the interaction of the pointer movement with the ZCC. Thus horizontal and vertical movements are usually the best, but these can be, varied depending on user/developer preference. The important aspect to note regarding the variations and descriptions of variations of the Zeroclick appearance and triggering is that despite providing a few variations of the Zeroclick, from the definition of the Zeroclick it is obvious, that there are a vast number of possible variations for the design of the Zeroclick.

Components that use a Specific Version of the Zeroclick.

The application of the Zeroclick method could be universal to all existing programs or software and control areas, and the functionality may be added to all future programs or software.

Any control area that would normally have a click to activate a specific function could have a Zeroclick shape related to it to emulate a click action. Thus the Zeroclick method enables a developer a complete pointer based emulated click command sub system for any control area, e.g. any command buttons, radio buttons, text boxes, grids, drop down combo, that use the Zeroclick method to enable them or a pop up qualifier grid. This would enable a complete sub system to be added.

The word processor adaptation of Zeroclick. See 222 in FIG. 52 The current word processors would operate identically using the traditional key based and mouse click function. The Zeroclick could be added to the original functions where there was a click function existing. A specific modification of the "textbox" control area of the word processor could occur. Each word of text could get focus (see 323 in FIG. 52) and could become highlighted by a specific zeroclick over the word or phrases as shown in FIG. 68. The Zeroclick illustrated is a combination of a vertical downward zeroclick, followed by a horizontal left to right direction zeroclick over the word, and then completing the zeroclick by an upward direction zeroclick. These all occur in a hidden or invisible additional area 3 or predetermined path area 3 being the word (or phrase) plus the spaces either side to perform the vertical zeroclicks. This is just one example of zeroclick over the word that may activate a bordergrid. This would activate a Zeroclick for each word. I.e. each highlighted word or phrases by mouse movement could become a control area for a Zeroclick Control or bordergrid (88) using each word to activate a bordergrid. This may be shown to be applied to the medical program. If the user moved over any clinical feature 323 in FIG. 52 or management step, the user may use the bordergrid to record new changes related to the selected (it may be highlighted) term underneath the pointer or perform a relevant function by selecting the appropriate range of functions for that term. Thus those doctors who would like to read the notes may get a comprehensive overview of the patient's history in the traditional recorded notes, yet may use all the recorded information to record further changes to the clinical features or management. There would be relevant bordergrid menu items to record new clinical features or management steps. The information may be organised in chronological date order or from the last entry backwards depending on user preference.

Other key areas of the word processor that could activate the Zeroclick would be the margin of the textbox. The borders of the text box could be to locate different pages or lines e.g. the upper border of the text box activates the Zeroclick to enable page up (see FIG. 42, 180) or line up (see FIG. 42, 181). The bottom border enables page down (183) or line down (182). The right border could enable selection of individual pages, and location of specific text by word, bookmark or line search.

The left border could activate the free text data entry. The alphabet grid is modified to enable multiple words to be entered into the text box without alphabet grid becoming too large (see text regarding 114 of FIG. 22). To enable multiple words to be added using this text entry method means that after the space is applied after each word, it adds the previous word to the word processor text box and it restarts the alphabet grid to enable another word to be entered. The use of the Zeroclick to mirror the click function of existing programs means any device with a touch screen could operate existing programs without needing screen pressure but using just the location of the pointer aspect of the screen.

The Border Grid. (Also Written Bordergrid)

Definition

A bordergrid is a control area 1 that triggers the appearance of a grid or menu (e.g. 22 in FIG. 13, which is the equivalent region 2 of the zeroclick), and by subsequent movement to the bordergrid menu item from the control area 1 to the grid and then by a subsequent movement within a selected menu item or grid cell (the predetermined path area 3) or a zeroclick control within a selected menu item (the predetermined path area 3, e.g. performing a zeroclick by zeroclicking the ZCC 24), a function from the menu item of the bordergrid is initiated and activated, as if that function had been initiated by a click over the menu item (or in the specific example a left mouse click over the original control 1). As may be seen by this definition, a bordergrid is a variation of a ZeroClick with usually multiple different predetermined path areas 3 as the bordergrid has multiple different zeroclicks, with usually at least one per menu item (except where the function for the menu item is solely to activate another right hand grid by movement over the menu item—which is the default method for the HCG, bordergrid and qualifier grids to activate showing the next right hand grid). Now we will look further at the description of a bordergrid, and the variations illustrated by examples from the figures.

As already described in FIG. 13, the simplest form of the bordergrid is where the pointer moves in contact with or over a control area 1. This triggers the bordergrid menu 22, which would be equivalent to the region 2. The position of the bordergrid usually is on the border of the control. However it may be any position so long as the pointer may move directly from the control area 1 to the region 2 without losing focus due to some aspect of the control area 1 and the region 2 being in contact with each other. Thus the position of the region 2 or menu 22 may vary from completely overlapping the original control to only having a partial aspect of its border in contact with the control area. To enable the completion of a zeroclick, the pointer moves to a menu item by a pointer movement within the control area 1, through the area in contact with the region 2 thus to the bordergrid menu 22, to the specific menu item (e.g. the Left mouse click 23). The pointer then comes in contact with the ZCC 24 (this may be any of the ZCC described in the zeroclick section, and performs the appropriate zeroclick (this may be any zeroclick as previously described appropriate for the ZCC) to activate the relevant menu function, which would be the simulation of the left mouse click for the control area 1. If the menu item and related function for the original control area 1 to be selected is on a subsequent grid e.g. in FIG. 14 if the function to be selected is to record a by a left reverse zeroclick starting at 10 with the 0 0 Zeroclick control, then the pointer movement would need to pass in contact from the control area 1, to the menu 22, down to the lower case alphabet menu item 25, horizontally across to the character grid 27, and then up to the menu item and to perform the left reverse zeroclick with the 0 0 zeroclick in that menu item. The region 2 area would have increased in size from the menu 22 area to include the extra character grid 27 area. Thus as more grids are generated the region 2 of the bordergrid (since it is a zeroclick variation) increases to include all the grids and may increase to include the related areas that may be generated for user feedback, and fully informing the user of the function about to be activated by the highlighted menu item zeroclick.

The appearance and the activation of the bordergrid from a control area 1 by the pointer coming in contact with the control may require a more precise movement if the developer or user prefers. The developer or user may not like bordergrids appearing by random movement over the screen. Therefore an additional ZCC (e.g. ZCC 21 in FIG. 12) may be need to be triggered by a zeroclick to make the bordergrid appear and be activated. Indeed the developer may find it beneficial to allow grids to appear by contact with the control area 1, but not be activated (by "activated" is meant that unless activated, a Zeroclick may not occur even if the pointer movement performs the correct subsequent movement over the visible but inactivated additional area 3 e.g. 24) unless a zeroclick was performed on a ZCC (e.g. ZCC 21 in FIG. 13). In this example until the appropriate zeroclick is performed on the ZCC 21 (e.g. left to top right angled zeroclick), then no further zeroclicks on any items of the menu 22 will work. It is a further form of error prevention it has the benefit that the user is able to see the grids rapidly without having to do a specific zeroclick but by just coming into contact with a certain control area 1, but with the reassurance that the bordergrid would not have a function accidentally triggered by a random movement. Thus by the appropriate use of these variations the developer and/or user may adjust the bordergrid to have the exact required functionality and error prevention.

The user feedback may be the same as the zeroclick. If there is any information needed to further aid the selection of a certain function or record data via a menu item selection, then as previously described regarding, the Zeroclick, the user feedback may not only inform the user how to activate the Zeroclick but may use any additional part of the screen to provide all the information needed in the appropriate format (e.g. text, graphics, image, animation, video clip) that may provide a comprehensive understanding of the function and its implications. Also the functionality of moving outside the control area 1 and region 2 area resetting the control area 1 to the state of never having being activated, and moving outside the predetermined path 3 area, having the effect of restoring the additional area 3 to the state prior to the pointer coming in contact with the additional area 3, as the default applies.

Description of a Bordergrid.

This expands the definition by more reference to the drawings. In FIG. 12 the pointer moves in contact with the control 1. This may make visible the appearance of the region 2 in FIG. 13 which has the appearance of a grid 22 and/or activate it. Thus the programmer may make the bordergrid visible to show the contents of the bordergrid immediately the pointer made contact with the control area 1. However, to increase the error prevention activation of the bordergrid, may require an additional Zeroclick e.g. 21 to activate it by a left to top right angled Zeroclick. Alternatively both the visibility and activation may occur by the pointer coming in contact either with the control area 1 or both being activated by ZC 21.

The bordergrid's menu items provide a replacement for the mouse clicks (illustrated by the first four menu item in grid 22 which show the common single and double left and right mouse clicks if more complicated button presses are required by the pointer device then further menu items may comprehensively deal with all the variations. The next three menu item show how the bordergrid may be used to simulate the keyboard. It illustrates the Upper case alphabet, lower case alphabet, or character groups (these may be numerical, date, other groups of useful key presses).

The mouse click emulations are performed by activating the relevant Zeroclick in each menu item. Thus once the bordergrid is visible and active, the pointer movement, provided it stays within the control area 1 and the grid 22, may perform a Zeroclick e,g, left mouse simulated click by the correct movement in conjunction with circle Zeroclick 24. This may be direction, reverse or angle Zeroclicks or any more complicated Zeroclicks, as described in the Zeroclick section. However, because it is a bordergrid, it may also just require the pointer movement to come into contact with the circle Zeroclick 24 area, as it may have already had one Zeroclick e.g. 21 for error prevention. This method is not recommended, but is an available option, as the reverse and right angle Zeroclicks may, provide better error prevention, with only a marginal decrease in speed and a much greater reassurance of prevention of accidental triggering. The normal circle Zeroclick 24 shape will be a generic symbol for any type of Zeroclicks, and if any Zeroclick symbol is used e.g. 21 it may be assumed that they may be replaced with other Zeroclicks if the user/developer prefers.

The character grid 27 operates in the following method. The pointer movement over the lower case alphabet 25 menu item in FIG. 14 makes and activates the character grid 27, in this case it is the default lower alphabet key. The movement of the pointer from 25 in FIG. 15 horizontally to the character grid 27 then up to the e character 28 then across to the 0 0 Zeroclick control within the e menu item. A Zeroclick (e.g. left reverse) adds the letter e to the textbox 30. The user may move up and down the character grid adding letters in a similar fashion, and two Zeroclicks (e.g. left reverse) on 28 would cause two e's to be added to the textbox 30. By performing another type of Zeroclick (e.g. right reverse) this would remove the last letter. Alternatively the action grid may be used to further record and edit further free text. The action grid 32 may contain complete word processing functions.

The action grid 32 may be activated and appear when the pointer is over any of the menu items in the character grid. It would move up and down in the default setting with the blank space 38 on the same horizontal level as the menu item the pointer is over. By moving the pointer to the action grid, the default setting is that the pointer would activate the action grid by moving the pointer to the menu item 38. It then may move up and down the action grid to use any of the additional word processing functions. Moving over delete all 34 and zero-clicking the ZCC 33 would delete all the text in the editable text box. Moving over delete word 35 and performing a zero-click would delete the last word in the editable text box. Moving over the delete last letter and performing a zeroclick would delete the last letter in the editable text box 30. Moving over the check spelling and performing a zc would check the spelling and provide options like that shown in 96 of FIG. 20 on the word or words in the editable text box. The words in the editable text box may be listed as a grid to the right of action grid as separate words and moving over words that are incorrectly spelt may cause further hierarchical grid to select the correct spelling of the right word. The options 41 provide a space and 42 to 47 other characters which by a zc in the correct menu item may cause those characters to be added to the editable text box 30. Search provides a non hierarchical search of any data source. It may have the ability to perform this search and locate the information in the exact hierarchical position in a hierarchical grid as shown in FIG. 20. Exit and save the data into the underlying database or file and may return the control to its inactivated appearance.

FIG. 16 shows a bordergrid being used to record numerical data. This FIG. 16 demonstrates one method that this may be done. Depending on programmer's preference the pointer moves to the control; this may make the bordergrid visible. The bordergrid's appearance may be the combined editable textbox 30 and the replacement mouse and keyboard functions as shown in the right hand grid to the control areal in FIG. 16. In FIG. 16 the pointer has moved over the numerical data 52. The numerical data grid 54 is activated by the pointer being over the bordergrid's Numerical menu item. The numerical grid appears. This lists the numbers in the grid, the decimal point, and further mathematical functions. It may be used to enter numerical data or to calculate numerical data. To enter numerical data it works the same way as the character grid. The user moves the pointer to the relevant number (e.g 1 53) and adds it by a left reverse Zeroclick (and may remove it by a right reverse Zeroclick if required). This enters the information in the text box 55. It shows that 1 has been entered. This occurred by the pointer moving to the 1 menu item 53 and performing a left reverse Zeroclick (again different Zeroclick controls e.g. 16-21 or movements may be chosen from this default version). To cause the numerical grid to calculate numerically, numerical data or operator would be added using the numerical grid as described above. If operators were used with more than one number eg. 132 in FIG. 25 then by performing a left reverse Zeroclick on the equals would cause the = sign to appear in the textbox and also calculate the data. In the same way as the character grid, the action grid may be accessed by moving horizontally across from the numerical grid (the grid containing the numbers and operators in FIG. 16). The functions of the action grid may be as comprehensive as the numerical functions required for the purpose. To record blood pressure the systolic reading would be entered as described above and then the/61 would be selected and then the diastolic reading entered in. The user would just save the reading without calculating. The numerical grid may be tailored with other operators or characters if useful for other mathematical functions or purposes.

FIG. 17 shows a variation of the bordergrid, which may be used with the HCG (hierarchical cascading grid) described later. The features that are noteworthy are that the bordergrid area 64 is an integral part of the grid structure. In the inactive appearance the HCG looks like a hierarchical grid which the subdata grid (right grid) reflect the subdata for the grid that the pointer is over e.g. the pointer is over c/o cough and the subdata grid (right) reflects the relevant subdata for that c/o cough menu item. To activate the bordergrid in the HCG, the pointer is moved horizontally over to the portion of the bordergrid 66. Activation only may occur in the default version horizontally in this direction. The programmer may have user feedback at this point. The square 66 may alter in appearance e.g. in colour and shape (254 in FIG. 62), or alternatively as another example, show two arrows one above say a red thin rectangular line around the border of the 66 rectangle. The upper arrow pointing vertically upwards with a tiny arrow pointing downward in the midline over the rectangle indicates there is a Zeroclick route (a bottom reverse Zeroclick starting in 66 moving to 67 then back to 66). This may cause the bordergrid 88 to appear. There is a downward arrow with a small reverse upward arrow from the bottom side of the 66 rectangular red outline. It is indicating there is a top reverse Zeroclick (moving the pointer within the three rectangles 66,68,66) designed for recording the c/o cough entry into the recorded data column shown in FIG. 50. Further top reverse Zeroclick would remove the c/o cough entry from the recorded data section. If the user performs the bottom reverse Zeroclick the bordergrid becomes visible 88 (moving the pointer with the three rectangles 66,67,66). The appearance of the bordergrid now gives the user multiple branching hierarchical grids relevant to the c/o cough symptom. Thus the bordergrid allows the doctor to record c/o cough with a menu item by performing a left reverse Zeroclick in the record menu item 71. A Zeroclick in the No 72 menu item would cause No c/o cough to be added to the recorded data. This is an example of a descriptive qualifier i.e. adding No, the descriptive term, to the original term, c/o cough. Repeating the Zeroclick (e.g. left reverse Zeroclick) would cause that No c/o cough entry in the recorded data to be removed. The menu items 73-76 would allow other descriptive terms to be added or removed by Zeroclick to the recorded data. Search would allow the web or other databases to be searched for data on cough. 78 would allow all other functions of the program to be accessed hierarchically from the bordergrid. This minimizes the movement to switch functions. 79 would provide a comprehensive list of all background information for the symptom all arranged in grid format so all clinical features and management textbook advice would be able to be recorded (E.g. FIG. 70). 80 list a differential diagnosis (252 in FIG. 61 as an example—see further description later) based on the clinical features already added by the system. 79-85 looks through the comprehensive history, examination, investigation, and management of cough according to evidence based medicine. The PatternClick 2 87 will give the default most useful pattern of symptoms for certain conditions, e.g urti cough, sore throat, pharyngitis, chest clear, Rx symptomatic. See Patternclick section for description of Patternclick 1 86. Thus with one press you may record the general pattern. By further Zeroclicking on individual selected items this default template may be tailored exactly to the patient. All data will be related hierarchically to the c/o cough even free text. The computer will constantly be showing the doctor the differential diagnosis and how the diagnosis and treatment varies as the clinical features are added. This may be displayed as user feedback with a differential diagnosis list (e.g. 252 in FIG. 61) and management list (e.g. 253 in FIG. 61) while data is being entered. The doctor may then Zeroclick on the suggested management minimising his data entry.

FIG. 20 shows the search on the HCG. This search function may be used on any bordergrid or control. The find icon 89 is activated by positioning the pointer over the find icon and performing a top reverse Zeroclick from 89, 89*a*, 89. This activates and makes visible the text data entry and the character grid. The letters cough are selected in the default manner for the cough grid by Zeroclicking (left reverse) over the relevant letters to enter coug in the textbox 90. Thus after Zeroclicking the g the pointer moves horizontal to 93, down to 94, then Zeroclicks 95. This searches the HCG for all the entries with those letters, by moving the pointer over a particular entry c/o cough 96 the search positions the user in the exact hierarchical position. The relevant hierarchical level may be set by the user. It may be set for the subset of the relevant data, or any hierarchical level related to the selected element. The purpose is that the user may use the hierarchical grid, and learn its classification even while performing free text searches. Its advantage is that every word searched may be seen in its useful clinical setting.

FIG. 21-FIG. 26 This shows an alternative data entry method for character, date and numerical data. All these assume that they are activated by a Zeroclick from a control or a menu item from a bordergrid. FIG. 21 shows a control area 1 activated by a Zeroclick (left to upper right angled Zeroclick) activating the cascading character grid to replace needing a keyboard. The default is the lower case. The user wishes to add a capital H by moving the pointer to Caps 98. This changes the lower case alphabet to upper case. Then to H 99. As with all bordergrids, qualifier grids, or HCG the next right grid is generated by movement over the menu items of the grid. Moving to a preceding grid or control e.g. over the control removes the H letter and restores the default lowercase setting. Moving the pointer forward to the next right boundary to the next right grid allows access to the next right vertical lower case grid e.g. 100,101,102 enabling Hell to be written in the editable text. An automatic search is performed when the selection of possible words with those letters is equal to or less than a given number e.g. 3. It then gives a list of the three possible words with that spelling and displayed in another right grid. Moving the pointer to 103 selects Hello and moving to save and Zeroclicking saves the Hello.

FIG. 22 shows a similar type of cascading character-grid. Using the method described above it allows a phrase to be written. 107,108,109,110,111 a man. When it is time to save, search or further modify the text, the pointer moves to the save 112 and then confirms this with 113. Alternatively, access to other word related functions may be achieved by other menu items on this grid (containing 113). The menu item restart with space 114 allows the cascading character grid to never get wider than one word i.e. when a space is selected the word is saved and the pointer is placed in the first letter column of the character grid. The default use of the space would be to add a space to the text box. The Restart with space 114 function allows the user to reset the cascading character grid after a word is entered. The space signals the word is automatically added to the text box, then the grid resets to the first column again. This may also reset the pointer position to restart at the beginning. This pointer reset as well as the restarting of the grid after each word is optional. If the user moves over the original control then it enables the user to access the previously entered word, with the pointer and grids being generated to the appearance of the grid just prior to the space resetting the character grid and pointer (if required). Thus the previous word or previous words may be edited if a mistake was made.

FIG. 23 Date entry. This shows a cascading date entry method. Again it works on similar principles. The control with or without a Zeroclick 21 (left to top right angle Zeroclick) generates the date grid. The difference with this is the entire date control is shown. It shows a sequential grid rather than a cascading grid. If the user wished to just record a year then the user would move the pointer from cell 115,116,123. By moving the pointer over the correct decade 115, year 116, correct month 117, and correct day of the months (the correct 10's 118 and the correct 1's 119), the correct date may be entered in the control area 1 if the user moves to the save cell and Zeroclicks 121. Then this is the Zeroclick 121 that saves the date information. (e.g. in the textbox 127). This date data input mechanism shows how by one last Zeroclick, four pieces of data are entered in the correct manner. This date mechanism illustrates the sequential HCG. Related data that is necessary to ask to complete a task e.g. to record a date accurately the year, the month and the day (118,119) need to be recorded. Likewise for any other task where sequential related information is needed a sequential HCG is a very useful format that several different aspects of related information may be recorded with a single Zeroclick. Another example of a sequential grid is the drug grid shown in FIG. 55. Thus by a left to right movement using a grid an entire thought may be captured. Thus this illustrates that for sequential grids, which do not change and are limited in size it is better that the control is shown completely so that the user can see the various aspects highlighted by each grid that are required for one complete sequential thought. It enables important items not to be missed.

FIG. 24 shows a variation over FIG. 23 for date entry. It enables users who require centuries for historical figures to select the century, decade, then normal year, month and day grids.

FIGS. 25 and 26 show a cascading numerical grid, which works in an identical fashion The Purpose and Function of the Bordergrid This enables the developer the opportunity of adding a bordergrid to every control area. The bordergrid may provide a complete keyboard replacement, a "click" replacement, further more efficient and powerful data entry and display methods later described in the HCG section, and any other functions. Thus by movement alone all these functions may be accessed for the control area. Thus this function may be accessed for any control area by the interaction of the pointer movement with the control area.

Thus all the mouse clicking function and additional functions that the developer considered should be linked to that control area can be displayed directly in a associated bordergrid. This educates/reminds the user of the functions provided by every control area. It also provides a way of allowing the user to trigger these functions by the directional movement of the mouse alone.

The bordergrid can also contain a HCG, qualifier grids and patternclicks allowing a full range of data input and display methods.

The method the bordergrid performs the following further functions for the control area are:

The way the bordergrid provides a mouse replacement.

FIG. 13 shows a bordergrid 22 with the first four rows showing the minimum mouse replacement. Additional mouse or locator buttons could be listed below if required. By moving the pointer over the red circle 24 in the "left Mouse Click" row would simulate the action of the Left Mouse Click and trigger the function associated with a left mouse click for that control area. To repeat the click, the user would need to move to another row then move over the red circle. However, this Zeroclick action may be varied for developer and/or user preference and the Zeroclick could be any Zeroclick design instead of the circle. (e.g. FIG. 11 (16-21)).

in reality, the developer would never use the term left mouse click for a menu item unless it was modifying an existing program or web page not designed for Zeroclick functionality or it was purely educational to change the users thinking of using control areas with clicks to control areas with bordergrids as the new development in programming. The developer would probably use a grid menu item describing the function that the "Left Mouse Click" did for that control area.

However, it is easy to see by listing the mouse functions as in the first 4 rows of the bordergrid, how every control area could have their mouse/locator "click" action replaced or duplicated by that action being performed by a bordergrid menu item specifying that function and using a Zeroclick to activate the function.

The Way the Bordergrid Provide a Keyboard Replacement.

In FIG. 13, the upper case and lower case alphabet 25 and other character bordergrid menu items illustrate how key presses of all the keyboard (and thus all characters available as the bordergrid is not restricted by the number of keys) may be emulated by using the bordergrid as an alternative or replacement character data input method.

I.e in the same way the group of lower case alphabet letters is shown under the bordergrid menu item "lower case alphabet", the bordergrid could provide a menu item with a descriptive label for a selection of characters in groups suitable for the user purpose. (E.g. alphabet and relevant editing function for specific tasks, numbers and their operators, function keys, and various different character groups useful to the user/developers purpose. Thus by several bordergrid menu items labelling different groups of characters the entire keyboard could have all the key actions duplicated by the bordergrid.

To emulate the pressing of a character key with the bordergrid the user moves the pointer to the relevant bordergrid menu item and highlights it, e.g."Lower Case Alphabet" 25. In the same way as a HCG, this causes the appearance of a list of the alphabet (subdata grid) specifically called the character grid 27 in FIG. 15 with a Zeroclick for each row. If the user wishes to enter a letter (e.g. the letter e 28) the user moves to the relevant row with the letter and performs the appropriate Zeroclick (e.g. moves the pointer from the left circle 10 to the right 11 then back again.—the left reverse zeroclick on the 0 0 ZCC). This causes the letter to be added to the bordergrid edit textbox. By repeating this appropriate Zeroclick the pointer movement would continue to add duplicate letters to the edit text box. By performing a different Zeroclick the letter may be removed (e.g. move the pointer from the right circle 11, to the left circle 10, to the right circle to delete the selected letter in the 0 0 Zeroclick shown). By moving over the row with the space at the bottom of the character grid 27 and performing the appropriate. Zeroclick this would add a space to the bordergrid edit box so that the user could add another word. In reality the example Zeroclick for the menu items is the same as described in FIG. 5. It may be a different design like FIG. 4 or any other ZCC. The FIG. 15 also shows that the pointer over the character grid 27 generates the action grid 32. The appearance of the action grid 32 may have a central empty menu item 38 on the same row as the selected character. Thus if the user by accident moved to the boundary of the cell and triggered the action grid 32 then the user would need to change to another direction to move the pointer to a menu item with a Zeroclick. The menu items in the action grid 32 enable the user to select the full range of relevant functions for the previous highlighted item. The action grid 32 shows some of the range of editing and word processor functions. However, a skilled use of designing appropriate hierarchical grids may achieve comprehensive functionality for all functions that the original control needed. Each function of the action grid may be activated by a Zeroclick, appropriate to the programmers need. Thus if the user wished to record the letter e, the user may use the illustrated Zeroclick (10,11,10) or may move to the right border of the e cell, then enter the blank cell 38 then move the pointer down to perform a zeroclick in the record letter cell 39. Likewise if the user wished to select and change the e to a capital letter 40 then, the pointer may move to perform a zeroclick in the capital letter cell. If the user was searching for a word beginning with e or some further letter, the user may move to the search cell and perform the Zeroclick for that cell. Thus all useful features may be accessed by the hierarchical structure of the bordergrid. FIG. 16 shows a more simplified action grid if the user wished faster speeds. The character grid 27 would work as described in FIG. 15. The action grid in FIG. 16, however, is simpler and faster. To activate the delete-previous character function 56, e.g. if the character grid had recorded e, the user may move the pointer horizontally to the empty menu item 55 and then move the pointer into the cell to delete previous character 56. That movement may delete the e. Alternatively if the user may wish to save the e, the user may move to the empty menu item 55, and then move the pointer to the save menu item 57. This description has tried to show that there are numerous way the Zeroclick Control may be defined to activate the individual menu items. It depends on the various factors previously discussed in the Zeroclick section, and the developer or user's needs.

The action grid can tailor the data entry to be the faster for the specific purpose of the bordergrid. The action grid is specific for the highlighted row it is in effect a bordergrid for each row of the character grid.

The developer or user could add or remove any menu items so that the action grid reflected the ideal action grid for the exact purpose of the bordergrid.

By this means the user can replace both keyboard and any mouse button presses by using the interaction of the control area with the movement of the pointer alone. The bordergrid may provide qualifier grids for that control area, flowchart educational recording pathways. FIG. 69, data entry methods as described above.

Variation of the Bordergrid

This could vary by having a different style of Zeroclick Controls for different grids to trigger different functions of the bordergrid. The bordergrid could also have different types of Zeroclick to trigger the grid menu item function. The appearance of the bordergrid could vary like that of a HCG.

The Appropriate Zeroclick to Activate the Bordergrid

This depends on the user requirements. See definition and description of the bordergrid.

The Border Grid in the HCG

Definition

This is a vertical border 64 in FIG. 17 with horizontal divisions with the rows separating the grid and their derivative grids in the HCG. Its function is tow as a menu system specific for the individual highlighted cell/row.

This is a menu system, at the vertical boundary (in the preferred left to right style of the grid) of the grids in the HCG. It also can be applied to any grid or any control area.

It provides menu items for individual selected rows and/or menu item which can affect the recording and display of the grid and its elements either side of the border grid. It can allow recording of an element.

Border Grid's Appearance Before Activation

Its preferred appearance would be a discrete border divided with rows. In the preferred system, it would show no text until activated. However, this could vary with user/developer preference as the grid could be visible, of normal width for the menu items.

The Inactivated Appearance

A user using the HCG would not be aware that the border grid was anything else that a border that indicated the row position of the next grid.

How the Border Grid is Activated

It is activated when the pointer passes from highlighted row of the grid in focus to over the border grid to the sub data grid which causes the pointer to pass over the rectangular border grid cell (66). In the preferred activation of the grid, the grid would only change from its inactivated appearance to its activated appearance if the pointer moved up or down vertically a user defined distance (e.g. one row). See FIG. 17 and previous description in the bordergrid's section.

Border Grid's Appearance after Activation

The effect of this activation is to change the border into a border grid with multiple useful function to rapidly, accurately, and relevantly document all details regarding the highlighted element. The items choices of the border grid enables the user to access all necessary data so that the user can effectively record all useful information in a classified manner related to the highlighted cell of the grid in focus. This then can allow multiple branching menus specific to the highlighted element to appear from the border of a HCG. The border grid would operate like any HCG grid except the Zeroclick mechanism for each row could be simpler as the user already has to move the pointer in a right angled movement to activate the border grid. Thus the user by deliberately accessing the border grid is already aware that he wishes to perform one of the functions of the border grid.

The Qualifier Grid

Description of the Qualifier Grid

Qualifier grid elements allow systematic description of the selected item or control. They work identically to the bordergrid. The bordergrid may have all the functionality of the qualifier grid and may be used interchangeably with regard to function. It was originally used for the illustration of the qualifier characteristics in the HCG.

The qualifier grid is a dynamic grid that provides a grid structure specific for the purpose of systematically describing the selected element of hierarchical data and also to increase the functionality of the grid.

The components needed to maximise the usefulness of the qualifier grid are: It could provide general functions, which are applicable for the whole grid, which could improve the function of the grid and possible access to any appropriate function of the rest of the program.

It could provide recording tools. These could be either general or specific adjective descriptions or general or specific structured data related to the selected element.

It could provide common and specific appropriate adjective descriptions to make the classification system more accurate. E.g. the specific location, further sub classification of the highlighted item, the highlighted element e.g. no 72, no change 73, worse 75, better 74, verbal adjective descriptions appropriate to the highlighted element and/or an associated code that the modification could be easily searched.

Specific appropriate adjective descriptions. This is where more objective accurate description could supplement or replace the vaguer more general term. E.g. for claudication pain instead of the vague descriptive term no change, worse, better, it could be replaced with a more objective description: claudication at rest, claudication occurring before walking 25 meters, claudication occurring before walking 50 meters.

Thus for every symptom, sign, investigation, Rx and any other medical term, specific appropriate adjective descriptions could be provided. If these are used in conjunction with free text and numerical data, exact specific clinical details could rapidly be recorded for every patient, despite the gaps of descriptive terminology with current classification systems. If there was a code associated with every qualifier grid systematic descriptive term, adjective description and free text, and numerical data this would provide a complete accurate description of the diseases recorded for a given population, which would be completely statistically analysable.

Thus by using this data and by doctors creating and using specific appropriate adjective descriptions and sharing these in the medical world, this would soon lead to an exponential growth of sub classification for each medical term and its medical management. Thus classification for medical conditions would become as accurate as the entire population, when the doctors were using this hierarchical grid.

It could provide tools to add free text and add numerical data to any of the selected term and/or the general and/or specific systematic description and/or the general and/or the specific adjective description.

The advantage of this associated code in addition to the verbal description would be the precise definition in coded form of any classified data. Thus in a medical example the read code or any other medical classification system may not be precise enough to classify exactly the nature of a certain type of pain in relation to duration, timing, etc. The qualifier grid would be able to provide all the descriptive terms that the classification of the symptom could be statistically analysable. Thus this program stores data and records record sets of data under the medical classification heading.

Application of the Qualifier grid. It provides the user instant further detailed information regarding the subject selected. It also provides the tools to record that information. It also enables access to any function of the existing program so that the user can remain in the same position yet have access to any function other than function that the application provides. When these general functions are selected then it remembers the exact position within the grid and enables the user to return back to the position after that function was performed.

Activation of the Qualifier Grid

When the qualifier grid is made visible either by a click (Right Mouse Click*) or the Zeroclick method, the qualifier grid appears centred over the element selected (the position of the top of the qualifier grid in relationship to the selected element could be varied). The header of the qualifier grid indicates which element of the underlying hierarchical grid has been just selected. The qualifier grid consists of elements/cells, which allows further qualifiers of data specific to the highlighted element clicked over to be recorded. If the menu is left without an element being selected no data is recorded in the preferred system. However, if an element in the qualifier grid is located and recorded as described in the hierarchical grid section, the qualifiers are then recorded as subheadings or sub data under the highlighted element data in the editable text box.

Figure 48:
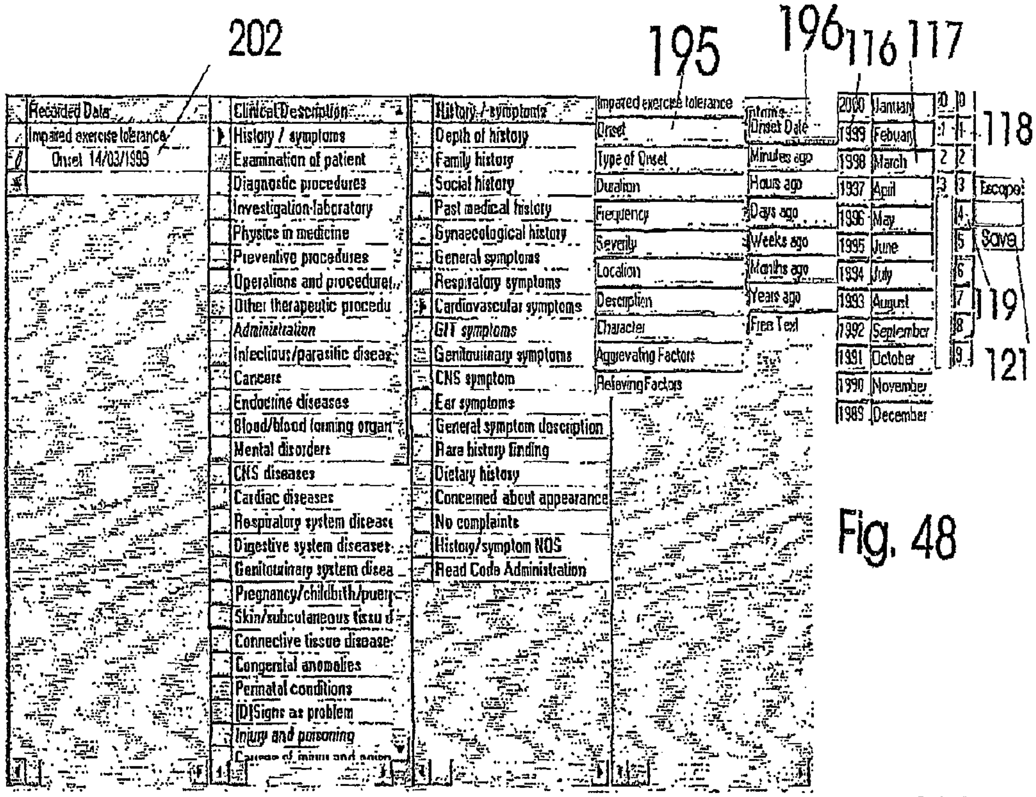
Figure 49:
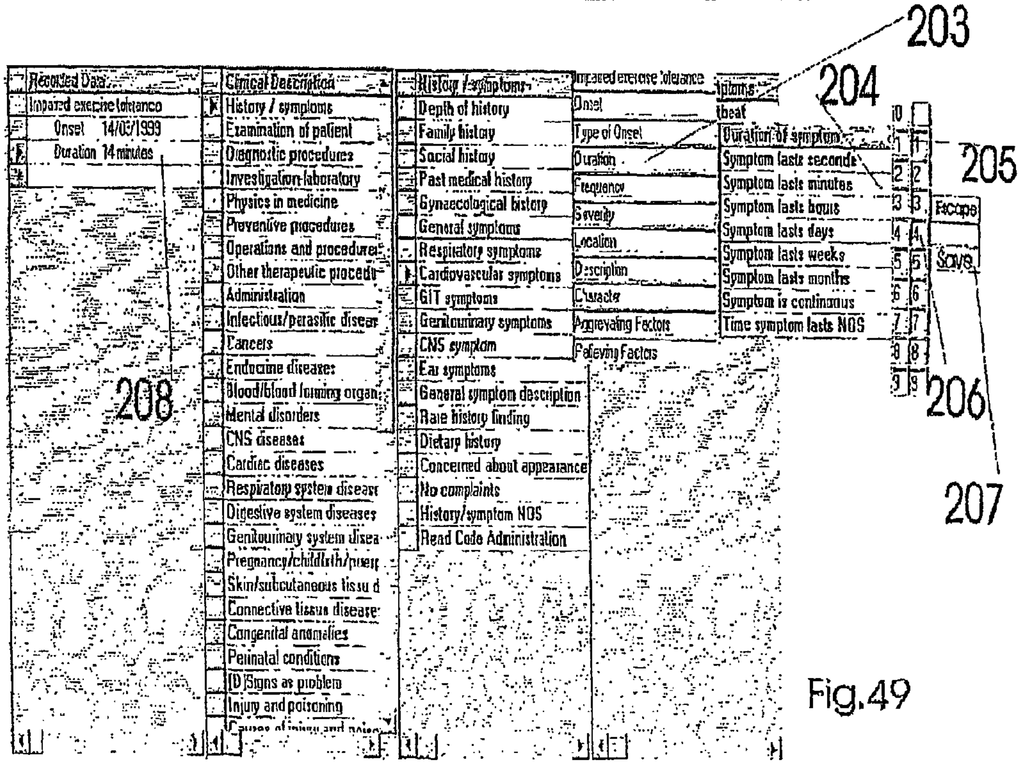

E.g. if the highlighted cell for the qualifier grid was impaired exercise tolerance, then by moving the pointer in the conventional hcg, bordergrid, or qualifier manner over onset 195 across to the next grid, then movement across onset date 196 to the next grid, then highlight 1999 116, and subsequent movement 117,118,119 then across to then nest grid to move to the save cell and zeroclick 121, this would record the onset date 14/3/1999 202 under the impaired exercise tolerance grid was recorded as a main heading and subsequently the onset was recorded as a qualifier of the impaired exercise tolerance as Onset 14/3/1999 as shown in 202 in FIG. 48. If the user wished to add further qualifier, duration 203, as shown in FIG. 49, the user moves the pointer back through the date recording grids to the grid containing 203, and in a similar fashion via pointer movement through 204,205,206 and finally zero-clicking on 207 data is recorded. Duration 14 minutes 208 in the exact hierarchical context of impaired exercise tolerance. Thus both these qualifier grids show sequential HCG where related groups of data (e.g. component of the date under the impaired exercise tolerance heading) is added by one zero-click.

Variation to the Qualifier Grid.

The qualifier grid can vary in action to the normal mode of action of the hierarchical grid. Its purpose is to add specific subdata to already selected data. It therefore also can be triggered by moving to the right hand boundary of a grid. The grid can have the normal edit features. Moving over the different column elements can trigger different editing features. Free text has a free text entry control. Moving over the review date can trigger the date data entry control or a calendar control. Moving over a number data entry column can trigger a number data entry control. The qualifier menu for the specific highlighted row of the grid with the different data entry methods for each of its columns is placed to the right border of the grid with focus. Only by passing through the right border at the level of the highlighted row can the user access the relevant submenu.

Some of the submenus of the qualifier menu may require free text entries for text, calendar, formula and numeric values. Thus when the pointer moves over an element which requires a free text entry the left border of the appropriate control most suited for entering that free text will appear on the right hand border of the grid with the mouse over the selected element, the different controls for entering further data are discussed below.

The elements of the qualifier menu could also be adapted for activating other functions, e.g. in a medical recording program if an inquiry was made during another patient's consultation, the ability to access all the other aspects of the clinical program yet be able to return to the precise location of data recording for the current person when the request regarding another patient was sorted.

Systematic Qualifiers—EduRecordDataElement.

These are other structured data regarding the highlighted element which are used for informed educational data recording. The unique aspect of this information is that all the useful information for recording data in the correct context is divided into hierarchical information in units of data useful for providing education FIG. 70, hierarchical flowcharts FIG. 69 and recording data.

Thus this structured information can be used directly in the recording process. These units of data also provide information which can all be used to educate and guide the thought processes of a user reducing the likelihood of making mistakes. Thus the very structure of the ideal protocol for a specific element may be used in a recording process. Thus text box information if divided and organised provides a simultaneous dual function of education and a perfect recording template.

Thus systematic data that can be isolated from textbooks describing the usual range of descriptive terminology and effective management steps, as well as useful information for the background of the condition, can be useful in simultaneously documenting information Tools to Add Free Text and Adding Numerical Data Many variations of these tools have already been described in the bordergrid section. They allow any keyboard keys to be entered using a mouse/pointer device so the user does not need to switch to the keyboard. A variety of styles have already been demonstrated. The default method of entering any characters would be via the character grid 27.

Character Grid Style 1 (Cascading Character Grid See FIG. 21 or 22 and Previous Description)

This is a specific modification of the cascading grid for free text. A blank space, the alphabet, numbers and other characters (the most useful for the user) are listed as a grid column. As the pointer moves across the right border of the grid the current element of the grid selected is recorded in the text box. E.g. in the record of Hello (see FIG. 21) The first grid highlighted element is h, and is converted to a capital H by a right mouse click* (the effect of a right mouse click or the Zeroclick equivalent is to change the alphabet from lower case to upper case by selecting Caps 98 as previously described), the second grid's highlighted element was e and so on for the entire word Hello. This data is then recorded from the Character Grid Style 1 textbox to the hierarchical cascading grid recording area by pressing the left mouse click* or the Zeroclick equivalent.

If the user makes a mistake with the last grid, he can remove the last character entry by moving to the preceding grid and selecting another alphabet letter, number or character. It also resets the alphabet style to lower case.

If the user wishes to use this grid to enter a capital alphabet letter. The effect of a right mouse click or the Zeroclick equivalent is to change the alphabet from lower case to upper case and vice versa. Please note the effect of the right mouse clicking or Zeroclick is to change the letters of the active grid into capital letters (e.g. the capital H in the first column of the Hello example—where the alphabet letters all are in uppercase) in the preferred system to give the user feedback. To store the selected letter the user clicks (Right Mouse Click*) or Zeroclick equivalent. This free text will be stored as sub data of the element selected from the qualifier grid. It also could be used in another context as a text string to search a database where a database used the string as a value as a filter. Depending on the circumstances this could be a word or a multiple word search if appropriate. The result of this search would then be displayed as data elements in the next grid to the right of the active one, and thus the user could then enter the dictionary word or any other word or words that the filtered recordset has found.

This process of using this grid as a free text search could even be made automatic (i.e. without even needing a click (Right Mouse Click*) or Zeroclick equivalent). This works by the grid automatically searching a database as the letters are selected entered into the text box. That process continues in background until the computer has recognised that the returned recordset number of the filtered recordset is small enough for the next grid at the right border of the current active grid to display the results of the filtered recordset as elements of that grid. The exact number or less of the filtered recordset number that activates the display in the grid to the right of the last letter selected for the search can vary due to user choice, preference, and speed consideration (whether the automatic process would slow down the use of the grid due to lag time waiting for the filtering process to finish; if this was the case then it would be better to make the process manual)

The Visual Qwerty Keyboard

Adding Date Data.

FIG. 48 shows a Zeroclick date entry. The date is present in the most logical format for recording. The year 116, the month 117, and the date in unit of 10's 118, and the date in units of 1's 119. The example shows how the qualifier grid may add an onset date 202 under the impaired exercise tolerance heading. The user may generate the qualifier grid by a Zeroclick in the cell Impaired exercise tolerance, or may use a bordergrid to show the qualifier grid for the cell. Since the Impaired exercise is a symptom the qualifier grid automatically shows qualifier relevant to symptoms. By using the pointer to move from the onset 195, it accesses the onset menu, and by moving the pointer over the onset date 196 it shows the date entry (columns 116, 117, 118, 119, 121). By moving the pointer over the correct date, correct month and correct day of the months (the correct 10's and the correct 1's), the correct date may be entered. If the user moves to the save button on the last menu 121, then this is the Zeroclick that saves the date information. This date data input mechanism shows how by one last Zeroclick, four pieces of data is entered in the correct hierarchical manner. This date mechanism illustrates the sequential HCG. Related data that is necessary to ask to complete a task e.g. to record a date accurately the year 116, the month 117 and the day 118, 119 needs to be recorded. Likewise for any other task where sequential related information is needed a sequential HCG is a very useful format that several different aspects of related information may be recorded with a single Zeroclick.

Tools that Only Need to Add Numerical Data

The PatternClick

Definition

This is when a user by a single click or Zeroclick over a highlighted cell is able to record a pattern of several row/cells within a HCG. These normally would be from the specific sub data grid and subsequent related hierarchical grids for that highlighted element as this will localise the patternclick items to a derivative path from the patternclick, but the rows or cell may be from any part of the HCG. To illustrate this principle if the pointer movement zeroclicks over the patternclick 1 85 menu item in the bordergrid 88 in FIG. 19. This would have the effect of recording a pattern of several rows/cells within the HCG (e.g. the c/o-cough 65, blood in sputum 211 and breath symptom 212 in FIG. 50—or whatever the selected pattern of several grouped cells) by a single zeroclick over the patternclick 1 85 (normally it would be a more specific name to the nature of the collected, group of clinical features or management—or appropriate description for any other subject/specialty). This is shown recorded in 213. The user can then record further row/cells or remove those row/cells as appropriate from the recorded data by further Zeroclicks or Clicks on the relevant row/cell according to the HCG recording mechanism. E.g. FIG. 51 The user may move to the c/o cough 65 cell, deselect it by zeroclicking, move to the no cough 157 cell and record it by zeroclicking, and it would show that the patternclick 1 data now has been changed to 215.

Activation of the PatternClick

As for the conventional bordergrid, the qualifier grid may have menu items activating qualifier grids for the given HCG cell. The PatternClick may be activated by a click/Zeroclick equivalent within the highlighted cell that generates the sub data grid with its default PatternClick (variable depending on developer or user preference), e.g. right double pointer device/the Zeroclick equivalent of the Right double mouse click within the highlighted cell.

Effect of the PatternClick

This records elements that are preset with the submenu template and also makes it easy to add the qualifying data to any selected elements. Thus by a single click multiple sub data entries are recorded.

Multiple Default PatternClick

In the modify mode one of the options is to allow multiple defaults to be set for various click patterns. These can be accessed using the qualifier grid or the bordergrid.

Automatic PatternClick

The grid could have a separate database which records the commonest recording patterns for each grid. After watching the user for a while it could automatically generate default PatternClick based on the user usage pattern.

The Hierarchical Cascading Grid (HCG)

This invention can be a method or device, which enables an element of hierarchical data to be located in a hierarchical manner and supply further sub data information of that element (if available) and/or provides the option of displaying further qualifying information (the qualifier grid and/or the border grid) of the selected element of hierarchical data and/or recording the element's data and/or its related qualifying information and/or using a quick default macro (see PatternClick and/or The border grid, which by one click and/or Zeroclick it chooses to record a default combination of elements of the sub data menu) by a pointer device by design methods of interaction of the grid with the directional movement of a pointer alone to facilitate a reduction in clicks or keyboard presses. The bordergrid and qualifier grids are HCG structures and may have all the above functionality. They have been named differently to emphasise the particular uses of the functions. However, if the developer wished all the features below may be applied to these structures. The following components are a more detailed description of the hierarchical cascading grid:—

I) To achieve the location of an element of hierarchical data in a hierarchical method via the pointer device.

a) The method of data entry requires a grid containing hierarchical data and a pointer device b) The grid action is triggered by moving the pointer over the following area. See figure "Terminology" to understand the description below.

1) Over the row (cell or element of data if single column, row if multiple columns) (e.g. 143 of FIG. 27) of the grid is to highlight the element and display sub data of hierarchical data related to the element highlighted in the grid (this now will be known as the grid in focus) to the right of the current grid (this now will be known also as the subdata grid).

This can be achieved by the search being triggered by the pointer movement, highlighting the underlying cell, and also performing a search on a data source (see the section on Creating and a user modifying a hierarchical grid) to find the data recordset for the subdata grid. This search is performed only once when the pointer moves inside a cell and highlight it. It will not be triggered again unless the pointer moves outside the highlighted cell and then enters it again. The developer will use all design methods to improve the speed of display of the subdata grid. The HCG control will be loaded in memory even when not visible, the data of the grids will be loaded into memory. If the database is very large for the HCG then it might be subdivided into smaller recordsets and/or stored in memory so they can be searched and loaded faster. This is so the subdata grid appears as instantly as possible when the pointer moves over the highlighted item in the grid in focus.

The only exception to this might be if the search time of the subdata grid was long or developer preference, then the developer could have a switch that allows a simple Zeroclick (e.g. a direction Zeroclick) or "Click" to trigger the search for subdata grid for those rows or all rows of that grid, instead of moving over the row triggering the search (e.g. the simple Zeroclick could be—if the user moved the pointer horizontally a certain distance within the cell/row to lookup the data for the subdata grid).

2) Movement Up over the header in central area 144 causes the menu to page up for every time the pointer moves over this area (but to cause a second page up the pointer needs to move outside this page up header area then return to it), in lateral header area (the up arrow 145) scrolls up one record at a time. This only works if there are hidden elements that can be viewed in this up direction. This style can be varied for user preference by the header area needing clicks or Zeroclick equivalent to create the page up and/or scroll up function. (See FIG. 27)

2b Movement to the Top Left corner of the first (and or subsequent grids if preferred) grid over the "find icon" 89 in FIG. 27 causes an edit box 90 in FIG. 20 with a visual keyboard to appear. By moving the pointer within the edit box 90 and then within the character grid 27 the letters of coug may be recorded by a series of zeroclicks in the appropriate menu item (e.g. a left reverse zeroclick with the 0 0 zeroclick control in the cell/menu item, a right reverse zeroclick may remove the character or last character) in the relevant grid cell (e.g. c 91, etc). After zeroclicking the last letter of the text to be searched (e.g. g 92) the pointer moves horizontally to 93, then downwards to perform the search 94 by performing a zeroclick with zeroclick control 95. This manually searches the data source entries in the HCG and produces a list in the right hand grid. (This search may be done automatically where by entering the text to be searched in the character grid 27, the data source of the HCG is automatically searched and then displays a list when the letters entered are sufficient to makes a specific enough part of a word (or part of a phrase with some data sources) to enable a list equal to or less than a certain number of items. This number, that the list of searched item found in the data source needs to be equal to or less, may vary to any number, but in the example of FIG. 20 we will assume it is four. Thus the list 331, when only "cou" is entered by the character grid 27, would not show because there would be too many entries in the list greater than four. Only when coup is entered and the searched list 331 was four or less the list 331 would appear. The position of the list 331 may vary. It may be next to the character grid or as shown in FIG. 20. The list 331 grid may have a more typical bordergrid appearance with a blank space like 70, the menu items above the blank space would be the list, and below the functions like removing characters etc. Thus this automatic search occurring in background as the characters are entered, then showing a list when the search entries were specific to less than a certain number, may be an option to eliminate the user even needing to activate the search manually by a zeroclick 95.) After either a manual or automatic search, the pointer is moved horizontally to the list 331 grid, then upwards to select a menu item (e.g. c/o cough 96). This then repositions the underlying HCG with the correct hierarchical grids so that the next right hand grid of the underlying HCG selected (e.g. do cough entry 65) shows the selected entry in its correct hierarchical context within the HCG. Depending on the speed of searching of the data source, this may be activated by pointer movement over the menu items, the normal default, but may also be activated by a zeroclick in over the menu item, (e.g. even though not illustrated in c/o cough 96 there may be a zeroclick control of any type for the menu item and a zeroclick). The default hierarchical display of the term searched in the HCG (e.g. c/o cough 96) would be the normal hierarchical menu context that the term would be normally found, and as shown in FIG. 20 it would be the next grid to the grid with the selected menu item (96). The purpose is to provide a manual or automatic search engine, which can find an item in the cascading hierarchical grid within its context of grids within the hierarchical grid. Once the user moved from the list 331 grid to the underlying HCG, the appearance of the HCG would return to that before the find icon was zeroclicked. Thus the user would be positioned in HCG in the correct menu with the selected item c/o cough with the same functionality as if the user had found it hierarchically. The default display to the right of the list 331 grid would normally be grid 166 with do cough 65 in this grid, however, this may be varied and the search may have the option of having this default varied if different levels of hierarchical context were needed on the search term (e.g. the subdata grid e.g. (167) or the preceding grid 165 may be grid displayed and repositioned to the right of the list grid 166). Also the default location of the find icon or appearance of the icon may vary on the HCG. This text search to locate the hierarchical status may be used in any appropriate context.

Thus in summary, a manual list is created by the user selecting the first few letters of the word to be searched for then selecting search.

The automatic search is monitoring constantly the first few letters you are entering and as soon as the number of possible word options for those letters in a particular hierarchical cascading grid (or any data source the user wishes to search) becomes equal or less than a certain number, a list is displayed. In another example, FIG. 21, if the user/developer selected the certain number of list size to be 3 and the data source only had 3 words beginning with hell as shown in the list box in FIG. 21, the list box (i.e. the box containing Hello 103) with the 3 words would appear automatically. Whereas when the user only typed hel the number generated from the data source would be greater than 3 and therefore the list box would not show.

The advantage of the automated search would be that the word options would automatically appear with a manageable amount of options to select. The disadvantage may be that the grid reacted slower due to the grid being processed. The manual search also gives the user more control. The automated or manual search could be selected depending on user preference. Whether using the automated or manual process, the user then selects the appropriate word from the search. Once selected the term (e.g. 65) is shown in its correct position in a grid 166 within the HCG next to the list 331 grid. Moving to this HCG grid 166 restores the HCG appearance prior to the find icon been activated, and the HCG has the same functionality as if the term had been found hierarchically.

3) Moving Down over footer (e.g. 148 in FIG. 27) in central area causes the menu to page down one page for every time the pointer moves over this area (but to cause a second page down the pointer needs to move outside this page down footer area then return to it). in lateral footer area scrolls down one record at a time (e.g. 149 in FIG. 27). These areas only work if there are hidden elements that can be viewed in this down direction. This style as the header can be varied for user preference.

4) Moving the pointer through the right border of the highlighted element of the grid accesses the hierarchical sub data related to that element in the grid on the right border of the highlighted element. e.g. 150 FIG. 28, the example shows the preferred arrangement where by moving the pointer within and through the right border of the row containing the cell "Examination of patient" accesses the sub data related to "Examination of patient" in the grid (with header "Examination of patient"). When the pointer moves from the grid in focus to the subdata grid, the pointer passes over a border. While the pointer is over the border it can access a menu system called the bordergrid (See FIG. 16, FIG. 17). See section on the bordergrid for further description. With this style both left and right sides of each grid will have a border 64 (it also is shown schematically in the drawings as 69). This border menu could trigger any function but usually it provides data and additional functions for the adjacent grids.

Variation in Style of Access to the Subdata Grid

The normal style (FIG. 40) where the left border of the subdata grid lies on the right border of the grid in focus may also be varied due to user/developer preference to the Overlap Grid Style.

The Overlap Grid Style (FIG. 41)

The pointer moves within and past a certain proportion of the horizontal length of the grid row (if multiple column grid) or cell (if single column grid) e.g. Moving the pointer further horizontally past the point 172 in the respiratory symptoms grid 166, it triggers the left border of the grid containing the sub data of the highlighted element in focus, to move the sub data grid's left border horizontally to overlap the grid in focus to the horizontal position of the tip of the lead line 172. This enables the user to transverse wide grids quicker by only having to move the mouse a proportion of the horizontal length of the grid row. It also enables the grid in focus and its subdata grid to be of normal size enabling more grids to fit on the screen.

5) Moving the pointer to an element of the grid to the left of the current grid then causes the display of the current grid to show the sub data of the selected cell (150) in the previous grid. e.g. FIG. 27 shows that the subdata grid reflects the grid in focus selected element (143). The pointer over the history/symptoms 143 causes the appearance of the History/symptoms subdata grid. Moving horizontally from the element 143 to the subdata grid with header History/Symptoms then causes this grid to become the grid in focus and further triggering other subdata grids if they existed for the cell that the pointer was over in the grid with the header history/symptoms. Moving the pointer from the History/Symptoms grid left back to the Clinical description grid then causes the element highlighted in that grid to generate a subdata grid for that element. Thus if pointer is moved back over the grid cell Examination of Patient (150 in FIG. 28) causes the subdata related to that element to be shown in the right subdata grid thus to be changed from history/symptoms subdata to the examination of patient 151 subdata. Any other subsequent hierarchical grids derived from a previous different clinical description cell prior to moving the pointer back from the subdata grid to the clinical description grid over 150 are made invisible and the subsequent right grids will only reflect subdata related to that item. If the pointer moves back to a cell in a previous grid with no subdata related to it, there will be no grid generated for that item or if the developer prefers the grid generated will be empty. (e.g. in FIG. 29 the pointer is over 157. The user moves back to the grid to the left and moves the pointer over 155 in FIG. 30. Because respiratory symptoms NOS 155 has no associated subdata, there is no grid to the right of the grid containing 155.)

6) Consequently any data in a hierarchical structure can be located rapidly via a hierarchical method for a particular element found.

7) The user/developer may prefer the width of preceding grids not in focus to be reduced in width and/or overlapped. E.g. in the circumstances when there are multiple grids displayed in the cascading grid, required then to enable the grid to fit in the screen, the grids preceding the one with the focus would be concatenated (FIG. 62), and only the grid in focus will be of a size that makes the element text of the grid in focus and the next right hand grid with the sub data of the element in focus appropriately visible (e.g. FIG. 62 the last two left hand grids are larger than the previous concatenated grids prior to the grid in focus headed Significant History). In some circumstances the width of the grid in focus may be dynamically expanded as well as concatenating the width of the other grids to improve the visibility of the elements of the grid in focus and the sub data related to it in the next grid to the right. The ultimate shrinkage of the preceding grids to the one in focus would be when the grids form the width of a line. When moved over the line that grid becomes in focus, and expands to a visible size along with the right hand grid with the sub data of the element. Alternatively the preceding grids could be overlapped (FIG. 41). Moving the pointer back in a left direction from the right subdata grid to the preceding overlapped grid causes it to become fully visible and not overlapped with normal width e.g. the width of the FIG. 40 grid compared to the same grid overlapped in FIG. 41.

8) Alternatively when the grid reached the boundary of the area allocated for the cascading grids, the grid could reverse direction and go backwards over the existing cascading grids. (See FIG. 33) Thus to trace back to the beginning of the hierarchical grid you would have to first move to the right most boundary and then back to the left where the grid originated. The reverse grid (e.g. grid 167 containing 157) may be at a lower level so that all the preceding grids (e.g. the rest of the grids on FIG. 33) could be accessible to the pointer so that the user could move directly to any of the existing preceding grids. If the Zeroclick was used the direction of the Zeroclick path may also transposed for the reverse grid's new direction depending on user preference. Also if bordergrids were used they may be in the normal position for the grid but they may also be transposed for the reverse direction depending on user preference. This style of reversing the grid could be continued if the cascading grids return back to the left hand boundary. In this case it would be the original direction of the grid but at a lower level. This process could continue with further boundaries. 9) In the circumstance when the user wished to show more rows than could be visible due to the vertical screen distance being unable to support the distance required for the resolution of the text of the row, the height and width of row in focus would be of normal size and the remaining rows would have their height reduced. As the user moved the mouse over these remaining rows, the row in focus would expand to be readable (e.g. 157 of FIG. 37) 10) If the headings and subheadings of the grid in focus were of such a long length, the row in focus could have the row height made wider to support multiple lines. 11) The grids have been described for users who have a left to right preference. For those with a right to left preference or up to down or down to up the grid structure and functions could be transposed to adapt to that user's direction preference. E.g. the HCG could start on the right hand side of the screen for Arabian text, and the other grids would appear with the grid in focus on the right and the subdata grid on the left the left. This transposition feature may also be applied to the bordergrid or qualifier grids and may be user or developer adjustable. 12) The border, style, text font properties, colour etc of the grid could be varied to user preference. The HCG grid shows the width of the grids being equal and on the same horizontal level. The scroll bar allows the user to see the complete word or any other fields. If user/developer preferred the text may be adjusted Automatically to fit the length of the largest word or phrase in a given element of the grid. If space were at a premium using the following techniques 7-10 the text in the highlighted element of the active grid would be visible. The scroll and other current features of grids may or may not be present.

II) To record the element of hierarchical data and/of its hierarchical status. Depending on user need and preference this can be done by a click (e.g. Left mouse click*) or using the Zeroclick method described below. A further click or Zeroclick would delete that recorded data for that particular element. Thus by repeated clicking or using the relevant Zeroclick click, the element of data would be recorded and deleted repeatedly. It is thus easy to add or remove data for every element of data in the hierarchical grid When the data is recorded the element of the grid selected would be highlighted in a different colour e.g red and/or style and/or checked style from the highlight colour showing the position of the mouse. If the user goes back to the selected item to remove it. The colour and/or style would return back to an unselected item, and it would be deleted from the recorded data. In the diagrams showing the HCG, there are no Zero-Click controls shown. This is because it is an optional style. As the HCG is used primarily for displaying and recording data in functions (as opposed to the bordergrid and qualifier grid structures which may activate up to all functions of the program) the zeroclick control in the cell which is under the pointer will only usually appear for that cell; the other cells of the HCG will not show any zeroclick control until the pointer moves over that particular cell. The appearance of a cell with a zeroclick control is shown in FIG. 10. This illustrates the T shaped zeroclick. Thus in one method to record the No Cough via a zeroclick, the pointer needs to perform a left to top right angled (pointer movement in contact with 12,13,14 within the arrow boundary of the arrow T shaped 21 ZCC which is the boundary of the path 3) zeroclick. To remove No Cough the user just repeats the left to top right angled zeroclick.

Recording Data Features.

1. Pointer device Single click or Zeroclick equivalent records the highlighted element of data.

2. Repeated Pointer device Single Click or Zeroclick equivalent removes the highlighted element of data.

3. In the preferred system the highlighted data is recorded in an editable textbox with its hierarchical status. The hierarchical status can be stored as a code. Every bit of recorded data whether in code form or free text will be classified to a known code. Thus all data elements stored can be compared. See “The record structure required for the modification of the HCG” for further details.

4. The recorded data in the preferred system is stored in an editable recordset.

III) To access a qualifier grid this can be done by a click (e.g. Right mouse click) over the underlying element of hierarchical data or using the Zeroclick control described below. This allows the user to add structured sub data, which can systematically describe the selected element of hierarchical data. To access the qualifier grid using the example of FIG. 10, a left to bottom right angled zeroclick is used (pointer movement in contact with 12,13,15 within the arrow boundary of the arrow T shaped 21 ZCC which is the boundary of the path 3).

IV) Easy importing and exporting of data into the grid. Any hierarchical data may be imported into the grid. This may be indented text, outlines, or databases with codes. The data would be analysed to see if there was an associated code (e.g. the Read Code) with the heading. The data would then be displayed in the HCG format. i.e. the highest level of heading would be shown in the first grid, and subsequent grid based on the subdata grid for the highlighted element/cell/row of the preceding grid.

V) How the cascading grid works. Moving the pointer over an element of the grid highlights the cell or row underneath the pointer. It also triggers a search for sub data related to the highlighted element. Each element of the first menu would then have an associated code, which searches/filters for an appropriate recordset or file (storing a recordset) or sub array of data containing the recordset of the next level of elements related to that sub data level. (FIG. 48). That sub data recordset would be the datasource for the next grid on the right hand border of the highlighted element.

VI) Easy modification of grids. Hierarchical data can be imported from the grid and modified within the grid by normal editing (adding, deleting, modifying) of the columns. There is the ability to use drag and drop (or a zeroclick equivalent to select the item and another zeroclick to paste the item) to bring a element with a code from another cascading grid or within a cascading grid or grid and drag it into any position on the new users grid. The sub data associated with the code would then automatically be accessed unless the user decides to design their own structure by overriding the default code [e.g. read code] with their own recordset/cascading hierarchical structure for the new element). User defined recordsets may then include the default read code sub data as one of its choices.

VII) Creation and modification of Grids. There would be a menu with items related to “Grid Options” (the menu name and menu items, and their location, could be altered for user preference, or the GUI chosen to activate these options). There would be a menu item to change the mode of the grid from the normal recording mode to the mode which allows modification of the grid. There would be separate menu items allowing for importing and exporting of data from the grid, creation of a new grid, opening one or more other grids so data can be dragged and dropped from the source grid to the destination grid being modified.

VIII) The variations in style of the hierarchical grid To show the variation of style of the cascading hierarchical grid, in effect, it may become a tree view, which could locate an element of hierarchical data by pointer movement alone. For example, as described in 7) above, the ultimate shrinkage of the preceding grid would be a mouse sensitive line. If further modification of the style of the grids were changed the tree view styles in FIG. 42*a-d* may be imitated [e.g. the grid would have an icon column (which could have various icons—open, shut, various on icons which describe the classification of the current text element), a line column (allowing for the horizontal lines and/or vertical lines of the tree view), with a column for text, and the rest of the grid made invisible (e.g. the cell lines and borders may be made invisible) and the position of the top of the right hand grid with sub data was positioned underneath, indented and below the highlighted element of the preceding grid. It is possible to see how the tree view structure (FIG. 32) can be formed by rearranging the cascading grid in the tree view pattern. It also could be rearranged for any form of hierarchical grid, which needed to be adapted to be sensitive to mouse movements alone to traverse the hierarchical grid. FIG. 42*a-d* shows two types of modification of the tree view enabling them to be operated by pointer movement alone in addition to the standard activation. They show a couple of different appearances of the treeview but the appearance may be modified for developer/user preference. The treeview shown in FIG. 42*a-d* operates in the following fashion.

To locate the hierarchical subdata the pointer needs to come into contact and may require a further zeroclick over the tabbed folder 176 (please note that the folder icon may be varied to any icon 176), It would have a closed and an open appearance (and/or +/− signs—not shown for simplicity) to represent whether subdata is showing. The hierarchical tree view would show the main headings to locate data. In the preferred method of using the tree view to locate data without needing mouse clicks, the tree view would be activated by mouse movements over its structure. Moving the pointer over the text would highlight text 174 under the pointer, and a zeroclick control associated with the text would appear to enable the user to record data like the HCG as described previously in section of the HCG and activation of a qualifier grid in section III of the HCG section. Moving the pointer over the icon 176 would access the subdata (176 in FIG. 42*a* before the pointer comes in contact with the icon 176 shows no subdata. However, after contact with the icon, or contact with the icon and a zeroclick, this makes the subdata 179 in FIG. 42*b* appear). To make the subdata 179 disappear and the tree view shrink to the appearance prior to the expansion required for the subdata, the pointer needs to be moved back to the vertical line 175 in FIG. 42*b*. The appearance of the grid then reverts to FIG. 42*a* prior to the subdata being open. If the user moves the mouse to the vertical line 177 then the subdata for history (e.g. CVS symptoms, Respiratory symptoms and any further subdata symptoms on the screen related to the history) would become closed and only history would show as the highest level of the tree view. To reopen the subdata related to history the pointer would need to come in contact with the icon 173 and in addition may require a further zeroclick on it depending on the programmer/user preference. Accessing the sublevels is achieved by coming into contact and in addition may require a further zeroclick depending on the developer/user preference with the folder icon relevant for the sublevel. Thus moving the pointer back to appropriate vertical level collapses and closes the treeview subdata to the right of that vertical line. Moving the pointer to the appropriate central header area 180 to page up, header area 181 to scroll up, footer area 183 to page down, and footer area 182 to scroll down may be achieved in an identical manner as already described for a HCG grid previously. When the pointer moves over the appropriate area e.g. 180 to page up, if there are further items above out of view then the treeview pages up. The user would need to move off area 180 and then return to page up a second time. This mechanism applies to the scroll up, page down and scroll down areas as well.

The position of the folder icon 176 in the preferred tree view would be after the text as opposed to the standard tree view. This reduces the accidental triggering of the subdata expanding as the pointer movement over 176 is more unlikely during the pointer movement either to highlight the text 174 to record it or moving back to preceding vertical line 177 to get to a higher data level. The position of the icon that activates the subdata would be done so that the movements would flow better and minimises the risk of activating the highlighted element. This position of the icon e.g. 173 and 176 may be varied to have the traditional appearance of the tree view. Additional care would be needed to avoid accidental triggering of the icon, and the best way to achieve this would by requiring a zeroclick with a ZCC (any one of FIG. 11). If the developer/user did not wish a zeroclick associated with the icon, then to reduce the likelihood of accidental triggering when the user moves the pointer back to the preceding vertical lines to close the subdata folders to that level or while trying to highlight the text of that subdata may be achieved by making the icon smaller and increasing the gaps 184 between Folders.

The default action of moving to preceding vertical levels would always close the data to show the hierarchical path as a heading to the grid. (This could be changed to the normal or other user preference.) The effect of using this grid would be similar to using the cascading hierarchical grid except the preceding grid to the active one would be decreased in width to a vertical line. Using the Tree View would enable the same functionality of the hierarchical cascading grid in a much smaller space. The method of using the tree view to record text, remove text, or activate the qualifier grid would be the same as described in section II or III of the HCG. The highlighted text (e.g. 174, 179) would have a zeroclick control as described in the sections illustrated by FIG. 10. The icon 176 may activate the subdata related to that heading to appear by the pointer coming into contact with the icon if the user prefers speed of access to subdata. However, the icon 176 may require a further zeroclick by the appearance of a zeroclick control related to that icon to activate the appearance of the subdata tree. The tree view may also respond to standard click methods. The importing of data into the grid and the modification of data as described in points IV and V of the hierarchical cascading grid also apply.

The above describes the default way that the tree view could be used to locate and record data with one click and/or ZeroClick. Other variations achieving the same functionality could also be used.

The second variation is that any the grids can have multiple columns. The grid works in the same manner that the highlighted row controls the sub data shown in the right hand grid yet when the mouse moves over each column of the row it could have difference responses to the mouse clicks and the Zeroclick for each column. Thus each column may have independent actions of different columns but all would show the same sub data in the right hand grid related to the row highlighted.

IX) Any style of hierarchical grid may be modified using the above principles and thus require less clicks and/or become more efficient. The modification of the Tree View demonstrates how any hierarchical grid may locate an element of hierarchical data and if appropriate, to record the data by pointer movement alone. (See FIG. 42 *a-d* for diagram and description above of two examples of this modification.) In essence the Tree View is a hierarchical grid which can be expanded or reduced by clicks. The modified tree view is a hierarchical grid, which is expanded or reduced by mouse movements. Using Zeroclick principles and adapting the above methods, any style of hierarchical grid could be modified to be used for design of hierarchical grid and may usually be improved to need less clicks to implement the location and selection of an item of hierarchical data. Thus methods of the cascading hierarchical grid being operated by pointer action alone may be applied to any hierarchical grid.

X) Variation of the hierarchical grid in displaying recorded data. The hierarchical cascading grid is also very useful in displaying recorded data which has already been recorded by using the cascading grid. The medical recording system shows a variation using a combination of the above features. Recorded medical data enable the doctor to get an overview of the patients medical conditions. See medical section FIG. 52

Medical Conditions

Screening Details

Financial Details

The best display for the medical conditions is a multiple columned grid. Highlighting a specific condition row would trigger a specific qualifier grid. This qualifier grid would be at the right hand side of the medical condition grid. It would have a default, as seen in overview. The qualifier grid for displaying data has additional functionality of displaying all useful data, which is recorded under the condition. Thus the menu items after a condition is selected show the most common views. The most, important principle in displaying previously recorded data is that the user should never need to duplicate data previously entered. The different views should enable the user to be reminded of the previously recorded data, be able to modify the changes since the last record and the effectiveness of the last management step, and to be prompted within the recording process of the additional worthwhile clinical data to record.

The Design of the Grid for the User to Use Keyboard Independently from the Mouse.

The usual arrangements of tabs for different controls on a form apply. Care would be taken that the users may be able to transverse the HCG without having to use a mouse. This may be done by arrows. In addition the HCG may have the option of the user having an alphabet (187 of FIG. 43) to represent the rows of the grid in focus. By pressing an alphabet key it would move, highlight and focus the element of the row represented by the alphabet letter chosen. The letters a-z represent a row of the elements within the grid. Each grid would have a number 1-9. (See 185, and 186 of FIG. 43). If there were more than 9 cascading grids the grids would be numbered 01-09. If further grids then 001-009. Thus by pressing the alphabet letters the user could locate any element in a hierarchical manner without needing to use the mouse. Function keys or other character keys or standard keys (e.g. delete) could be used for record, delete, qualifier grid, border grid patternclick and for any other needed function. The normal pointer movement keys could traverse the grids in the most appropriate style e.g. up, down, left (preceding grid), right (subdata grid). To increase speed the spacebar could access the right subdata grid, and the backspace could access the preceding grid. The pressing of the alphabet could be altered to avoid the spacebar or right arrow being needed to move to the subdata grid. By pressing the letters of the alphabet it would have the effect of pressing the alphabet letter and the spacebar. This allows rapid location of any element in the hierarchical grid as it saves the additional pressing of buttons. Pressing a shift with the alphabet letter would allow movement within the current grid without the effect of moving to the subdata grid by the pressing of the spacebar or right arrow. The use of Ctrl and the alphabet letter would have the effect of just moving to the current alphabet letter in the grid and recording it. Enter could have the effect of recording the currently highlighted grid. Repeating this process would remove the recorded item. The design of each form could have a HCG with alphabet rows that by pressing a letter would enable location of any control area on the form (which would have normally have been done by the tab key). Having located the control area, this would activate a bordergrid with an alphabet using rows for each control area, enabling any function for that control area to be done by keyboard entry alone. Subsequent alphabet hierarchical cascading grids could then give the user access to the entire functionality of the form without needing to use a mouse.

XII) Uses of the HCG

This could be used for any display or data input for any hierarchical data. The HCG is also a good format to perform a search engine. The user selects a search mode for the HCG. This would then allow the user to select features for the population of records that the user would search. E.g. for medical records the population statistics of patients and the different features would be included as a field that would generate the appropriate HCG, listing all the possible features regarding that patient population that the doctor wished to search. It then may be presented in an HCG format. Thus the HCG could show all the data from the most broad classification to the most detailed. E.g. if a search was for colds, the user would change to search mode and the diseases of the practice would be counted and listed in the hierarchical format. The doctor would move from the respiratory system disease. It would list the breakdown of the respiratory diseases with numbers or percentages reflecting the practice population. The doctor would then select infections (which would have the total number listed) then select the urti subdata from that. This would enable the doctor to get a complete overview of the practice data. The search would then be able to find all the patients under one condition, and then all the clinical features and managements used for that condition. Since all the data is hierarchical and all the data is related to a read code, all information regarding a patient would be statistically analysable using conventional search operators. Then the doctor could use the border or qualifier grids in search mode to specific the exact features from the read codes that the user would need to specify the exact clinical features or therapies that the user would need, to include or exclude from that given population. Two very important search structures would be listing the management for a given condition. The subdata grid for the condition would show the variation in the patient population of the different managements of the patient for a similar condition. The subdata groups for each management would look for how that management changed clinical features. Thus if the cost for each management is known for a given change in clinical features a given cost effectiveness may be attributed. This would be done for all the different management steps for the conditions. Automatically, this is producing a wonderful research database about the cost effectiveness of each management for each clinical change. These could then compared as further research into the most cost effective managements for each condition. Since all data is linked to read codes, even free text, all the data recorded may be analysed. This may be done by the border grid or qualifier grid giving the user search criteria for each read code as follows:

Search Criteria. This lists some of the criteria that the may be used These operator apply to Numerical Data fields or Date fields Greater than, Less than, Equal to, Not Equal to Range between two values or dates using a bordergrid character style to enter figures These operators apply to Text Fields Equal to, Not Equal to Type the characters using a bordergrid character style to enter figures x_means multiple wild characters,? means wild single character Order of Records displayed Display Criteria Every Record, Group Heading 1, Heading, Total XI) Tips for designing User defined templates using the HCG The structure of hierarchical data in the HCG should be organised for most rapid data entry, e.g. in a medical system with common conditions, their clinical features and therapies easier to access than the rarer ones. In medicine there are default details which are recorded the most. This will also occur in other speciality fields.

The organisation of the data grid must reflect ideal recording patterns for each given clinical setting E.g the patternclick would be used for the group of clinical features and therapy Try and have only one keypress for each common recording pattern (e.g. clinical features or treatments that usually go together) using the patternclick. Have the common variation nearby, preferably the same grid as the common patternclicks, which can be accessed by the bordergrid. Thus the user can deselect certain individual items from the PatternClick and also record other features by selecting other items in the grid. Have the flexibility for adding user preference. Make the recording process educational eg teaching the correct management. Make the recording process eliminate mistakes. The branching multiple cascading hierarchical grid. This is a design of a cascading hierarchical grid that allows for every selected element (or elements) of a grid the opportunity for multiple menu choices to be selected and activated for that single element by pointer movement alone, yet to maintain the function of the cascading hierarchical grid. The multiple menu choices could be views of related data to the element chosen, control of the function of the grid or objects displaying that data, a menu choice accessing a qualifier grid, menu choices with default record patterns. A way to achieve this is to have a border which is pointer sensitive between the grid with the highlighted element of data and the grid with the sub data of the element. If the user moves horizontally across the border between the grids, the hierarchical cascading grid (HCG) works as described above. If the pointer changes direction and moves vertically up or down within the border area horizontally aligned to the element then it could activate the additional menu choices for that specific highlighted element. These menu choices could have any function but the following example can show the recording function.

XII) The Function of the Click or Zeroclicking Action of the HCG May be Varied for the User or Developer Preference.

The left mouse click causing the recording and removing of cells or rows of data usually in a hierarchical manner, the right mouse click activating a qualifier grid, the left mouse double click activating a patternclick, the right mouse double click being user defined are the preferred actions of the mouse clicks for the hierarchical grid. However, these all could vary depending on user preference and different mouse devices with extra buttons or controls. In effect the user/developer has the choice of at least four mouse clicks (left and right single or double clicks) and four Zeroclick emulated clicks. In an advanced option of changing the grids, the user may be given the option of changing the default grid reaction to attach the recording and qualifier grid to their preferred mouse click or Zeroclick style. The user also may have the option of activating other application or HCG functions with a click or Zeroclick action of their choice.

Modifying the HCG

The user will have the ability to change and reorganise the HCG to any structure they would prefer. E.g. the default organisation for the HCG for a medical recording system would be to organise the data in specialities. Under each speciality would be listed the history, examination, investigation, treatment and all the common conditions with structured data and defaults for each. However, if the user wished to regroup or design their own HCG structure e.g. adding a list for chronic disease management to the main menu, the following or similar record structure would be required to give the user this flexibility of the grid.

The Record Structure Required for the Modification of the HCG

To achieve this you will need a comparable (see section on variation of data implementation described below) recordset/array structure or a record with fields that fulfil the following functions. The developer could design a HCG with the fields that were necessary for the degree of modification or functionality he wished to allow the user. i.e. lesser functionality may require less necessary fields. The structure will be described as a record with the following fields. This will allow a data driven HCG (names may be different, but function will be the same).

Definition Field (DF)

This requires a description of the term, which is visible to the user.

Hierarchical Identifier Code (HIC) Field

This is a code classification system, where the descriptive term is classified. It is preferable that this code is the most useful and/or authoritative and can be related to all other codes. It will be this code, which is the principal code that governs the structure of the hierarchical grid. Based on this code the highlighted cell in focus will use this code to search for the derivative data to fill the subdata grid unless a descriptive term has a UDC instead or no HIC code. User defined Code (UDC) to locate sub data Field This allows the user to define a code, which will trigger a recordset based on this code instead of the HIC field code, to fill the derivative subdata grid. This is a code that enables the user to get the derivative record set of data for the highlighted element. This could be done by using the code as a pointer to a recordset (e.g. a recordset within a database or a recordset within a file structure or any data source).

Location Identifier Code (LIC) Field of the current element/cell within the hierarchical grid This is a hierarchical code relating to the current hierarchical grid. This is unique and generated for each data element within the HCG. This represents the relative position of any cell or element of data within the complete hierarchical data structure. It allows the computer to classify every term in the HCG in relationship to a known HIC value.

An Automatic Classification System.

The computer can classify any term in relationship to a known HIC. If a term has been user defined within the classification system, when that term is recorded it will be normally be recorded with its HIC code (the read code in our example e.g. the term "Impaired Exercise Tolerance, with the code 185.). If there is no HIC then the computer automatically creates a code related to most specific HIC code Selected within the hierarchical manner to get to the current description.

How the Computer Classifies a Term with No HIC to the Nearest HIC

This could be done in numerous ways.

E.g. if a user wished to select a read code term "Impaired Exercise Tolerance" (stored in the DF). Its associated HIC would be 185. (the read code). If the user wished to further define the Impaired Exercise tolerance with its onset (14/3/1999)—See FIG. 48.

The HIC for the onset would be r185 . . . |tonset|d14/3/1999 R tells the computer this is a read code. In reality the r would refer to a specific version of a read code at a given time. Thus the computer would always be able to compare any data recorded by a doctor with another doctor even if the medical code system and/or the read code system changed. 185 . . . is the read code for "Impaired exercise tolerance"

The | would be a delimited character informing the computer of another piece of qualifying data. The letter t would represent free text. i.e. it would inform the computer what type of qualifying data was coming and how it should be interpreted and processed. The onset would be free text. It could, however, be a read code, e.g. time since symptom started; 1 D3 . . . .

In this case the HIC for the onset is r185 . . . |r1D3 . . . |d14/3/1999. In this way any data whether coded or any type of free text data can be classified with its exact hierarchical status The | would be a further delimited character informing the computer a further piece of qualifying data was occurring. The d would represent that the qualifying data was a date. 14/3/1999 would be the qualifying date data.

The single character after the delimited character could classify all the different types of data that were likely for the HCG. E.g. r could stand for a further read code, n for numerical data, p for patient Also if a qualifier grid was chosen for a term in the HCG which did not have a defined HIC, the nearest defined HIC will be used, even if it was a few grids previous to the qualifier grid. E.g. supposing "impaired exercise tolerance" did not have a read code defined in the HIC, the computer would then look for the next nearest defined HIC, which would be "Cardiovascular Symptoms" with 18 . . . as its read code. The computer would then automatically assign the HIC for 14/3/1999 being the onset of impaired exercise tolerance as 18 . . . |timpaired exercise tolerance|tonset|d14/3/1999. Thus every data recorded (e.g. in patient's notes) would be linked to the nearest read code (or any other authoritative medical code), thus all recorded data including free text will be analysable. Thus any data shared with other doctors would be recognisable. E.g. if a doctor wished to send another doctor information regarding a patient e.g. the onset of impaired exercise tolerance it could be sent.

pPatient NHS number (or any other unique identifier) |aDrIrvine|r185 . . . |tonset|d14/3/1999 P is the code informing the computer this is a Patient's NHS number), | delimiter for new qualifying data, a is the qualifying code to inform the computer of the author of the information.

From the above example the pattern of delimiter (|), a single character for a qualifying code and the remainder of the data until the next delimiter is one way an automatic accurate classification system can be created based on any existing hierarchical code structure and shared between different practitioners. This pattern could allow for numerous different types of data to be transmitted by having different qualifying codes for each. Standards could them be applied to the qualifying code. This could also apply, to any other hierarchical code outside the medical field. These new automatic classifications once they become standardised could then become the classification e.g. the "New" read code.

Thus every piece of information recorded would be classified according to it exact hierarchical status and easily accessible for statistical analysis.

For the existing terms with read codes, they would be recorded in an appropriate manner according to their code. The structure of recording would always to link all clinical features to a condition. Hone was not supplied the computer would allow a provisional free text description. Other linked data sources (OLD) field is the code that links the data required for the Bordergrid, other branching HCG's, Qualifier grids, and PatternClicks for the relevant highlighted item. The structure of the data source pointer for the other data grids associated with the selected element may be any method that could store data for those functions. One way to do this would be to have a recordset for the bordergrid. The bordergrid in modify mode would be a recordset with records that may have the following structure The pointer for OLD would point to another recordset in a datasource. This recordset may have records that may have the following structure.

DF for the Menu Item.

SGDC for sub grid data code. This is the code that points to any data source for the data for the recordset for the grid. Each recordset would be appropriate for the function of the grid. E.g. FC for the function code. This instructs the computer what type of menu item the FC is, and how it is to operate. The user would select from a drop down list of various alternatives. These also may be any other function that the developer wished to include for any useful function within the general program.

Other Fields. Rich Text/ordinary text fields, Multimedia data, or any other files may also be linked to the record depending on the use of the HCG. E.g. if a textbox/photo/sound/video/multimedia is needed to be shown in conjunction with a highlighted cell. To prevent slowing of the grid these other fields would normally point to the data elsewhere than the record in memory, so not to slow the HCG grid down. The data may only be displayed by a click, Zeroclick, bordergrid menu option or qualifier menu option to prevent slowing of the HCG, unless the computer system was of sufficient speed and memory capacity to store all this type of data in memory and display it with minimum delay. This type of data may be used for additional information for correct selection, implication of selection, and other user feedback. Thus this record structure if fast enough may show any form of multimedia data related to every cell of the HCG, in addition to the normal subdata of the HCG. This may provide any Zeroclick with suitable multimedia data so that all additional information required precise knowledge about a function to be activated, and/or its implication may be made known prior to the completion and even after the completion of the function (telling the user the full consequences of having trigger the function) so that the user is fully informed.

Variation of the design of the data structure to achieve the above functionality of the HCG. The fields could vary per record to run this data. The user could add more fields to subdivide the sections e.g. the OLD field or could use one field for a pointer or pointers for several of the fields described above. Thus a variety of data implementations could be done to achieve the above functionality depending on developer preference to drive the data and functionality of the HCG grid specific for the developer's need.

How the structure works to allow the creation and modification of the HCG. How to achieve the design of the HCG where user can freely modify and change the hierarchical order of the data within a HCG structure based on a known classification system. One way to achieve the HCG is shown below by an example with the read code.

E.g. the read code is a known medical classification system, which currently has five characters to indicate the hierarchical classification of most medical terms in relationship to the Read Code structure. A medical term (term, term_30 characters long, term_60 characters long) would be visible in the OF. The read code would be in the HIC field. Normally when a term is highlighted, the HCG would use this code in the HIC field to search for sub data related to it and show it in the grid to the right of the grid in focus. Thus provided the UDC field was empty and there was a read code in the HIC field then this would be the default action of the grid. If the UDC in a record had a defined user defined code as well as a defined code in the HIC field then the HCG when searching for the relevant derivative sub data for the subdata grid of an element in focus would use the code in the UDC field to look for the user defined recordset. The HCG uses this UDC to search for the relevant subdata for that highlighted record. This UDC may point to any datasource that the user chooses e.g. in files, databases, delimited text etc (i.e. and structured data source that could generate a recordset/array with the appropriate recordset structure). One example, of the UDC would be a delimited text file. This has the advantage that it may be sent as an attachment by email and dropped into a relevant directory so that the program may read the filename as a UDC in this directory. Thus by email the HCG may be continuously kept up to date in background mode.

If the given record had both the HIC and UDC field empty then it would rely on the LIC code. Recording of data. The data recorded could be just the DF. However, the data recorded would normally be associated with a HIC code.

Thus when a user recorded data from the HCG the DF and the HIC of the record would normally be recorded.

If the HIC was empty, and the record had no definition code in the HIC, the computer would create a HIC based on the nearest defined HIC. This automatic classification code generated by the computer (explained in a previous section) would normally be recorded along with the term within the DF. Thus the exact hierarchical status of every item recorded in the HCG will be known and comparable to any other using the same HIC codes in their HCG.

How users could share UDC data for a HCG.—The HCG would have a mechanism for sharing UDC data from other sources automatically. It could be shared on a temporary basis to try out and/or it could be shared on a permanent basis. It could either overwrite existing UDC data or be added on as a new UDC data. This can be done in many ways. One way would be by using the above delimiter, qualifying code, qualifying data structure for the recordset file. The HCG would be able to automatically search for this file (in two different directories, one designated for temporary the other for permanent data) and be able to tell by the filename classified according to the above structure exactly which data element and in what manner (qualifier grid/bordergrid/pattern/click) the user wished this recordset (HCG) to be added. E.g. if a doctor wished to share a HCG qualifying grid linked to a particular cell in the HCG, the HCG would be able to automatically add this as a temporary addition to the bordergrid/patternclick/qualifier grid or add it as a permanent addition due to the bordergrids allowing multiple HCGs originating from a single term with an associated HIC (eg a read code). Then allowing the user to add a grid relevant to any HIC would be very easy. The grid data could be in a recordset which was a *.dat file. The name of the *.dat file would be listed with the a name in the following pattern. It would begin with the HIC (e.g. read code) that it should be linked to as a menu item of a bordergrid. There would be a delimiter after that code. Then there would be further qualifier if relevant.

| Derived field | Delimiter | Qualifier code | Qualifier | Delimiter |
|---|---|---|---|---|
| This is the HIC that the Recordset would Be part of the Bordergrid or Qualifier grid | | This may be Single character It represents the Type of data The qualifier is | | |
| e.g. Read Code | \| | A | | Authors Name\| |

e.g. Read Code |A Authors Name |r185|aDrIrvine|bDr Irvine's special grid for impaired exercise tolerance|d1-1-2000 r stands for read code 185 is the read code for impaired exercise tolerance. Note—Its full stops have been removed due to not being compatible with the file structure. HIC will automatically be adjusted to be compatible with the file structure. | is the delimiter a is author's name Dr Irvine is the author of the additional menu to be shared | is another delimiter b means that this should be added as a bordergrid item to the element with the read code 185. Dr Irvine's special grid for impaired exercise tolerance is the menu item of the bordergrid—in reality it would be a shorter name!

| is another delimiter d is the date d1-1-2000 was when this was authored. If this is absent it could be the date of the file. The computer will automatically make sure the filename uses delimiters and characters that are compatible with the filename structure for that operating system. The above are just examples as is the qualifier code listed below. Using this descriptive system, data could be downloaded automatically from any other user over the web or emailed as an attached file from a source to the appropriate directory, which would not require any user delay, and integrated instantly into the HCG. There are some examples of possible qualifier codes. This in reality may be much more carefully structured using the entire ASCII range of characters, or if needed later two character or more characters could become this standard.

| Qualifier Code | | |
|---|---|---|
| A | Author's Name | |
| B | Bordergrid Menu Item Description | |
| C | Cost | |
| D | Date | |
| E | Effectiveness | |
| F | | |
| G | | |
| H | | |
| I | Improvement | |
| J | | |
| K | | |
| L | | |
| M | Management Change | |
| N | Numerical Data | |
| • | Qualifier Menu Item Description P | Prognosis Q |
| R | Read Code | |
| S | Same | |
| T | Text Data | |
| U | Units | |
| V | | |
| W | Worsen | |

Thus this ability of the HCG to have an option for filenames within a directory to add multiple qualifier grids for one disease or read code, and that these files may be sent via downloaded or attached email files to temporary or permanent directories means that the web or gpnet may constantly be updating the local computer in background while the doctor is working (or files for any other subject or profession may be continuously updating). The filenames downloaded to the directory providing they do not have the exact same filename means that multiple subdata qualifier grids may be added to a bordergrid for a particular read code. If filenames are sent by the same organisation or person, and have the same title, then the HCG when searching the directory may just show the most up to date qualifier grid for that particular condition. An example of the power of this HCG structure may be seen in the clinical section under adding new data.

Clinical Use of the existing, data as a structure for recording of new data.

If a user wishes to build a hierarchical cascading grid rapidly, then the following options for doing this are:

1. Importing any known method of representing hierarchical data. e.g. databases with codes representing their hierarchical structure, any outline method used with word processing, any patterned text method which could be converted into a HCG structure. The grid would then have an import routine which allowed the converting of this hierarchical data into the HCG structure.

2. In the modify mode there could be the opportunity of two or more grids to be visible. One would be the grid the user wished to create and the other the grid that the user wished to add hierarchical data from. The user may then drag cells or use zeroclicks in the source cell and receive cell or any other method to add data to the new grid. The drag and drop or zeroclicks may enable the user to have the control of adding entire sub data cascading hierarchical grids by just moving one element. Or the user may have the ability to choose exactly the depth of cascading grids (i.e. the number of sub data grids) that the user wished to add.

3. The user would be able to drag and drop or use zeroclicks from the source and receive cell for any highlighted text. In the absence of the text having the appropriate clipboard delimited format (that the new grid would recognise and subdivide into the record format of that HCG)

then the user may be able to construct a grid using just pasted text which would be placed in the DF. The HIC and UDC fields would be empty. But the program would automatically assign that row/cell of DF data a LIC. The user can also paste data into a subdata grid for a highlighted element of a grid. This may be done using the bordergrid (or qualifier grid) for that highlighted element having a menu item allowing the option of adding a sub data grid. Zeroclicking or “clicking” this menu item will add the subdata grid for that highlighted element. Elements may be dragged to this grid. The program will generate all necessary LIC to maintain the new hierarchical structure.

4. The user can move any row of data to any other position on the grid. If all the HIC fields and UDC fields were empty then the LIC would control the grid. If there were HIC fields defined and controlling the sub data grids then the computer would automatically create a UDC for the row of data that would generate the appearance of the grid to which the row of data was moved.

5. The hierarchical grid would have the ability in modify mode to add, delete, modify all of the data fields associated with that record using the normal pointer and arrow movement. Additional keyboard functions may also allow movement of the cells. Drag and drop or zeroclicks in the source cell and receive cell may be used for moving the cells around the HCG. Editing functions for each cell may be added by a border grid menu items.

6. Adding a Border grid, other branching HCGs (Qualifier grid), and PatternClick for each highlighted item is done in modify mode by activating a border grid for that relevant highlighted item. Moving over an unlabelled menu item of a border grid gives the user further bordergrid options of adding or importing a new bordergrid item, a new qualifier grid, or a new patternclick. Then the user enters the descriptive name for the grid which appears as a menu item for the bordergrid. If the user has selected adding a new grid then the user can use drag and drop, or direct grid editing to create the rows of the grid and further subdata grids for that grid. If the user imports a previous created grid stored as a file on the hard drive, all is needed is to select the descriptive name. If the user moves over a bordergrid menu item already entered, by using a bordergrid mechanism for that menu item the user has the option to modify that grid. For a patternclick the user adds a descriptive term, then clicks/Zeroclicks the relevant selection from the subdata grid. The first patternclick created using this bordergrid mechanism will be the default patternclick. In the same way the first qualifier grid created will also be the default qualifier grid.

Additional Techniques to Increase Data Input Speeds Illustrated by a Specific Application in Medical Recording (but these Features May be Appropriately Transposed to be Used in Other Data Recording Applications)

To provide an electronic record of any data requires a data entry method (recording of data) and a data display method. The methods that the medical system highlights is defined by another term called proximity software design. Proximity software design (PSD) is using the Zeroclick methods in an application to achieve the minimal amount of pointer movement to achieve the maximum amount of functionality for the given control area for its given functions. The PSD tries to provide the functionality to any control area in a HCG bordergrid (this is a bordergrid menu which has menu items which cause relevant subdata grids to appear for that specific grid menu item by moving the pointer over that item). Through this structure the commonest and/or the most logical used functions can be ordered closest to the control area in the hierarchical grid (i.e. on the first bordergrid menu) and radiate out to the more uncommon functions. The bordergrid just as the HCG can have a click and/or a Zeroclick to activate a function on a highlighted bordergrid menu item while also displaying a subdata grid to that bordergrid menu item.

This medical program shows the following Zeroclick methods.

It shows the following techniques in a medical application. The medical application is chosen because it is essential that information is rapidly (large workload and delay in treatment may cause death) and accurately recorded (inaccurate data may cause death). Thus if the Zeroclick methods may be effective in this program then they will have credibility in all other commercial programs. In Britain doctors may have to record accurately three or four medical complaints within a five minute period, as well as examine the patient. The doctor therefore requires access to the existing patient medical information to be presented in the most efficient manner possible and be able to rapidly move from different complaints and to find the precise medical information possible for each complaint and then use that information to record further changes in clinical data and further management of the patient.

Figure 52:
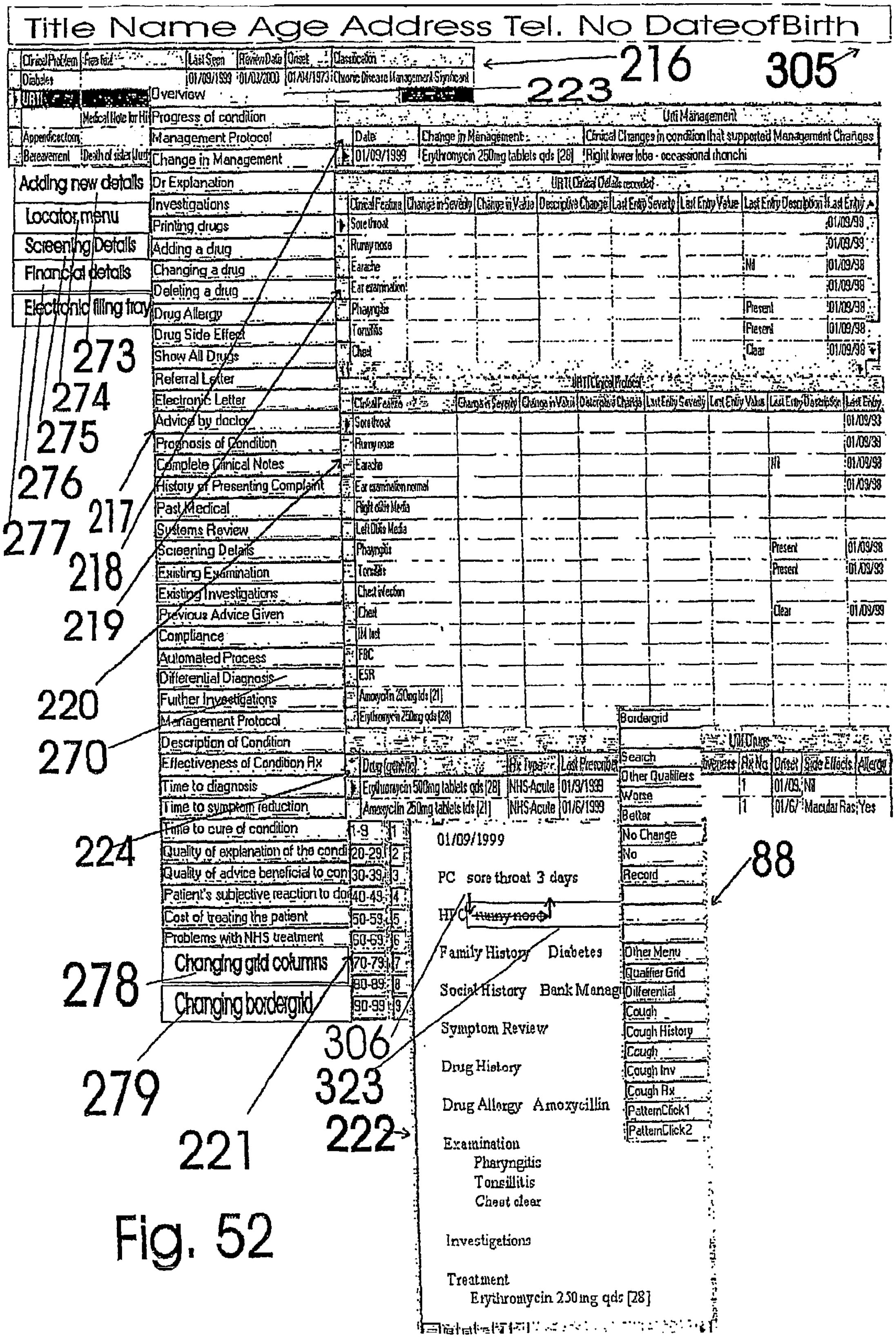

FIG. 52 shows a patient’s record. The following explanation of the different components of the patient’s record explain how to achieve this display and recording of this information.

The demographic data is located in area 305 in FIG. 52. Moving the pointer to this area 305 (or zeroclicking the area if preferred) enables a bordergrid to the right of this area to edit and change the demographic field order and arrangement in this area. The user may also arrange a small line of demographic data, which expands to show the entire demographic data if the user moves the pointer over the demographic area or zeroclicks the demographic data.

Figure 53:
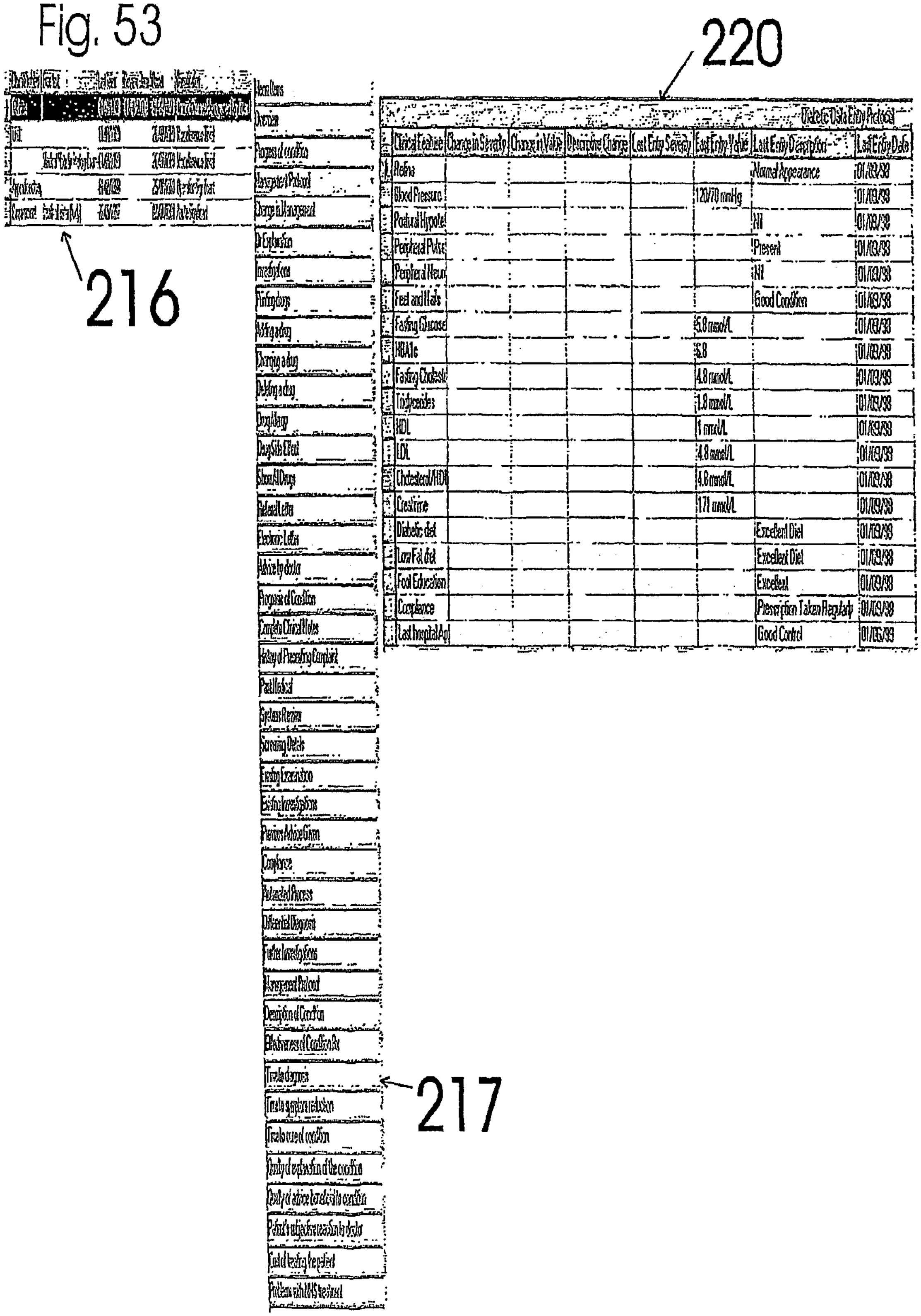
Figure 54:
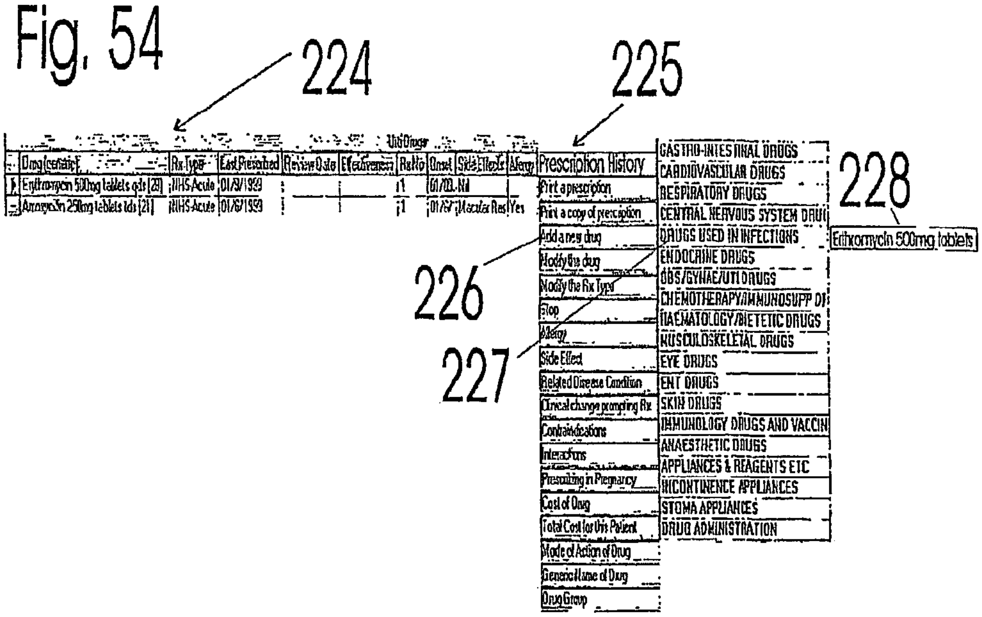
Figure 55:
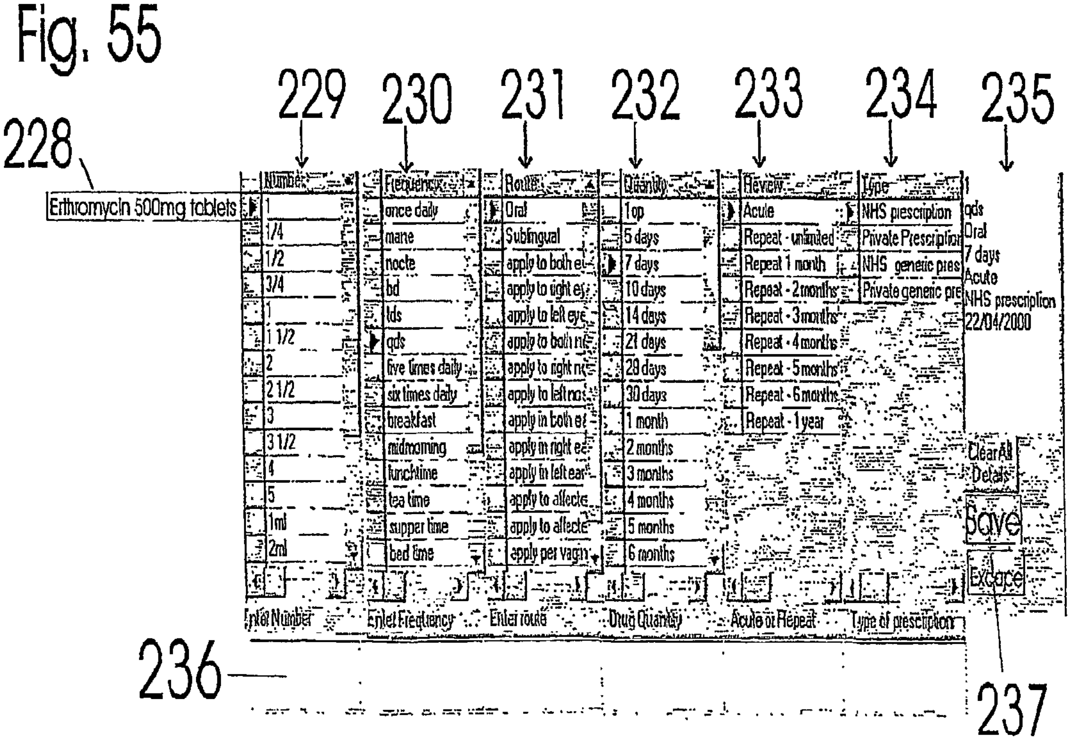

The disease grid or conditions grid 216. The doctor may then by moving the pointer over the different conditions highlight all the information relevant to the selected condition by the pointer being over that row, so the doctor may get a comprehensive summary of that condition and its management (e.g. the pointer moving over the condition URTI highlights the comprehensive summary or overview of the patient’s clinical details and management of that condition—this is illustrated by FIG. 52). Thus by moving over URTI the qualifier 217 of FIG. 52 or the bordergrid 217 of FIG. 53 appears set on the general overview appearance, the management grid 218, the clinical details 219, the clinical protocol grid 220, the drug grid 224, and the clinical history notes 222 related to the condition highlighted in the condition grid 216 (URTI in this example). The preferred position of the clinical history notes 222 would be underneath the condition grid 216. This will allow the maximum use of space for the clinical history 222. The condition’s bordergrid 217 located on the right border of the conditions grid 216 is shown in FIG. 53. A further list describing some of the important features of this bordergrid is listed in table form in FIG. 60 *a* & FIG. 60 *b*. Thus at a glance the doctor may know the following information regarding any condition of a particular patient by a single movement of the pointer over the row containing the condition in the condition grid 216. With the default setting, the conditions will be listed according to when last seen, with the last seen at the top, the required review date, the onset of the condition and the classification of the condition. The default setting of the bordergrid would be the overview 223, which would show the following the grids listed, above as the comprehensive summary.

The management grid 218 list the management steps that have been performed, the date they were done and the clinical features that supported this action. The default setting would be listing the last management step for the condition first but this may be reversed to a chronological manner by the bordergrid for the management grid to the right of this grid.

The clinical details grid 219 lists the entire range of clinical details that has been recorded for this condition, noting the date of the last entry and a more detailed description or history of the presenting complaint. (HPC) of the given clinical feature. These clinical features may be positive and relevant negative history, examination and investigation results. The clinical details grid would normally just show the last recorded detail of the symptom. By moving over the last entry date with the pointer for any given symptom, the complete listing of that symptom with its full HPC in chronological or reverse date order would appear in a grid format, with the top of the grid one row below the row of clinical feature. This would remain as long as the pointer was in the last entry column, and the user may make this grid disappear by moving the pointer to the Last Entry Description. If there is a detailed last entry description of the feature then this may be expanded so that the full HPC of the clinical feature may be seen. The program will automatically summarise whether this clinical feature has got better or worse. It will also indicate whether that clinical change occurred during a new management step. Thus the last entry description allows the clinical program to assess how that particular clinical feature has changed in relationship to time and in relationship to the medication or any management steps (advice or referral). The program if needed could also measure the degree of improvement or worsening compared to the medical resources used (doctor's time, cost of medication or other management steps) as an additional summary at the bottom of the clinical summary. Thus the medical effectiveness and cost effectiveness of the management may be known for every symptom. The pointer moving over the clinical feature may allow rapid recording of how this has changed. The movement of the pointer over the relevant change in severity, change in value, descriptive change column for the given clinical feature row will enable the doctor to rapidly ask the patient and record the changes to the clinical features that was associated with the condition.

This is done by the top of a relevant change grid automatically appearing one row lower, and the left hand corner of the change grid approximately 1 cm to the left of the right border of the column for the row that the pointer is in. This allows the user a diagonal south east movement of the pointer to gain focus of the change grid (the change grid may be positioned in relation to the highlighted column of the row in a similar manner requiring diagonal pointer movement north east, south west, north west of the cell in focus if developer prefers). The appearance of the change grid will vary depending on the cell that the pointer is over and consequently highlighted.

The change in severity column will generate a change grid with the appearance of bordergrid 88 with entries similar to 75,74,73. The descriptive terms of getting better or worse or no change would be tailored exactly to the clinical feature and would be an accurate graduation of whether that clinical feature was getting better or worse. Thus the user would just need to move over the change in severity for a given clinical feature and move to the change grid in a diagonal fashion with the pointer movement passing directly from the highlighted cell to the change grid. Then the user would just need to zeroclick the appropriate change (e.g. getting better). This would then automatically record the change of clinical feature, the change of severity of it, and the current date with a single zeroclick or click. If it were a value then a numerical grid would appear in a similar relationship to the value cell of the clinical feature, and the user would use the numerical grid 54 to enter the value of the clinical feature by zeroclicking the appropriate entries. Likewise if there was a descriptive change regarding the clinical feature, then a qualifier grid like 193 in FIG. 47 would appear except the heading would be the relevant clinical feature. In addition to the various relevant descriptive menu items shown in history grid 193 there would boa lower case alphabet 25 menu item, which, if the pointer moves over generates a character grid 27 to the right of the highlighted cell so free text may be entered. Thus the doctor may be given all the range of descriptive terms relevant for a clinical feature, in addition if the appropriate term was not present, then the doctor may enter free text for the entry. This free text would automatically be classified to the nearest read code or other appropriate medical classification and thus be fully statistically analysable.

The clinical protocol grid 220 functions identically to the clinical features grid. However, the clinical protocol clinical features are generated by the program so that if the doctor checks all these features (history, examination, investigations) then, as best as clinical evidence based medicine can provide, the clinical protocol grid will be suggesting all the correct management steps to confirm the diagnosis and have all the relevant clinical features to base management on the best evidence based medicine. Moving over the clinical feature column for the particular clinical feature, will enable a grid to appear with a similar location relative to the highlighted cell that will enable the doctor to zeroclick the relevant test required and medical treatment. The bordergrid will also give the doctor the option to print out these tests and prescriptions after the correct ones have been selected. The action of this grid would include additional information provided to the user when the user enters data and/or and or is about to enter data. As clinical features and their details are added there would be an option for the grid to show the differential diagnosis and the management according to the specific clinical features grouped for the given condition (but the program will also be watching the total clinical features of the patient to check that another diagnosis is not being missed, and other management steps are not being considered). The differential diagnosis will be based on probability. For every clinical feature the program would have a probability of any given differential diagnosis according to incidence of that clinical feature for the given demographic features of that the patient data. This would then be weighted by the syndrome data, i.e. the combination of features that equal a different diagnosis. This would then influence the original differential diagnosis for the individual clinical features. Then there would be clinical, features that automatically mean a specific diagnosis. This will further weight the diagnostic information. The medical management will then be based on the most likely diagnosis, and the appropriate best evidence based medicine for that series of symptoms for that given condition. This will be gathered from medical guidelines based on evidence based medicine. Unfortunately this evidence based medicine is often based on meta analysis which is based on assumptions which may be inaccurate. Thus the most important feature is that the recording mechanism keeps accurate records. This is achieved by the clinical feature or the protocol grid suggesting all important clinical features and their changes that need to be documented, and providing a mechanism for this, and for all information to be recorded hierarchically so that even free text may be analysed to the nearest read code. The protocol grids will suggest the best treatment. However, the program if used on a large enough population will be using all the data of all the patients using the system to come to its own conclusion regarding the effectiveness of given medication. It will be checking whether this information is actually accurate according to the population who have been treated with that given management. Thus if this information was collated for a whole population of a country, this medical recording would rapidly produce its own conclusion regarding the effectiveness of any given treatment, and would be a much more accurate source of information than clinical trials. This program will minimize the doctor's essential recording task to just document the changes in clinical features of all given patients, and the management each patient was on. The program from this information may calculate whether any drugs or any combination of drugs are effective for any given condition. This then leads to a revised protocol, revised differential diagnosis, and revised management according to the new data.

Thus the ability for the program to easily transmit better protocols for given conditions is very important, and for these protocols to be integrated and upgrade the old protocols for given conditions is very important, as medical management is constantly changing in the light of new clinical evidence. The medical program has a very rapid way that a non programmer may devise a protocol. Thus non technical doctors may use a word processor in outline mode to describe the clinical history 242, significant history features 243, examination features 244, specific o/c findings 245, investigations 246, and specific investigation 247, management 248 and specific management protocols 249. The outline mode also will enable the doctors to emphasize different differential diagnosis for given clinical features or combination of clinical features and the appropriate management for these clinical features or changes of clinical features on given treatment. These protocols when devised by an authoritative source may then be shared and become the new standard for treating that condition. As described already the HCG enables email or downloading of files to a certain directory which the filename enables these downloaded data files to be listed in the appropriate bordergrid of the HCG for specific read code terms. The filename of the data files for the specific term allow the grid to be given a title for the downloaded file to show in the relevant bordergrid for the specific read code, and it also will inform the user who has sent the downloaded file. The bordergrid default mechanism will automatically show the latest date/time stamp file from each author, and the user may select only to display downloaded files from certain authors. This date/time stamp ensures that every file for every downloaded file is unique and thus may be backed up. Encryption and data security codes will enable the program to verify that the downloaded filename is from an authentic source before it uses (or removes) the file.

FIG. 61 shows an alternative management protocol which the doctor may include as another HCG in the overview picture or which may be accessed by the condition bordergrid 217 menu item "Management Protocol." This will then lead to a HCG similar to FIG. 61 appearing from the bordergrid. It will list disease conditions 241 from specialities 240. These conditions for given specialities may be generated by downloaded or emailed files from the web in a certain directory in addition to the original data structure of HCG. Thus they may be constantly updated by the web. The conditions in this management protocol are then organised into a sequential HCG. This is in addition to the option of the doctor adding new data by having information organised in the conventional hierarchical structure of the read codes. In other words the data is not hierarchical but rather a sequential sequence of grids on a related subject, and consequentially by moving from left to right (or whatever the preferred direction) the user may have the reassurance that no step or information is missed, and all relevant information is recorded in the correct sequence. This is a very powerful use of the HCG structure because it is educational, comprehensive, very efficient as it only requires movement from left to right to record multiple entries (if additional entries are required for each grid these may be zeroclicked in the appropriate grid in addition to the one automatically recorded by moving to the next grid (right in left to right sequence) and also may guarantee the doctor acts to an agreed protocol without error if used properly as a correct recording method E.g. to ensure the correct management for any given condition, or clinical feature in a speciality, the doctor would have to ensure that the appropriate history 242, the significant history questions 243, the examination 244, and significant O/E findings 245, investigations 246, specific investigations 247, management 248 and specific management 249 are recorded. Thus using a sequential grid the doctor need not miss any important feature and if he uses it properly from left to right, no important features need to be missed according to the highest medical standard known. As the doctor selects a certain clinical feature e.g. chest pain (highlighted in 241), the program automatically presents a differential diagnosis 252 and management 253 for the condition. The differential diagnosis and management may alter as clinical features are recorded or the pointer moves over new features (if the computer is fast enough). This enables the doctor to see the diagnosis and management implications of recording any clinical features before even recording them. As clinical features are added the differential diagnosis is changing, and the diagnosis with the highest probability wilt be listed first. The management gives general advice, and may give advice or treatment taking into account all the relevant and other clinical features of the patient. These management pathways may be generated by non computer technical doctors, and as these management pathways are developed more and more accurately for all given conditions the protocols on the medical program will reflect the highest known standard of care. FIG. 61 shows chest pain 251 being recorded in the history textbox 255 AND shows further details being added. It is as this data is added the diagnosis 252 and management 253 grids are altered to suit the exact clinical picture of the patient. If the doctor moves over the differential diagnosis 252 grid, then a bordergrid or qualifier grid for each diagnosis may appear. This would provide a complete comprehensive text book description of each of these conditions providing the comprehensive medical background, clinical features and management of each of these conditions, with any appropriate multimedia files. This is illustrated by FIG. 70. Assuming the pointer moves over the differential diagnosis grid 252 menu item 1. MI (heart attack to the lay person), FIG. 70 gives an example of the additional information generated. It shows a grid listing incidence, symptoms etc from the pointer movement over the entry. By further moving over the incidence a further right grid in FIG. 71 appears. In the same way moving over the symptoms cell makes grid in FIG. 72 appear. Moving the pointer over the signs cell similarly causes grid in FIG. 73 TOappear. Moving the pointer over the investigation menu item similarly causes the grid in FIG. 74 to appear. Moving the pointer over the management menu item similarly causes the grid in FIG. 75 to appear. Each item of information will be broken down to a single item of information e.g. a single clinical so the information may be a useful symptom or pattern of symptoms to record. So as the doctor is being educated, he may use any of the information received to record further data, investigations or management for the particular patient from the information he is reading. Because the HCG may be constantly updated with information specific to any read code, he has full confidence that the information regarding this condition is up to date. Indeed the downloaded filenames updating information regarding the specific read code may be accessed in the text book information under a heading or similar heading of medical management updates for this condition from the web. Similarly, if the user moves over the management section 253, then if there is a specific management recommended, if the user moves over that item, all the relevant information regarding the management step would be presented. Thus if an antibiotic was mentioned in the management grid 253, moving the pointer over that antibiotic would further list all-text book information regarding it, mode of action, side effects, cautions. It would then supply all the reference to its effectiveness of a treatment in a concise form, then hierarchically allow the user to view relevant trial papers if necessary. There would also be another bordergrid option which would assess the suitability of the drug for the patient's condition, and other options for the doctor to prescribe the treatment for the patient, e.g. if a drug needed to be prescribed the further qualifying information may be added by the sequential grid shown in FIGS. 54 and 55. The bordergrid of this would allow for the doctor to print the treatment. In addition the management section of the program would analyse the clinical-entries, demographic details of the patient and effects of previous management to see if that management was suitable for the given patient. (e.g. interaction, contraindication, etc from the patient's file). In short for any patient with any clinical features, the standard of information presented to the doctor would be the highest known standard, as recently updated by the web (thus information need not be more than a few minutes old) The doctor would very rarely need to write free text because the relevant information for him to ask and collect (examine and investigate) from the patient will be prompted before he has thought comprehensively of it. If he needs any further detailed information the hierarchical structure will allow him to access any new data.

The clinical history grid 222 allows the doctor to write notes in the conventional paragraph manner. The information in this grid would be presented in a traditional medical history pattern (e.g. Hutchinson's clinical methods), of history, examination, investigation, differential diagnosis, provisional diagnosis, and progress of the condition, with reference to the specific features related to the condition. This clinical history grid may be in chronological order, or reverse chronological order listing the latest entry (for most doctors this would be the preferred method.) The page locator 221 would allow the doctor to rapidly move to any page. It would work in the standard HCG method (i.e. pointer movement over 1-9 shows the page numbers 1-9 in the next grid and moving over the appropriate page number e.g. 1 shows the first page. Moving the pointer hack to the upper left margin of the page enables the page locator grid 221 to reappear and the doctor to select another page. Although the notes would be recorded in traditional format, every individual word or groups of words (condition, grouped management) would be enabled to be highlighted when the pointer moved over them and performed a ZeroClick (306 in FIG. 68, and the same zeroclick in FIG. 52). This is in essence a combination of three directional zeroclick over an invisible control area 1 which would be the word or phrase in addition to the space either side of the word. Any zeroclick may be used instead of this triple directional zeroclick to activate the bordergrid. Thus the normal editing functions of the text box may be retained but by using the zeroclick method the doctor would be able to use all the recorded information, via a bordergrid to record new information regarding that highlighted clinical feature or management step. (e.g. moving over runny nose, a bordergrid would appear enabling all related information regarding the change of the runny nose, to recording any of the associated symptoms, investigations and treatment for the URTI (in the bordergrid 88 in FIG. 52, the word cough should be replaced by runny nose) Thus by the doctor reading the notes in the conventional manner, he may also use all the details to record any further changes of the condition, and prescribe drugs by just highlighting the relevant drug and accessing the normal bordergrid that would have been associated with drug grid 224. As is the common pattern, there would be a bordergrid for the clinical history grid on the right hand side of the clinical history grid 222. The bordergrid would allow the doctor to print all known variations of the data stored in the clinical database (different referral letters, standard hospital clerking, insurance medicals and reports etc) and would be able to design their own layout of letters and information. If there was a referral necessary, there would be a HCG grid listing hospitals, specialities, then the consultants' names under the hospital, and then type or referral letter to sent to the consultant. The doctor may then zeroclick or type in a few words of information why the referral was necessary, and then the program would order the entire data of the patient's notes around that referral. Thus a comprehensive referral letter would only take a few seconds to write, and it may be printed, or sent by the web/GP net. If sent electronically the doctor at the hospital may combine his electronic record with GP's record, without losing data or duplicating data as each piece of clinical feature, their changes, and every management step for a patient is transmitted as a hierarchical classified piece of data, which is time stamped, related to a doctor/surgery.

The drug grid 224 provides the doctor with the drug and its details, type of prescription e.g. acute or repeat, NHS or private, last prescription date, the effectiveness of the drug (the program automatically assesses the change of clinical features since the start of treatment, and highlights the clinical changes due to this drug which may be related to efficacy or lack of it. Consequently as long as the doctor records the clinical features and their changes accurately the program is constantly assessing effectiveness of management), Rx No is the number of prescriptions (moving over this column gives the details of the prescriptions in a grid with a location and access similar to that described in the change grid in the clinical details grid 219), onset, side effects (moving over this column for a specific drug allows the doctor to see all the new clinical features or change of features since starting the drug and select a clinical feature which then may be described as a side effect). The bordergrid for the drug grid is shown in 225. This is the menu items for the selected drug that the pointer passed through the right border of the grid. The bordergrid enables the printing, printing a copy, modifying the drug, seeing the details of previous prescribing recording an allergic reaction of the drug, recording side effects, recording effectiveness by selecting the clinical changes related to the drug, and providing comprehensive information regarding the drug e.g, indications, contraindication, interactions, prescribing in pregnancy, cost of the drug, mode of action, generic name etc. It also allows the adding of new drugs, and may show the total number of current drugs, and previous drugs, (these menu items are not shown) that the patient has been prescribed. If the user moves the pointer over the menu item providing information, it may either open a further qualifier grid in the form of a HCG or it may present the information in text form in a text window which then would have the relevant word or phrases useful to record accessible as described in the clinical history grid, via a bordergrid for each word or phrase. These two methods of data presentation may be used as the right hand grid for any bordergrid menu item that provides additional information regarding its given subject. Multimedia files (animation, video, sound, pictures) may also be shown in the right hand grid space or elsewhere on the screen to illustrate the information in the most effective manner.

To add a new drug the pointer would be moved horizontally across from "add a new drug"226, across "drugs used in infections" and out of a list (not shown) "Erythromycin 500 mg tablets" would be selected. Then a sequential HCG grid is used where related qualities of a particular description of a certain process is arranged in a left to right sequence, e.g. number 229, frequency 230, route 231, quantity 232, review 233, type of prescription 234. Thus by completing a horizontal movement across, the six descriptive features necessary for a GP to qualify the drug is recorded by a single zeroclick at the end. 236 allows free text to be added per feature via a character grid appearing underneath. If the user preferred there would also be the ability to search for a particular drug using the HCG search facility described with the find icon, thus by a text search the exact hierarchical data of the drug would be found.

The adding of new details 273 may be done using the traditional HCG or the management protocol method FIG. 61 as already described. The user may also use the find icon method of the HCG to find the particular term searched for by text search in its hierarchical location.

Full implementation of the user feedback principle of providing the user with full information regarding the significance of activating a particular function, and the ability to reverse that function Thus as previously described, as information is being recorded or even about to be recorded the program is constantly providing user feedback of the significance of recording that data. It will use all the stored data, and correct management protocols to feed back appropriate diagnostic and management steps to the doctor. The user may quickly undo that function in the location that the zeroclick was done (e.g. a second zeroclick to remove data in the HCG).

Zeroclick Features Illustrated by the Medical Program

1 When recording changes in clinical data, the Zeroclick methods may provide the full implications of the change in clinical data with reference to diagnosis and management. The range of differential diagnosis may be changed, the order of the differential diagnosis may be changed (if ordered on probability), the range of medical management (information, advice, investigations, procedures, medicines, operations etc) may be changed, the order of the management may be changed (i.e. evidence based medicine may suggest a different management order precisely tailored to the patient's condition), the prognosis may be changed. The analysis may be based on analysing the details tinder a single condition or all conditions.

2 The Zeroclick Method Would allow the doctor to the change in data in the vicinity of the selection of the data.

3. The doctor may move over additional data to get further information or use that data as a means of recording further information for the patient.

4. The presentation of data may be tailored to the user's feedback needs. The data display for recorded data may reflect the user's preference. The list of data categorised by column in the multi columned grid may be adjusted. The data shown by the bordergrid items may be adjusted. The date may be adjusted to be chronological. The grid's and bordergrid's behaviour of expanding and contracting in size may be adjusted to maximise the effectiveness of multiple zeroclicks being activated. The user may switch on or off the zeroclick, and the controls may behave with normal point and click functionality. This allows the user to train with the zeroclick, and get used to the functionality in their own time.

5. All other functions that may be implied by selection of data may prompt the user for that function or automatically perform the function.

6. Multiple functions may be triggered by one movement to provide the necessary information for the correct Zeroclick to be performed.

7. The flexible update structure of the HCG allows continuous updates of information from the web by email in background. Thus the information on the local computer is continuously kept up to date and accurate with no time lag in the Zeroclick method.

8. Necessary user defined/programmer controls to increase the efficiency of Zeroclick programming These grids show an important principle with zeroclick programming with multiple zeroclick controls. Care is need in planning Once the pointer moves from the condition grid, to the condition bordergrid to e.g. the in grid, the principle that applies is the highlighted grid should expand to the maximum useful size so that the doctor may see the full functionality of that grid. However, the other grids should decrease in size to the extent that they do not obstruct the pointer accessing any other zeroclick grid or control, but not shrink to such an extent that the maximal information should be achieved by the appropriate showing of information from each grid, to have quick access and a knowledge of the important information from each of the grids. Thus as the pointer moves from management grid to clinical grid to clinical protocol grid, the sizes of the relative grids may be constantly changing to give the optimum performance of each of the grids but also maximizing the information from the other grid. All this shrink and expand grid functionality may be programmed by the appropriate bordergrid so that the optimum balance is achieved for the given user. Thus the bordergrids may have controls for grids and bordergrid rules for expanding and contracting, bordergrids shrinking to move out of the way, constant resizing of grids when moving over them. The bordergrids allow the user to adjust the columns for each grid, how the columns respond, and the order that the information is displayed in the grids and the functions accessed by each bordergrid for each grid.

BACKGROUND

Figure 46:
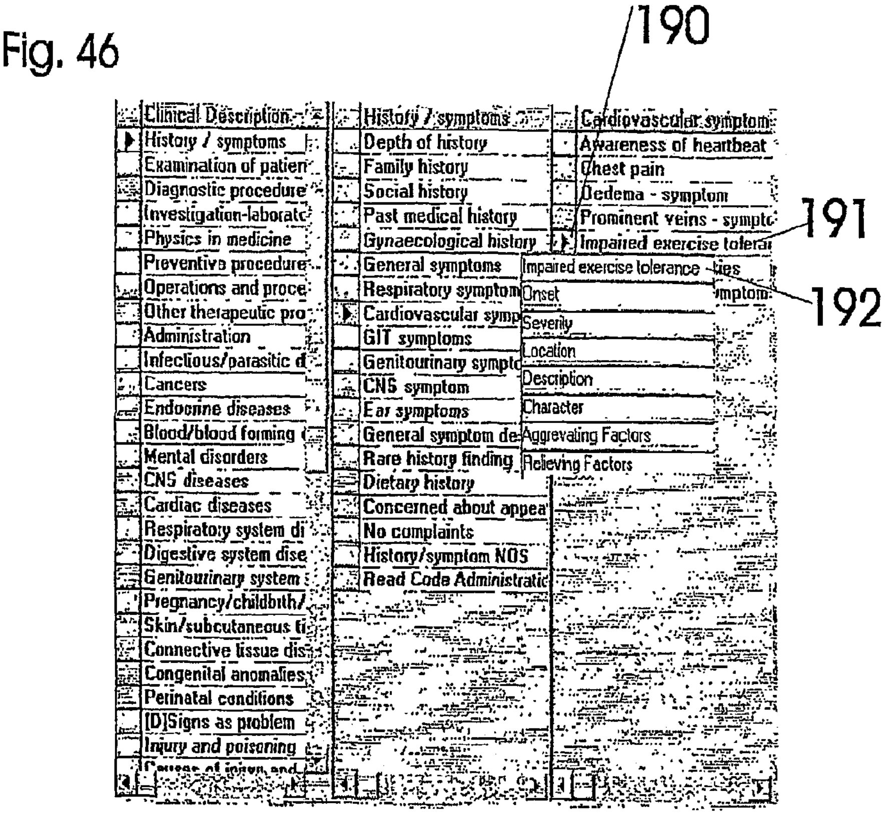
Figure 47:
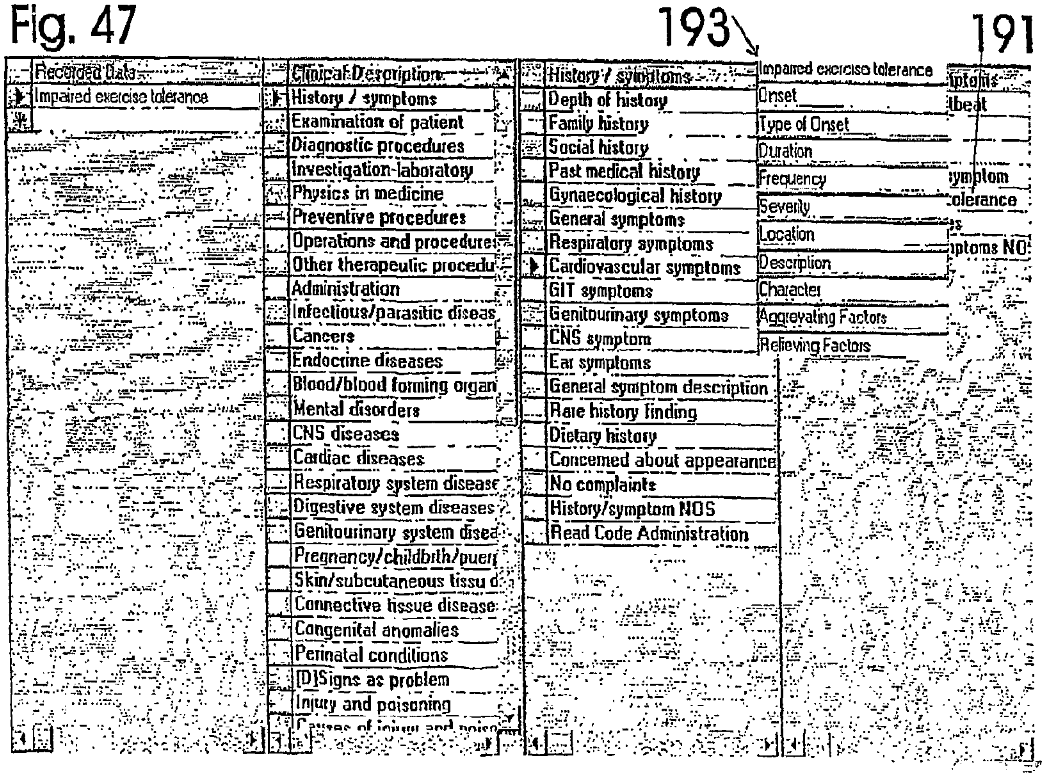
Figure 56:
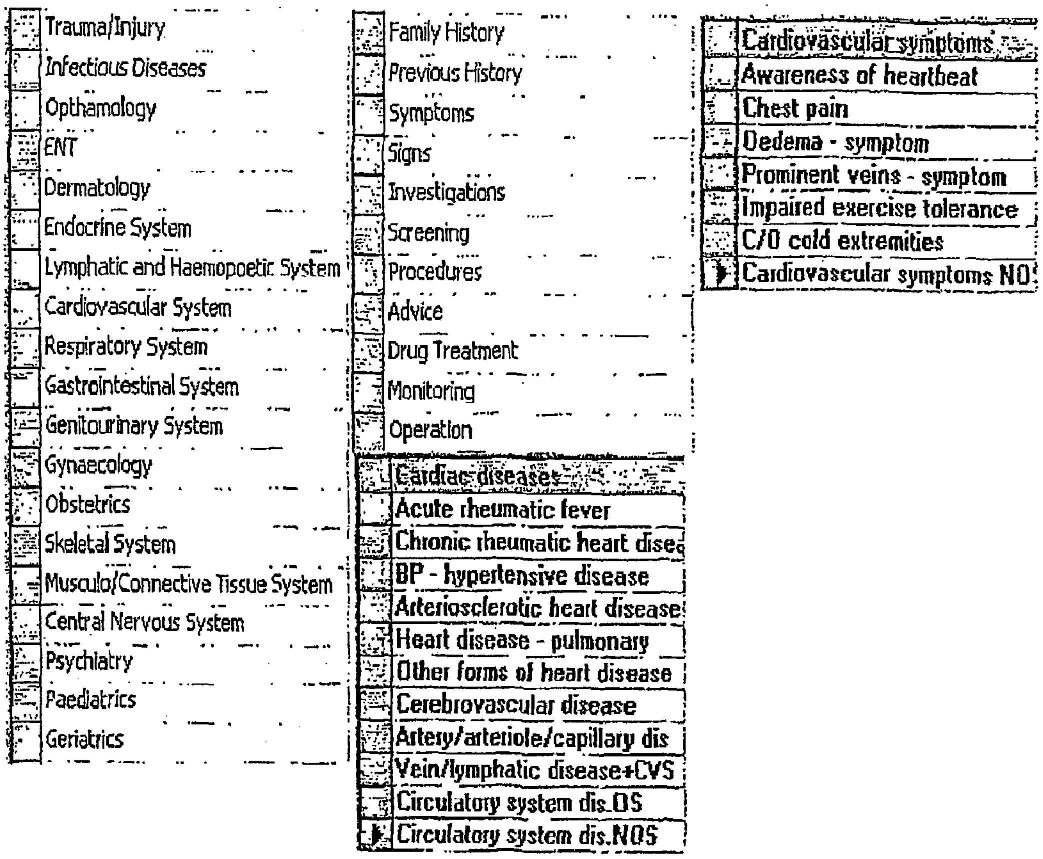
Figure 57:
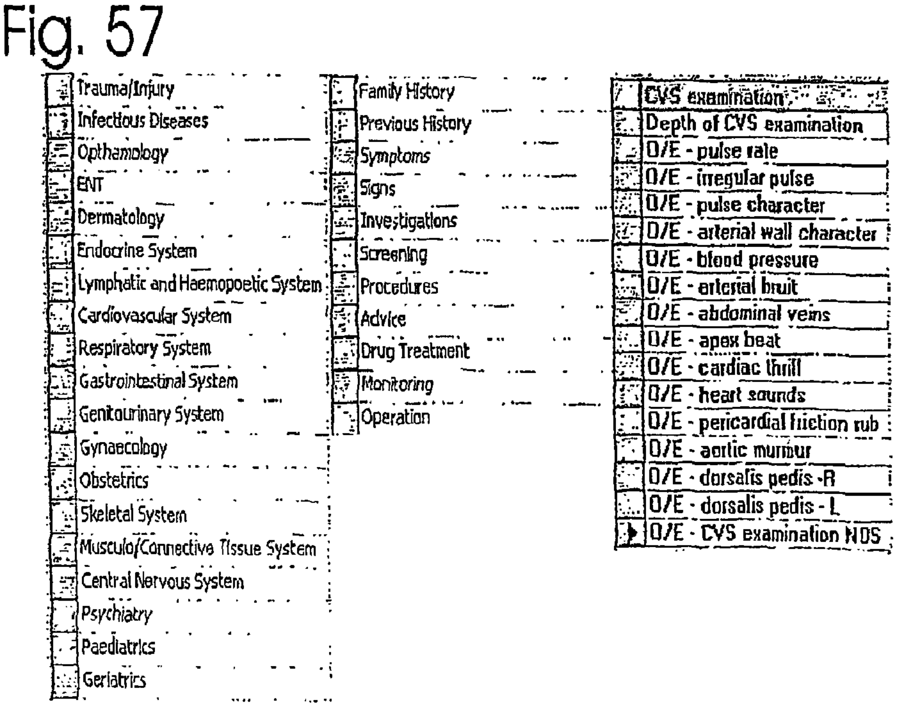
Figure 58:
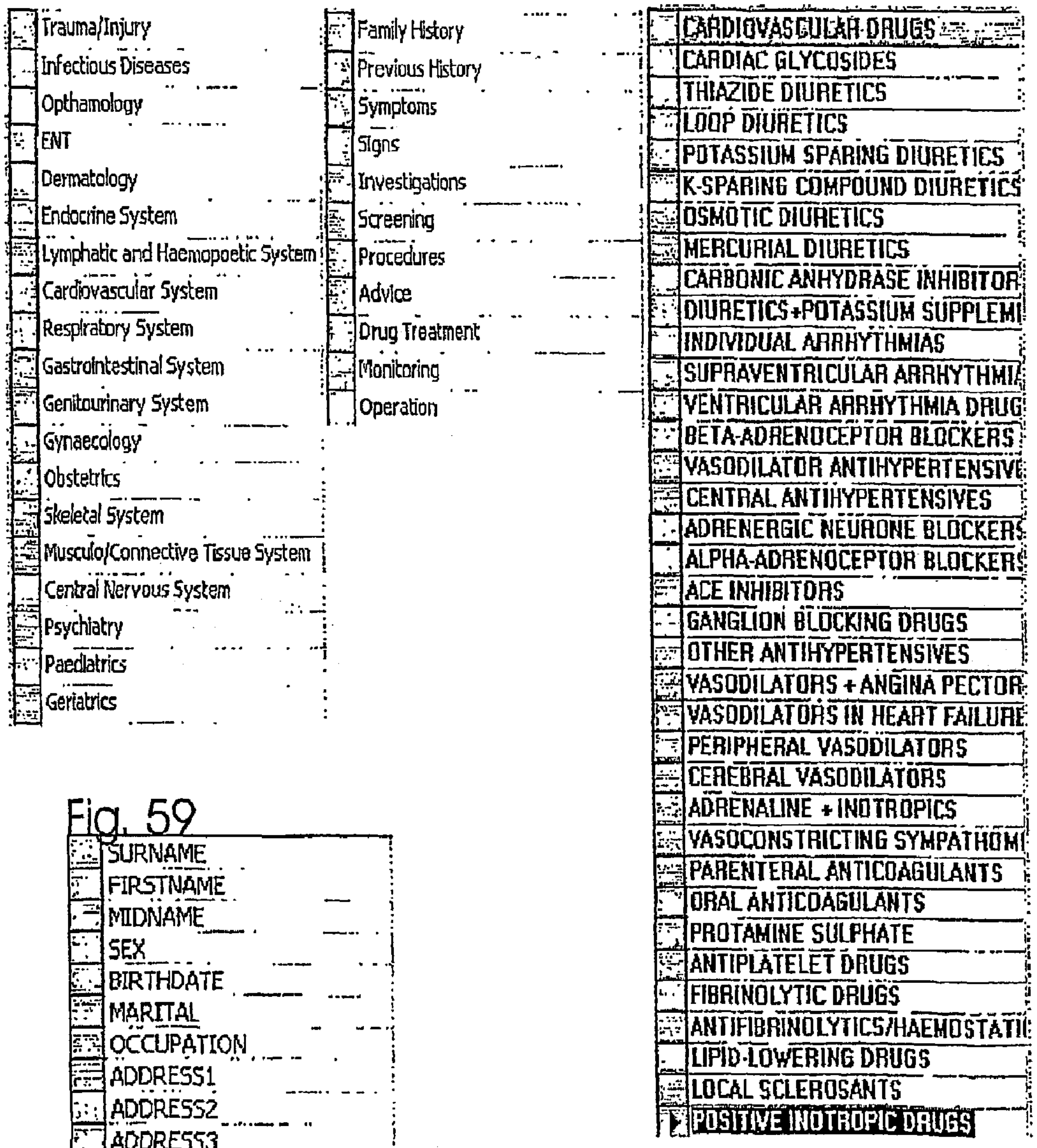

The default structure for the HCG recording new data would group medical problems by speciality. FIG. 56 shows the speciality listing the normal clinical recording process for each speciality for example the cardiovascular system, as this is the most familiar way that doctors group conditions. The user can modify this standard approach by adding their own classification e.g. This may be by aetiology, body systems, or common clinical groups. FIGS. 46, 47, and 48 for example show that the HCG would enhance the standard Read Code by having additional branching HCGs as a bordergrid or qualifier grid from each clinical feature. The clinical features (symptoms, signs, and investigations) would have branching hierarchical grids in three main areas: Listing the possible variation of that clinical feature, giving a differential diagnosis for that clinical feature, and a management route for that symptom. The variations list the variations in description of the clinical feature. A row will represent a single variant of description and this can be hierarchically arranged by several grids. The differential diagnosis lists the possible conditions that cause the clinical feature. The order of the differential diagnosis will be the incidence that condition occurs with that feature. It will be calculated initially by the differential diagnosis listing all conditions that may have that clinical feature and then arranging the order of that list of condition to be dependent on the incident of the condition and the probability that that condition would have that particular manifestation of the clinical feature. The manifestation of the clinical feature could vary if it were a symptom, sign or investigation. The variation of symptom could vary in all the conventional ways that a symptom could be described. Each different descriptive pattern could have a different likelihood of being a cause of a certain condition. The signs could be listed by how they could vary with regard to their descriptive pattern. Likewise the investigations could vary with the ranges of values or different patterns of values. Each variation could have a probability. Thus the computer could list the differential diagnosis with most likely probability (i.e. incidence of The clinical feature would have a management pathway reminding a doctor of the correct pathway to manage any one clinical feature.

The doctor would then select the most likely diagnosis or condition based upon the features. Having selected a condition then the doctor would wish to record as many clinical features that confirm that condition. This can be done because the condition will have a bordergrid and/or qualifier grid that would allow the doctor to add any unique clinical feature that could describe the condition. The doctor could then order any appropriate tests to confirm diagnosis and aid management of the condition. The doctor then could manage the condition. This is because the system allows exact text book data to be divided into hierarchical data in unique description per row of each of the hierarchical grids. This data would be classified to the nearest read code HIC as described in the HCG section. Thus the system offers the user a recording system which can use the latest medical information directly within the recording system. Thus the very recording process is educational, safe for the patient and time saving as the user has all the information to hand.

How the Medical System would Store the Data of the Recording System.

The normal way that the system would add data to a particular patient record is that the doctor would record the clinical features of a patient using a HCG. This may be any read code clinical feature. It may be a clinical feature from a bordergrid or qualified grid related to a clinical feature. The doctor could order appropriate investigations (to provide further clinical feature data) and also start an appropriate management for that patient using the HCG. All these would normally be stored under a condition. The program would know all the codes for conditions and when the hierarchical data was to be saved to the patient's notes. The method of saving the newly added data may be any command button in the patient's medical record. Likewise the method of clearing the recorded data by the HCG may be any other command button. The developer may even continue to use the bordergrid method on the left hand border of the recorded data grid from the HCG. This could provide menu options to save or clear the data. They could be triggered by clicking or Zero-clicking. Once the data is saved the computer will look for a condition among the saved data. It would then save all the other clinical features and management data under that condition. It would check to see if that condition was already previously recorded in the patient's notes. If the condition was recorded it would give the user the option of filing the newly added data under and in conjunction with the existing condition's data. If no condition was specified the computer would then prompt the user to select a condition. If the user was unsure of the condition he may use any or the nearest read code to define that condition. It may be any clinical feature. The user also has the option of writing a free text description (this could done using a character grid or by keyboard). Later the user could change the condition description and/or the read code term to more accurately reflect the condition.

How the Medical Program Stores the Medical Data.

Figure 59:
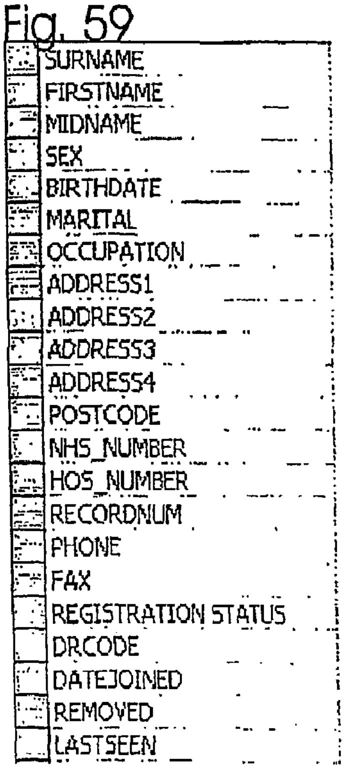
Figure 64:
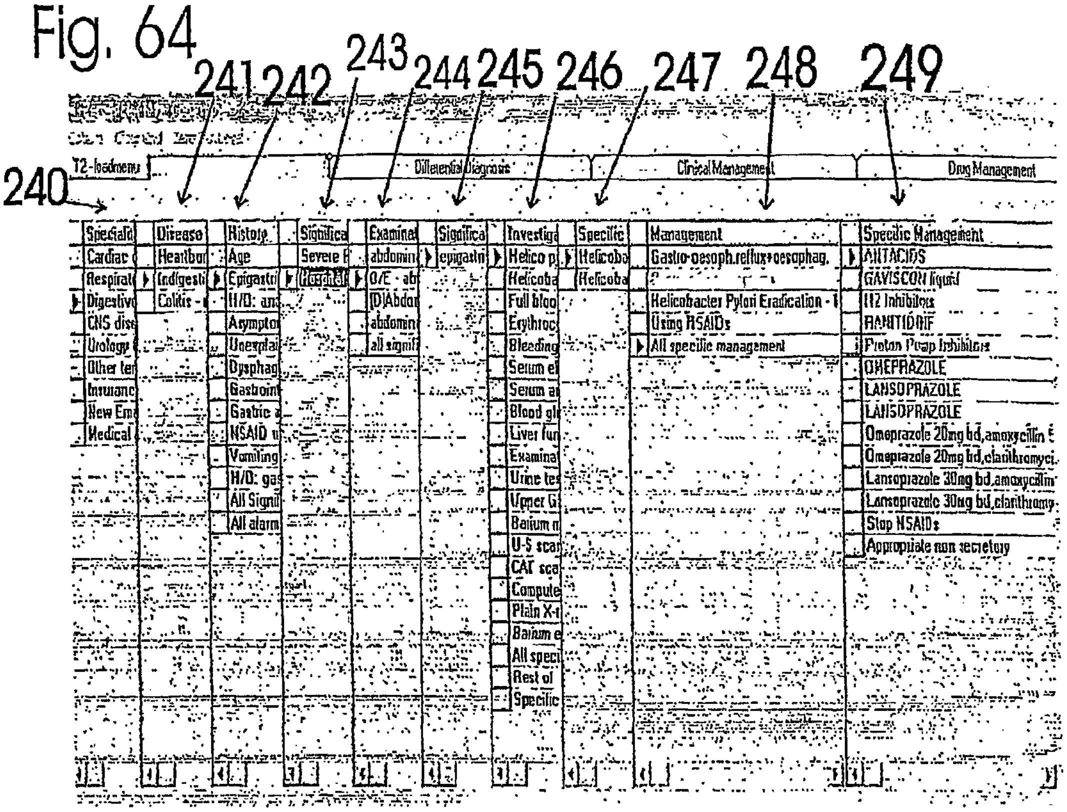
Figure 65:
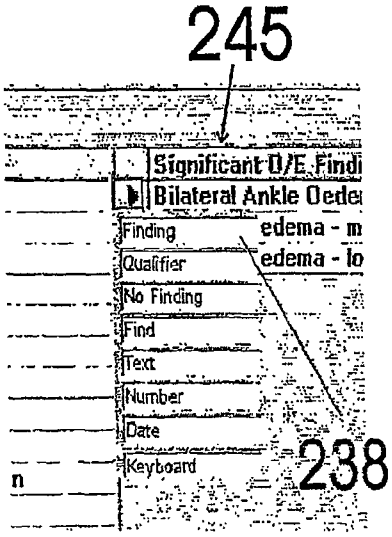
Figure 66:
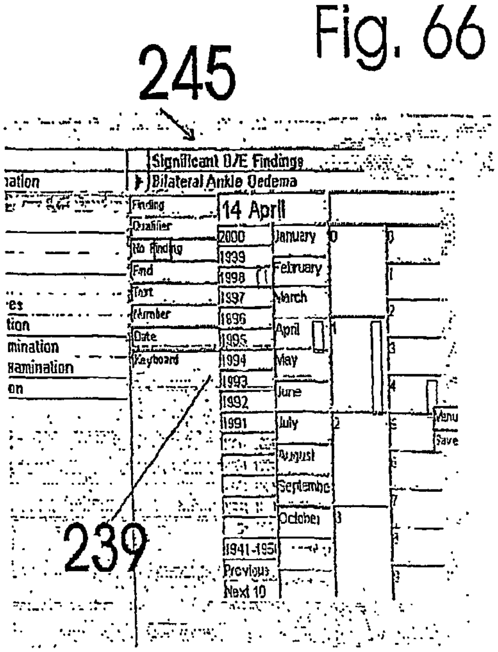

The patient has their demographic fields e.g. some illustrated in FIG. 59 (this may be all known patient data fields or useful fields to the patient). The patient has an internal record number (e.g. recordnum) that can relate this demographic data to other databases. The patient also would have a NHS number (or another government classification number that the patient could be identified by). This demographic data also includes a drcode field which would relate the demographic data to the registered doctor's details (and practice details).

This recordnum then relates the patient demographic data to the patient's conditions. This has the ability to store any further clinical feature data within the condition. Each clinical feature can be described with more detail. E.g. symptoms may be described either with conventional read code qualifiers. Signs may be described with conventional read code qualifiers. Investigations may be described with their values and/or a descriptive implication of their values. All these features may be described by any qualifier or bordergrid description relevant to that clinical feature, even free text qualifiers.

The recordnum then relates the patient's demographic data to management of that condition. The management database has the following fields recordnum, Description of the management, code for the type of management (this could be ordering any investigation, drug treatment, patient advice, procedures, operations or referrals to other specialities), condition code—ie. for which of the patient's conditions was this prescribed for, management number for the condition, date that management was actioned, memo field storing the results of management (Further diagnostic clues, and further management steps and when they were implemented). This database allows the user to know every management step for a particular condition. These may be compared to standard government protocols and/or ideal management plans for given conditions, thus the management of the individual patient may be compared to the highest standards of medical care. This information would be integrated into the recording process, and a computer feedback monitoring the doctor's management may alert the doctor if it deviated significantly from the standard management. Thus at the moment of recording the doctor may be reminded of management which may clarify the exact diagnosis of the condition, and/or the degree of severity of the condition and/or the best management based on the exact recorded data. The relational database structure of the underlying medical recording needs to be sufficient to allow for all the functions of the HCG and the recording and display of this medical information. This is one relational structure to do this: however, this may be done in different ways.

The display of the medical data. One of the most important observation for analysing doctors using the computer is that the doctor needs to be informed of the following information regarding a condition so that the doctor can be reminded of a complete overview of the current management of a patient's specific condition. The most important information the doctor needs to know is the management that the patient has, the date the management occurred and the clinical feature and/or changes that prompted it. This management grid in the preferred design will organise the management with the last management at the top. However clicking on the date column heading could reverse this to the management arranged in chronological date order. Each management (e.g. investigation, advice, drugs, procedures, operations) will be classified and recognised according to type by the read code. They will also be listed numerically from the first management step tried for the condition to the last. Thus each group of managements may be analysed. The government can analyse which drugs doctors use first (or investigations, or advice, or procedures etc). These could be compared against standard protocols. But more important the effectiveness of these managements may be automatically checked by the computer. Although this multiple column grid style is the preferred displayed style, this management grid (or all or some of the other multiple column grids shown in FIG. 52) may be arranged in the normal HCG style rather than a multiple column style if the developer prefers.

This is done by the computer showing the next grid. This next grid lists all the clinical features that have been previously entered for that given condition. The doctor therefore has an instant reminder of the clinical features that the patient has previously described to justify the diagnosis and current management. He could quickly see how the patient's symptoms have changed since the last consultation as this grid give a comprehensive view. The doctor has the option of describing how the symptoms have changed. The grid lists enables the doctor to rapidly record the changes in severity, value, or descriptive change for each clinical symptom. This is done by moving the pointer over the relevant column cell for the particular clinical feature that changes. Pop up qualifier grids may occur by clicking or Zeroclicking. This will allow HCG qualifiers so that for each symptom accurate and relevant descriptive choices are available in a hierarchical cascading grid format. The doctor can compare the clinical feature changes with the last one recorded.

The clinical protocol grid. This reminds the doctor of all the necessary clinical features that need to be asked or asked for to enable the more certain diagnosis and better management of this particular condition of the patient. It reminds the doctor of further symptoms, signs and investigations that need to investigated. Further qualifier grid or bordergrids could enable these clinical features to provide HCG which could lead the doctor down a clinical management pathway (as shown in FIGS. 52, 53 and 69). The multiple columned grid then allows the severity of these clinical features in the protocols to be recorded (e.g. no symptom is a useful feature). The protocol grid would also list the appropriate investigations and drugs to be prescribed and via qualifier grids, click or Zeroclicks enable the doctor to initiate these with a single or minimum user pointer movement.

The drug grid shows how drugs are related according to a condition. This is different from the management grid. It groups all the drugs together. The figure drug menu shows how using a bordergrid can control the drug grid with a minimum of mouse movement and user activity. The bordergrid on the right side of the drug menu could also be applied to the management grid and the clinical features and protocol grids allow the relevant bordergrid menu items to control the grids. Clicking over the headers of the grid may allow the user the choice of how many columns should appear in the individual grids and the contents of the bordergrid items.

The last grid shows a traditional way of displaying medical notes. It has a page locator for which the program calculates the number of pages. It then displays the appropriate number of columns. By navigating in a traditional bordergrid or HCG style (i.e. moving the pointer over the 1-9 pages and then over the 1 page of the page locator) enables the first page to be displayed. If the mouse is moved over the data entry then data, which was entered as one row of data via the HCG, can be modified as a single entry. Each line of data could be highlighted and be used as a text bordergrid as described in the previous word processor section (222 of FIG. 52). In this case it would be a line of data rather than a word that would be highlighted and then the Zeroclick which triggers the bordergrid would be a horizontal movement over the line and then a vertical movement up or down immediately in the white space after the line. This would allow for editing of the line of data. Any edited data would be stored so all changes to the medical records could be traced. The right hand border of the text box could be used as safeguard for editing of the notepad. There could be a bordergrid which gives the user the option of saving all the modified data (moving horizontally across into the bordergrid and moving vertically downwards highlighting the save option of the bordergrid—see the action grid 32 in FIG. 16 as an example) or removing the modified changes to the text box data (moving horizontally into the bordergrid and then vertically upwards and highlighting the undo modified data—instead of "Delete Previous Chararacter"). By clicking or Zeroclicking on the upper horizontal border (header area of the grid and all the other grids) the user would be given the option to modify the grid by a HCG bordergrid related to that click. The modifications could be numerous. However, the data could be displayed in reverse order with the most recent details first. Also the data may be displayed in a letter form. This creates a letter style from the existing patient note data. It is an intelligent letter creation method. It would automatically know what the highlighted condition was and based on the data entered in the recent consultation it would suggest the appropriate person for the referral. It would use the existing data of the computer to write a letter. E.g. thank you for seeing this two year old girl toddler with the present complaint; the computer would have deduced the description of the girl toddler from the age and sex, and the presenting complaint would be the problem just recorded—i.e the management steps in the previous consultation and the current degree of severity and/or degree of change of clinical features and any other management steps started in the current consultation. E.g. still poor hearing for 6 months despite a course of erythromycin 125 mg qds for 2 weeks in a child with glue ear. She has been commenced on sudofed and referred to you for assessment whether grommets are appropriate. The automatic letter then will list all the clinical features that support the diagnosis of glue car. The automatic letter then will list all the management that has been done for the glue car in chronological order.

Other data from the other areas would be provided. Thus the automatic letter would list a comprehensive history and management of the current problem as the HPC. It then would write in paragraph form under the relevant heading of the traditional clerking the other data medical data of the patient. This could be as comprehensive as all the data entered regarding the patient or the user would have the option of making this data less comprehensive by checking options on the bordergrid related to the header, under the section user preference for referral letter. Eventually all notes would be going electronically so that the consultant would receive the entire patient notes and able to display it in the same manner as the GP. The letter then would need to be very brief as in E.g. still poor hearing . . . above, as he could rapidly find all the information regarding the patient.

Display of the consultant's finding. The consultant (or any other medical referral person) would just add any additional clinical features noted that could further confirm diagnosis or aid management of the conditions. The system would automatically record the doctor or health professional who made the relevant entries.

Thus every doctor's performance for every condition of every patient they ever treated could be monitored accurately by the changes record in clinical features that they generated with their management. The system would be able to cost each management to the penny, know the cost of the therapeutic management and also a cost based on that health professional's time. This would be calculated by the computer monitoring the time the doctor was on in each condition for a given patient's notes, and multiplying it by the minute rate of that health professional. The computer would know the beginning of the consultation time, the end of the consultation time and how long the patient was waiting. If the doctor preferred he/she may modify the ratio of time spent on the various conditions or even divide then evenly over the total consultation time if the doctor left the computer in one of the patient's conditions longer than the real time.

The HCG would be the ideal way of displaying an overview of the all the statistical data of any population group (practice, PCG, regional, country)

The default overview of the practice medical conditions would not require any effort. Every condition for every patient would be counted. The total number of patients would be the total relevant population. By moving through the hierarchical grid, the numbers of patients with the relevant condition or management would be listed with the relevant read code displayed. If the user then used the bordergrid all the qualifier data recorded under the relevant heading could be grouped. Because of the dual classification of data with a HIC being created for every detail and it being related to a relevant read code, immense detail can be analysed. E.g. user may look at the cough and see all the detail written in the practice describing different types of cough. If a number is Zeroclicked in association with a term via a bordergrid then the full breakdown of the patients and their conditions can be listed. For larger populations, percentage would be a better way with the number of patients in brackets. This data for larger population statistics could have the personal data omitted so that the individual patient could only be traced by the doctor the patient was registered with.

For the specific search, the doctor would use the HCG. An additional HCG allows the doctor to select the population group (i.e. the ability to select all the patient data that should be included—demographic data and condition related data). Then the user could select which aspects of given conditions for that given population were need to be searched for and counted and displayed in a given manner. All this could be done using a HCG and various bordergrid and qualifier grids. The data searched for then could be displayed in a traditional report.

List of Unique Features

Adding New data. This is the done with a HCG. Using the HCG provides all the functionality of the HCG to adding medical data. E.g. to list a few: The read code is the preferred HIC code for the British medical classification system. This medical classification may vary for user or developer preference. Any term and/or its HIC may be found in a hierarchical manner without a click and/or by a find icon without a click. Any term and/or its HIC may be recorded with a single click and/or a Zeroclick and/or a bordergrid. Any term and/or its HIC may have any qualifying data linked to it Displaying Existing Data.

All clinical features and therapies are linked to a condition. Prompting the user with data which was previously recorded for a given condition to see if the recorded data has changed. Automatically linking this data to any change in management of the condition. Generating the change in management effectiveness from last consultations due to the recording of clinical features of the condition. Every management for every patient will have a cost.

Consultations will have a time element associated for every condition and the status of the person spending the time. The program then can assign a cost for every consultation. Every management step will also have the ability for an additional costing in addition to the health professional's time so that the costs of every management step can be calculated.

Thus the calculation of cost effectiveness for every condition treated in the NHS could be known.

The drugs will all be linked to a condition. Therefore the compliance to protocols could be monitored accurately.

The doctor will be given all the medical knowledge to accurately record the clinical symptoms and start the appropriate therapy in the minimum amount of steps.

The degree of certainty of diagnosis could be recorded or estimated by computer by the correlation to the typical textbook description.

The degree of effectiveness can be measured by improvement of clinical features.

The degree of conformity of the treatment by doctors could be compared to protocols. Thus if a consultant elicits more clinical features suggestive of a condition, then the consultant will have further confirmed diagnosis. The effectiveness of the management suggested by any doctor can be monitored.

Patient subjective assessment of doctors can be recorded. The quality of the explanation, lifestyle advice, compliance of patient to all guidelines.

Protocol compliance—checks the given management steps with those done by the doctor for every condition.

Diagnosis match—This checks all the recorded clinical features of the patient and tries to match the closest match. It will check according to conditions, but also can check all conditions.

Overview search.

Rapidly updatable

Locator Menu FIG. 76

The locator menu 274 may be accessed by the FIG. 52 menu item. This can be used in conjunction with a qualifier grid for data entry for describing location of any object. (e.g. within the medical context this would be a picture of a body, with parts of the body)

This is in essence the applying of a hierarchical grid which are activated by hotspots. The only difference is the recorded data is recorded on a separate grid.

The visual recording of new medical details (the Locator Menu) This shows a same sex diagram/picture front and back of a body which has hotspots. Associated with each hotspot (which is activated by the mouse moving over the body) is a cascading hierarchical grid. The grid related to each hotspot has the following structure: the anatomical areas and names related to the hotspot area, the common conditions related to the area and the ability to customise the hierarchical grid according to the needs of the user. This user defined customisation is done by having two modes for operating the grid; the recording mode and the modifying mode. The modifying mode allows the grid to be customised. This could occur by any method, but in the preferred system drag and drop or importing. Elements can be added, moved, edited or deleted to each grid related to the hotspot.

The locator menu has a third mode, where existing details can be displayed. The locator menu may also be used to display the patient's existing conditions with the medical terms positioned in the most appropriate body location (allowing for best access and visibility of the conditions). The default would display the important conditions and the last consultation's conditions. They could be highlighted in a different colour. Thus it would be easy to recognise the last consultation. The default style would place minor/trivial conditions under a heading of miscellaneous if they were not seen in the last consultation. However, the user could add different colours/font styles for the different types of clinical conditions or recording e.g chronic condition, recurrent conditions, acute conditions, and trivial conditions. They would have the option of changing the default to use the body to show all conditions, the miscellaneous conditions alone, or any of the combination of conditions according to which category was selected.

Adding New Details 273 of FIG. 52

This allows either the traditional data entry via the HCG or the previously described data entry by the management protocol.

Screening 275 and Financial Details 276

Any data which should be collected but has not been recorded under these two headings would cause these screening or financial items to flash. By moving the pointer over them the relevant screening data, e.g. a missed cervical smear, will be highlighted, or a missed claim under the financial section would be highlighted. The other features of the bordergrids triggered by these screening or financial items, would be a structured classification of the relevant screening and Analysis from the Medical Program.

Effectiveness of Medical Treatment may be assessed by the following Speed of Diagnosis, Speed of Treatment, Health Professional Manner, Effectiveness of Treatment Cost of Medical Treatment may be calculated by Heath Professional Staff Cost, and the cost for the management (e.g. drugs, procedures etc)

Isolation of Problem areas in medicine,

High Cost/High Effectiveness
- Must tell patients what is the best treatment
- Decide what the NHS can afford.

High Cost/Low Effectiveness
- Inefficiency
- Inappropriate treatment

Low Cost/High Effectiveness
- Learn what is being done right

Low Cost/Low Efficiency
- Redirect fund

Electronic filing tray. This has sections for investigation. These are ordered according to abnormality. The patient's name, the abnormal values would be described and the reason why the investigation sent. In a similar manner to the conditions grid, moving the mouse over the relevant patient row would activate a left top corner of the qualifier grid positioning the full patient details, and the full results in a window to the right of the patient's details. Moving towards the window would show a hierarchical grid offering the doctor the option of various actions for the results. Clicking or Zeroclick could access the full patient notes. The results are automatically filed in the relevant section of the notes. Thus the exact context of the investigation would be known. Investigations sent electronically from the laboratory will have two telephone ranges. The serious range which requires immediate urgent action and the abnormal range. The results would be filtered according to their severity and listed accordingly. The most immediate and severe first (for very abnormal results—the patient could be automatically contacted by phone if the results came when the primary care centre was closed, or activated a message which would notify the current GP immediately that action was required. Thus no serious investigation would ever be unnoticed in a pile of returned results. It has a section for referral letters. These would be listed according to whether action was required or the letters sent just to provide further information. The letter would be listed with letters requiring immediate urgent action first, followed by those requiring action. For the letters providing information. For those letter which provide additional information to that provided by the GP these would be listed next ordered by change of management required, referral letters which have confirmed diagnosis, or made important management decisions, and then routine follow ups with little change.

The Slider Control.

By moving the pointer horizontally, for example over a horizontal slider with measurements and/or a changing value by the movement in the horizontal direction enables by horizontal movement by synchronous movement of the slider pointer with the horizontal pointer movement to select a certain value on the slider measurement by the slider pointer. A rectangular area, around the slider measurement area with slider pointer pointing to a certain figure, either visible or invisible would be the area within which the pointer movement was done to move the slider pointer to a certain value. Once the certain value was selected by moving the pointer vertically outside this rectangular area sets the slider control at that certain value. There would be another control area within the control area containing the slider, which let the user zeroclick the value to be saved, as with all zeroclick controls if the user moved outside the larger control area containing the slider control and save button, if the save button control area had not been zeroclick, would then reset the slider control to the setting prior to the slider control been in contact with the pointer. Thus using this form of zeroclick all values which may be represented by a slider range may be zeroclicked.

A Zeroclick Device.

This could be a pointer device that works entirely by mouse movement. Thus a touchpad, or a touch sensitive screen may have Zeroclicks to activate the mouse clicks by specific movements alone over the touch sensitive pad. Thus the touch screen or touch pad would not need any pressure sensitive component and therefore much cheaper to produce. Using the zeroclick methodology a control area 1 may activate a region 2 with an additional area 3 as shown in FIG. 67. Thus by locating a finger in the control area 1, the region 2, additional area 3 and the two subareas 321 and 322 will be activated and made visible if they were not already visible. Then since the touch screen or touch pad does not require consecutive movement of the pointer, the programming of the subsequent movement of the pointer in the predetermined path area 3 may be jumping to area 321, then area 322. Movement of the pointer to any other area may deactivate the zeroclick and in addition may deactivate the control area 1. Thus unless exact finger movement is placed sequentially on the control area 1 then subarea 321 then subarea 322 (or any further or more complicated sequences if required) then the control area 1 deactivates until the exact sequence of pointer movements occurs with no touching of any other areas. The more complicated this sequence the more impossible for the sequence to occur by random. Optimum sequences to switch on devices, press buttons, and deactivate devices using this programming may be devised and thus this may be an ideal apparatus to control any electrical components with out the need for any buttons requiring pressure. E.g. the latest mobile phones may be just controlled by a touch screen, with programming that did not use any pressure components. A start sequence like that showed in FIG. 67 may activate the phone display from a very low power mode, the touch screen e.g. LCD or TFT or any other may then show telephone buttons. There may be a series of sequences from a control area 1 button to activate pressing the sequence of phone numbers, then another sequence of buttons to confirm this was the intention to telephone the number. All during this time the buttons may be informing the user what to do next e.g. to activate ringing the phone number the control area 1 in FIG. 67 as an example may say press me to ring the phone number, the control when the finger was located within that area and no where else would generate a message on 321 to say touch me to confirm ringing the phone number, and then 322 would say touch me to finally confirm ringing the phone. Thus the whole process, which relies on movement alone of the finger, being located within each button, requires no pressure, requires no mechanical parts, and by careful research into the probability of different sequences being accidentally triggered by average user, may make a phone at least as reliable as the mechanical devices, requiring no mechanical pressure, and able to surf the net on the phone, and control all functions using the zeroclick technology. It may be used as pressure less switches on all electrical appliances, locks on cars, doors or any other suitable function. Although having the feedback of a LCD or TFT screen would be the preferred design, location sensitive devices made of any suitable material which had buttons engraved on the material may be able to use this switch pressure less switch if there was a way that a sequence of button presses known to the user may activate a certain function. The marked buttons on the material with appropriate labelling would provide reminders to the obvious sequence of finger locations on the buttons to trigger the function (this use may be for electrical appliances like switching on a kettle having three buttons engraved on its side describing the sequence to switch it on or switch it off—the more complicated the more impossible for children to activate unintentionally), or not obvious to anyone bar the owner who set the sequence—eg a door lock code. Thus this zeroclick technology may be applied to any control panel or switch on any device mechanical or electrical that had a requirement for an electrical control panel or switch. The more obvious application would be a computer with a touch screen, like a notepad, which worked on the finger movements or pointer movements, and may be used for retrieving or recording any information in any multimedia format.

Graphical Interface.

How may specific pixel location be located using a zeroclick method? FIG. 77 shows one method. A control area 1 containing a zeroclick control 21 would move synchronously with the pointer. In all directions except a south-cast direction (135 degrees) the movement of the control area 1 would be synchronous with the pointer, but at this specific degree the pointer would be able to move over the ZCC. Once over the control 1 area, the pointer would be able to move freely within the control area and any other regions or additional areas activated by this control area 1. Thus when the user wished e.g. to change a certain pixel colour from white to red over the right little finger of the body drawing to indicate that location. The pointer would move to that location in horizontal and vertical movements avoiding the diagonal south east movement. Once the pointer was over the desired pixel the user would move the pointer in a south-east direction, the original location of the pixel would be remembered, and may highlighted in a different colour e.g. blue. The user then would move over to the zeroclick control 21 (or any other ZCC or bordergrid, qualifier grid) and activate a zeroclick, which would then change that pixel from white to red. Thus any pixel position may be located by a zeroclick. The further problem of how to draw may be questioned? How without the tedious process of repeated zeroclicking individual pixels may a line be drawn quickly? One way may be using a synchronous control area 1 as described above. The pointer may be located at the start pixel location as described above. The user then activates another zeroclick or a different menu item, which is the draw function. This allows the user to move the pointer anywhere, which draws in free text. In this circumstances there would be no restriction of movement as in this draw mode the control area 1 will move in all directions while the pointer is drawing. When the user has finished drawing, the user will move back over the line that he has just drawn. This in effect would be a reverse zeroclick on the line that was drawn. In this way free text drawing may be done. The reverse zeroclick may be altered to any appropriate more complicated zeroclick, the initial pointer movement of the zeroclick, however, would be a reverse movement over the line just drawn previously. The program would remember the exact point that the reverse movement occurred over the line, and provided the zeroclick was completed as specified, that point would represent the end of the line drawn. Thus full graphics programs, and other zeroclick applications may be devised using the synchronous control area 1 zeroclick control.

The application has claimed priority, which provide further examples and programming source code, and early descriptions to support the claims of this application.

The invention claimed is:

1. A method of operating a graphical user interface (GUI) that operates by an input of a movement of a pointer (0) according to a specified movement generates a 'click' event; that is the generation of said 'click' event by the completion of the movement of the pointer (0) being first positioned or moving within an area on a computer screen (300) called a control area (1) and then a subsequent movement of the pointer (0) within a second area on the screen (300) called a predetermined path area (3) according to said specified movement by the following 2 steps:

a) when the pointer (0) is immediately adjacent or passes within said control area (1) said 'click' event is not generated, b) whereby the subsequent movement of the pointer within said predetermined path area (3) according to a specified movement generates said 'click' event, which simulates direct clicking of a control, thereby triggering a function related with said control area (1).

2. A graphical user interface (GUI), which may comprise an update of an existing program, that may fully operate a GUI by a two step method of movement of a pointer (0) to operate one or more functions within the GUI, wherein, said existing program is any existing program that can operate the movement of the pointer (0) over a screen (300) and has one or more functions operated by one or more other methods apart from said two step method, and/or one or more functions operated by said one or more other methods in said existing program can be updated to operate by said two step method, wherein said GUI executes one or more functions within the GUI by the completion of the following said two step method:

first said pointer (0) is immediately adjacent or passes within a control area (1), which is an area of the screen (300) that may be any size including from a pixel on the screen (300) to occupying the whole screen (300), and second by the completion of a subsequent movement of said pointer (0) according to a specified movement generates a 'click' event, thereby triggering one or more functions within the GUI.

3. A GUI according to claim 2 wherein, the second step of said two step method is:

second by the completion of said subsequent movement of said pointer (0) within a predetermined path area (3) according to a specified movement generates said 'click' event, which simulates the direct clicking of a control, thereby triggering a function related with said control area (1), and/or said subsequent movement and/or said predetermined path area (3) of said pointer (0) is adjustable for the purpose of error prevention, so that said one or more functions accessible within the GUI generated by said 'click' event is less likely to be accidentally triggered than if said one or more functions accessible within the GUI was triggered by said pointer (0) being immediately adjacent or moving over said control area (1).

4. A GUI as defined in claim 3, wherein said control area (1) is displayed on said screen (300) and/or said control area (1) covers only a part of said screen (300).

5. A GUI as defined in claim 3, wherein said predetermined path area (3) is displayed on said screen (300) and/or said predetermined path area (3) is an identical area or less within said control area (1).

6. A GUI as defined in claim 3, wherein said control area (1) is visible.

7. A GUI as defined in claim 3, wherein said control area (1) is invisible.

8. A GUI as defined in claim 3, wherein said control area (1) is associated with plural predetermined path areas (3) that can generate different respective said 'click' events.

9. A GUI as defined in claim 3, wherein plural specified pointer movements within said predetermined path area (3) can generate different respective said 'click' events.

10. A GUI as defined in claim 3, wherein said predetermined path area (3) extends outside said control area (1).

11. A GUI as defined in claim 3, wherein the appearance of said screen (300) outside said control area (1) is adjustable to provide visual feedback to the user.

12. A GUI as defined in claim 3, wherein the appearance of said control area (1) is adjustable to provide visual feedback to the user.

13. A GUI as defined in claim 3, wherein visual feedback comprises information on how to complete the specified movement to generate said 'click' event and/or comprises visible subareas within said predetermined path area (3).

14. A GUI as defined in claim 3, wherein within one or more of the movement stages, from initial contact with said control area (1) to final movement that leads to said 'click' event provides visual feedback and/or other feedback to the user.

15. A GUI as defined in claim 3, wherein said predetermined path area (3) is adjustable so that it fits on said screen (300) on which the GUI is displayed if the original position of said control area (1) would have meant that said predetermined path area (3) would have gone off said screen (300) and not be accessible to said pointer (0).

16. A GUI as defined in claim 3, wherein said predetermined path area (3) is adjustable to suit a certain screen size.

17. A GUI as defined in claim 3, wherein the position and/or the appearance and/or size and/or shape of said predetermined path area (3) and/or the specified movement are adjustable for the purposes of user preference, that is predetermining any of the preceding features to increase the user's choice to generate at least one said 'click' event related to said control area (1) instead of operating that event by one or more said other methods.

18. A GUI as defined in claim 3, wherein the position and/or the appearance and/or size and/or shape of said predetermined path area (3) and/or the specified movement are adjustable for the purposes of speed of completing said 'click' event, that is predetermining any of the preceding features so that said 'click' event is faster to complete compared to the slowest specified movement of said pointer (0) to complete within said predetermined path area (3).

19. A GUI as defined in claim 3, wherein whole control of a computer is a series of pointer (0) movements.

20. A GUI as defined in claim 3, wherein two or more said 'click' events for controlling the control are listed.

21. A GUI as defined in claim 20, wherein the list of said 'click' events for controlling the control includes a description of the functions to be selected.

22. A GUI as defined in claim 3, wherein said other methods can be one or more said other methods of operating the GUI other than the said two step method including:

said pointer (0) is positioned or moves over a control, where said control includes an icon, menu item, or window, said pointer (0) is positioned over a pixel or within a certain area of said screen (300), a mouse or pointer device button press and/or button release, a mouse or pointer device wheel movement, a jog wheel movement, a slider device movement, a lever movement, a joystick button press and/or button release, a pen-down, that is where the pen makes contact at a specific location on the touch screen (300), a pen-up, that is where the pen leaves contact at a specific location on the touch screen (300), a digit-down, that is where the digit makes contact at a specific location on the touch screen (300), a digit-up, that is where the digit leaves contact at a specific location on the touch screen (300), a pen-down, that is where the pen makes contact at a specific location on the touch pad, a pen-up, that is where the pen leaves contact at a specific location on the touch pad, a digit-down, that is where the digit makes contact at a specific location on the touch pad, a digit-up, that is where the digit leaves contact at a specific location on the touch pad, one or more key presses and/or key releases on a keyboard, voice activation triggering a function, device button press and/or release, waiting a period of time while said pointer (0) is over the area of the control on the screen (300), a timer, and/or said other methods in combination with each other.

23. A GUI as defined in claim 3, wherein the GUI has at least one control area (1) in the form of a bordergrid, that is, a menu system associated with said control area in which the menu and/or menu items are activated by one or more said 'click' events and/or a bordergrid comprises one or more of the following: a qualifier grid, hierarchical cascading grid HCG, sequential grid and operating according to a pattern-click.

24. A GUI as defined in claim 3, wherein said 'click' event is used in conjunction with one or more said other methods to generate said one or more functions within the GUI.

25. A GUI as defined in claim 3, comprising completing a specified movement within said predetermined path area (3) related to said control area (1) of a pixel on said screen (300) which generates said 'click' event triggering the function causing a further control area (1) moving synchronously with said pointer (0) and the associated predetermined path area (3) to cease to move and be accessible to said pointer (0), and thereby can generate a further said 'click' event that is associated with said pixel of the said screen (300).

26. A GUI as defined in claim 3, wherein said subsequent movement of the pointer (0) is said subsequent movement of said pointer (0) within a predetermined path area (3) according to a specified movement is a direction of pointer movement over the screen (300) including one of the following said direction of pointer movement: a left to right said direction of pointer movement, a right to left said direction of pointer movement, an upwards said direction of pointer movement, a downwards said direction of pointer movement, a downward left to right diagonal said direction of pointer movement, a upward left to right diagonal said direction of pointer movement, a downward right to left diagonal said direction of pointer movement, a upward right to left diagonal said direction of pointer movement.

27. A GUI as defined in claim 3, wherein the input of movement of said pointer (0) can be generated by any input device that can move said pointer (0) according to a specified movement on said screen (300) including:

moving a mouse or pointer device over a surface to move said pointer (0) on said screen (300), moving said pointer (0) over said screen (300) by moving a joystick, pressing one or more arrow keys and/or one or more other device buttons and/or one or more other keys to move said pointer (0) in a similar manner to arrow keys moving said pointer (0) over said screen (300), moving said pointer (0) by sliding a digit in contact over a touch screen (300), moving said pointer (0) by sliding a pen over a touch screen (300), moving said pointer (0) over a touch screen (300) by moving a pen with a sequence of intermittent contact over a touch screen (300) so said pointer (0) moves in jumps to different locations of the touch screen (300) to complete a specified pointer movement, moving said pointer (0) over a touch screen (300) by moving a digit with a sequence of intermittent contact over a touch screen (300) so said pointer (0) moves in jumps to different locations of the touch screen (300) to complete a specified pointer movement, moving said pointer (0) by sliding a digit in contact over a touch pad, moving said pointer (0) by sliding a pen over a touch pad.

28. A GUI as defined in claim 3, wherein the specified movement of said pointer (0) to be completed within said predetermined path area (3) to generate said 'click' event includes one or more of the following specified movements:

moving said pointer (0) in a certain direction within said predetermined path area (3) including one of the following:

a right pointer movement, a left pointer movement, a up pointer movement, a down pointer movement, any other specified direction of pointer movement;

moving said pointer (0) a certain distance;

a change in direction of said pointer (0) within said predetermined path area (3) including either a reverse pointer movement or an angled pointer movement;

more than one change in direction of said pointer (0) within said predetermined path area (3);

and/or moving said pointer (0) sequentially within two or more subareas of said predetermined path area (3) in the correct sequence thereby to complete a specified pointer movement while said pointer (0) remains within said predetermined path area (3);

and/or any sequence of the preceding specified pointer movements.

29. A GUI as defined in claim 3, wherein the GUI is displayed on a touch screen (300).

30. A GUI as defined in claim 29, wherein the specified movement required to generate said 'click' event over the touch screen (300) can be generated by the movement of one pointer (0).

31. A GUI as defined in claim 29, wherein the specified movement required to generate said 'click' event over the touch screen (300) can be generated by movement of one digit over the touch screen (300).

32. A GUI as defined in claim 29, wherein the specified movement required to generate said 'click' event over the touch screen (300) can be generated by finger movements over the touch screen (300).

33. A GUI as defined in claim 29, wherein one pointer movement can be generated by movement of each digit sliding in contact over the touch screen (300).

34. A GUI as defined in claim 29, wherein said 'click' event is generated by movement of said pointer (0) caused by the digit or pen jumping to different areas over the touch screen (300).

35. A GUI as defined in claim 29, wherein said 'click' event is generated by the digit or pen moving in a specified movement over the touch screen (300).

36. A GUI as defined in claim 29, wherein the touch screen (300) comprises one of the following: a Liquid Crystal Display (LCD), Thin Film Transistor (TFT) or any other touch screen that can display the GUI.

37. A GUI according to claim 29, wherein said 'click' event generated by the input of pointer movement is as safe or is less likely to be accidentally activated on a touch screen (300) than a mechanical button press.

38. A GUI as defined in claim 29, wherein said 'click' event generates a function to activate an apparatus from low power to increased power and/or start an apparatus and/or deactivate an apparatus.

39. A GUI as defined in claim 3, wherein the input of pointer movement generating said 'click' event can be operated by a touch sensitive surface (300), including: a pen over a graphical tablet, a touch pad, or other touch sensitive surfaces, with or without markings, whereby these may operate in the same manner as a touch screen (300) except do not display the GUI.

40. A GUI as defined in claim 3, wherein any program, including an interne browser, operating by one or more said other methods can increase its functionality operated by the input of pointer movement by generating one or more said 'click' events to operate one or more functions of the program.

41. A GUI as defined in claim 3, wherein the specified movement of said pointer (0) required to generate said 'click' event, is not deducible to the user and/or used for a child safety device and/or a secret code.

42. A GUI as defined in claim 3, wherein moving said pointer (0) outside said predetermined path area (3) prior to completion of the specified movement resets said control area (1) to as if the specified movement of said pointer (0) to be completed within said predetermined path area (3) has not been initiated.

43. A GUI as defined in claim 3, wherein the function activated by said 'click' event can be reversed by a subsequent movement of said pointer (0) within a predetermined path area (3) according to another specified movement.

44. A GUI as defined in claim 3, wherein said pointer (0) is visible.

45. A GUI as defined in claim 3, wherein said pointer (0) is invisible.

46. A GUI as defined in claim 3, wherein the function generated by said 'click' event can be any function of the GUI, including any function which was previously activated in a GUI by one or more said other methods.

47. Computer apparatus having a GUI as defined in claim 3.

48. A GUI according to claim 47 wherein the computer apparatus is a mobile phone with a touch screen (300).

49. A GUI according to claim 47 wherein the computer apparatus is a pocket-sized personal computer which has a touch screen (300).

50. A GUI according to claim 47, wherein the computer apparatus is an electrical switch.

51. A GUI according to claim 47, wherein the computer apparatus is a control panel for an electrical and/or mechanical apparatus.

52. A method of operating a graphical user interface (GUI), which may comprise an update of an existing program, that may fully operate a GUI by a two step method of movement of a pointer (0) to operate one or more functions within the GUI, wherein said existing program is any existing program that can operate the movement of the pointer (0) over a screen (300) and has one or more functions operated by one or more other methods apart from said two step method, and/or one or more functions operated by said one or more other methods in said existing program can be updated to operate by said two step method, wherein said GUI executes one or more functions within the GUI by the completion of the following said two step method:

first said pointer (0) is immediately adjacent or passes within said a control area (1), which is an area of the screen (300) that may be any size including from a pixel on the screen (300) to occupying the whole screen (300), and second by the completion of a subsequent movement of said pointer (0) according to a specified movement generates a 'click' event, thereby triggering one or more functions within the GUI.

53. A method of operating a GUI according to claim 52 wherein, the second step of said two step method is:

second by the completion of said subsequent movement of said pointer (0) within a predetermined path area (3) according to a specified movement generates said 'click' event, which simulates the direct clicking of a control, thereby triggering a function related with said control area (1), and/or said subsequent movement and/or said predetermined path area (3) of said pointer (0) is adjustable for the purpose of error prevention, so that said one or more functions accessible within the GUI generated by said 'click' event is less likely to be accidentally triggered than if said one or more functions accessible within the GUI was triggered by said pointer (0) being immediately adjacent or moving over said control area (1).

54. A method of operating a GUI as defined in claim 53, wherein said control area (1) is displayed on said screen (300) and/or said control area (1) covers only a part of said screen (300).

55. A method of operating a GUI as defined in claim 53, wherein said predetermined path area (3) is displayed on said screen (300) and/or said predetermined path area (3) is an identical area or less within said control area (1).

56. A method of operating a GUI as defined in claim 53, wherein said control area (1) is visible.

57. A method of operating a GUI as defined in claim 53, wherein said control area (1) is invisible.

58. A method of operating a GUI as defined in claim 53, wherein said control area (1) is associated with plural predetermined path areas (3) that can generate different respective said 'click' events.

59. A method of operating a GUI as defined in claim 53, wherein plural specified pointer movements within said predetermined path area (3) can generate different respective said 'click' events.

60. A method of operating a GUI as defined in claim 53, wherein the predetermined path area (3) extends outside said control area (1).

61. A method of operating a GUI as defined in claim 53, wherein the appearance of said screen (300) outside said control area (1) is adjustable to provide visual feedback to the user.

62. A method of operating a GUI as defined in claim 53, wherein the appearance of said control area (1) is adjustable to provide visual feedback to the user.

63. A method of operating a GUI as defined in claim 53, wherein visual feedback comprises information on how to complete the specified movement to generate said 'click' event and/or comprises visible subareas within said predetermined path area (3).

64. A method of operating a GUI as defined in claim 53, wherein within one or more of the movement stages, from initial contact with said control area (1) to final movement that leads to said 'click' event provides visual feedback and/or other feedback to the user.

65. A method of operating a GUI as defined in claim 53, wherein said predetermined path area (3) is adjustable so that it fits on said screen (300) on which the GUI is displayed if the original position of said control area (1) would have meant that said predetermined path area (3) would have gone off said screen (300) and not be accessible to said pointer (0).

66. A method of operating a GUI as defined in claim 53, wherein said predetermined path area (3) is adjustable to suit a certain screen size.

67. A method of operating a GUI as defined in claim 53, wherein the position and/or the appearance and/or size and/or shape of said predetermined path area (3) and/or the specified movement are adjustable for the purposes of user preference, that is predetermining any of the preceding features to increase the user's choice to generate at least one said 'click' event related to said control area (1) instead of operating that event by one or more said other methods.

68. A method of operating a GUI as defined in claim 53, wherein the position and/or the appearance and/or size and/or shape of said predetermined path area (3) and/or the specified movement are adjustable for the purposes of speed of completing said 'click' event, that is predetermining any of the preceding features so that said 'click' event is faster to complete compared to the slowest specified movement of said pointer (0) to complete within said predetermined path area (3).

69. A method of operating a GUI as defined in claim 53, wherein whole control of a computer is a series of pointer (0) movements.

70. A method of operating a GUI as defined in claim 53, wherein two or more said 'click' events for controlling the control are listed.

71. A method of operating a GUI as defined in claim 70, wherein the list of said 'click' events for controlling the control includes a description of the functions to be selected.

72. A method of operating a GUI as defined in claim 53, wherein said other methods can be one or more said other methods of operating the GUI other than the said two step method including:

said pointer (0) is positioned or moves over a control, where said control includes an icon, menu item, or window, said pointer (0) is positioned over a pixel or within a certain area of said screen (300), a mouse or pointer device button press and/or button release, a mouse or pointer device wheel movement, a jog wheel movement, a slider device movement, a lever movement, a joystick button press and/or button release, a pen-down, that is where the pen makes contact at a specific location on the touch screen (300), a pen-up, that is where the pen leaves contact at a specific location on the touch screen (300), a digit-down, that is where the digit makes contact at a specific location on the touch screen (300), a digit-up, that is where the digit leaves contact at a specific location on the touch screen (300), a pen-down, that is where the pen makes contact at a specific location on the touch pad, a pen-up, that is where the pen leaves contact at a specific location on the touch pad, a digit-down, that is where the digit makes contact at a specific location on the touch pad, a digit-up, that is where the digit leaves contact at a specific location on the touch pad, one or more key presses and/or key releases on a keyboard, voice activation triggering a function, device button press and/or release, waiting a period of time while said pointer (0) is over the area of the control on the screen (300), a timer, and/or said other methods in combination with each other.

73. A method of operating a GUI as defined in claim 53, wherein the GUI has at least one control area (1) in the form of a bordergrid, that is, a menu system associated with said control area in which the menu and/or menu items are activated by one or more said 'click' events and/or a bordergrid comprises one or more of the following: a qualifier grid, hierarchical cascading grid HCG, sequential grid, and operating according to a patternclick.

74. A method of operating a GUI as defined in claim 53, wherein said 'click' event is used in conjunction with one or more said other methods to generate said one or more functions within the GUI.

75. A method of operating a GUI as defined in claim 53, comprising completing a specified movement within said predetermined path area (3) related to said control area (1) of a pixel on said screen (300) which generates said 'click' event triggering the function causing a further control area (1) moving synchronously with said pointer (0) and the associated predetermined path area (3) to cease to move and be accessible to said pointer (0), and thereby can generate a further said 'click' event that is associated with said pixel of the said screen (300).

76. A method of operating a GUI as defined in claim 53, said subsequent movement of the pointer (0) is said subsequent movement of said pointer (0) within a predetermined path area (3) according to a specified movement is a direction of pointer movement over the screen (300) including one of the following said direction of pointer movement: a left to right said direction of pointer movement, a right to left said direction of pointer movement, an upwards said direction of pointer movement, a downwards said direction of pointer movement, a downward left to right diagonal said direction of pointer movement, an upward left to right diagonal said direction of pointer movement, a downward right to left diagonal said direction of pointer movement, and an upward right to left diagonal said direction of pointer movement.

77. A method of operating a GUI as defined in claim 53, wherein the input of movement of said pointer (0) can be generated by any input device that can move said pointer (0) according to a specified movement on said screen (300) including:

moving a mouse or pointer device over a surface to move said pointer (0) on said screen (300), moving said pointer (0) over said screen (300) by moving a joystick, pressing one or more arrow keys and/or one or more other device buttons and/or one or more other keys to move said pointer (0) in a similar manner to arrow keys moving said pointer (0) over said screen (300), moving said pointer (0) by sliding a digit in contact over a touch screen (300), moving said pointer (0) by sliding a pen over a touch screen (300), moving said pointer (0) over a touch screen (300) by moving a pen with a sequence of intermittent contact over a touch screen (300) so said pointer (0) moves in jumps to different locations of the touch screen (300) to complete a specified pointer movement, moving said pointer (0) over a touch screen (300) by moving a digit with a sequence of intermittent contact over a touch screen (300) so said pointer (0) moves in jumps to different locations of the touch screen (300) to complete a specified pointer movement, moving said pointer (0) by sliding a digit in contact over a touch pad, moving said pointer (0) by sliding a pen over a touch pad.

78. A method of operating a GUI as defined in claim 53, wherein the specified movement of said pointer (0) to be completed within said predetermined path area (3) to generate said 'click' event includes one or more of the following specified movements:

moving said pointer (0) in a certain direction within said predetermined path area (3) including one of the following:

a right pointer movement, a left pointer movement, a up pointer movement, a down pointer movement, any other specified direction of pointer movement;

moving said pointer (0) a certain distance;

a change in direction of said pointer (0) within said predetermined path area (3) including either a reverse pointer movement or an angled pointer movement;

more than one change in direction of said pointer (0) within said predetermined path area (3);

and/or moving said pointer (0) sequentially within two or more subareas of said predetermined path area (3) in the correct sequence thereby to complete a specified pointer movement while said pointer (0) remains within said predetermined path area (3);

and/or any sequence of the preceding specified pointer movements.

79. A method of operating a GUI as defined in claim 53, wherein the GUI is displayed on a touch screen (300).

80. A method of operating a GUI as defined in claim 79, wherein the specified movement required to generate said 'click' event over the touch screen (300) can be generated by the movement of more than one pointer (0).

81. A method of operating a GUI as defined in claim 79, wherein the specified movement required to generate said 'click' event over the touch screen (300) can be generated by movement of one digit over the touch screen (300).

82. A method of operating a GUI as defined in claim 79, wherein the specified movement required to generate said 'click' event over the touch screen (300) can be generated by finger movements over the touch screen (300).

83. A method of operating a GUI as defined in claim 79, wherein one pointer movement can be generated by movement of each digit sliding in contact over the touch screen (300).

84. A method of operating a GUI as defined in claim 79, wherein said 'click' event is generated by movement of said pointer (0) caused by the digit or pen jumping to different areas over the touch screen (300).

85. A method of operating a GUI as defined in claim 79, wherein said 'click' event is generated by the digit or pen moving in a specified movement over the touch screen (300).

86. A method of operating a GUI as defined in claim 79, wherein the touch screen (300) comprises one of the following: a Liquid Crystal Display (LCD), Thin Film Transistor (TFT) or any other touch screen that can display the GUI.

87. A method of operating a GUI according to claim 79, wherein said 'click' event generated by the input of pointer movement is as safe or is less likely to be accidentally activated on a touch screen (300) than a mechanical button press.

88. A method of operating a GUI as defined in claim 79, wherein said 'click' event generates a function to activate an apparatus from low power to increased power and/or start an apparatus and/or deactivate an apparatus.

89. A method of operating a GUI as defined in claim 53, wherein the input of pointer movement generating said 'click' event can be operated by a touch sensitive surface (300), including: a pen over a graphical tablet, a touch pad, or other touch sensitive surfaces, with or without markings, whereby these may operate in the same manner as a touch screen (300) except do not display the GUI.

90. A method of operating a GUI as defined in claim 53, wherein any program, including an interne browser, operating by one or more said other methods can increase its functionality operated by the input of pointer movement by generating one or more said 'click' events to operate one or more functions of the program.

91. A method of operating a GUI as defined in claim 53, wherein the specified movement of said pointer (0) required to generate said 'click' event, is not deducible to the user and/or used for a child safety device and/or a secret code.

92. A method of operating a GUI as defined in claim 53, wherein moving said pointer (0) outside said predetermined path area (3) prior to completion of the specified movement resets said control area (1) to as if the specified movement of said pointer (0) within said predetermined path area (3) has not been initiated.

93. A method of operating a GUI as defined in claim 53, wherein the function activated by said 'click' event can be reversed by a subsequent movement of said pointer (0) within a predetermined path area (3) according to another specified movement.

94. A method of operating a GUI as defined in claim 53, wherein said pointer (0) is visible.

95. A method of operating a GUI as defined in claim 53, wherein said pointer (0) is invisible.

96. A method of operating a GUI as defined in claim 53, wherein the function generated by said 'click' event can be any function of the GUI, including any function which was previously activated in a GUI by said one or more other methods.

97. A method of operating a GUI as defined in claim 53, wherein the full control of the GUI is operated only by the input of pointer movement, that is all of the one or more functions of the GUI can be fully generated by only one or more said 'click' events.

98. A computer program having program instructions stored in a computer-readable medium for causing a computer to operate a GUI in accordance with all the steps of a method of operating a GUI as defined in claim 53.

99. A method of operating a GUI according to claim 98 wherein the computer apparatus is a mobile phone with a touch screen (300).

100. A method of operating a GUI according to claim 98 wherein the computer apparatus is a pocket-sized personal computer which has a touch screen (300).

101. A method of operating a GUI according to claim 98, wherein the computer apparatus is a control panel for an electrical and/or mechanical apparatus and/or operate one of the functions as a switch.

102. A graphical user interface (GUI), which may fully operate a GUI by pointer movement alone, including updating any existing program, and/or one or more functions within the GUI previously operated by a point and click method to be operated by pointer (0) movement, where said point is the location or position of the visible or invisible pointer (0) within a screen (300) area, and said point and click method is a method in which one or more functions within the GUI are generated by the position of the pointer (0) within said screen (300) area and/or one or more other methods, where said other method may be any other method apart from pointer movement, including a click detection circuit, a pointer device button press, pointer device button release, a mouse button press, a mouse button release, moving a wheel, a joystick button press, a joystick button release, moving a slider, moving a dial, a touch screen (300) click detection circuit detecting a click by a pen-down, pen-up, pen-drag, and pen-still, said touch screen pen-down wherein said pen-down is holding the pen against a touch screen (300), said touch screen pen-up where said pen-up is lifting a pen off a touch screen (300), said pen-drag where said pen drag is said pen-down and pointer movement across a touch screen (300), and said pen-still is said pen-down waiting within a touch screen area for a time delay, a voice command, pressing one or more keys on a keyboard, releasing one or more keys on a keyboard, a time delay, and any other input method, wherein said pointer movement alone means the change or changes of position of the pointer (0) within the screen (300) is the only single element required to operate one or more functions within the GUI and may fully operate the GUI without any said other method of operating the GUI by completing one or a series of pointer movements, wherein each pointer movement completed according to a specified movement generates one or more functions within the GUI.

103. A GUI according to claim 102, wherein one or more functions within the GUI are executed by the completion of said pointer (0) movement according to a specified movement and/or in conjunction with said one or more other methods, and/or the one or more purposes of operating one or more functions of the GUI by pointer movement include to generate a function:

more safely with less accidental error for error prevention, faster, by a movement of a pointer only on a screen (300) than the identical pointer movement and one or more other methods, increasing the functionality accessible on the screen by offering functions triggered by pointer movement and/or one or more other methods, simpler to use as only requires a pointer movement, and both a touch screen (300) and mouse pointer device can operate by pointer movement, and/or said pointer (0) movement according to a specified movement may be one or more directions of pointer movement over the screen (300) including one of the following said direction of pointer movement: a left to right said direction of pointer movement, a right to left said direction of pointer movement, an upwards said direction of pointer movement, a downwards said direction of pointer movement, a downward left to right diagonal said direction of pointer movement, an upward left to right diagonal said direction of pointer movement, a downward right to left diagonal said direction of pointer movement, an upward right to left diagonal said direction of pointer movement, and any other said direction of pointer movement.

104. A method of operating a graphical user interface (GUI), which may fully operate a GUI by pointer movement alone, including updating any existing program, and/or one or more functions within the GUI previously operated by a point and click method to be operated by pointer (0) movement, where said point is the location or position of the visible or invisible pointer (0) within a screen (300) area, and said point and click method is a method in which one or more functions within the GUI are generated by the position of the pointer (0) within said screen (300) area and/or one or more other methods, where said other method may be any other method apart from pointer movement, including a click detection circuit, a pointer device button press, pointer device button release, a mouse button press, a mouse button release, moving a wheel, a joystick button press, a joystick button release, moving a slider, moving a dial, a touch screen (300) click detection circuit detecting a click by a pen-down, pen-up, pen-drag, and pen-still, said touch screen pen-down wherein said pen-down is holding the pen against a touch screen (300), said touch screen pen-up where said pen-up is lifting a pen off a touch screen (300), said pen-drag where said pen drag is said pen-down and pointer movement across a touch screen (300), and said pen-still is said pen-down waiting within a touch screen area for a time delay, a voice command, pressing one or more keys on a keyboard, releasing one or more keys on a keyboard, a time delay, and any other input method, wherein said pointer movement alone means the change or changes of position of the pointer (0) within the screen (300) is the only single element required to operate one or more functions within the GUI and may fully operate the GUI without any said other method of operating the GUI by completing one or a series of pointer movements, wherein each pointer movement completed according to a specified movement generates one or more functions within the GUI.

105. A method of operating a GUI according to claim 104, wherein one or more functions within the GUI are executed by the completion of said pointer (0) movement according to a specified movement and/or in conjunction with said one or more other methods, and/or the one or more purposes of operating one or more functions of the GUI by pointer movement include to generate a function:

more safely with less accidental error for error prevention, faster, by a movement of a pointer only on a screen (300) than the identical pointer movement and one or more other methods, increasing the functionality accessible on the screen by offering functions triggered by pointer movement and/or one or more other methods, simpler to use as only requires a pointer movement, and both a touch screen (300) and mouse pointer device can operate by pointer movement and/or said pointer (0) movement according to a specified movement may be one or more directions of pointer movement over the screen (300) including one of the following said direction of pointer movement: a left to right said direction of pointer movement, a right to left said direction of pointer movement, an upwards said direction of pointer movement, a downwards said direction of pointer movement, a downward left to right diagonal said direction of pointer movement, an upward left to right diagonal said direction of pointer movement, a downward right to left diagonal said direction of pointer movement, an upward right to left diagonal said direction of pointer movement, and any other said direction of pointer movement.

* * * * *